(12) United States Patent
Hurst

(10) Patent No.: US 9,841,769 B2
(45) Date of Patent: Dec. 12, 2017

(54) FLUID ACTIVATED FLOW CONTROL APPARATUS

(71) Applicant: Colt Irrigation LLC, Goleta, CA (US)

(72) Inventor: James Walter Hurst, Goleta, CA (US)

(73) Assignee: Colt Irrigation LLC, Goleta, CA (US)

( * ) Notice: Subject to any disclaimer, the term of this patent is extended or adjusted under 35 U.S.C. 154(b) by 84 days.

(21) Appl. No.: 15/131,934

(22) Filed: Apr. 18, 2016

(65) Prior Publication Data

US 2016/0327962 A1 Nov. 10, 2016

Related U.S. Application Data

(63) Continuation of application No. 13/759,947, filed on Feb. 5, 2013, now Pat. No. 9,341,281, which is a continuation-in-part of application No. 13/717,134, filed on Dec. 17, 2012, now abandoned, which is a continuation-in-part of application No. 13/469,899, filed on May 11, 2012, now Pat. No. 8,397,745, which is a continuation-in-part of application No.
(Continued)

(51) Int. Cl.
| | |
|---|---|
| *F16K 11/22* | (2006.01) |
| *G05D 7/03* | (2006.01) |
| *F16K 31/385* | (2006.01) |
| *G05D 7/01* | (2006.01) |

(52) U.S. Cl.
CPC ............. *G05D 7/03* (2013.01); *F16K 31/385* (2013.01); *G05D 7/012* (2013.01); *F16K 11/22* (2013.01); *G05D 7/018* (2013.01); *Y10T 137/268* (2015.04); *Y10T 137/7793* (2015.04)

(58) Field of Classification Search
CPC ........... Y10T 137/268; Y10T 137/2683; Y10T 137/2685; Y10T 137/269; Y10T 137/7762; Y10T 137/7793; F16K 31/16; F16K 31/36; F16K 31/385; G05D 7/03; G05D 7/018
USPC ............. 137/119.03, 119.04, 119.05, 119.07, 137/119.08, 488
See application file for complete search history.

(56) References Cited

U.S. PATENT DOCUMENTS

| | | |
|---|---|---|
| 981,271 A | 1/1911 | Hutchins |
| 1,590,558 A | 6/1926 | Stenhouse |
| 1,606,245 A | 11/1926 | Lang |
| (Continued) | | |

FOREIGN PATENT DOCUMENTS

| | | |
|---|---|---|
| EP | 2 687 763 A1 | 1/2014 |
| GB | 1 491 779 | 11/1977 |
| (Continued) | | |

OTHER PUBLICATIONS

4000 Series Indexing Valves from http://web.archive.org/web/20060312222240/http://www.krain.com/index.cfm?fuseaction=indexingvlvs.4000series&CFID=28203112&CFTOKEN=85029057, Mar. 12, 2006.
(Continued)

*Primary Examiner* — William McCalister
(74) *Attorney, Agent, or Firm* — Knobbe, Martens, Olson & Bear LLP

(57) ABSTRACT

Embodiments of a fluid flow regulating device and methods of using the same are described. Certain embodiments manages fluid flow between one or more input ports and output ports at least partly in response to fluid pressure changes and/or by a mechanism driven by fluid flow, optionally without using electrical power.

21 Claims, 71 Drawing Sheets

Related U.S. Application Data

12/028,992, filed on Feb. 11, 2008, now Pat. No. 8,230,871.

(60) Provisional application No. 60/901,055, filed on Feb. 12, 2007.

(56) References Cited

U.S. PATENT DOCUMENTS

| | | |
|---|---|---|
| 1,704,374 A | 3/1929 | Stewart et al. |
| 1,812,586 A | 6/1931 | Elder |
| 1,826,450 A | 10/1931 | Bragg et al. |
| 1,859,357 A | 5/1932 | Elder |
| 1,901,496 A | 3/1933 | Elder |
| 2,059,126 A | 10/1936 | Malthaner |
| 2,311,108 A | 2/1943 | Hauser |
| 2,341,041 A | 2/1944 | Hauser |
| 2,389,817 A | 11/1945 | Rider |
| 2,418,794 A | 4/1947 | Iver |
| 2,533,960 A | 12/1950 | Rothschild |
| 2,591,216 A | 4/1952 | Thompson et al. |
| 2,619,105 A | 11/1952 | Hauswer |
| 2,625,429 A | 1/1953 | Coles |
| 2,641,280 A | 6/1953 | Fleischhauer |
| 2,642,076 A | 6/1953 | Tigert et al. |
| 2,678,662 A | 5/1954 | Boteler |
| 2,744,541 A | 5/1956 | Fleischhauer |
| 2,749,080 A | 6/1956 | Griswold |
| 2,771,905 A | 11/1956 | Griswold |
| 2,784,648 A | 3/1957 | Zelewsky |
| 2,837,241 A | 6/1958 | Griswold |
| 2,844,167 A | 7/1958 | Griswold |
| 2,861,301 A | 11/1958 | Haberlin |
| 2,880,757 A | 4/1959 | Campbell |
| 2,919,590 A | 1/1960 | Griswold |
| 2,921,629 A | 1/1960 | Stout |
| 2,931,233 A | 4/1960 | Griswold |
| 2,944,565 A | 7/1960 | Dahl |
| 2,986,167 A | 5/1961 | Griswold |
| 2,991,796 A | 7/1961 | Griswold |
| 3,003,514 A | 10/1961 | Furlong |
| 3,018,788 A | 1/1962 | Perlis |
| 3,042,074 A * | 7/1962 | Graybill ............ A01G 25/162 137/119.03 |
| 3,103,339 A | 9/1963 | Rose |
| 3,105,518 A | 10/1963 | Kunz |
| 3,108,609 A | 10/1963 | Allen |
| 3,125,112 A | 3/1964 | Maurice |
| 3,147,770 A | 9/1964 | Perlis |
| 3,181,551 A | 5/1965 | Coletti |
| 3,204,872 A | 9/1965 | Whear |
| 3,217,653 A | 11/1965 | Griswold |
| 3,224,458 A | 12/1965 | Davis |
| 3,226,909 A | 1/1966 | Zelewsky et al. |
| 3,232,317 A | 2/1966 | Fowler |
| 3,241,569 A | 3/1966 | Sully |
| 3,252,285 A | 5/1966 | Krautwurst et al. |
| 3,256,909 A | 6/1966 | Obidniak et al. |
| 3,278,424 A | 10/1966 | Griswold |
| 3,303,755 A | 2/1967 | Linker et al. |
| 3,335,756 A | 8/1967 | McPherson |
| 3,336,843 A | 8/1967 | Griswold |
| 3,344,809 A | 10/1967 | Smith |
| 3,367,621 A | 2/1968 | Griswold |
| 3,369,565 A | 2/1968 | Haggard, Jr. |
| 3,402,890 A | 9/1968 | Heitzman |
| 3,405,733 A | 10/1968 | Hansen |
| 3,420,270 A | 1/1969 | Neyer |
| 3,422,847 A | 1/1969 | Polizzi |
| 3,431,933 A | 3/1969 | Tidd |
| 3,454,048 A | 7/1969 | Van der Veer |
| 3,478,780 A | 11/1969 | Gheen |
| 3,480,034 A | 11/1969 | Jerome |
| 3,512,543 A | 5/1970 | Kubik |
| 3,519,016 A | 7/1970 | Kah et al. |
| 3,524,470 A | 8/1970 | Kah, Jr. et al. |
| 3,540,213 A | 11/1970 | Johnston et al. |
| 3,604,456 A | 9/1971 | Jones |
| 3,635,237 A | 1/1972 | Kah et al. |
| 3,730,208 A | 5/1973 | Lewis |
| 3,735,722 A | 5/1973 | Hooper et al. |
| 3,747,620 A | 7/1973 | Kah, Jr. |
| 3,752,184 A | 8/1973 | Griswold |
| 3,779,269 A | 12/1973 | Gould |
| 3,785,391 A | 1/1974 | Miller |
| 3,791,619 A | 2/1974 | Pett |
| 3,797,740 A | 3/1974 | Kah et al. |
| 3,838,046 A | 9/1974 | Hunter |
| 3,845,777 A | 11/1974 | Gilson |
| 3,853,145 A | 12/1974 | Judd |
| 3,867,961 A | 2/1975 | Rudelick |
| 3,870,274 A | 3/1975 | Broe |
| 3,888,143 A | 6/1975 | Kolehmainen et al. |
| 3,938,426 A | 2/1976 | Hunter et al. |
| 3,948,285 A | 4/1976 | Flynn |
| 3,967,808 A | 7/1976 | Lieding |
| 3,989,066 A | 11/1976 | Sturman et al. |
| 4,022,239 A | 5/1977 | Schwindt |
| RE29,252 E | 6/1977 | Miller |
| 4,029,119 A | 6/1977 | Klieves |
| 4,034,775 A | 7/1977 | Slagel |
| 4,051,767 A | 10/1977 | Landsberg |
| 4,067,541 A | 1/1978 | Hunter |
| 4,077,424 A | 3/1978 | Ehret et al. |
| 4,105,186 A | 8/1978 | Eby |
| 4,125,124 A | 11/1978 | Kah |
| 4,135,696 A | 1/1979 | Saarem et al. |
| 4,150,685 A | 4/1979 | Van Haaften |
| 4,178,954 A | 12/1979 | Klieves |
| 4,180,236 A | 12/1979 | Saarem et al. |
| 4,189,792 A | 2/1980 | Veach |
| 4,199,130 A | 4/1980 | Stoll et al. |
| 4,203,459 A | 5/1980 | Boschung |
| 4,210,169 A | 7/1980 | Palma |
| 4,212,320 A | 7/1980 | Stoll et al. |
| 4,235,254 A | 11/1980 | Kirby |
| 4,253,494 A | 3/1981 | Cooke |
| 4,312,379 A | 1/1982 | Kinder |
| 4,313,455 A | 2/1982 | Pitman |
| 4,316,480 A * | 2/1982 | Kah, Jr. ............ A01G 25/162 137/119.03 |
| 4,323,194 A | 4/1982 | Newbold et al. |
| 4,330,003 A | 5/1982 | D'Alonzo |
| 4,342,424 A | 8/1982 | Meyer et al. |
| 4,353,386 A | 10/1982 | Slagel |
| 4,398,562 A | 8/1983 | Saarem et al. |
| 4,407,451 A | 10/1983 | Hunter |
| 4,452,272 A | 6/1984 | Griswold |
| 4,492,247 A | 1/1985 | Lockwood |
| 4,496,103 A | 1/1985 | Pitchford |
| 4,502,506 A | 3/1985 | Fisher |
| 4,505,450 A | 3/1985 | Saarem et al. |
| 4,523,606 A | 6/1985 | Gould et al. |
| 4,526,198 A | 7/1985 | Scott |
| 4,537,356 A | 8/1985 | Lawson |
| 4,565,235 A | 1/1986 | Fischer et al. |
| 4,585,027 A | 4/1986 | Stillions |
| 4,592,379 A | 6/1986 | Goettl |
| 4,611,617 A | 9/1986 | Hewitt |
| 4,617,992 A | 10/1986 | Abel |
| 4,647,003 A | 3/1987 | Hilpert |
| 4,671,485 A | 6/1987 | Saarem et al. |
| 4,676,264 A | 6/1987 | Wiseman |
| 4,708,264 A | 11/1987 | Bruninga |
| D295,280 S | 4/1988 | Walser |
| 4,744,285 A | 5/1988 | Presley |
| 4,796,657 A | 1/1989 | Baker |
| 4,809,910 A | 3/1989 | Meyer |
| 4,817,661 A | 4/1989 | Howeth |
| 4,838,485 A | 6/1989 | Rinkewich |
| 4,852,802 A | 8/1989 | Iggulden |
| 4,911,401 A | 3/1990 | Holcomb et al. |
| 4,921,002 A * | 5/1990 | Christon ............ A01G 25/162 137/119.03 |

(56) References Cited

U.S. PATENT DOCUMENTS

| | | |
|---|---|---|
| 4,961,538 A | 10/1990 | Hewitt |
| 5,022,426 A | 6/1991 | Fischer |
| 5,031,875 A | 7/1991 | Zimmerman |
| 5,082,015 A * | 1/1992 | Baker ............... A01G 25/162 |
| | | 137/119.03 |
| 5,082,022 A | 1/1992 | Boundy |
| 5,100,056 A | 3/1992 | Theodorsen et al. |
| 5,104,090 A | 4/1992 | Grizzle et al. |
| 5,118,072 A | 6/1992 | Sakamoto et al. |
| 5,129,620 A | 7/1992 | Castetter |
| 5,158,475 A | 10/1992 | Tyler |
| 5,170,144 A | 12/1992 | Nielsen |
| 5,205,539 A | 4/1993 | Schalk |
| 5,207,354 A | 5/1993 | Hsu et al. |
| 5,213,124 A | 5/1993 | Costa |
| 5,230,366 A | 7/1993 | Marandi |
| 5,259,554 A | 11/1993 | Ewing et al. |
| 5,263,685 A | 11/1993 | Winnike et al. |
| 5,299,774 A | 4/1994 | Arneson et al. |
| 5,301,710 A | 4/1994 | Marandi |
| 5,301,919 A | 4/1994 | May |
| 5,328,149 A | 7/1994 | Reuter |
| 5,335,688 A | 8/1994 | Caviar |
| 5,406,974 A | 4/1995 | Griswold |
| 5,427,350 A | 6/1995 | Rinkewich |
| 5,433,243 A | 7/1995 | Griswold et al. |
| 5,445,182 A | 8/1995 | Sturman et al. |
| 5,460,076 A | 10/1995 | Pierce et al. |
| 5,487,409 A | 1/1996 | Stoll |
| 5,535,987 A | 7/1996 | Wlodarczyk |
| 5,647,397 A | 7/1997 | Heiniger et al. |
| 5,649,562 A | 7/1997 | Sturman et al. |
| 5,682,918 A | 11/1997 | Stoll et al. |
| 5,685,336 A | 11/1997 | Heiniger |
| 5,706,855 A | 1/1998 | Heiniger |
| 5,711,486 A | 1/1998 | Clark et al. |
| 5,746,058 A | 5/1998 | Vertanen |
| 5,762,092 A * | 6/1998 | Yang ............... F16K 11/074 |
| | | 137/119.03 |
| 5,762,270 A | 6/1998 | Kearby |
| 5,796,008 A | 8/1998 | Stoll et al. |
| 5,806,556 A | 9/1998 | Johnson |
| 5,823,505 A | 10/1998 | Stoll et al. |
| 5,853,026 A | 12/1998 | Wlodarczyk et al. |
| 5,879,559 A | 3/1999 | Schreiner et al. |
| 6,007,045 A | 12/1999 | Heiniger et al. |
| 6,050,286 A * | 4/2000 | Kruer ............... F16K 11/0853 |
| | | 137/119.03 |
| 6,059,259 A | 5/2000 | Gregoire et al. |
| 6,082,703 A | 7/2000 | Fava et al. |
| 6,102,362 A | 8/2000 | Gerber |
| 6,126,141 A | 10/2000 | Geiger |
| 6,182,941 B1 | 2/2001 | Scheurenbrand et al. |
| 6,220,293 B1 | 4/2001 | Rashidi et al. |
| 6,227,455 B1 | 5/2001 | Scott et al. |
| 6,241,158 B1 | 6/2001 | Clark et al. |
| 6,257,264 B1 | 7/2001 | Sturman et al. |
| D449,872 S | 10/2001 | Lohde et al. |
| 6,298,872 B1 | 10/2001 | Keller et al. |
| 6,299,075 B1 | 10/2001 | Koller et al. |
| 6,311,728 B1 | 11/2001 | Goettl |
| 6,314,999 B1 | 11/2001 | Conn |
| 6,325,087 B1 | 12/2001 | Tarr |
| 6,360,767 B1 | 3/2002 | Barnes |
| 6,386,232 B2 | 5/2002 | Serrano Sanchez et al. |
| 6,394,126 B2 | 5/2002 | Lohde et al. |
| 6,394,412 B2 | 5/2002 | Zakai et al. |
| 6,397,687 B1 | 6/2002 | Garmas |
| 6,416,033 B1 | 7/2002 | McKell et al. |
| 6,484,754 B1 | 11/2002 | Muth et al. |
| 6,491,235 B1 | 12/2002 | Scott et al. |
| 6,499,509 B2 | 12/2002 | Berger et al. |
| 6,539,967 B2 | 4/2003 | Tarr |
| 6,547,214 B2 | 4/2003 | Gregoire |
| 6,612,335 B1 | 9/2003 | Assa et al. |
| 6,622,933 B1 | 9/2003 | Young et al. |
| 6,663,078 B1 | 12/2003 | Stoll et al. |
| 6,679,053 B2 | 1/2004 | Priese |
| 6,708,715 B2 | 3/2004 | Duebel et al. |
| 6,748,970 B2 | 6/2004 | Keller |
| 6,749,136 B1 | 6/2004 | Wilson et al. |
| 6,837,271 B1 | 1/2005 | Saint |
| 6,860,469 B2 | 3/2005 | Kerg et al. |
| 6,874,756 B2 | 4/2005 | Hawkins et al. |
| 6,877,714 B2 | 4/2005 | Hall |
| 6,889,922 B1 | 5/2005 | Knight et al. |
| 6,948,697 B2 | 9/2005 | Herbert et al. |
| 6,986,500 B2 | 1/2006 | Giousouf et al. |
| 7,007,916 B2 | 3/2006 | Lee |
| 7,040,840 B2 | 5/2006 | Zook |
| 7,156,322 B1 | 1/2007 | Heitzman |
| 7,201,187 B2 | 4/2007 | Irwin et al. |
| 7,252,032 B2 | 8/2007 | Scheffel et al. |
| 7,303,147 B1 | 12/2007 | Danner et al. |
| D559,955 S | 1/2008 | Donovan |
| 7,343,845 B2 | 3/2008 | Wirti et al. |
| 7,392,824 B2 | 7/2008 | Bogdanowicz et al. |
| 7,475,863 B2 | 1/2009 | Donovan |
| 7,503,346 B1 | 3/2009 | Clark |
| 7,503,348 B2 | 3/2009 | Irwin et al. |
| 7,537,437 B2 | 5/2009 | Muramatsu et al. |
| 7,552,906 B2 | 6/2009 | Irwin et al. |
| 7,694,934 B2 | 4/2010 | Irwin |
| D622,226 S | 8/2010 | Crist |
| 7,789,052 B2 | 9/2010 | Ellison et al. |
| 7,793,913 B2 | 9/2010 | Hara |
| 7,806,382 B1 | 10/2010 | Palumbo et al. |
| 7,826,931 B2 | 11/2010 | Lorenz |
| 8,397,745 B2 | 3/2013 | Hurst |
| 8,535,540 B2 | 9/2013 | Chandler, Jr. |
| 8,651,141 B2 | 2/2014 | Giacomini et al. |
| 8,733,672 B2 | 5/2014 | Nations |
| 8,746,591 B2 | 6/2014 | Lichte et al. |
| 2002/0003042 A1 | 1/2002 | Reilly |
| 2003/0030021 A1 | 2/2003 | Hawkins et al. |
| 2005/0109400 A1 | 5/2005 | Glime et al. |
| 2005/0139061 A1 | 6/2005 | Timko et al. |
| 2005/0199292 A1 | 9/2005 | Stedman et al. |
| 2005/0230650 A1 | 10/2005 | Peterson |
| 2007/0199600 A1 | 8/2007 | Irwin et al. |
| 2008/0029722 A1 | 2/2008 | Irwin |
| 2009/0126801 A1 | 5/2009 | Grill et al. |
| 2010/0024414 A1 | 2/2010 | Hittle et al. |
| 2010/0072410 A1 | 3/2010 | LaCasse et al. |
| 2010/0161144 A1 | 6/2010 | Crist |
| 2010/0163765 A1 | 7/2010 | Gregoire |
| 2010/0276011 A1 | 11/2010 | Spitzer |
| 2011/0015794 A1 | 1/2011 | Lorenz |
| 2011/0248104 A1 | 10/2011 | Malsam |
| 2011/0284790 A1 | 11/2011 | Ikeda et al. |
| 2011/0308619 A1 | 12/2011 | Martino et al. |
| 2011/0309274 A1 | 12/2011 | Parsons et al. |
| 2013/0180599 A1 | 7/2013 | Hurst |
| 2014/0217315 A1 | 8/2014 | Morozumi et al. |
| 2014/0599356 | 1/2015 | Hurst |

FOREIGN PATENT DOCUMENTS

| | | |
|---|---|---|
| WO | WO 2012/124349 A1 | 9/2012 |
| WO | WO 2013/169511 | 11/2013 |

OTHER PUBLICATIONS

Dorot matholding group article on *Irrigation—Hydraulic remote control—Principles and assembly schemes*, downloaded from http://www.dorot.com/index.php?page_id1=820, on Jan. 22, 2015, © Dorot 2015 (4 pp).

GEMÜ® product description brochure for Diaphragm Valve, Plastic, Model 693, © Sep. 2014 by GEMÜ Gebr.Müller—Apparatebau GmbH & Co. KT, Ingelfingen-Criesbach, Germany (9 pp).

(56) References Cited

OTHER PUBLICATIONS

Humpherys et al., Momentarily-Energized Pilot Valves for Irrigation Systems, *Transactions of the ASAE* (American Society of Agricultural Engineers, St. Joseph, Michigan), pp. 1471-1475, vol. 26, No. 5.

International Search Report and Written Opinion regarding PCT/US2013/038613, dated Apr. 29, 2013.
Pohjakas, K., Development of Automated Surface Irrigation, *Canadian Agricultural Engineering*, pp. 72-74, vol. 14, No. 2, Dec. 1972.

\* cited by examiner

First Example Operating Environment

Example Cog Wheel and Springs Interface

Diaphragm Valve On Position

Third Example Operating Environment

Fourth Example Operating Environment

Second Example Operating Environment

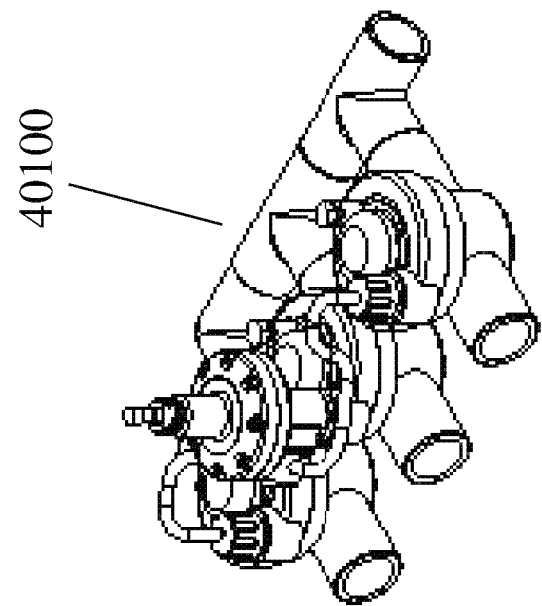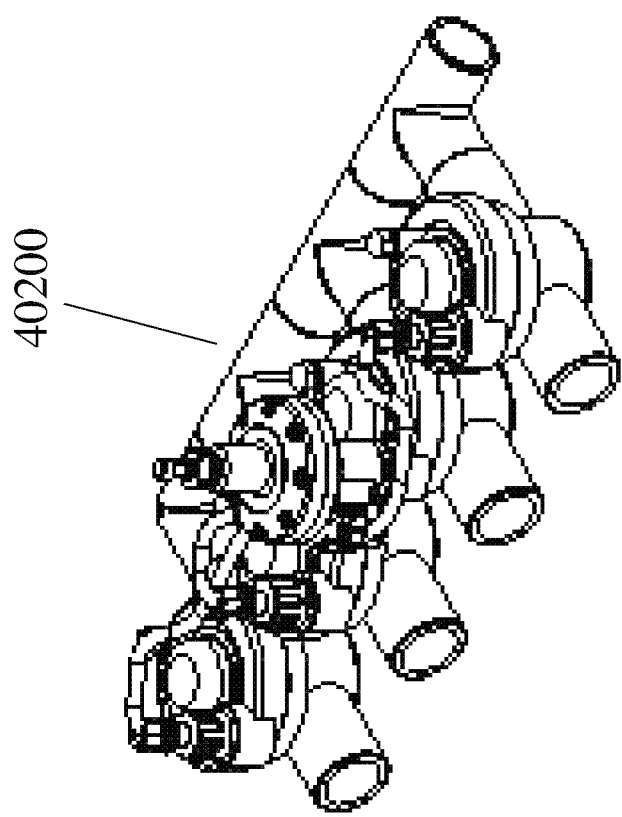
Fig. 40

Fifth Example Operating Environment

FLUID ACTIVATED FLOW CONTROL APPARATUS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

STATEMENT REGARDING FEDERALLY SPONSORED R&D

Not applicable.

REFERENCE TO SEQUENCE LISTING, TABLE, OR COMPUTER PROGRAM LISTING

Not applicable.

FIELD OF THE INVENTION

This invention relates generally to devices and methods for regulating fluid flow and in particular, to pressure sensitive flow control apparatus and methods for using the same.

BACKGROUND OF THE INVENTION

Agricultural, commercial, and domestic irrigation systems are commonly constructed of fixed piping that depend on a single source for delivery of water to the entire system. The flow in a given pipeline is limited by its length, diameter, internal surface condition, and fluid pressure. Thus, for any single fluid source the flow in a pipeline is not expandable beyond a given length or number of fluid delivery terminals such as a sprinkler head. Thus, expansion of fluid delivery coverage is difficult, costly, and commonly involves addition of additional source controls and pipe.

Adding new pipe runs has the added difficulty of requiring costly trenching and cutting or circumventing pavement such as sidewalks, roads, driveways, and patios. More importantly, should all the control circuits be utilized in the existing system, expansion will require addition of a new or additional timing mechanism further increasing the cost, maintenance, and difficulty of operating the system.

Further, installation of long piping runs with more than one flow control valve involves installation of long electrical runs to service solenoids that may be distant from the electrical source. This adds significantly to the cost of expanding an existing irrigation system and results in increased maintenance needs.

Current irrigation systems switch between multiple irrigation runs by using an electronic clock system that signals solenoids placed on remote valves to activate or shut off water flow through each respective valve. This system organization requires installation of electrical cables from the clock system to each solenoid valve. Thus, both flow control and a timer control mechanisms are required to distribute a single source of water through a system of lines. This multiple control system is costly to purchase and install. Further, expansion of the existing system requires additional trenching to install new electric lines to regulate new valve systems.

Prior art solutions to the above problems employed various schemes that used an impeller driven rotating plate with an orifice or cam that sequentially opened radially positioned ports. Such a device is illustrated in U.S. Pat. No. 6,539,967, which is incorporated herein by reference in its entirety. These devices suffer from numerous drawbacks including water hammering due to slow activation or deactivation of the output valves and difficult or absent timing adjustment. Devices that provided timing adjustment required a difficult and awkward process of changing the cams within the mechanism, thus requiring shutting down the system and professional adjustment.

Installation of prior art water distribution systems requires replacing or removing existing valve systems and replacing them with a complicated control device. The complexity of the prior art control devices requires precise manufacturing standards to ensure functionality and results in increased cost of purchase, operation, and maintenance, thus, increasing warranty replacement costs and detrimentally affecting customer goodwill.

Thus, there exists a need for a fluid control device capable of expanding fluid delivery area in an existing system, utilizing an existing timing control or requiring no timing control, and is suitable for installation at a location distant from an electrical source.

SUMMARY OF THE INVENTION

Embodiments of a fluid flow control device are provided whereby a servo assembly is controlled by a pressure activated mechanism and/or a fluid flow mechanism. Optionally, the fluid flow control devices described in this specification require no electrical power to manage the flow of fluid through a one or more output valves (although a remote upstream controller, that controls fluid flowing to the fluid flow control devices, may be electrically powered).

An example fluid control device includes an inlet, an outlet, and an actuator configured to, (without utilizing an electrically powered component in certain embodiments), open a first valve to provide a fluid flow path between the inlet and outlet at least partly in response to a first flow of pressurized fluid received via the inlet, close the first valve to obstruct the fluid flow path between the inlet and outlet at least partly in response to an interruption of the first flow of pressurized or a reduction in the first flow pressure received via the inlet and a subsequent second flow (which may be in the form of an increase in pressure of the first flow) of pressurized fluid received via the inlet.

An example fluid control device may include a fluid inlet port, a fluid outlet port, a chamber configured to receive fluid via the fluid inlet port, wherein the chamber is configured to undergo a first increase in size in response to fluid pressurized to a first degree received via the fluid inlet port, and a mechanism configured to open a fluid passage between the fluid inlet port and the fluid outlet port at least partly in response to the first increase in size of the chamber, and close the fluid passage at least partly in response to a reduction in the chamber size resulting from the fluid being pressurized to a second degree, the second degree less than the first degree, and a subsequent second increase in size of the chamber. Optionally, the chamber includes at least one diaphragm, and the first increase in size results at least in part from an expansion/change in shape/dimension of the diaphragm.

An example device includes a pressure activated servo assembly with a diaphragm connected to a drive post. The drive post is positioned so that movement of the diaphragm translates to rotational motion of a cog wheel. The cog wheel is connected to a servo valve that has at least one valve shaft port that is capable of transmitting fluid between a plurality of tubes that are connected to the servo valve. The tubes are also connected to at least one output valve. Two output valves are controlled by one pressure activated mechanism. The use of the terms servo assembly, fluid active actuator, pressure activated servo assembly, etc., as described herein are used interchangeably, unless the surrounding context indicates otherwise.

A given embodiment may include some or all of the features, functionality, systems and methods described herein.

An example embodiment provides a method for managing fluid flow in an output valve without using electrical power, comprising: receiving at a fluid pressure controlled actuator a first input flow of pressurized fluid at an inlet fluid port wherein the fluid pressure controlled actuator is mounted in a receiving area associated with an output valve, the receiving area configured to receive an electrically powered solenoid, wherein the fluid pressure controlled actuator is not electrically powered; directing, by the fluid pressure controlled actuator, at least a portion of the first input flow of pressurized fluid into a diaphragm chamber of the fluid pressure controlled actuator wherein the first input flow of pressurized fluid causes a first expansion of a diaphragm within the diaphragm chamber of the fluid pressure controlled actuator; at least partly in response to the first diaphragm expansion, rotating a wheel and a shaft wherein the wheel interfaces with the shaft and wherein the shaft includes a shaft fluid port, wherein the rotation of the shaft opens a fluid passage through the shaft fluid port, wherein the fluid passage interfaces with the associated output valve and fluid passing through the shaft fluid port causes, at least in part, the associated output valve to actuate to a first position; receiving at the fluid pressure controlled actuator a pressure reduction of the first input flow of pressurized fluid; after the pressure reduction of the first input flow of pressurized fluid, receiving at the fluid pressure controlled actuator a second input flow of pressurized fluid; directing, by the fluid pressure controlled actuator, at least a portion of the second input flow of pressurized fluid into the diaphragm chamber of the fluid pressure controlled actuator wherein the second input flow of pressurized fluid causes a second expansion of the diaphragm within the diaphragm chamber of the fluid pressure controlled actuator; at least partly in response to the second diaphragm expansion, rotating the wheel and the shaft to obstruct the open fluid passage through the shaft fluid port and causing, at least in part, the associated output valve to actuate to a second position wherein the second position is spaced apart from the first position; and, optionally wherein the first position is an opened position or a closed position; and, optionally further comprising: maintaining the fluid passage in an open state during the reduction in pressure of the first input flow of pressurized fluid; and, optionally wherein the fluid passage is fluidly connected to a diaphragm port of the associated output valve; and, optionally wherein the associated output valve actuates to the first position and the second position without using electrical power; and, optionally wherein the wheel is a cog wheel with four or more attached posts; and, optionally wherein the diaphragm interfaces with the wheel, at least in part, using a leaf spring; and, optionally wherein the fluid is a gas; and, optionally wherein the fluid is a liquid; and, optionally wherein the fluid is water; and, optionally wherein the fluid pressure controlled actuator is used in a hydrocarbon-based fluid application; and, optionally wherein the first and second input flow of pressurized fluid is managed by an electronic controller associated with a master valve; and, optionally further comprising: a one or more user controls which disable the fluid pressure controlled actuator; and, optionally wherein the interface to the shaft is through one or more gears; and, optionally wherein the first and second input flow of pressurized fluid is managed by an electronic controller associated with a master valve and wherein a configurable mechanism ensures that the electronic controller does not release the second input flow of pressurized fluid until a configurable time period has elapsed; and, optionally wherein the fluid pressure controlled actuator includes an externally viewable indicator which enables a user to view the actuator state and infer the position of the associated output valve; and, optionally wherein the fluid pressure controlled actuator includes a manual actuate control; and, optionally wherein the fluid pressure controlled actuator includes an adjustment mechanism which allows a user to adjust the compression force of one or more return springs.

An example embodiment provides a method for managing fluid flow in an output valve without using electrical power, comprising: receiving at a fluid pressure controlled actuator a first input flow of pressurized fluid at an inlet fluid port wherein the fluid pressure controlled actuator is mounted in a receiving area associated with an output valve, the receiving area configured to receive an electrically powered solenoid, wherein the fluid pressure controlled actuator is not electrically powered; directing, by the fluid pressure controlled actuator, at least a portion of the first input flow of pressurized fluid into a diaphragm chamber of the fluid pressure controlled actuator wherein the first input flow of pressurized fluid causes a first expansion of a diaphragm within the diaphragm chamber of the fluid pressure controlled actuator; at least partly in response to the first diaphragm expansion, rotating a wheel and a shaft wherein the wheel interfaces with the shaft and wherein the shaft includes a two or more shaft fluid ports, wherein the rotation of the shaft opens a first fluid passage through a first shaft fluid port and closes a second fluid passage through a second shaft fluid port wherein the first fluid passage interfaces with the associated output valve and fluid passing through the shaft fluid port causes, at least in part, the associated output valve to actuate to a closed position; receiving at the fluid pressure controlled actuator a pressure reduction of the first input flow of pressurized fluid; after the pressure reduction of the first input flow of pressurized fluid, receiving at the fluid pressure controlled actuator a second input flow of pressurized fluid; directing, by the fluid pressure controlled actuator, at least a portion of the second input flow of pressurized fluid into the diaphragm chamber of the fluid pressure controlled actuator wherein the second input flow of pressurized fluid causes a second expansion of the diaphragm within the diaphragm chamber of the fluid pressure controlled actuator; at least partly in response to the second diaphragm expansion, rotating the wheel and the shaft wherein the rotation of the shaft obstructs the open first fluid passage through the first shaft fluid port and opens the second fluid passage through the second shaft fluid port wherein the second fluid passage interfaces with the associated output valve and fluid passing through the second shaft fluid port causes, at least in part, the associated output valve to actuate to an open position; and, optionally further comprising: maintaining the first fluid passage in an open state during the reduction in pressure of the first input flow of pressurized fluid; and, optionally wherein the first fluid passage is fluidly connected to a diaphragm port of the associated output valve; and, optionally wherein the second fluid passage is fluidly connected to a diaphragm port of the associated output valve; and, optionally wherein the associated output valve actuates to the open position and the closed position without using electrical power; and, optionally wherein the wheel is a cog wheel with four or more attached posts; and, optionally wherein the diaphragm interfaces with the wheel, at least in part, using a leaf spring; and, optionally wherein the fluid is a gas; and, optionally wherein the fluid is a liquid; and, optionally wherein the fluid is water; and, optionally wherein the fluid pressure controlled actuator is used in a hydrocarbon-based fluid application; and, optionally wherein the first and second input flow of pressurized fluid is managed by an electronic controller associated with a master valve; and, optionally further comprising: a one or more user controls which disable the fluid pressure controlled actuator; and, optionally wherein the interface to the shaft is through one or more gears; and, optionally wherein the first and second input flow of pressurized fluid is managed by an electronic controller associated with a master valve and wherein a configurable mechanism ensures that the electronic controller does not release the second input flow of pressurized fluid until a configurable time period has elapsed; and, optionally wherein the fluid pressure controlled actuator includes an externally viewable indicator which enables a user to view the actuator state and infer the position of the associated output valve; and, optionally wherein the fluid pressure controlled actuator includes a manual actuate control; and, optionally wherein the fluid pressure controlled actuator includes an adjustment mechanism which allows a user to adjust the compression force of one or more return springs.

An example embodiment provides a method for managing fluid flow in an output valve without using electrical power, comprising: receiving at a fluid pressure controlled actuator a first input flow of pressurized fluid at an inlet fluid port wherein the fluid pressure controlled actuator is mounted in a receiving area associated with an output valve, the receiving area configured to receive an electrically powered solenoid, wherein the fluid pressure controlled actuator is not electrically powered; directing, by the fluid pressure controlled actuator, at least a portion of the first input flow of pressurized fluid into a diaphragm chamber of the fluid pressure controlled actuator wherein the first input flow of pressurized fluid causes a first expansion of a diaphragm within the diaphragm chamber of the fluid pressure controlled actuator; at least partly in response to the first diaphragm expansion, rotating a wheel and a shaft wherein the wheel interfaces with the shaft and wherein the shaft includes a one or more cam lobes and wherein the rotation of the shaft raises a fluid pressure controlled actuator plunger, wherein the raising of the plunger opens a first fluid passage, wherein the first fluid passage interfaces with the associated output valve and fluid passing through the first fluid passage causes, at least in part, the associated output valve to actuate to an open position; receiving at the fluid pressure controlled actuator a pressure reduction of the first input flow of pressurized fluid; after the pressure reduction of the first input flow of pressurized fluid, receiving at the fluid pressure controlled actuator a second input flow of pressurized fluid; directing, by the fluid pressure controlled actuator, at least a portion of the second input flow of pressurized fluid into the diaphragm chamber of the fluid pressure controlled actuator wherein the second input flow of pressurized fluid causes a second expansion of the diaphragm within the diaphragm chamber of the fluid pressure controlled actuator; at least partly in response to the second diaphragm expansion, rotating the wheel and the shaft wherein the rotation of the shaft lowers a fluid pressure controlled actuator plunger, wherein the lowering obstructs the first open fluid passage causing, at least in part, the associated output valve to actuate to a closed position; and, optionally further comprising: maintaining the first fluid passage in an open state during the reduction in pressure of the first input flow of pressurized fluid; and, optionally wherein the first fluid passage is fluidly connected to a diaphragm port of the associated output valve; and, optionally wherein the associated output valve actuates to the open position and the closed position without using electrical power; and, optionally wherein the wheel is a cog wheel with four or more attached posts; and, optionally wherein the diaphragm interfaces with the wheel, at least in part, using a leaf spring; and, optionally wherein the fluid is a gas; and, optionally wherein the fluid is a liquid; and, optionally wherein the fluid is water; and, optionally wherein the fluid pressure controlled actuator is used in a hydrocarbon-based fluid application; and, optionally wherein the first and second input flow of pressurized fluid is managed by an electronic controller associated with a master valve; and, optionally further comprising: a one or more user controls which disable the fluid pressure controlled actuator; and, optionally wherein the interface to the shaft is through one or more gears; and, optionally wherein the first and second input flow of pressurized fluid is managed by an electronic controller associated with a master valve and wherein a configurable mechanism ensures that the electronic controller does not release the second input flow of pressurized fluid until a configurable time period has elapsed; and, optionally wherein the fluid pressure controlled actuator includes an externally viewable indicator which enables a user to view the actuator state and infer the position of the associated output valve; and, optionally wherein the fluid pressure controlled actuator includes a manual actuate control; and, optionally wherein the fluid pressure controlled actuator includes an adjustment mechanism which allows a user to adjust the compression force of one or more return springs.

An example embodiment provides a method for managing fluid flow in an output valve without using electrical power, comprising: receiving at a fluid pressure controlled actuator a first input flow of pressurized fluid at an inlet fluid port wherein the fluid pressure controlled actuator is mounted in a receiving area associated with an output valve, the receiving area configured to receive an electrically powered solenoid, wherein the fluid pressure controlled actuator is not electrically powered; directing, by the fluid pressure controlled actuator, at least a portion of the first input flow of pressurized fluid into a diaphragm chamber of the fluid pressure controlled actuator wherein the first input flow of pressurized fluid causes a first expansion of a diaphragm within the diaphragm chamber of the fluid pressure controlled actuator; at least partly in response to the first diaphragm expansion, rotating a wheel and a dual lobe shaft wherein the wheel interfaces with the dual lobe shaft and wherein the rotation of the dual lobe shaft raises a first fluid pressure controlled actuator plunger and opens a first fluid passage and wherein the first fluid passage interfaces with the associated output valve and fluid passing through the shaft fluid port causes, at least in part, the associated output valve to actuate to a closed position; receiving at the fluid pressure controlled actuator a pressure reduction of the first input flow of pressurized fluid; after the pressure reduction of the first input flow of pressurized fluid, receiving at the fluid pressure controlled actuator a second input flow of pressurized fluid; directing, by the fluid pressure controlled actuator, at least a portion of the second input flow of pressurized fluid into the diaphragm chamber of the fluid pressure controlled actuator wherein the second input flow of pressurized fluid causes a second expansion of the diaphragm within the diaphragm chamber of the fluid pressure controlled actuator; at least partly in response to the second diaphragm expansion, rotating the wheel and the dual lobe wherein the rotation of the dual lobe shaft lowers the first fluid pressure controlled actuator plunger and obstructs the first fluid passage and raises a second fluid pressure controlled actuator plunger and opens a second fluid passage wherein the second fluid passage interfaces with the associated output valve and fluid passing through the second fluid passage causes, at least in part, the associated output valve to actuate to an open position; and, optionally further comprising: maintaining the first fluid passage in an open state during the reduction in pressure of the first input flow of pressurized fluid; and, optionally wherein the first fluid passage is fluidly connected to a diaphragm port of the associated output valve; and, optionally wherein the second fluid passage is fluidly connected to a diaphragm port of the associated output valve; and, optionally wherein the associated output valve actuates to the open position and the closed position without using electrical power; and, optionally wherein the wheel is a cog wheel with four or more attached posts; and, optionally wherein the diaphragm interfaces with the wheel, at least in part, using a leaf spring; and, optionally wherein the fluid is a gas; and, optionally wherein the fluid is a liquid; and, optionally wherein the fluid is water; and, optionally wherein the fluid pressure controlled actuator is used in a hydrocarbon-based fluid application; and, optionally wherein the first and second input flow of pressurized fluid is managed by an electronic controller associated with a master valve; and, optionally further comprising: a one or more user controls which disable the fluid pressure controlled actuator; and, optionally wherein the interface to the shaft is through one or more gears; and, optionally wherein the first and second input flow of pressurized fluid is managed by an electronic controller associated with a master valve and wherein a configurable mechanism ensures that the electronic controller does not release the second input flow of pressurized fluid until a configurable time period has elapsed; and, optionally wherein the fluid pressure controlled actuator includes an externally viewable indicator which enables a user to view the actuator state and infer the position of the associated output valve; and, optionally wherein the fluid pressure controlled actuator includes a manual actuate control; and, optionally wherein the fluid pressure controlled actuator includes an adjustment mechanism which allows a user to adjust the compression force of one or more return springs.

An example embodiment provides a method for managing fluid flow in an output valve, comprising: receiving at a fluid pressure controlled actuator a first input flow of pressurized fluid; directing, by the fluid pressure controlled actuator, at least a portion of the first input flow of pressurized fluid into a first chamber of the fluid pressure controlled actuator wherein the first input flow of pressurized fluid causes an expansion of a first diaphragm within the first chamber of the fluid pressure controlled actuator; at least partly in response to the first diaphragm expansion, opening a previously closed first fluid passage to cause, at least in part, an associated output valve to actuate to a first position; receiving at the fluid pressure controlled actuator a pressure reduction of the first input flow of pressurized fluid; after the pressure reduction of the first input flow of pressurized fluid, receiving at the fluid pressure controlled actuator a second input flow of pressurized fluid; directing, by the fluid pressure controlled actuator, at least a portion of the second input flow of pressurized fluid into a second chamber of the fluid pressure controlled actuator wherein the second input flow of pressurized fluid causes an expansion of a second diaphragm within the second chamber of the fluid pressure controlled actuator; at least partly in response to the second diaphragm expansion, obstructing the first fluid passage to cause, at least in part, the associated output valve to actuate to a second position wherein the second position is spaced apart from the first position; and, optionally wherein the first diaphragm chamber and the second diaphragm chamber are the same diaphragm chamber; and, optionally wherein the first diaphragm and the second diaphragm are the same diaphragm; and optionally wherein the fluid pressure controlled actuator is mounted in a receiving area associated with the output valve, the receiving area configured to receive an electrically powered solenoid; and, optionally further comprising: at least partly in response to the second diaphragm expansion, opening a previously closed second fluid passage to cause, at least in part, the associated output valve to actuate to a second position wherein the second position is spaced apart from the first position; and optionally wherein the first position is an opened position or a closed position; and, optionally further comprising: maintaining the fluid passage in an open state during the reduction in pressure of the first input flow of pressurized fluid; and, optionally wherein the fluid passage is fluidly connected to a diaphragm port of the associated output valve; and, optionally wherein the associated output valve actuates to the first position and the second position without using electrical power; and, optionally wherein the wheel is a cog wheel with four or more attached posts; and, optionally wherein the diaphragm interfaces with the wheel, at least in part, using a leaf spring; and, optionally wherein the fluid is a gas; and, optionally wherein the fluid is a liquid; and, optionally wherein the fluid is water; and, optionally wherein the fluid pressure controlled actuator is used in a hydrocarbon-based fluid application; and, optionally wherein the first and second input flow of pressurized fluid is managed by an electronic controller associated with a master valve; and, optionally further comprising: a one or more user controls which disable the fluid pressure controlled actuator; and, optionally wherein the first and second input flow of pressurized fluid is managed by an electronic controller associated with a master valve and wherein a configurable mechanism ensures that the electronic controller does not release the second input flow of pressurized fluid until a configurable time period has elapsed; and, optionally wherein the fluid pressure controlled actuator includes an externally viewable indicator which enables a user to view the actuator state and infer the position of the associated output valve; and, optionally wherein the fluid pressure controlled actuator includes a manual actuate control; and, optionally wherein the fluid pressure controlled actuator includes an adjustment mechanism which allows a user to adjust the compression force of one or more return springs.

An example embodiment provides a fluid regulator, comprising: one or more fluid inlets configured to receive a first flow of pressurized fluid; one or more fluid outlets; one or more diaphragms; one or more fluid passages; an actuator configured to, without utilizing an electrically powered component: open an output valve to provide a fluid flow path between the at least one of the one or more fluid inlets and the at least one of the one or more fluid outlets at least partly in response to: a first flow of pressurized fluid received via the at least one of the one or more fluid inlets, an expansion of a first diaphragm caused at least in part by the first flow of pressurized fluid received via the at least one of the one or more fluid inlets, and an opened first fluid passage caused at least in part by the expansion of the first diaphragm; close the output valve to obstruct the fluid flow path at least partly in response to: an interruption of the first flow of pressurized fluid received via the inlet, a subsequent, relative to the interruption of the first flow, second flow of pressurized fluid received via the one or more fluid inlets, an expansion of a second diaphragm caused at least in part by the second flow of pressurized fluid received via the at least one of the one or more fluid inlets and a closed second fluid passage caused at least in part by the expansion of the second diaphragm; and, optionally wherein the fluid passage is configured to be fluidly connected to a diaphragm port of the output valve; and, optionally wherein the first fluid passage and the second fluid passage are the same fluid passage; and, optionally wherein the actuator is mounted in a receiving area associated with the output valve, the receiving area configured to receive an electrically powered solenoid; and, optionally further comprising: an open third fluid passage caused at least in part by the expansion of the second diaphragm; and, optionally wherein the first diaphragm and the second diaphragm are the same diaphragm; and, optionally further comprising: maintaining the fluid passage in an open state during the interruption of the first flow of pressurized fluid received via the inlet; and, optionally wherein the first fluid passage is fluidly connected to a diaphragm port of the output valve; optionally wherein the first fluid passage is fluidly connected to a diaphragm port of the output valve; and, optionally wherein the output valve actuates to the open position and the closed position without using electrical power; and, optionally wherein the fluid is a gas; and, optionally wherein the fluid is a liquid; and, optionally wherein the fluid is water; and, optionally wherein the actuator is used in a hydrocarbon-based fluid application; and, optionally wherein the first and second input flow of pressurized fluid via the inlet is managed by an electronic controller associated with a master valve; and, optionally further comprising: a one or more user controls which disable the actuator; and, optionally wherein the first and second input flow of pressurized fluid is managed by an electronic controller associated with a master valve and wherein a configurable mechanism ensures that the electronic controller does not release the second flow of pressurized fluid until a configurable time period has elapsed; and, optionally wherein the actuator includes an externally viewable indicator which enables a user to view the actuator state and infer the position of the output valve; and, optionally wherein the actuator includes a manual actuate control; and, optionally wherein the actuator includes an adjustment mechanism which allows a user to adjust the compression force of one or more return springs.

An example embodiment provides a method of retrofitting a valve actuator of a fluid regulator, the method consisting essentially of (or in certain embodiments, consisting of): removing from a first mount of the fluid regulator a solenoid configured to be electrically controlled to open and close a fluid regulator valve; and coupling to the first mount a fluid controlled actuator, wherein the fluid controlled actuator is configured to open and close the fluid regulator valve at least partly in response fluid pressure; and, optionally wherein the fluid controlled actuator comprises: a fluid inlet port; a fluid outlet port; a chamber configured to receive fluid via the fluid inlet port, wherein the chamber is configured to undergo a first increase in size in response to fluid pressurized to a first degree received via the fluid inlet port; a mechanism configured to: open a fluid passage between the fluid inlet port and the fluid outlet port at least partly in response to the first increase in size of the chamber; close the fluid passage at least partly in response to a reduction in the chamber size resulting from the fluid being pressurized to a second degree, the second degree less than the first degree, and a subsequent second increase in size of the chamber; and, optionally wherein the chamber includes a diaphragm, and the first increase in size results at least in part from an expansion of the diaphragm.

An example embodiment provides a method of retrofitting a valve actuator of a fluid regulator, the method consisting essentially of (or in certain embodiments, consisting of): removing from a first mount of the fluid regulator a solenoid configured to be electrically controlled to open and close a fluid regulator valve; and coupling to the first mount a fluid controlled actuator using an adaptor, wherein the fluid controlled actuator is configured to open and close the fluid regulator valve at least partly in response fluid pressure; and, optionally wherein the fluid controlled actuator comprises: a fluid inlet port; a fluid outlet port; a chamber configured to receive fluid via the fluid inlet port, wherein the chamber is configured to undergo a first increase in size in response to fluid pressurized to a first degree received via the fluid inlet port; a mechanism configured to: open a fluid passage between the fluid inlet port and the fluid outlet port at least partly in response to the first increase in size of the chamber; close the fluid passage at least partly in response to a reduction in the chamber size resulting from the fluid being pressurized to a second degree, the second degree less than the first degree, and a subsequent second increase in size of the chamber; and, optionally wherein the chamber includes a diaphragm, and the first increase in size results at least in part from an expansion of the diaphragm; and, optionally wherein the adapter is a gasket; and, optionally wherein the adapter enables the coupling to the first mount to use one or more different thread dimensions.

An example embodiment provides a method of retrofitting a valve actuator of a fluid regulator, the method consisting essentially of (or in certain embodiments, consisting of): removing from a first mount of the fluid regulator a solenoid configured to be electrically controlled to open and close a fluid regulator valve; and coupling to the first mount a fluid controlled actuator, wherein the fluid controlled actuator is configured to open and close the fluid regulator valve at least partly in response to fluid pressure, wherein a first flow of pressurized fluid received via a fluid regulator inlet causes the fluid controlled actuator to control the fluid regulator valve so as to permit fluid to flow from the fluid regulator inlet to a fluid regulator outlet, and a second flow of pressurized fluid received via the fluid regulator inlet causes the fluid controlled actuator to control the fluid regulator valve so as to inhibit the flow of fluid from the fluid regulator inlet to the fluid regulator outlet.

An example embodiment provides a method of retrofitting a valve actuator of a fluid regulator, the method consisting essentially of (or in certain embodiments, consisting of): removing from a first mount of the fluid regulator a solenoid configured to be electrically controlled to open and close a fluid regulator valve; and coupling to the first mount a fluid controlled actuator using an adapter, wherein the fluid controlled actuator is configured to open and close the fluid regulator valve at least partly in response fluid pressure, wherein a first flow of pressurized fluid received via a fluid regulator inlet causes the fluid controlled actuator to control the fluid regulator valve so as to permit fluid to flow from the fluid regulator inlet to a fluid regulator outlet, and a second flow of pressurized fluid received via the fluid regulator inlet causes the fluid controlled actuator to control the fluid regulator valve so as to inhibit the flow of fluid from the fluid regulator inlet to the fluid regulator outlet; and, optionally wherein the adapter is a gasket; and optionally wherein the adapter enables the coupling to the first mount to use one or more different thread dimensions.

An example embodiment provides a fluid regulator, comprising: one or more fluid inlets configured to receive a flow of pressurized fluid; one or more fluid outlets; a turbine shaft drive; a turbine in fluid communication with said fluid inlet port, said turbine connected to said turbine shaft drive; a speed reducing mechanism connected to said turbine drive shaft such that rotation of at least a portion of said turbine drives said speed reducing mechanism; a timing control assembly; a servo valve connected to said timing control assembly; a valve shaft connected to said speed reducing mechanism and said timing control assembly; one or more fluid passages; an actuator configured to, without utilizing an electrically powered component: open a first output valve to provide a fluid flow path between the at least one of the one or more fluid inlets and the at least one of the one or more fluid outlets at least partly in response to: a flow of pressurized fluid received via the at least one of the one or more fluid inlets, a rotation of the turbine and associated turbine drive shaft caused at least in part by the flow of pressurized fluid received via the at least one or more fluid inlets, and a closed first fluid passage interfacing with the first output valve caused at least in part by the rotation of the turbine; close the first output valve to obstruct the fluid flow path at least partly in response to: a rotation of the turbine and associated turbine drive shaft caused at least in part by the flow of pressurized fluid received via the at least one or more fluid inlets and an opened first fluid passage interfacing with the first output valve caused at least in part by the rotation of the turbine; and, optionally further comprising: substantially at the same time the first output valve is closed, open a second output valve at to provide a fluid flow path between the at least one of the one or more fluid inlets and the at least one of the one or more fluid outlets at least partly in response to: a rotation of the turbine and associated turbine drive shaft caused at least in part by the flow of pressurized fluid received via the at least one or more fluid inlets and an opened second fluid passage interfacing with the second output valve caused at least in part by the rotation of the turbine; and, optionally wherein the fluid regulator, further comprising: a servo activation lever connected to said valve shaft; at least one spring arm connected to said speed reduction mechanism; said at least one spring arm in transient association with said servo activation lever; and, optionally wherein said servo activation lever further comprises at least one lever rotation stop; said lever rotation stop limiting the rotation of said servo activation lever; and, optionally further comprising: a detent bar, said detent bar in transient connection with said spring arm such that rotation of at least a portion of said spring arm is retarded when said spring arm is in contact with said detent bar; and, optionally further comprising: a timing control knob; and, optionally further comprising: an adapter having a body and a first port and a second port; wherein said first port is fixedly connected to one of said plurality of tubes such that fluid is transportable between said first port and one of said plurality of tubes; said first port in fluid communication with a diaphragm port in said at least one output valve; said second port is connected to one of said plurality of tubes such that fluid is transportable between said second port and one of said plurality of tubes; said second port in fluid communication with an exit port in said at least one output valve; said exit port in communication with a fluid port; and, optionally wherein said output valve further comprises a flow control arm; and, optionally wherein said timing control knob further comprises a color code to indicate relative time of operation of said at least one output valve; and, optionally further comprising: at least one color code button; and, optionally wherein said at least one output valve is in a linear alignment with said servo valve; and, optionally wherein said valve shaft rotates in response to said turbine and said speed reducing gear mechanism.

An example embodiment provides a fluid regulator, comprising: one or more fluid inlets configured to receive a flow of pressurized fluid; one or more fluid outlets; a turbine shaft drive; a turbine in fluid communication with said fluid inlet port, said turbine connected to said turbine shaft drive; a speed reducing mechanism connected to said turbine drive shaft such that rotation of at least a portion of said turbine drives said speed reducing mechanism; a timing control assembly; a servo valve connected to said timing control assembly; a valve shaft connected to said speed reducing mechanism and said timing control assembly; one or more fluid passages; at least one valve shaft port integral with said valve shaft such that rotation of said valve shaft rotates said at least one valve shaft port so as to provide fluid connection between a plurality of tubes; said plurality of tubes fixedly connected to said servo valve; at least one output valve; and said plurality of tubes fixedly connected to said at least one output valve; and, optionally wherein said at least one output valve is two output valves; and, optionally wherein the fluid regulator, further comprising: a servo activation lever connected to said valve shaft; at least one spring arm connected to said speed reduction mechanism; said at least one spring arm in transient association with said servo activation lever; and, optionally wherein said servo activation lever further comprises at least one lever rotation stop; said lever rotation stop limiting the rotation of said servo activation lever; and, optionally further comprising: a detent bar, said detent bar in transient connection with said spring arm such that rotation of at least a portion of said spring arm is retarded when said spring arm is in contact with said detent bar; and, optionally further comprising: a timing control knob; and, optionally further comprising: an adapter having a body and a first port and a second port; wherein said first port is fixedly connected to one of said plurality of tubes such that fluid is transportable between said first port and one of said plurality of tubes; said first port in fluid communication with a diaphragm port in said at least one output valve; said second port is connected to one of said plurality of tubes such that fluid is transportable between said second port and one of said plurality of tubes; said second port in fluid communication with an exit port in said at least one output valve; said exit port in communication with a fluid port; and, optionally wherein said output valve further comprises a flow control arm; and, optionally wherein said timing control knob further comprises a color code to indicate relative time of operation of said at least one output valve; and, optionally further comprising: at least one color code button; and, optionally wherein said at least one output valve is in a linear alignment with said servo valve; and, optionally wherein said valve shaft rotates in response to said turbine and said speed reducing gear mechanism.

An example embodiment provides a fluid regulator, comprising: one or more fluid inlets configured to receive a first flow of fluid; one or more fluid outlets; a turbine shaft drive; a turbine in fluid communication with said fluid inlet port, said turbine connected to said turbine shaft drive; a speed reducing mechanism connected to said turbine drive shaft such that rotation of said turbine drives said speed reducing mechanism; a timing control assembly; servo valve connected to said timing control assembly; a valve shaft connected to said speed reducing mechanism and said timing control assembly; one or more fluid passages; a threaded adapter wherein the threaded adapter is configured to removably engage a threaded receiving area of an output valve having a housing, the threaded adapter providing a fluid conduit to the output valve housing when the threaded adapter is screwed into the threaded receiving area of the output valve housing; the threaded adapter having a first port and a second port wherein said first port is fixedly connected to at least one of plurality of tubes such that fluid is transportable between said first port and said one of said plurality of tubes and wherein said first port is in fluid communication with a diaphragm port of the output valve, and wherein said second port is connected to one of said plurality of tubes such that fluid is transportable between said second port and said one of said plurality of tubes and wherein said second port is in fluid communication with an exit port in the output valve; a fluid regulator configured to, without utilizing an electrically powered component: open a first output valve to provide a fluid flow path between the at least one of the one or more fluid inlets and the at least one of the one or more fluid outlets at least partly in response to: a flow of fluid received via the at least one of the one or more fluid inlets, a rotation of the turbine and associated turbine drive shaft caused at least in part by the flow of fluid received via the at least one or more fluid inlets, an open first fluid passage interfacing with the first output valve caused at least in part by the rotation of the turbine, and a fluid flow through the first fluid passage from the output valve; the fluid regulator further configured to, without utilizing an electrically powered component close the first output valve to obstruct the fluid flow path between the at least one of the one or more fluid inlets and the at least one of the one or more fluid outlets at least partly in response to: a subsequent flow of fluid received via the at least one of the one or more fluid inlets, a rotation of the turbine and associated turbine drive shaft caused at least in part by the flow of fluid received via the at least one or more fluid inlets, and a closed first fluid passage interfacing with the first output valve caused at least in part by the rotation of the turbine; and, optionally further comprising: a servo activation lever connected to said valve shaft; at least one spring arm connected to said speed reduction mechanism; and said at least one spring arm in transient association with said servo activation lever; and, optionally further comprising: at least one lever rotation stop; and said lever rotation stop limiting the rotation of said servo activation lever; and, optionally further comprising: a detent bar; said detent bar in transient connection with said spring arm such that rotation of at least a portion of said spring arm is retarded when said spring arm is in contact with said detent bar; and, optionally further comprising: a timing control mechanism; and, optionally wherein said valve shaft rotates in response to said turbine.

An example embodiment provides a method for managing fluid flow in an output valve, comprising: providing a fluid regulator having a threaded adapter configured to removably engage a threaded receiving area of an output valve having a housing, the threaded adapter providing a fluid conduit to the output valve housing when the threaded adapter is screwed into the threaded receiving area of the output valve housing; receiving at the fluid regulator a first input flow of fluid; directing, by the fluid regulator, at least a portion of the first input flow of fluid into a chamber containing a turbine wherein the first input flow of fluid causes a rotation of the turbine; at least partly in response to the turbine rotation, opening a previously closed first fluid passage fluidly connected to the output valve to cause, at least in part, fluid to flow through the threaded adapter from the output valve housing to actuate the output valve to an open position; after the output valve actuates to an open position, directing, by the fluid regulator, at least a portion of the first input flow of fluid into a chamber containing a turbine wherein the first input flow of fluid causes a rotation of the turbine; at least partly in response to the turbine rotation, closing a previously opened first fluid passage fluidly connected to the output valve; obstructing the first fluid passage to interrupt the fluid flow through the threaded connector from the output valve housing, causing, at least in part, the output valve to actuate to a closed position; and, optionally wherein the first fluid passage is fluidly connected to the diaphragm port of the output valve; and, optionally further comprising: a valve shaft in association with the turbine wherein the valve shaft rotates in response to said turbine rotation; and, optionally wherein the output valve actuates to the open position and the closed position without using electrical power; and, optionally further comprising: a user accessible timing control mechanism.

An example embodiment provides a fluid regulator, comprising: a turbine shaft drive; a turbine in fluid communication with said fluid inlet port, said turbine connected to said turbine shaft drive; a servo valve; a valve shaft; one or more fluid passages; a fluid regulator configured to, without utilizing an electrically powered component: open a first output valve to provide a fluid flow path between at least one of the one or more fluid inlets and at least one of the one or more fluid outlets at least partly in response to: a flow of fluid received via the at least one of the one or more fluid inlets, a rotation of the turbine and associated turbine drive shaft caused at least in part by the flow of fluid received via the at least one or more fluid inlets, an open first fluid passage interfacing with the first output valve caused at least in part by the rotation of the turbine, and a fluid flow through the first fluid passage from the output valve; the fluid regulator further configured to, without utilizing an electrically powered component close the first output valve to obstruct the fluid flow path between the at least one of the one or more fluid inlets and the at least one of the one or more fluid outlets at least partly in response to: a subsequent flow of fluid received via the at least one of the one or more fluid inlets, a rotation of the turbine and associated turbine drive shaft caused at least in part by the flow of fluid received via the at least one or more fluid inlets, and a closed first fluid passage interfacing with the first output valve caused at least in part by the rotation of the turbine; and, optionally further comprising: a servo activation lever connected to said valve shaft; at least one spring arm; and said at least one spring arm in transient association with said servo activation lever; and, optionally further comprising: at least one lever rotation stop; and said lever rotation stop limiting the rotation of said servo activation lever; and, optionally further comprising: a detent bar; said detent bar in transient connection with said spring arm such that rotation of at least a portion of said spring arm is retarded when said spring arm is in contact with said detent bar; and, optionally further comprising: a timing control mechanism; and, optionally wherein said valve shaft rotates in response to said turbine; and, optionally wherein the output valve actuates to the open position and the closed position without using electrical power; and, optionally further comprising: a threaded adapter having a first port and a second port; wherein said first port is fixedly connected to one of a plurality of tubes such that fluid is transportable between said first port and said one of said plurality of tubes; wherein said first port in fluid communication with a diaphragm port in the output valve; wherein said second port is connected to one of said plurality of tubes such that fluid is transportable between said second port and said one of said plurality of tubes; and wherein said second port in fluid communication with an exit port in the output valve; and, optionally wherein the threaded adapter is configured to removably engage a threaded receiving area of the output valve having a housing, the threaded adapter providing a fluid conduit to the output valve housing when the threaded adapter is screwed into the threaded receiving area of the output valve housing.

In certain embodiments, the device also employs an adapter that has a body in which there are a first and a second port. The first port is connected to one of the tubes and with a diaphragm port in the output valve such that fluid is transportable between the tube and the diaphragm port. A second port is connected to a different tube and to an exit port in the output valve such that fluid is transportable between the tube and the exit port. An adapter also has a bore that is integral with the second port. An inner seat is slideable inside the bore and is positioned by a spring so that it is spaced in alignment with the exit port.

The drive post has both a post and a cog drive spring where the spring physically interacts with the cog wheel. An anti-back rotation leaf spring stop is also in physical interaction with the cog wheel so that rotation of the cog wheel rotates unidirectionally. A flow control arm connected to the diaphragm is also provided.

An automatically controlled flow control device is provided whereby control of the servo valve is by the system having a fluid inlet port and at least one output port. A turbine is in fluid communication with the fluid inlet port and is connected to a turbine shaft drive which interacts with a speed reducing mechanism such that rotation of at least a portion of the turbine drives the speed reducing mechanism. A timing control assembly is connected to the speed reducing mechanism and transiently connected to a servo valve shaft in a servo valve. The servo valve shaft has at least one valve shaft port that provides fluid connection between a plurality of tubes. The servo valve shaft rotates in response to rotation of the turbine and the speed reducing mechanism. The tubes are also connected to at least one output valve, and in certain instances two or more output valves.

A servo activation lever is also provided connected to the valve shaft. At least one spring arm connected to the speed reducing mechanism transiently associates with the servo activation lever. The servo activation lever is provided with at least one lever rotation stop that is capable of limiting the rotation of the servo activation lever. A detent bar is provided in transient association with the spring arm so that rotation of at least a portion of the spring arm is retarded when in contact with the detent bar.

A timing control knob is also provided. The timing control knob has a color code to indicate the relative time of operation of at least one output valve. At least one color code button is also present on at least one output valve.

The device also employs an adapter that has a body in which there are a first and a second port. The first port is connected to one of the tubes and with a diaphragm port in the output valve such that fluid is transportable between the tube and the diaphragm port. A second port is connected to a different tube and to an exit port in the output valve such that fluid is transportable between the tube and the exit port. An adapter also has a bore that is integral with the second port. An inner seat is slideable inside the bore and is positioned by a spring so that it is paced in alignment with the exit port.

The output valve is provided with a flow control arm. The output valve is aligned with the servo valve.

BRIEF DESCRIPTION OF THE DRAWINGS

FIG. 40 depicts two example generalized arrangement for fluid activated actuators.

DETAILED DESCRIPTION OF PREFERRED EMBODIMENTS

Figure 1:
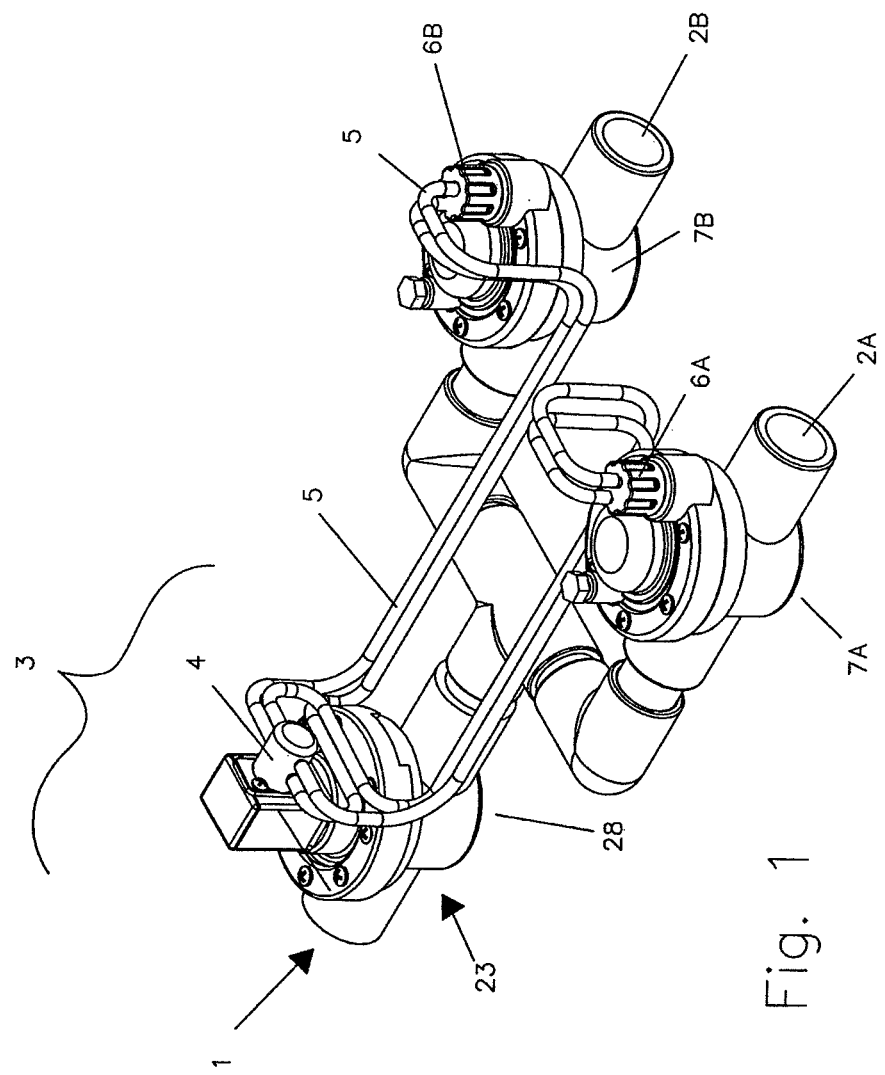
FIG. 1 depicts a general arrangement of an inventive flow control device controlled by a pressure activated servo assembly.

Certain embodiments described herein enable expanding an existing irrigation or other fluid delivery system without the need for electric regulation of flow distribution. Moreover, certain embodiments described herein are capable of regulating fluid distribution by an existing pressure control mechanism or independent of a pressure control mechanism. Certain embodiments described herein have utility for regulating fluid flow and distribution in irrigation or other fluid delivery systems.

As used herein the term fluid means any liquid capable of distribution. Illustratively, fluid is water, milk, juice, aqueous buffer, solvent, organic or inorganic liquids, gas, air, fluidized solid, slurry, liquid that contains particulate matter, solvated chemicals, or other molecule or material that requires distribution. In an example embodiment, the fluid is water. However, it is appreciated that the flow control system is independent of the fluid that is delivered, and a person having ordinary skill in the art recognizes that enablement for one liquid enables one to make and use embodiments described herein with any fluid.

Certain embodiments are suitable for use with any valve. Valve types operative herein illustratively include in-line, diaphragm, bypass, rotary in-line, slide, spool, restrictor, servo, exhaust, check, anti-siphon, ball, bibcock, stopcock, demand, double check, duckbill, flow control, foot, gas pressure regulator, leaf, pilot, poppet, sleeve, pressure reducing, pressure sustaining, back flow reducing, reed, saddle, solenoid, vacuum breaker, combinations thereof, or other valve configurations known in the art.

It is appreciated that a valve operable herein optionally includes a flow control arm that prevents complete opening of the valve. Illustratively, a flow control arm limits the movement of the diaphragm such that the valve prevents the full magnitude of source flow from reaching the output port. A flow control arm is optionally adjustable. Adjustability is optionally by a screw control or other adjustment or micro adjustment mechanism known in the art.

U.S. Provisional Application No. 60/901,055 is incorporated herein by reference as if each line and figure were explicitly set out herein. With particularity but without limitation, FIGS. 1-82 and the accompanying description of each figure are incorporated herein by reference.

Certain embodiments of flow control device components are optionally formed of a thermoplastic material and preferably are injection molded. Materials illustratively operative herein are thermoformable plastic, polyurethane, polypropylene, polyethylene, polyester, vinyl, polystyrene, rubber, die-cast metal, aluminum, steel, other suitable metals, reinforced plastic, inter fiber reinforced composite, combinations thereof, or other materials known in the art. Thermoplastic materials operative herein illustratively include but are not limited to, polystyrene, acrylonitrile, butyl styrene, and polyalkylenes.

Figure numbering is conserved between all figures. Thus, a numbered element holds the same number independent of the figure referred to.

FIG. 1 represents a generalized arrangement for the inventive flow control device whereby a fluid inlet port 1 receives fluid from a source and the inventive device automatically determines whether one or more distribution valves 7A and 7B are activated or inactivated, thus, directing fluid out one or more of a group of fluid outlet ports 2A and 2B to a fluid distribution line.

In an example embodiment a fluid activated servo assembly 3 receives fluid from a source via an inlet port 1. Pressure, flow rate, or other parameter of the input fluid drives the fluid activated servo assembly 3 to activate or deactivate one or more output valves 7A and 7B. When more than one output valve 7A and 7B is present, activation of one output valve (e.g., 7A) occurs simultaneously, or nearly thereto, with deactivation of another output valve (e.g., 7B). Thus, fluid is directed into a particular distribution line with the same pressure and flow characteristics of the source fluid. By control from the fluid activated servo assembly 3, fluid is optionally then directed to a different distribution line by deactivation of the first output valve (e.g., 7A) and activation of another output valve (e.g., 7B). In this way multiple distribution lines are optionally served by a single source with the pressure, rate, and other flow characteristics of the original source maintained throughout the entire system (although other embodiments may include multiple sources). Thus, expansion of an existing irrigation or other fluid delivery system is optionally accomplished without requiring an additional fluid source, control device, or timing mechanism.

In an example embodiment a single fluid activated servo assembly regulates flow through two output valves. However, it is appreciated that the servo assembly is suitable for regulation of one, two, three, four, five, six, or more output valves. This is optionally accomplished by adding multiple valve shaft ports (FIG. 3, 21) at various angles each allowing fluid flow to one output valve. While certain embodiments are described with respect to two output valves, a person having ordinary skill in the art recognizes description and enablement of any number of output valves without limitation.

FIG. 1 also depicts a general communication system between the servo assembly 3 and the output valves 7. The servo assembly 3 optionally uses a servo valve 4 to allow fluid flow from one or more output valves 7A or 7B via two tubes 5. The tubes 5 communicate fluid to an output valve by an adapter (e.g., 6A) that optionally replaces the solenoid in a standard prior art solenoid controlled diaphragm valve. Thus, certain embodiments optionally incorporate the low cost and simplicity of widely used diaphragm valves with the certain embodiments of fluid activated servo devices described herein.

Figure 2:
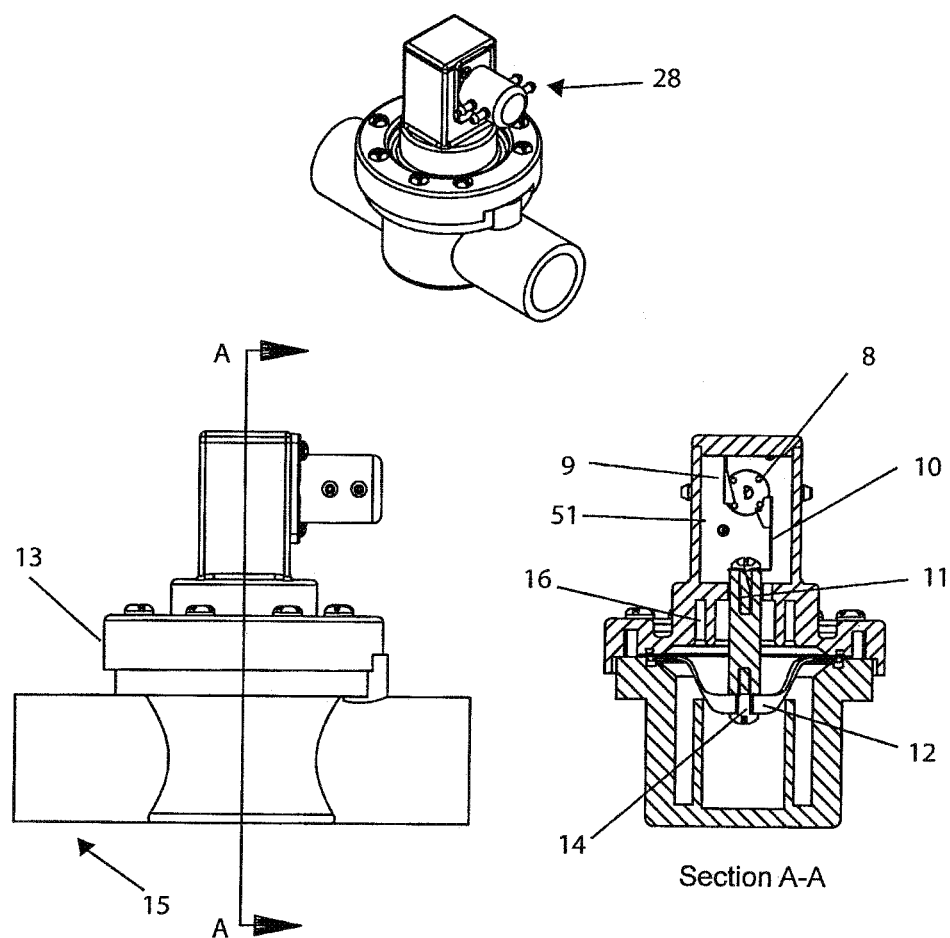
FIG. 2 depicts an arrangement of a pressure activated servo assembly.
Figure 3:
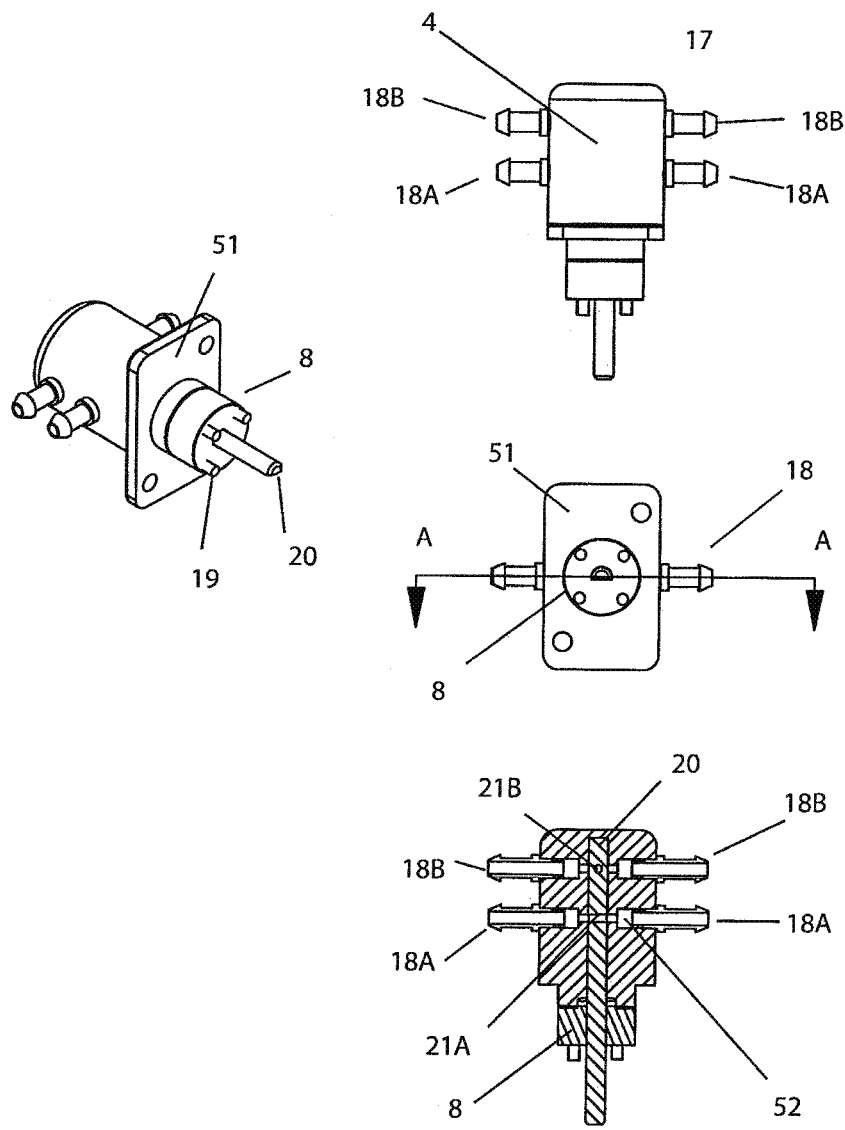
FIG. 3 depicts a servo valve as associated with a pressure activated servo assembly.

In an example embodiment as depicted in FIGS. 1-3 a fluid activated servo assembly 3 is a pressure activated servo assembly 28. The pressure activated servo assembly (PA) uses a pressure actuated mechanism to rotate a servo valve shaft 20 that switches the output valves 7A or 7B. The PA optionally alternatively distributes fluid from the original pipe into output ports 2A and 2B on a timed basis so that each output port 2A and 2B can deliver the same volume of fluid at the same pressure as is present at the inlet port 1. Thus, in an exemplary irrigation system the watering area can by doubled using one inventive fluid control device. Further, greater area is covered by employing multiple inventive fluid control devices in a cascading fashion. In the case of a pressure activated servo assembly 3, an existing system need only be modified by application of a single extra timer station. No new supply pipes, long trenches, or remote wiring is needed. Other embodiments may utilize additional timer stations, remote wiring, supply pipes and/or trenches.

An exemplary PA 28 is optionally constructed of an actuator housing 15 that is coupled with a cap 13 in such a way to form a seal sufficient to prevent fluid leakage. An existing prior art in-line diaphragm valve is optionally modified for use with certain embodiments described herein, whereby the actuator housing 15 is modified by insertion of a plug into the servo release port. It is appreciated that any method of stopping fluid entry into the servo release port is similarly suitable, or production of an actuator housing 15 without a servo release port is similarly operable. The cap 15 houses the servo actuated assembly that has a diaphragm 12 at the lower end of the system controlled by a spring 16 or series of springs that provide suitable force to extend the diaphragm 12 into the actuator housing 15 when pressure is reduced from the fluid source. Optionally, a single or dual acting piston drive is operable in place of the diaphragm and spring system. The cap 13 is mounted to a servo support block 51 that optionally supports an optional additional spring to increase the return force for activation of the cog mechanism. The cap 13 has a center hole that accepts a drive post 11 such that extension or retraction of the diaphragm 12 raises or lowers the drive post 11 relative to the cap 13. The drive post 11 is optionally mounted to the diaphragm 12 by a drive post mounting screw 14 or other attachment mechanism known in the art. At the opposite end of the drive post 11 is attached a cog drive spring 10 that interfaces with a cog wheel 8 to produce rotational force in the cog wheel 8 when the drive post is raised in response to reapplication of fluid pressure and raising of the diaphragm 12.

It is appreciated that any diaphragm, piston drive, or other means of stopping fluid flow is operable herein. Non-limiting examples include a dual bladder, single bladder with spring return, double acting diaphragms, single diaphragms with spring or other return, a dual acting piston drive, a single acting piston drive with spring or other return, combinations thereof, or other means known in the art.

Figure 12:
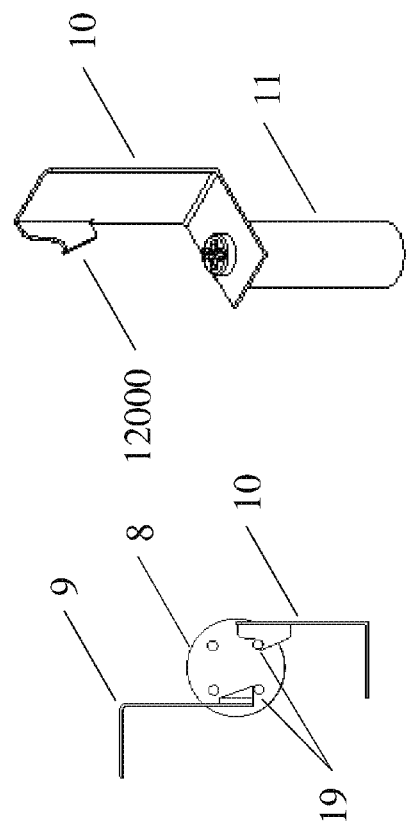
FIG. 12 depicts an example cog wheel and springs interface which is optionally used in a fluid activated actuator assembly.

FIG. 12 illustrates the example leaf spring 10 used in an example embodiment of a fluid activated servo assembly 3. FIG. 12 provides an enlarged view of the leaf spring 10 and cog wheel 8 of that shown in FIG. 2. The cog drive spring or leaf spring 10 optionally has a flange 12000 that provides a shelf that engages a cog wheel post 19 to drive the cog wheel 8 in the forward rotational direction (e.g., counter clockwise or clockwise). The leaf spring 10 is optionally flexible such that when the drive post 11 is moved downward a lower cog wheel post 19 does not impede the downward movement of the drive post and positions the next cog wheel post 19 on the shelf of the flange 12000 such that a subsequent raising of the drive post 11 will result in forward rotational direction of the cog wheel 8.

It is appreciated that the more cog wheel posts are operable on the cog wheel. The number of cog wheel posts is related to the number of valve shaft ports and output valves in the device. In a non-limiting example, a cog wheel has six (6) cog wheel posts. Thus, each phase of rotation rotates the valve shaft 60 degrees allowing control of three output valves. Other configurations are similarly operable.

The system optionally includes an anti-back rotational leaf spring stop 9 that prevents the cog wheel 8 from reversing the forward or rotational direction of the cog wheel 8. The anti-back rotation leaf spring optionally has a flange 12000 that provides a shelf that engages a cog wheel post 19 preventing back rotation. The anti-back rotation leaf spring 9 is flexible such that it does not impede the forward rotation of cog wheel 8.

FIG. 12 illustrates an example embodiment of a time-series fluid activation effect 10100 on a 4 post cog wheel 8 with the raising and subsequent lowering of an interfacing leaf spring 10 and anti-back rotational leaf spring stop 9 as similarly described above.

The cog wheel 8 optionally has a rotational resistance sufficient to prevent reverse movement of the wheel when the drive post 11 is lowered. This rotational resistance is optionally provided by an O-ring or other pressure seal that provides suitable friction to prevent unwanted reverse movement of the cog wheel 8 while not being so great as to impede forward rotation when the drive post 11 is raised.

FIG. 3 depicts an example embodiment of a servo valve assembly 4. A valve shaft 20 is rotatable with respect to the servo body 17 and a shaft that connects two or more tubing interconnect fittings 18. The valve shaft 20 is secured to the cog wheel 8 such that rotation of the cog wheel 8 produces rotation in the valve shaft 20. The valve shaft 20 is optionally cylindrical in shape. Preferably the valve shaft 20 is hemispherically shaped where it meets the cog wheel 8 such that the rotational force in the cog wheel is efficiently translated to the valve shaft 20. It is recognized in the art that other shapes for the cog wheel interface end of the valve shaft 20 are similarly suitable illustratively including square, triangle, oval, rectangle, pentagon, hexagon, and other shapes known in the art. Alternatively or additionally, the valve shaft 20 meets the cog wheel 8 in a pressure fitting such that the association of the two parts provides sufficient frictional force that rotation of the cog wheel translates to rotation of the valve shaft. It is also appreciated in the art that the cog wheel and valve shaft are optionally affixed with an adhesive or by press fit. The cog wheel 8 and valve shaft 20 are optionally formed from a single unitary piece eliminating the need for fitting a separate valve shaft 20 and cog wheel 8.

The servo valve assembly 4 preferably includes a servo body 17 that has at least one servo body shaft 52 interconnecting two tubing interconnect fittings 18. Preferably, a servo body 17 has two servo body shafts 52. However, it is appreciated that multiple other servo body shafts are similarly operable. For example, three, four, five, or six servo body shafts are operable, each serving a single output valve (or multiple output valves). The servo body 17 preferably has a cavity to accept a valve shaft 20 such that when a valve shaft port 20 aligns with servo body shaft 52 fluid flow is possible. In an optional embodiment, a valve shaft port is a slot (FIG. 8, 21) that allows communication between two adjacently positioned tubing interconnect fittings 18. It is appreciated that any method of regulating flow between two or more shafts is similarly operable herein. When two valve shaft ports 21A and 21B are present in a valve shaft 20 they are preferably positioned at 90 degrees relative to one another. Thus, a 90 degree rotation of the cog wheel aligns one valve shaft port 21 with a corresponding servo body shaft 52. The valve shaft ports 21A and 21B are preferably capable of delivering flow omnidirectionally. Thus, in this example, only one set of servo body shafts 52 are aligned at one time regulating flow to one output valve 7. This arrangement provided alternating flow through the servo body 17 for each 90 degrees of valve shaft 20 rotation as provided by four cog wheel posts 19 on the cog wheel 8.

It is appreciated that multiple configurations of a valve shaft port 21A and 21B are operable herein. In an example embodiment a valve shaft port is a straight shaft passing from one side of the valve shaft 20 to the other through a central axis. Alternatively, a valve shaft port is a notch with a length parallel to the central axis of the valve shaft. The notch forms a flow bypass zone that allows flow between two servo body shafts adjacent to each other. A valve shaft port 21A and 21B operable herein is illustratively non-linear and is optionally designed to allow fluid flow between servo body shafts 52 in any orientation. It is appreciated that a valve shaft port optionally incorporates a back flow prevention system such that fluid flow through a valve shaft port is unidirectional.

The inventive servo valve assembly 4 optionally is housed in a protective cover to reduce contamination by soil, water, or other environmental conditions. A protective cover is optionally a separate piece that is removable, or is incorporated into a single injection molded part that may be unitary or separate from the cap 13.

The inventive arrangement functions when the source fluid is pressurized by forcing the drive post 11 into its raised position extending the cog drive spring 10 to rotate the cog wheel 8 into its new position. This position aligns one of the valve shaft ports in the valve shaft 20 with its respective shaft connected to tubing interconnect fittings 18A or 18B in the servo valve. This position allows fluid to flow from an output valve (e.g., 7A or 7B) causing the output valve to open. Upon termination of the fluid pressure cycle by the control mechanism, the pressure is removed from the diaphragm 12 allowing pressure from the springs 16 to extend the diaphragm into the closed position while the leaf spring 9 prevents the cog wheel 8 from rotating in the reverse direction by the retraction of the drive spring 10.

In an example embodiment, two commercially available output diaphragm valves are connected to the fluid activated servo assembly 3 using standard PVC plumbing fittings. When fluid pressure is applied (turned on at the central control source) it enters the assembly at a fluid inlet port 1 and pressurizes a diaphragm 12 inside the servo assembly 3 that moves a drive post 11 bar and cog wheel 8 that rotates a servo valve 20 which in turn controls the output diaphragm valves 7. When fluid pressure is turned off the drive post 11 returns to its starting position. When pressure is reapplied the drive post engages a new cog wheel post 19 that rotates the servo valve 20 to a new position thereby opening the opposite output diaphragm valve 7. This alternates as determined by the fluid source control timer. Time durations are set for each output port per normal timer operation.

Each of the valves is optionally formed from a commercially existing fluid valve. Fluid valves, pipes, fittings, and other parts of commercially available fluid control systems operative as base units herein are optionally obtained from irrigation supply sources or sprinklerwarehouse.com.

A user may have an existing system in which all the timing or control stations are in prior use and no expansion of the existing control mechanism is possible. Alternatively, in a new or existing installation a control mechanism is not present or may be a simple manually operated tap. In these situations, or otherwise if desired, the inventive flow control device is configured with a fluid flow regulated flow control device.

Figure 4:
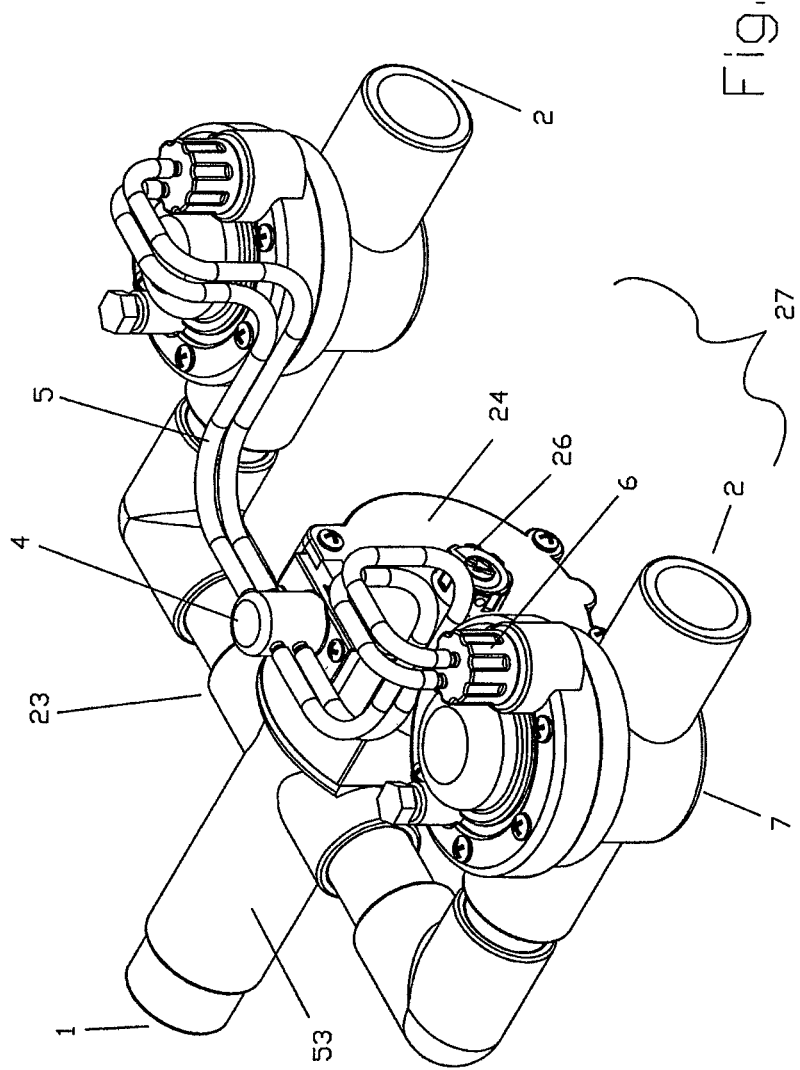
FIG. 4 depicts a general arrangement of an inventive flow control device controlled by a self-activating valve assembly.

As depicted in FIG. 4, a fluid flow regulated flow control device is generally a self-activating valve assembly 27 configured with an impeller assembly 25 housed downstream of the inlet port 1, a control assembly 23 including a gear box 24, a servo valve assembly 4, and a timing control assembly adjusted by a mechanism—illustratively a knob 26. The self-activating valve assembly 27 controls flow, via a plurality of tubes 5, between one or more adapters 6A and 6B that direct flow between the self-activating valve assembly and one or more output valves 7A and 7B that are activated or deactivated to regulate flow out a fluid output port 2. Preferably, a control assembly 23 regulates flow between two output valves 7A and 7B arranged on either side of the control assembly. It is appreciated that other configurations and number of output valves are operable in the instant inventive device. For example, the control assembly is optionally in a linear alignment with the output valves. Such a configuration optionally provides a device with no tubing and with flow regulated directly between an output valve and the control assembly by a channel or shaft. Other configurations are similarly operable to eliminate the need for tubing.

Figure 5:
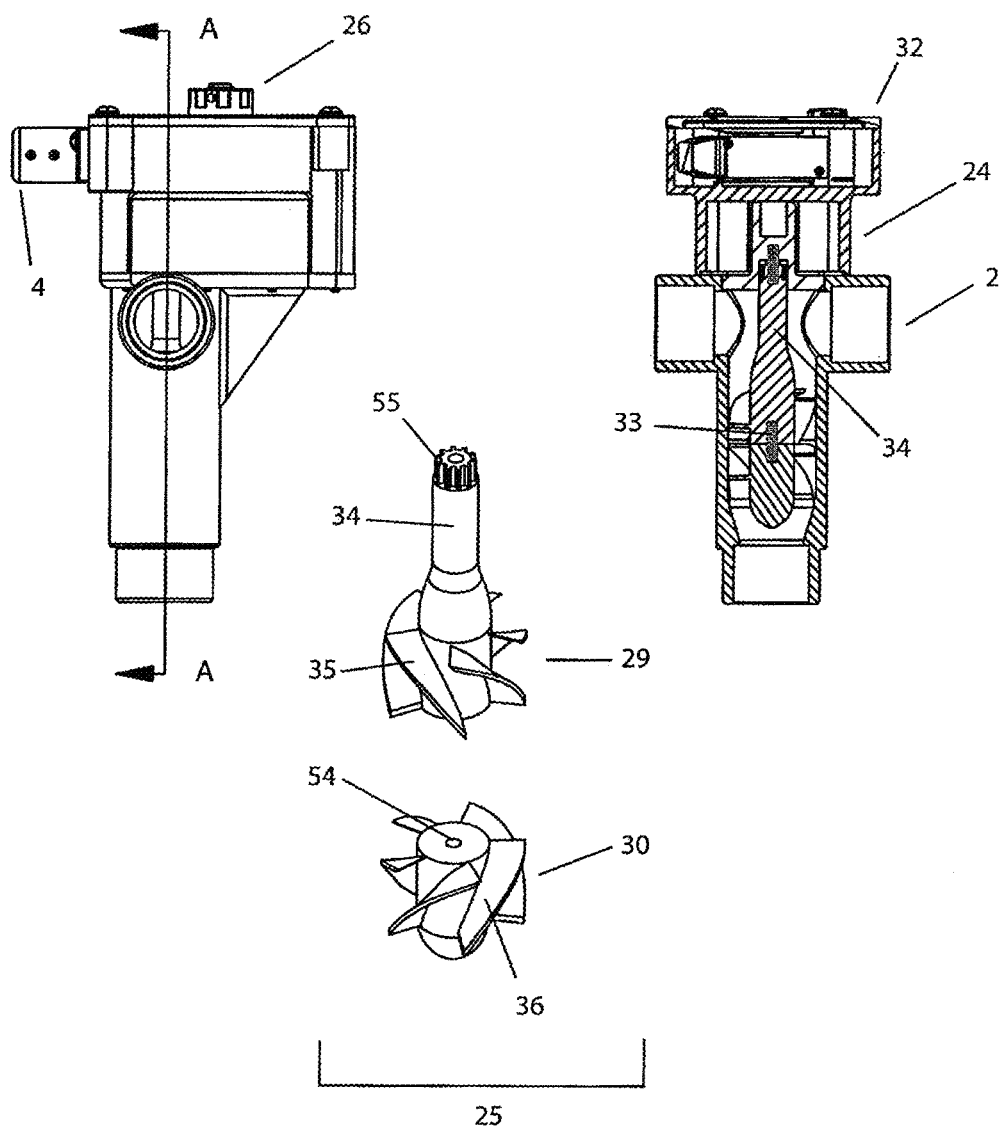
FIG. 5 depicts a self-activating valve assembly.

FIG. 5 depicts a control assembly. Downstream of an inlet port is a turbine that optionally is comprised of an impeller assembly. An impeller assembly is optionally an assembly of an impeller 29 and a stator 30. A stator 30 has a series of stator blades 36 surrounding the central shaft. The stator blades are optionally curved to direct flow in a circular fashion around the stator from the front end of the stator toward the back end. The front end of a stator is the portion facing the direction of fluid flow. The stator front end is optionally streamlined to increase efficiency of fluid flow across and beyond the stator. The stator blades 36 are dimensioned such that the stator will optionally press fit into a housing 53 surrounding the turbine. The number of stator blades is appreciated to be any number to induce a rotational flow in the fluid. The number of stator blades is illustratively 1, 2, 3, 4, 5, 6, 7, 8, 9, 10, or a greater number. A retainer cap optionally is connected to the inlet port to maintain the turbine 25 in the housing 53. It is appreciated that other methods of retaining the stator 30 stationary in a housing 53 are similarly operable illustratively including use of an adhesive.

A stator optionally has a bushing 54 in its central axis that receives a support shaft 33. The support shaft is connected to the central axis of an impeller 29 such that the impeller is rotatable about the central axis. An inventive impeller 29 optionally has a plurality of impeller blades 35 from as few as one to as many as is suitable for producing rotary force in the impeller. The number of impeller blades is illustratively 1, 2, 3, 4, 5, 6, 7, 8, 9, 10, or a greater number. The impeller blades 35 are preferably curved so that axial flow creates torsion or rotary force to produce rotational velocity and torque sufficient to power the inventive device. It is appreciated that an impeller is of any design known in the art suitable for producing rotary force around an axis when fluid flows across the impeller. Optionally the impeller blades are straight. Preferably, impeller blades are angled relative to a central axis of the impeller so that fluid flow from the stator forces against the side of an impeller blade inducing rotary motion in the impeller. It is further appreciated that other devices capable of being rotationally driven by fluid flow are similarly operable illustratively including a paddle wheel, fan blade arrangement, screw mechanism, or other configurations known in the art.

An impeller preferably has a streamlined exit shape. A support shaft 33 maintains a central axis around which the impeller will rotate. The impeller preferably has a diameter smaller than the inner diameter of the housing. Any clearance sufficient to produce a freely rotating impeller within the housing is operable. Preferably the clearance is between 0.001 and 0.05 inches. More preferably the clearance is between 0.002 and 0.04 inches. Most preferably the clearance is between 0.005 and 0.01 inches. An inventive housing 53 optionally has a larger inner diameter than the inlet port 1 such that the fluid flow is maintained independent of axial flow around the turbine. As such, turbine pressure losses are kept negligible by maintaining a flow cross section area that is larger than that of the input and output lines and by providing smooth streamlined changes in internal passage shapes.

A turbine output shaft 34 extends axially from the exit of the impeller 29. The turbine output shaft 34 translates the rotary force produced by the impeller into a gear box 24. A main pinion gear 55 is present on the turbine output shaft 34. The main pinion gear is optionally integral with the impeller output shaft, or is affixed. Preferably the turbine output shaft 34 is hemispherically shaped where it meets the main pinion gear 55 such that the rotational force in the turbine output shaft is efficiently translated to the main pinion gear 55. It is recognized in the art that other shapes for the main pinion gear interface end of the turbine output shaft 34 are similarly suitable illustratively including square, triangle, oval, rectangle, pentagon, hexagon, and other shapes known in the art. Optionally, the turbine output shaft 34 meets the main pinion gear 55 in a pressure fitting such that the association of the two parts provides sufficient frictional force that rotation of the turbine output shaft 34 translates to rotation of the main pinion gear 55.

Figure 6:
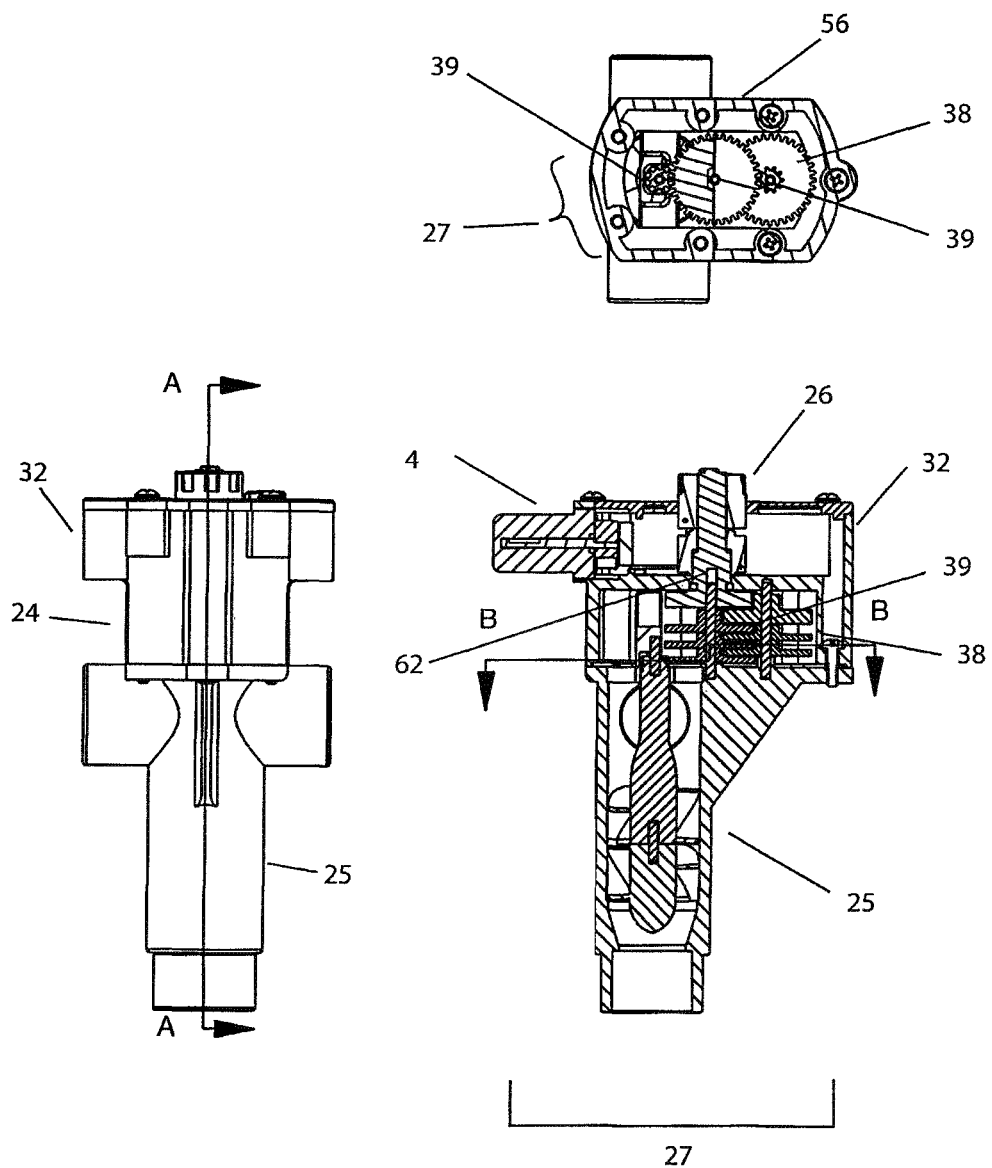
FIG. 6 provides additional detail of a self-activating valve assembly.

Rotation of the impeller 29 thereby rotationally drives the main pinion gear 55. The main pinion gear preferably associates with a family of cluster gears that form a speed reducing mechanism within the gearbox 24. FIG. 6C illustrates a cross section of a self-activating valve assembly 27. The gearbox as depicted in FIGS. 6B and C preferably is a gearbox housing 56 surrounding a speed reducing mechanism 38. In an example embodiment the speed reducing mechanism is a family of cluster gears. The cluster gears rotate about a plurality of cluster gear spindles 39. Optionally, two cluster gear spindles are present. In an example embodiment one spindle serves as a central axis for gears and the other both as a central axis for gears and as a central axis for the timing control assembly 32. The cluster gears culminate in rotation in an output gear affixed or integral with a spindle shaft. The spindle shaft on which the output gear is affixed optionally is fitted with a square shank. Preferably, an independent output shaft 62 is present and is driven by the cluster gears. In this embodiment the output shaft 62 is fitted with a square shank to interact with the timing control assembly 32. It is appreciated that other shapes for the shank are operative herein illustratively including triangle, oval, rectangle, pentagon, hexagon, and other shapes known in the art. Other means of affixing or driving rotation in an output gear are known in the art and are similarly operable herein.

The gearbox 24 also has a cover plate that when applied to the housing 56 is sealed so that fluid cannot escape the gear box. In this embodiment a spindle shaft traverses the cover plate and is sealed with an O-ring. The shank is affixed to the spindle shaft 39 at the outside of the cover plate. It is appreciated that the gearbox is optionally totally sealed from fluid by means of an O-ring surrounding the impeller output shaft 34 and a second seal surrounding the output gear spindle shaft. Thus, necessary lubricants in the gearbox are not transmitted to the fluid. It is appreciated that the gearbox is operable in fluid. Thus, there is optionally no seal around the impeller output shaft 34 such that the gearbox is accessible by fluid.

Figure 7:
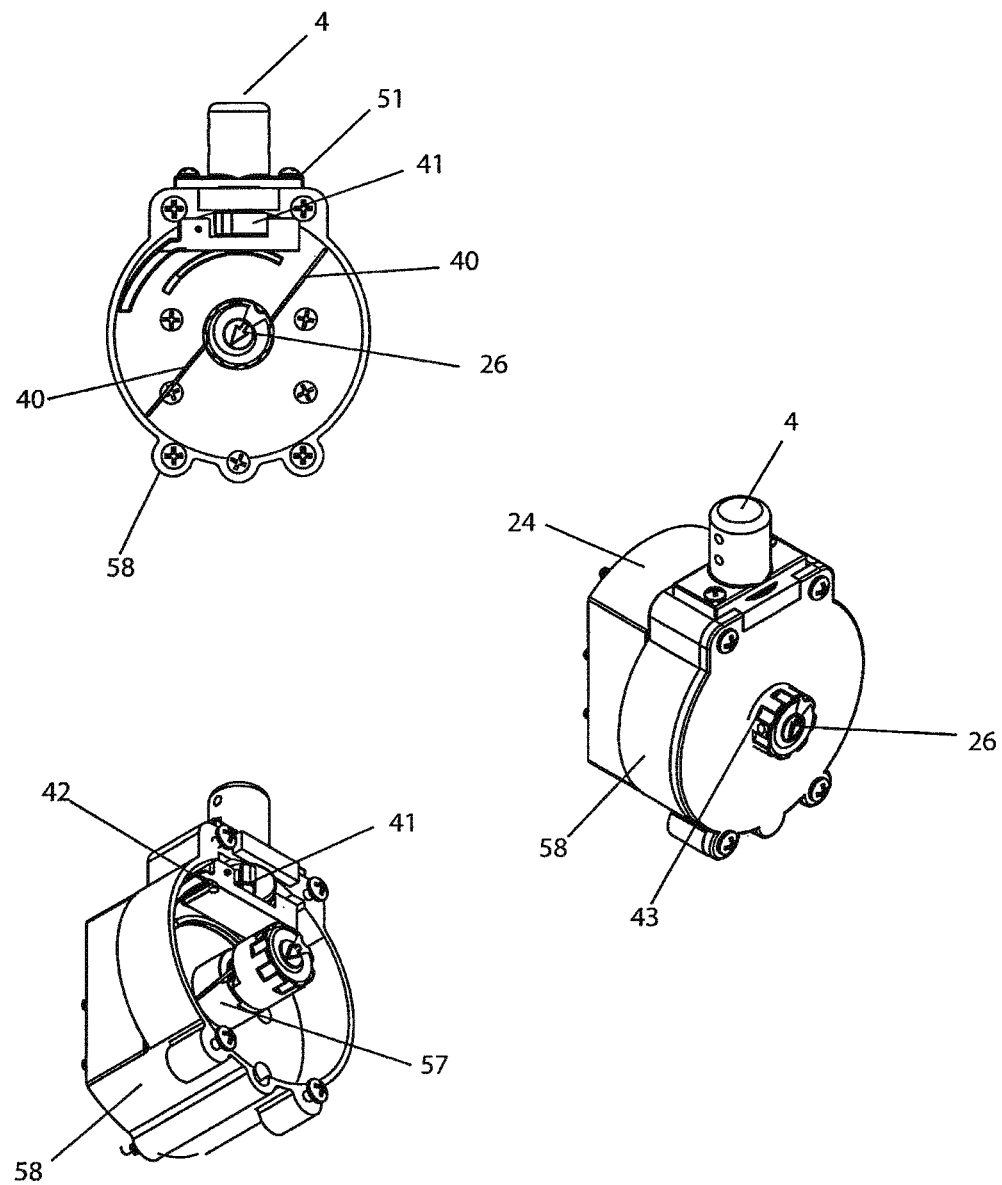
FIG. 7 depicts a timing control assembly in association with a servo valve.

FIG. 7 depicts an example embodiment of a timing control assembly 32. A timing control assembly is driven by a gearbox 24 and regulates switching between one or more output valves. A rotary force is transmitted from the gear box through the shank that is received by a gearbox socket. Thus, a drive shaft and spring arm mount 57 is rotated in response to fluid flow across the impeller. An actuator body 58 supports the drive shaft and spring arm mount 57 as well as the servo activation lever 41. The servo activation lever 41 is optionally maintained in position by a retainer clip 59 that also supports a central axis of the servo activation lever 41 such that forces applied to the lever 41 are translated to rotary motion. Movement of the servo activation lever 41 is driven by one or more spring arms 40 that translate the rotary force from the gear box to switch the servo activation lever 41. Preferably a timing mechanism has two spring arms 40. Each of two spring arms is oriented on the opposite side of a vertical axis upon which the servo activation lever 41 rotates. Thus, unidirectional rotation of the two spring arms 40 alternates the rotational direction of the servo activation lever 41. It is appreciated that multiple spring arms 41 are similarly operable. In a non-limiting example, four spring arms are operable to rotate the servo activation lever 41 at intervals smaller than that achieved by two spring arms. It is appreciated that other spring arm configurations are similarly operable.

A timing control knob 26 optionally allows adjustment of the position of the spring arm 40 relative to each other. Thus, the spring arms are illustratively at a 180 degree position relative to each other producing equal time for each position of the servo activation lever 41. Numerous other spring arm 40 configurations are operable that adjust the relative time for each position of the servo activation lever 41. Timing is adjustable to any desired ratio illustratively between the ranges of 20% to 80% for each position of the servo activation lever 41. Preferably, timing is adjustable in 10% increments ranging from 10% to 90% relative position of the servo activation lever 41. Small changes in the position of the timing control knob 26 can extend the timing to an even wider range. In an example embodiment the timing control knob has a set screw 43 that holds the timing in position between adjustments. It is appreciated that other means of maintaining position are operable illustratively including a spring loaded pressure lock, a friction fitting with or without position retaining stages, or other means of retaining rotary position known in the art. It is appreciated that other means of timing control are similarly operable. In a non-limiting example, replacement of the gears in the speed reducing mechanism 38 allows adjustment of the rate at which the drive shaft 57 rotates with each rotation of the impeller 29.

Preferably, the timing control knob has color-coded dials that indicate the percent of time that flow will discharge from the respective output ports. Preferably, each output valve is labeled by the color-coded buttons that depict settings of the timing control knob 26 so that a user can easily adjust the position of the timing control knob to the desired ratio of fluid delivery from each output port. Any color or numbering mechanism is operable for the timing control knob 26 and buttons illustratively including red, green, yellow, purple, black, white, orange, blue, or other suitable color known in the art. A numerical code is optionally employed to depict the time settings on the timing control knob. In a non-limiting example the number 8 translates to 80% of time fluid flows through that output port, 5 translates to 50%, and 2 translates to 20%. Each output valve is optionally labeled with a button of color that corresponds to one of two colors on the timing control knob 26. Each color on the timing control knob 26 is representative of a corresponding output port. Preferably, the color of the button on a particular output valve matches one on the timing control knob so that the user easily recognizes which setting represents which output valve. Thus, a user easily sets the relative time with confidence.

In an example embodiment the timing control knob 43 is also labeled with an arrow or other positional indicator to direct the user to the proper position to regulate flow as desired. Other markings illustratively include a line, dot, dash, or other operable label.

Figure 8:
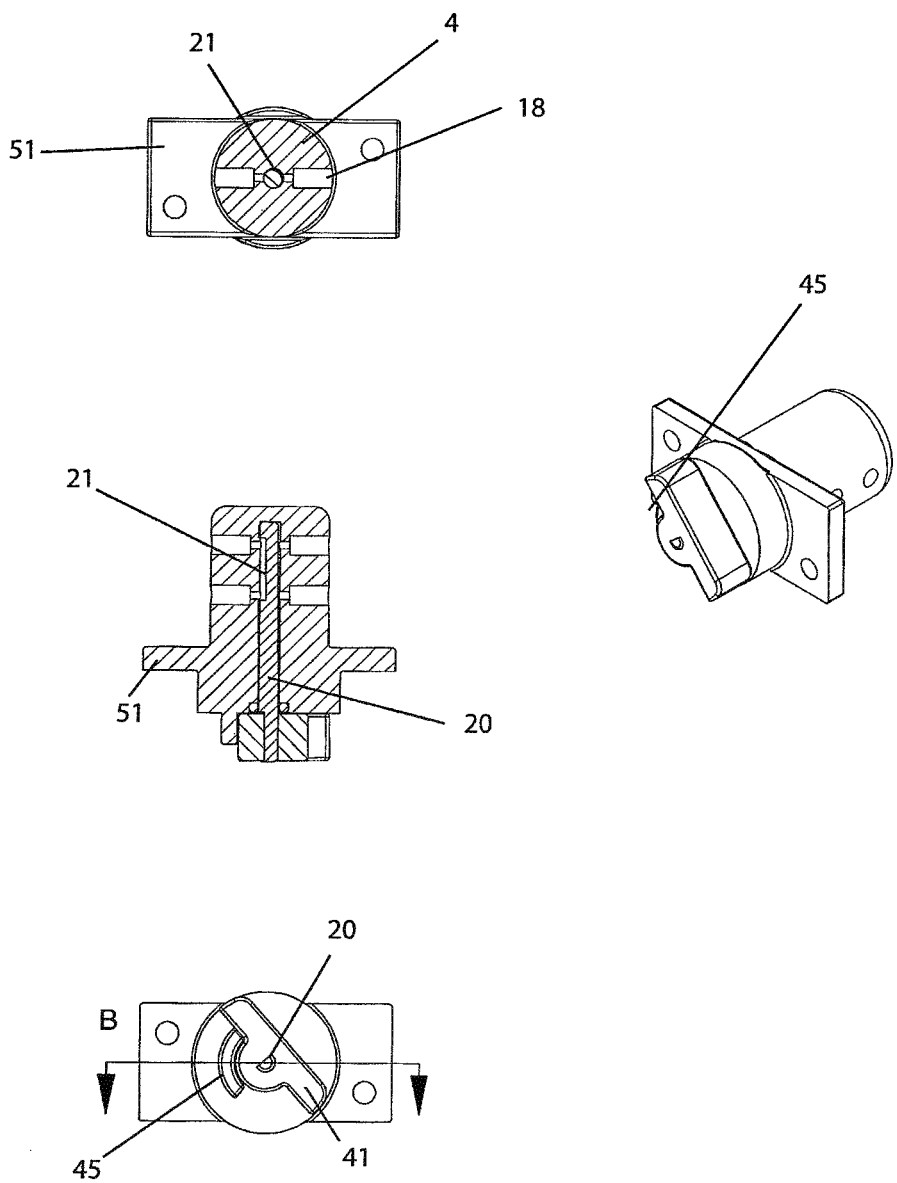
FIG. 8 depicts a servo valve as associated with a self-activating valve assembly.

Referring to FIG. 8, a preferred servo valve 4 is depicted as controlled by the position of the servo activation lever 41. The servo valve 4 is housed in a servo support block 51. The servo activation lever 41 is affixed to a servo valve shaft 20 that has one or more valve shaft ports 21. The orientation of the valve shaft ports 21A and 21B are aligned with the servo activation lever 41 such that each position of the lever correctly positions a valve shaft port 21A and 21B to allow fluid flow from one or more output valves. Preferably, a single valve shaft port aligns with two shafts connecting a single output valve. Preferably the valve shaft 20 is hemi spherically shaped where it meets the servo activation lever 41 such that the rotational force in the lever is efficiently translated to the valve shaft 20. It is recognized in the art that other shapes for the servo activation lever interface end of the valve shaft 20 are similarly suitable illustratively including square, triangle, oval, rectangle, pentagon, hexagon, and other shapes known in the art. Alternatively or additionally, the valve shaft 20 meets the servo activation lever 41 in a pressure fitting such that the association of the two parts provides sufficient frictional force that rotation of the servo activation lever 41 translates to rotation of the valve shaft. It is also appreciated in the art that the servo activation lever 41 and valve shaft 20 are optionally formed from a single unitary piece eliminating the need for fitting a separate valve shaft 20 and servo activation lever 41.

In an example embodiment a servo activation lever 41 has one or more lever rotation stops 45 that prevent over rotation of the servo activation lever. FIG. 8D depicts a single lever rotation stop 45, however, it is appreciated that each servo activation lever preferably has two lever rotation stops such that the magnitude of servo activation lever rotation is controlled in each direction (more than two rotation stops may be used in certain embodiments). The lever rotation stops 45 are optionally integral with the servo activation lever. It is appreciated that other mechanisms of regulating servo activation lever rotation are operable illustratively including a bar integral with or affixed to the servo support block or other support that extends to the servo activation lever preventing rotation beyond a desired point.

Referring to FIG. 7C, a detent bar 42 optionally extends from the servo support block 51, the actuator body 58, or other support. The detent bar 42 restricts rotational movement of a spring arm 40 at the distal end. Continuous rotation at the central axis of the drive shaft and spring arm mount 57 forces rotation of the proximal end of a spring arm forcing a bend in the spring arm. As rotation of the drive shaft and spring arm mount 57 continues the spring arm 40 slides along the detent bar until the end of the spring arm is reached releasing the energy stored in the bent spring arm, which quickly turns the servo activation lever 41. This rapid turning of the servo activation lever rapidly activates an output valve and deactivates another output valve, thus, preventing fluid hammering effects.

Optionally, movement of the servo activation lever 41 drives two valve shafts each extending from the control assembly to an output valve. Thus, the valve shaft port is optionally housed within the output valve and flow between the diaphragm port and the exit port is directly controlled in the absence of a servo valve.

In an example embodiment, one or more protective shrouds are present between the spring arms 40 such that each spring arm interacts with only one side of the servo activation lever. A spring arm guide bushing is optionally placed on each spring arm that separates the spring arm from the protective shroud. In an example embodiment two protective shrouds are employed with one on each side of an actuator body support block. The thickness of the actuator body support block is sufficient to direct each spring arm to an extension on the servo activation lever. A given spring arm is separated from the other by the protective shrouds and drives rotation of the servo activation lever in one direction. Thus, in this example, a single rotary direction of both spring arms will alternate the rotational direction of the servo activation lever producing a switching fluid flow between one or more output valves. An angular offset as determined by the timing adjustment knob 26 sets the ratio of time each output valve is activated.

Referring to FIGS. 1 and 4, one or more output valves are associated with a self-actuating valve assembly 27. In an example embodiment a single control assembly 23 controls flow between two output valves (other embodiments may use multiple control assemblies). It is appreciated that a single output valve is optionally regulated by the assembly or that 3, 4, 5, 6, 7, 8, 9, or 10 valves are optionally regulated. The output valves 7A and 7B are illustratively concentrically oriented around the control assembly 23. However, when two output valves 7A and 7B are controlled by the control assembly 23 an offset linear relationship is optionally employed. It is appreciated that a linear or direct connection relationship between the control assembly 23 and the output valves 7A and 7B is operative herein.

A commercially available sprinkler valve is operative as an output valve with little or no modification. In an example embodiment an output valve is optionally modified to direct fluid flow between the output valve and the control assembly. More preferably an output valve is unmodified and an adapter is used to direct fluid flow to and from the control assembly.

Illustratively, a commercially available sprinkler valve is employed as an output valve with few modifications. The solenoid is removed exposing the solenoid mount which is threaded and houses two ports. A first port leads to a diaphragm cavity and is a diaphragm port, and a second port is an exit port that leads to the output port 2. The solenoid mount and the openings of the diaphragm and exit ports are optionally plugged. Any material suitable for plugging is operable herein illustratively including thermoformable plastic, polyurethane, polypropylene, polyethylene, polyester, vinyl, polystyrene, rubber, aluminum, steel, other suitable metals, reinforced plastic, inter fiber reinforced composite, cork, combinations thereof, or other materials known in the art. Preferably, an epoxy or polyester resin is used to plug the solenoid mount. Each output valve has a cap and a body. The cap houses the solenoid mount and has two openings whereby the diaphragm port and exit port pass. As the solenoid mount ends of the ports are plugged, a new hole is created to provide access from the diaphragm cavity to the original exit port. The output valve body of a commercial valve has a port that fits the original exit port of the cap providing access to the output port. A plug is optionally inserted in the exit port at its distal end. A hole is created in the side of the output valve body accesses the original exit port such that assembly of the valve body and the cap creates a port accessible from the outside of the body that leads to the diaphragm cavity. This converts the original exit port into diaphragm port. A new exit port is created by creating a port between the outside of the valve body and the output port. A tubing interconnect fitting is optionally mounted on the new exit port and the new diaphragm port such that these ports are capable of fluid communication with the control assembly 23. It is appreciated that modifications preferably do not hinder access to the diaphragm for servicing or replacement.

More preferably, an unmodified output valve is employed. Proper routing of fluid between the output valve (e.g., 7A) and the control assembly 23 is achieved with an adapter that replaces the solenoid of a commercially available valve.

Figure 9:
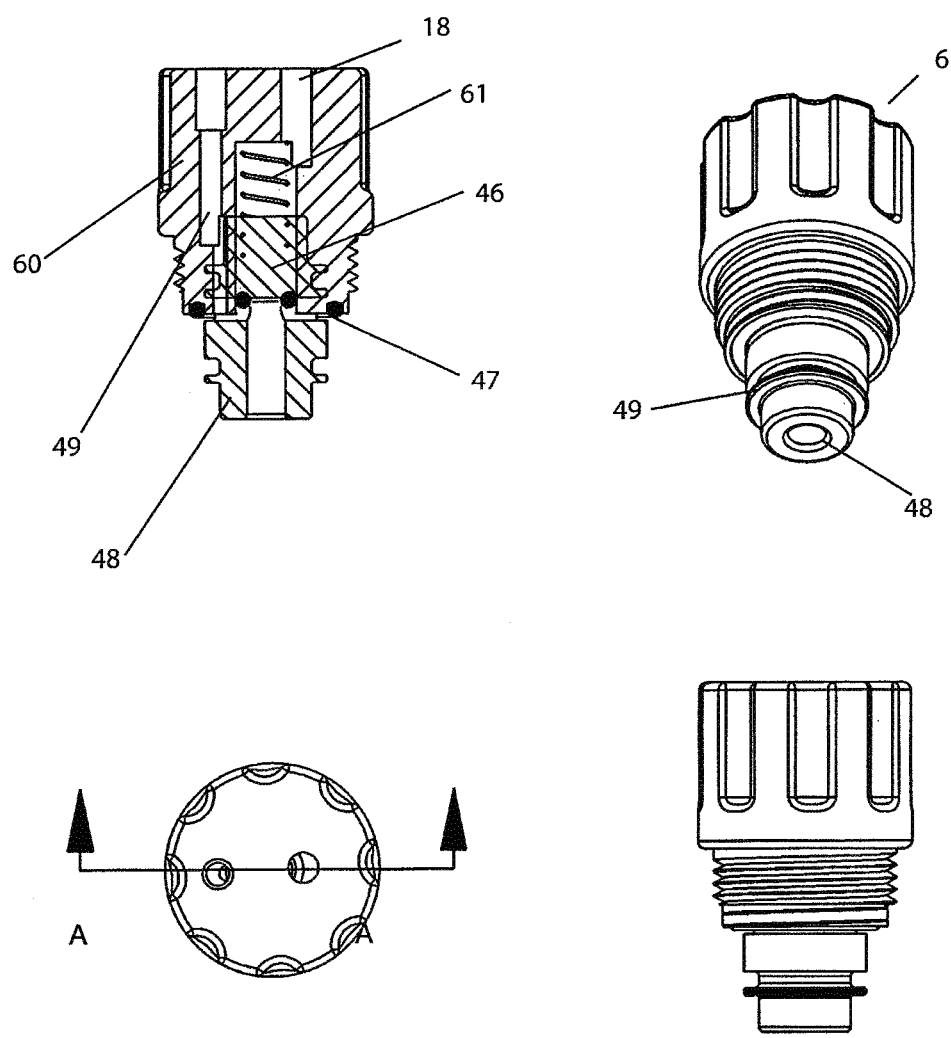
FIG. 9 depicts an adapter.
Figure 10:
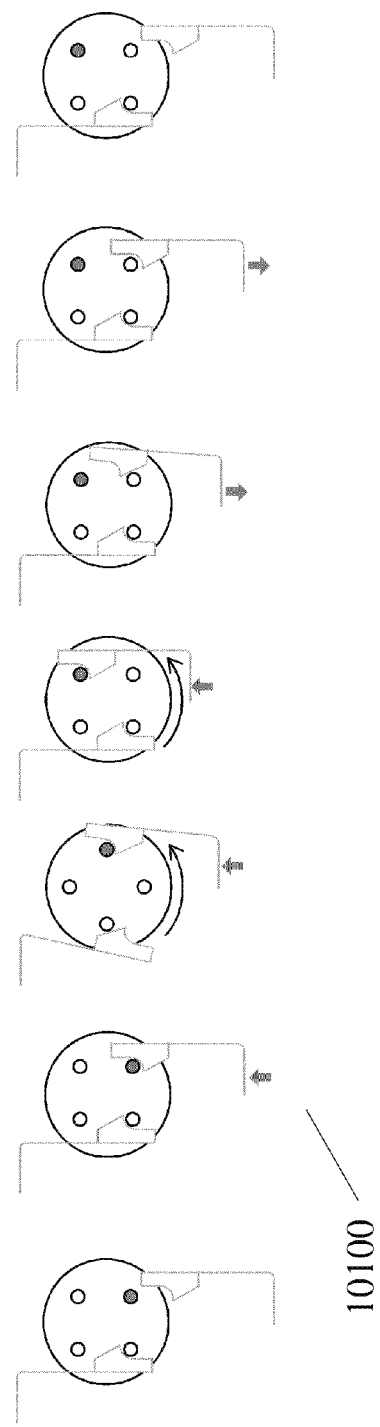
FIG. 10 depicts an example embodiment of a time sequenced cog wheel and springs interface.

It is appreciated that the directional ports are produced de novo with construction of an output valve and no modification is necessary. FIG. 9 depicts an exemplary adapter (6 in FIGS. 1 and 4). An illustrative adapter has a threaded body with two ports. A first port 49 provides access from the outside of the adapter to the diaphragm port in the output valve. The adapter body 60 also has a bore 61 that is connected to a second port providing access from the outside of the adapter to the exit port in the output valve. The bore 61 houses a spring 46 and an inner seat 48. The inner seat 48 slides relative to the adapter body and is forced outward by the spring 46. A seal is optionally achieved between the inner seat 48 and the bore 61 by an O-ring, or other sealing mechanism known in the art. A small flange is optionally present in the bore to retain the inner seat 48 when the adapter is removed from the solenoid mount in the output valve. Preferably, the inner seat has a shaft that allows fluidic connection between the second port and the exit port in the output valve. A second O-ring 47 is optionally present at the bottom of the threaded end of the adapter body 60 to prevent fluid leakage outside the adapter when inserted into the solenoid mount on the output valve. An adaptor seats in the location where the solenoid is commercially mounted in the output valve and is connected to the servo valve (4 in FIGS. 1 and 4) using small control tubes. The flow path through the servo valve is such that output valve switching is accomplished when the respective servo body shafts are opened by connection with a valve shaft port. Therefore, an unmodified commercial diaphragm valve is operative in remote locations without the need for electric control power at the remote site. Adaptors are provided to physically mate any brand of commercial valve.

When the adaptor (e.g., 6A) seats into the solenoid receptacle of an output valve, the outer O-ring seals it to the output valve cap providing access to the diaphragm port and simultaneously the center face seats over the exit port. Production accuracies of the particular output valve parts used for demonstration models allow the simultaneous mating of both surfaces.

It is appreciated that an adapter (e.g., 6A) is optionally manufactured without an inner seat 48 or seat spring 46. In this embodiment an optional protrusion is present below the adapter bore that is manufactured to fit snugly against the exit port in the output valve (e.g., 7A) when the adapter is seated in the solenoid mount of a commercial output valve. An additional O-ring is preferably employed to prevent fluid leakage from the adapter into the diaphragm cavity or exit port. Thus, fewer moving parts are necessary improving performance and reducing maintenance.

The control assembly 23 and the output valves 7A and 7B are optionally arranged in numerous configurations. In a non-limiting example, the control assembly 23 is arranged prior to a junction dividing flow between two output valves 7A and 7B as is illustrated in FIG. 1. Alternatively, the control assembly 23 is positioned between two or more output valves 7A and 7B as depicted in FIG. 4. When the control assembly is a self-activating valve assembly, the impeller is optionally in direct line with the drive shaft and spring arm mount 57, or arranged perpendicular thereto. Optionally, a right angle gear is used to translate rotational force between the impeller and the gear box. Alternatively, a right angle gear is employed between the gears of the speed reducing mechanism 38 and the drive shaft 57. Any right angle gear mechanism known in the art is operable herein. Illustratively, a worm gear is employed as the drive pinion 37. A worm gear has the advantage of translating rotational force in one direction. Alternatively, one or more helical gears are employed to configure the arrangement of the control assembly 23 relative to the output valves and the fluid inlet port 1 to any desired angle. Other gear types are operable in the speed reducing mechanism and in the interface between the impeller and the speed reducing mechanism illustratively including, but not limited to, face gear, hypoid gear, bevel gear, screw gear, planetary gears, combinations thereof, or other gear types known in the art.

A PA is illustratively used in a fluid delivery system where extra unused stations are available on the existing system watering timer. PA illustratively switches between two output valves 7A and 7B using the pressure increase of the fluid source when turn-on occurs. This activates a servo valve 4 which opens one of the output valves and closes the other. When the fluid source is turned off, the servo valve 4 remains in its last used position to keep open a path for pressure relief so that the activator diaphragm 12 can reset to the initial state. When the fluid source is turned on again the pressure increase activates the servo valve 4 to open the closed output valve and close the other. This alternating opening and closing allows one input source to serve two fluid delivery areas with equal flow and pressure. Time of use of each fluid delivery area is established at the source by the control timer. It is appreciated that by adding more ports to the servo valve shaft 20, more output valves are optionally controlled using the same concepts described above for two output valves.

It is appreciated that one or more bladder membranes are operable as a pressure activating device. In this embodiment, timing control devices are present to control filling each bladder thereby controlling output flow time. A blade is optionally placed between each bladder such that filling of one bladder moves the blade in a direction activating one output valve and deactivating another.

The existing source is optionally turned on and off by two or more fluid delivery station terminals. Most timers will operate by connecting the desired terminals to the source control valve using jumper wires between terminals. Many timers have a time delay between stations that will afford time for the servo valve to reset. However, if the time is inadequate for reset, another fluid delivery station is optionally operated between the two PA times to allow time for reset. Additionally, some timers have a second program capability, and that program can also be used to control the source valve for turn on at another time thereby eliminating the need for jumper wires. In either case, time for fluid delivery is set as desired for each station.

Operation of a self-actuating valve assembly as depicted as the control assembly 23 in FIG. 4 occurs generally by fluid entry at the fluid inlet port 1, passing through a turbine assembly, and then exit via either output port. The turbine 25 generates rotary power that drives, via a speed reducing gearbox, a servo valve 20 which opens an associated output valve. The relative time of fluid flow from either output ports is adjustable. Increasing the on-time for the original line makes it possible for the fluid delivery area to be increased accordingly since each output port provides the same flow rate and pressure as the original line. This allows each new line to cover an area equivalent to that covered by the original line.

A turbine is generally operated as fluid passes over the stator 30 and is directed into a swirl which impacts the impeller 29 at an angle causing it to rotate. The impeller's rotor blades 35 are optionally curved so that the axial flow creates additional torsion force assuring adequate torque and rotational velocity to power the servo valve 4. The turbine output shaft 34 optionally provides this power to the gearbox 24 through a low friction bearing. Turbine pressure losses are kept negligible by maintaining a flow cross section area that is larger than that of the input and output lines and by providing smooth streamlined changes in internal passage shapes. Losses due to turbine torque and friction are insignificant as well. Therefore, pressure at the output port is similar to pressure at the inlet port.

The turbine shaft 34 enters the gearbox 24 through a low friction bushing in the turbine housing. A gear is attached to, or integral with, the shaft which drives the cluster gears that reduce rotational velocity and amplify torque at the gear output shaft 62. Gears are optionally molded plastic and rotate on corrosion resistant spindle shafts. The housing is of corrosion-free plastic and the entire unit is optionally sealed. The output shaft 62 is optionally sealed with an O-ring to ensure no fluid exits the gearbox 24. This arrangement allows the turbine shaft bushing to have relatively large clearances and resultant low friction. Since there is ample torque at the gearbox output shaft 62, it easily overcomes the friction of the waterproofing O-ring. The low friction turbine bearings prevent any chance of static friction hang-up at operational start and ensure reliable turbine performance. An optional small bleed hole into the main flow path allows drainage so as to prevent freeze damage to the gearbox. The shank on the output shaft mates the servo valve 4 or timing control assembly 32.

The output shaft 62 nests into the shape matching socket of the drive shaft 57 and rotates the servo actuator spring arms 40. These spring arms 40 in turn rotate the servo activation lever 41 to activate the output valves 7. When the spring arms 40 approach the servo activation lever 41, they encounter the detent bar 42 that restrains them until sufficient force is stored in the spring 40 to quickly rotate (snap action) the servo activation lever 41. The spring arm 40 is released when the resulting radius of the bending spring arm is reduced enough to allow it to pass the detent bar. The servo valve 4 is optionally a bypass arrangement that directs a small volume of fluid through the tubes 5 to activate the internal diaphragms of either output valve. The quick snap action of the servo valve prevents water hammer pounding oscillations of output valve diaphragms that occur if the action is too slow. The servo valve 4 cannot hang-up because the valve shaft 20 and body 17 have low friction clearances. These clearances do not affect performance since small internal leakages are not large enough to trigger activation of the output valves.

Output valve timing adjustment is achieved by angularly repositioning two spring arms 40 relative to each other. This is optionally done by loosening the set screw 43 and rotating the timing control knob 26. Dials on the knob 26 indicate the relative time fluid will flow through each output port 2. Thus, the user can select fluid delivery times to each output port 2A and 2B according to his needs.

Figure 59:
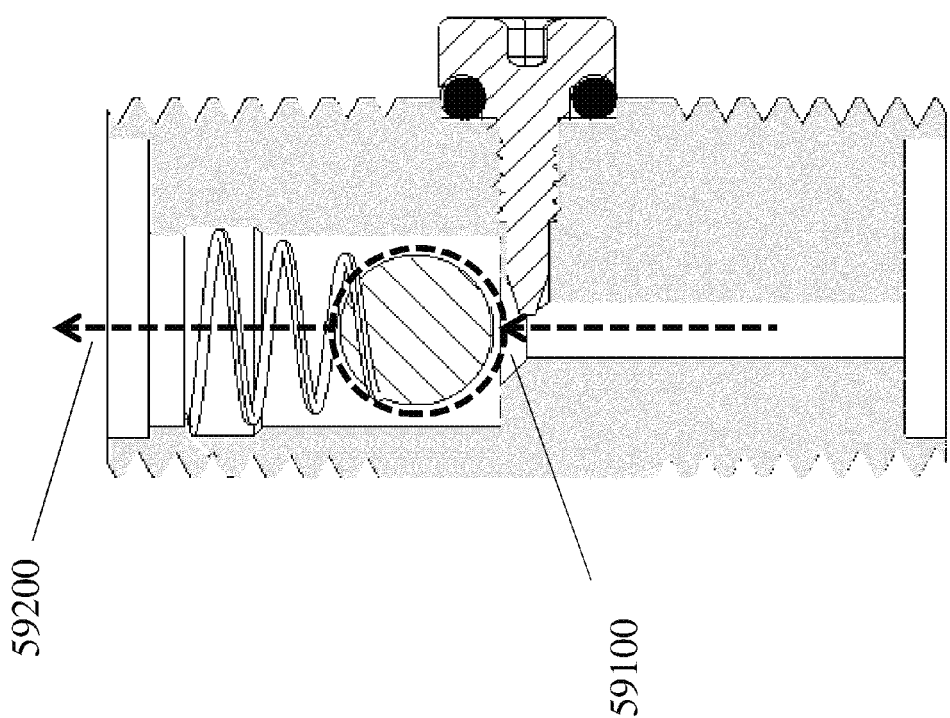
FIG. 59 depicts an internal view of certain components of an example embodiment of a fluid timing device.

It is appreciated that elements of certain embodiments are capable of independent manufacture either in themselves or as single element combinations to minimize the number of elements necessary. In a non-limiting example, the turbine housing and gearbox assembly is made to have all parts installed from the gearbox side, or control passages or tubes 5 are made integral to the housings to eliminate material and labor costs associated with external tubing as is depicted in FIG. 59a of U.S. Provisional Application No. 60/901,055.

Sequencing Actuator Description

Figure 21:
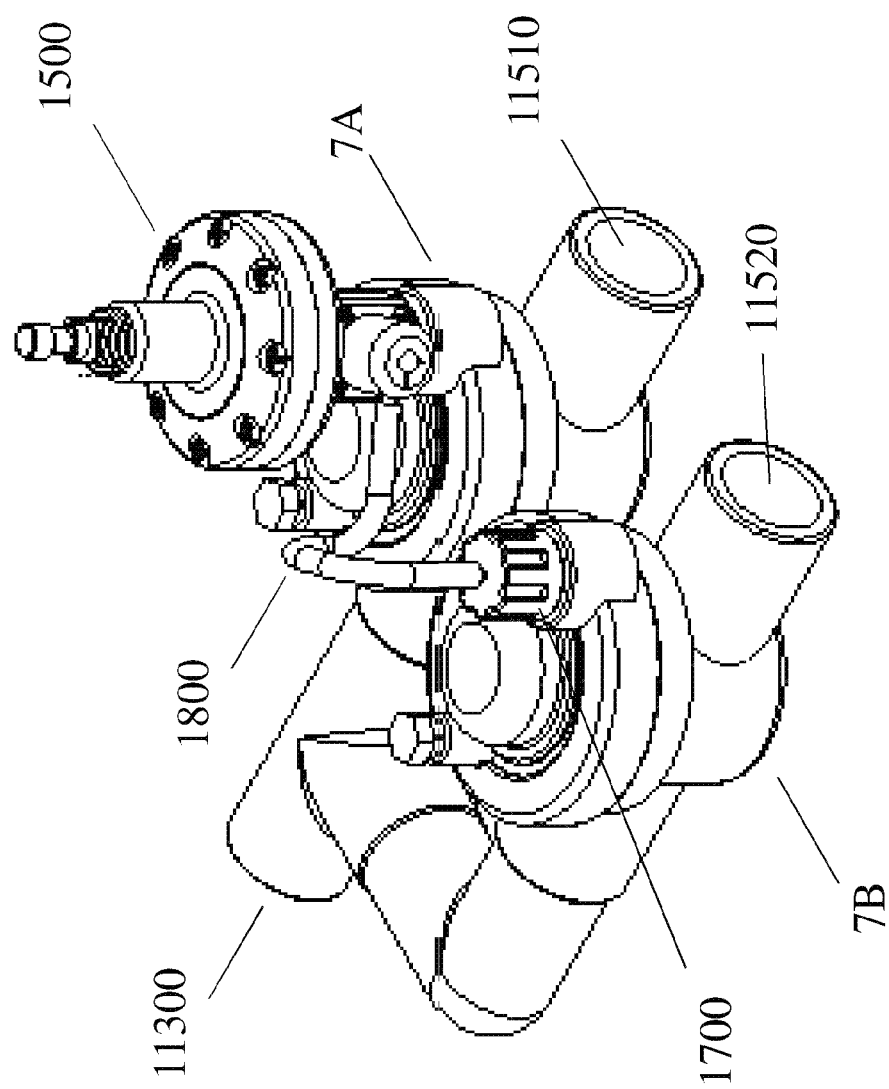
FIG. 21 depicts an example generalized arrangement for a fluid activated actuator.

FIG. 21 represents a generalized arrangement for a fluid activated servo assembly 1500 labeled a sequencing actuator. In this arrangement a fluid inlet port 11300 receives fluid from a source and the inventive device automatically determines whether one or more distribution valves 7A and 7B are activated or inactivated, thus, directing fluid out one or more of a group of fluid outlet ports 11510 and 11520 to a fluid distribution line.

In an example embodiment a sequencing actuator 1500 receives fluid from a source via an inlet port 11300. Pressure, flow rate, or other parameter of the input fluid drives the sequencing actuator 1500 to activate or deactivate one or more output valves 7A and 7B. When more than one output valve 7A and 7B are present, activation of one output valve, for example 7A, occurs simultaneously, or nearly thereto, with deactivation of another output valve, for example 7B. Thus, fluid is directed into a particular distribution line with the same pressure and flow characteristics of the source fluid. By control from the sequencing actuator 1500, fluid is optionally then directed to a different distribution line by deactivation of the first output valve 7A and activation of another output valve 7B, see FIG. 21. In this way multiple distribution lines are optionally served by a single source with the pressure, rate, and other flow characteristics of the original source maintained throughout the entire system. Thus, expansion of an existing irrigation or other fluid delivery system is accomplished without need for an additional fluid source, control device, or timing mechanism.

In an example embodiment a single sequencing actuator 1500 regulates flow through two output valves. However, it is appreciated that the sequencing actuator 1500 is suitable for regulation of one, two, three, four, five, six, or more output valves. This is optionally accomplished by adding multiple valve shaft ports at various angles each allowing fluid flow to one output valve, see FIG. 40. While certain embodiments are described with respect to two output valves, a person having ordinary skill in the art recognizes description and enablement of any number of output valves without limitation.

In an example embodiment it is appreciated that the sequencing actuator 1500 is also suitable for regulation of multiple output valves in which one or more of the output valves are configured to deliver an outlet pressure at the same pressure while two or more other output valves in the system are configured to deliver outlet pressure at a reduced pressure. For example, in a four output valve configuration, two valves are configured for an outlet pressure that is the same as the inlet pressure and two output valves are configured for an outlet pressure half the inlet pressure. In this example configuration, the two output valves with half pressure are configured to actuate at the same time causing the inlet pressure to be divided between the two.

FIG. 21 depicts a general communication system between sequencing actuator 1500 and the output valves 7A and 7B. The sequencing actuator 1500 optionally uses a pilot valve shaft 14900 to allow fluid flow from one or more output valves 7A and 7B via interconnecting tube 1800, one per valve. The tube 1800 receive fluid from an output valve by an adapter 1700 that optionally replaces the solenoid in a standard prior art solenoid controlled diaphragm valve, see FIG. 21. Optionally, the sequencing actuator 1500 itself replaces the solenoid in a standard prior art controlled diaphragm valve, see FIG. 20. Thus, certain embodiments optionally incorporate the low cost and simplicity of widely used diaphragm valves with fluid activated actuator devices as disclosed herein.

An exemplary sequencing actuator 1500 is optionally constructed of an actuator housing 14200 to prevent fluid leakage from the actuator. In addition, the housing 14200 provides a protective cover to reduce contamination by soil, water, or other environmental conditions. A protective cover is optionally a separate piece that is removable, or is incorporated into a single injection molded part. The housing 14200 includes a diaphragm 14400 of the actuator assembly coupled to a rigid pressure disk 14100. A return spring 14550 is further coupled to the pressure disk 14100 that provides suitable force to compress the pressure disk 14100 and diaphragm 14400 when pressure is reduced from the fluid source, see FIG. 14. Optionally, a single or dual acting piston drive is operable in place of the diaphragm, pressure disk, and spring system. Attached to the pressure disk 14100 is a cog drive bar or leaf spring 16000 that interfaces with a cog wheel 8 via a cog wheel post 19, see FIG. 16. The leaf spring 16000 produce a rotational force in the cog wheel 8 when the drive post is raised in response to reapplication of fluid pressure and raising of the diaphragm 14400 and coupled pressure disk 14100. The types of cog wheels and number of cog wheel posts varies as previously described.

The sequencing actuator 1500 optionally includes an anti-back rotation leaf spring stop 16300 that prevents the cog wheel 8 from reversing rotational direction. The anti-back rotation leaf spring optionally has a flange that provides a shelf that engages a cog wheel post preventing back rotation. The anti-back rotation leaf spring 16300 is flexible such that it does not impede the forward rotation of the cog wheel 8. Optionally, other anti-back rotation features including a notched cog wheel (described later) and rotational resistance (previously described) cog wheel can optionally be employed to prevent back rotation of the cog wheel.

The sequencing actuator 1500 optionally includes a pilot valve shaft 14900. The pilot valve shaft 14900 is rotatable and connects one or more pilot valve ports 17100 and 17200 to tubing interconnect fittings 17400, see FIG. 17. The pilot valve shaft 14900 is secured to the cog wheel 8 such that rotation of the cog wheel 8 produces rotation in the valve shaft 14900. The pilot valve shaft 14900 is optionally cylindrical in shape. Preferably the pilot valve shaft 14900 is hemispherically shaped where it meets the cog wheel 8 such that the rotational force in the cog wheel is efficiently translated to the valve shaft 14900. It is recognized in the art that other shapes for the cog wheel interface end of the pilot valve shaft 14900 are similarly suitable illustratively including square, triangle, oval, rectangle, pentagon, hexagon, and other shapes known in the art. Alternatively or additionally, the pilot valve shaft 14900 meets the cog wheel 8 in a pressure fitting such that the association of the two parts provides sufficient frictional force that rotation of the cog wheel translates to rotation of the valve shaft. It is also appreciated in the art that the cog wheel and valve shaft are optionally affixed with an adhesive or by press fit. The cog wheel 8 and pilot valve shaft 14900 are optionally formed from a single unitary piece eliminating the need for fitting a separate pilot valve shaft 14900 and cog wheel 8.

The sequencing actuator assembly 1500 preferably includes one or more fluid passages that can optionally be interconnected by the pilot valve ports 17100 and 17200, each serving a single output valve. It is appreciated that any method of regulating flow between two or more pilot valve ports is similarly operable herein. When two pilot valve shaft ports 17100 and 17200 are present in a pilot valve shaft 14900 they are preferably positioned at 90 degrees relative to one another, see FIG. 17. Thus, for example, a 90 degree rotation of the cog wheel 8 aligns one valve port 17200 with a corresponding sequencing actuator passage 14950, see FIG. 14. In another example, a further 90 degree rotation of the cog wheel 8 aligns the second valve shaft port 17100 with a corresponding sequencing actuator passage 18980, see FIG. 18. The pilot valve ports 17100 and 17200 are preferably capable of delivering flow omnidirectionally. Thus, in this example configuration, only one set of sequencing actuator passages and pilot valve ports are aligned at one time regulating flow to one output valve (e.g., output valves 7A or 7B). This arrangement provided alternating flow through the sequencing actuator 1500 for each 90 degrees of valve shaft 20 rotation as provided by four cog wheel posts 19 on the cog wheel 8. It is appreciated that multiple configurations of a pilot valve port are operable herein as previously described.

Optionally, the sequencing actuator 1500 includes a manual setting knob 14650 which is coupled to the rigid pressure disk 14100. The manual setting knob 14650 enables a user to manually actuate the sequencing actuator 1500. Manually applying, for example, an outward force to the setting knob 14650 causes the coupled rigid pressure disk 14100 and attached leaf spring 16000 to move in a linear direction to the applied force (e.g., upward in FIG. 14). The leaf spring 16000, interfacing with the cog wheel post 19, applies a rotational force to the cog wheel 8. The rotation of the cog wheel 8 cause a rotation in the pilot valve shaft 14900. Each full extension of the manual setting knob results in an advancement of the pilot valve shaft 14900. In this manner, the flow to an output valve (e.g., 7A or 7B) is manually configured.

Optionally, the sequencing actuator 1500 includes a pressure head adjustment bushing 14800. Optionally, a clockwise rotation of the pressure head results in a compression of the return spring 14550. Compressing the return spring 14550 increases the compression of the return spring. Therefore, more pressure is required in the diaphragm valve chamber to overcome the spring compression. Conversely, a counter-clockwise rotation of the pressure head results in an expansion of the return spring 14550. Therefore, less pressure is required in the diaphragm valve chamber to overcome the spring compression.

The inventive arrangement functions when pressurized source fluid enters the sequencing actuator via a fluid passage into diaphragm chamber 14300. The diaphragm expansion overcomes the return spring 14550 compression and forces linear movement of the rigid pressurized disk 14100. The coupled leaf spring 16100 rotates the cog wheel 8 into its new position. This position aligns one of the pilot valve ports in the valve shaft 14900 with its respective fluid passages (e.g., to tubing interconnect fitting 17400 or to the attached diaphragm bleed port 19600). This position allows fluid to flow from the diaphragm chamber of an associated diaphragm valve (e.g., 7A or 7B) causing the output diaphragm valve to open. Upon termination of the fluid pressure cycle by the control mechanism, the pressure is removed from the diaphragm 14400 allowing pressure from the return spring 14550 to extend the diaphragm into the closed position while the anti-back rotation leaf spring 16300 prevents the cog wheel 8 from rotating in the reverse direction by the retraction of the leaf spring 16100.

In an example embodiment, two commercially available output diaphragm valves are connected using standard PVC plumbing fittings. The sequencing actuator mounts in the solenoid mounting of one of the output diaphragm valves, see FIG. 20 and FIG. 21. The one or more associated diaphragm valves solenoids are replaced with an adapter 1700 which is screwed into the solenoid mounting location. Each adapter is fluidly connected to the sequencing actuator by way of tubing 1800. When fluid pressure is applied (turned on at the central control source) it enters the actuator by way of the bleed port (e.g., 22500) of the diaphragm valve and pressurizes a diaphragm 14400 inside the actuator which in turn controls the output diaphragm valves (e.g., 7A) as described above. When fluid pressure is turned off at the source, fluid exits the diaphragm 14400 via the diaphragm bleed port (e.g., 22500) and returns to its starting position. When pressure is reapplied the leaf spring 16000 engages a new cog wheel post 19 that rotates the pilot valve shaft 14900 to a new position thereby opening the opposite output diaphragm valve (e.g., 7B). This alternates as determined by the fluid source control timer. Time durations are set for each output port per normal timer operation.

Lockstep Actuator I Description

Figure 24:
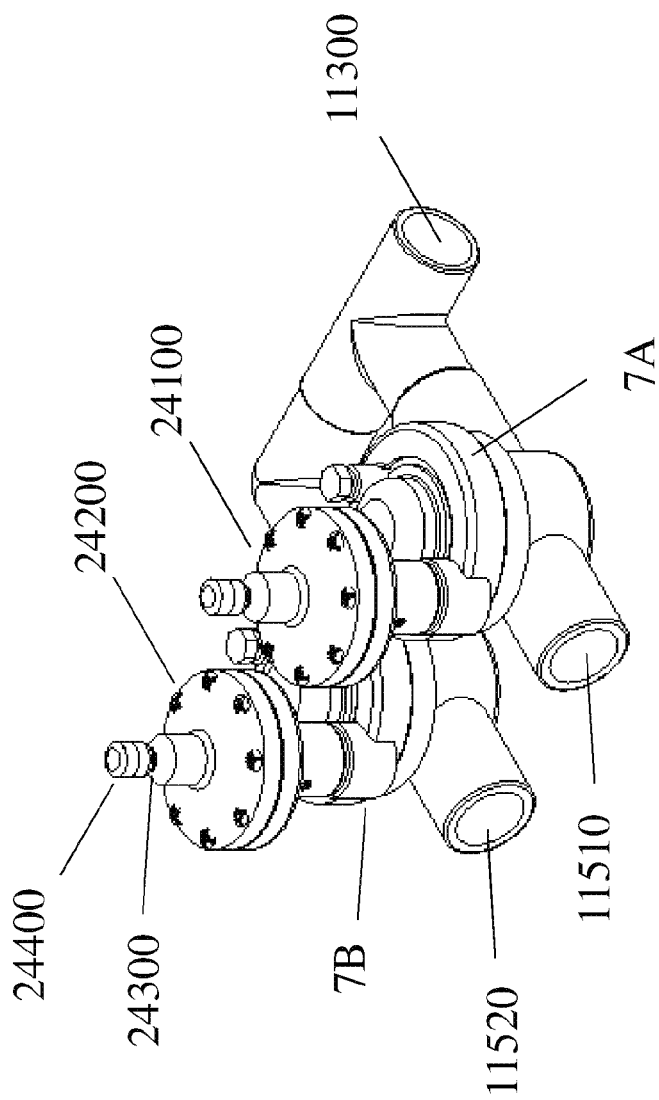
FIG. 24 depicts an example generalized arrangement for fluid activated actuators.

FIG. 24 represents a generalized arrangement for two fluid activated, actuator assemblies 24100 and 24200, labeled in this instant specification as lockstep actuators. In this arrangement a fluid inlet 11300 receives fluid from a source and the inventive device automatically determines whether one or more distribution valves 7A and 7B are activated or inactivated, thus, directing fluid out one or more of a group of fluid outlet ports 11510 and 11520. Advantageously, the lockstep actuator, as compared to the sequencing actuator for example, does not require a general communication system between the lockstep actuators 24100 and 24200. The independent lockstep actuators, when appropriately configured in a system operationally can direct fluid flow into various distribution lines with the same pressure and flow characteristics. Optionally, the actuator includes a manual setting knob 24400 and a open or closed valve indicator 24300.

In an example embodiment lockstep actuators 24100 and 24200 receives fluid from a source via an inlet line 11300. Pressure, flow rate, or other parameter of the input fluid drives the lockstep actuators 24100 and 24200 to activate or deactivate one or more output valves 7A and 7B. When more than one output valve 7A and 7B are present, activation of one output valve, for example 7A, occurs simultaneously, or nearly thereto, with deactivation of another output valve, for example 7B. Thus, fluid is directed into a particular distribution line with the same pressure and flow characteristics of the source fluid. By control from the lockstep actuators 24100 and 24200, fluid is optionally then directed to a different distribution line by deactivation of the first output valve 7A and activation of another output valve 7B, see FIG. 24. In this way multiple distribution lines are optionally served by a single source with the pressure, rate, and other flow characteristics of the original source maintained throughout the entire system. Thus, expansion of an existing irrigation or other fluid delivery system is accomplished without need for an additional fluid source, control device, or timing mechanism.

In an example embodiment two lockstep actuators 24100 and 24200 regulates flow through two output valves as illustrated in FIG. 24. However, it is appreciated that the lockstep actuators 24100 and 24200 are suitable for regulation of one, two, three, four, five, six, or more output valves. This is optionally accomplished by configuring the number of valve shaft ports and cog wheel posts. Increasing the number of cog wheel posts reduces the degree of rotation of the valve shaft ports in response to a fluid pressure change. This coupled with a reduction in the number of valve shaft ports (e.g., to one) enables the regulation of multiple valves. While certain embodiments are described with respect to two output valves, a person having ordinary skill in the art recognizes description and enablement of any number of output valves without limitation.

Figure 20:
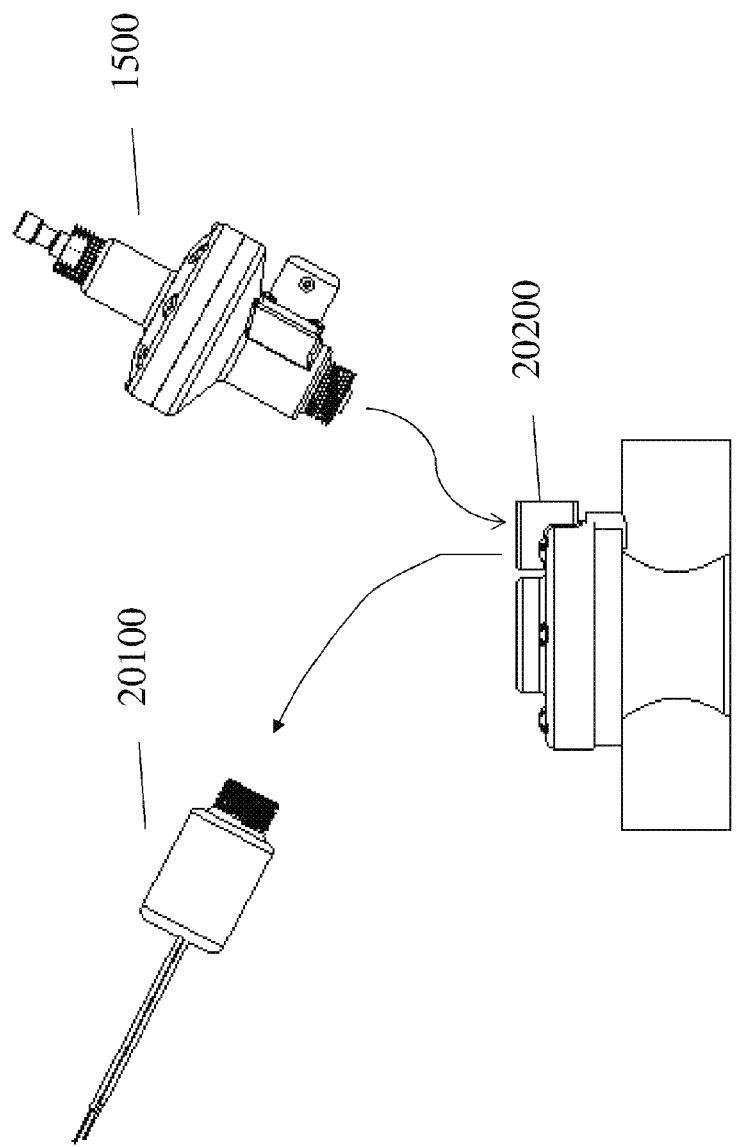
FIG. 20 depicts an example placement of a fluid activated actuator assembly within a diaphragm valve.

FIG. 24 depicts a configuration of lockstep actuators 24100 and 24200 replacing the solenoids in a standard prior art solenoid controlled diaphragm valve, see also FIG. 20. Optionally, the actuator is associated with (e.g., mounted or affixed to the diaphragm valve or placed nearby the diaphragm valve) and connective tubing is used to fluidly connect the diaphragm bleed passages (e.g., 22500 and 22600) using an adapter (e.g., the adapter 6A or 6B shown in FIG. 13) to the actuator (e.g., via actuator fittings). Thus, certain embodiments can be flexibly integrated with and optionally incorporate the low cost and simplicity of widely used diaphragm valves with embodiments of the fluid activated actuator devices disclosed herein.

An exemplary lockstep actuator 24100 is optionally constructed of an actuator housing 28500 to prevent fluid leakage from the actuator. In addition, the housing 28500 provides a protective cover to reduce contamination by soil, water, or other environmental conditions. A protective cover is optionally a separate piece that is removable, or is incorporated into a single injection molded part. The housing 28500 includes a diaphragm 28810 of the actuator assembly coupled to a rigid push plate 28555. A return spring 28550 is further coupled to the push plate 28555 that provides suitable force to compress the push plate 28555 and diaphragm 28810 when pressure is reduced from the fluid source, see FIG. 28. Optionally, a single or dual acting piston drive is operable in place of the diaphragm, pressure disk, and spring system. Attached to the push plate 28555 is a cog drive bar or leaf spring 16000 that interfaces with a cog wheel 25400 via a cog wheel post 19, see FIG. 16. The leaf spring 16000 produce a rotational force in the cog wheel 25400 when the push plate 28555 is raised in response to application of fluid pressure and expansion of the diaphragm 28810. The types of cog wheels and number of cog wheel posts varies as previously described.

The lockstep actuator 24100 optionally includes an anti-back rotation leaf spring stop 16300 that prevents the cog wheel 25400 from reversing rotational direction. The anti-back rotation leaf spring optionally has a flange that provides a shelf that engages a cog wheel post preventing back rotation. The anti-back rotation leaf spring 16300 is flexible such that it does not impede the forward rotation of the cog wheel 25400. Optionally, other anti-back rotation features including a notched cog wheel (described later) and rotational resistance (previously described) cog wheel can optionally be employed to prevent back rotation of the cog wheel.

Figure 27:
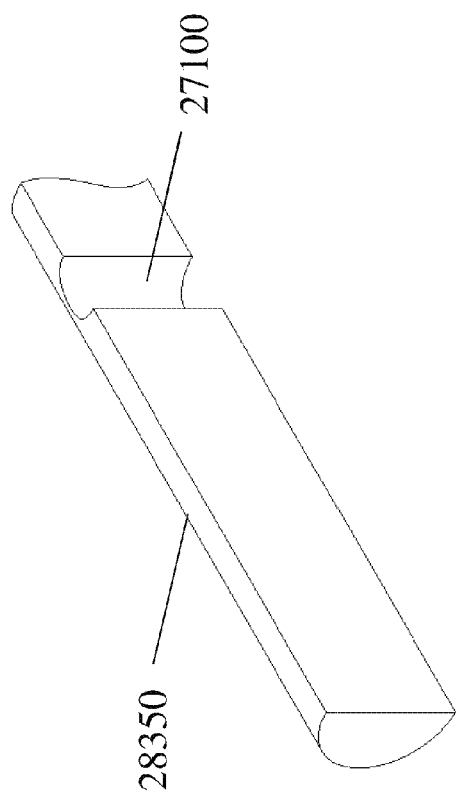
FIG. 27 depicts a cross-sectional view of an example pilot valve which is optionally used in a fluid activated actuator assembly.

The lockstep actuator 24100 optionally includes a pilot valve shaft 28350. The pilot valve shaft 28350 is rotatable and connects one or more pilot valve ports 30100 to fluid passages 28100. The pilot valve shaft 28350 is secured to the cog wheel 25400 such that rotation of the cog wheel 25400 produces rotation in the valve shaft 28350. The pilot valve shaft 28350 is optionally cylindrical in shape. Optionally, the pilot valve shaft 28350 meets the cog wheel 25400 in a pressure fitting such that the association of the two parts provides sufficient frictional force that rotation of the cog wheel translates to rotation of the valve shaft. It is also appreciated in the art that the cog wheel and valve shaft are optionally affixed with an adhesive or by press fit. The cog wheel 25400 and pilot valve shaft 28350 are optionally formed from a single unitary piece eliminating the need for fitting a separate pilot valve shaft 28350 and cog wheel 25400. The pilot valve shaft optionally includes a cylindrical fluid passage 30000 which interfaces with a fluid passage 28600 connected to the diaphragm chamber 28800. The fluid passage 28600 from the diaphragm chamber 28800 allows fluid to flow from the inlet lockstep passage 28900 through the diaphragm chamber 28800 into the pilot valve fluid passage 30000. The lockstep actuator assembly 24100 preferably includes one or more fluid passages that can optionally be interconnected by the pilot valve port 27100, each serving a single output valve. When a pilot valve shaft port 27100 as illustrated in FIG. 27 is present in a pilot valve shaft 28350, a 90 degree rotation of the cog wheel 25400 aligns the valve port 27100 with a corresponding lockstep actuator passage 28100, see FIG. 27 and FIG. 28. In another example, a further 90 degree rotation of the cog wheel 25400 blocks the actuator passage 28100. The pilot valve port 27100 is preferably capable of delivering flow omni-directionally. Thus, in FIG. 24, if the lockstep actuators 24100 and 24200 in this example are configured to be out-of-phase with each other, the lockstep actuator passage and pilot valve port are aligned in one valve and not aligned in the other. This arrangement provides alternating flow through the lockstep actuators 24100 and 24200 for each 90 degrees of valve shaft 28350 rotation as provided by four cog wheel posts 19 on the cog wheel 25400. It is appreciated that multiple configurations of a pilot valve port are operable herein as previously described.

Optionally, the lockstep actuators 24100 and 24200 include a manual setting knob 24400 which is coupled to the rigid push plate 28555. The manual setting knob 24400 enables a user to manually actuate the lockstep actuators 24100 and 24200. Manually applying, for example, an outward force to the setting knob 24400 causes the coupled rigid push plate 28555 and attached leaf spring 16000 to move in a linear direction to the applied force (e.g., upward in FIG. 16 and FIG. 28). The leaf spring 16000, interfacing with the cog wheel post 19, applies a rotational force to the cog wheel 25400. The rotation of the cog wheel 8 cause a rotation in the pilot valve shaft 28350. Each full extension of the manual setting knob results in an advancement of the pilot valve shaft 28350. In this manner, the flow to an output valve (e.g., 7A or 7B) is manually configured.

Optionally, the lockstep actuators 24100 and 24200 may be configured to include a pressure head adjustment bushing, not shown in Figures. Optionally, adjustments to the pressure head increase the compression of the return spring. With increased compression, more pressure is required in the diaphragm chamber 28800 to overcome the spring compression. Conversely, adjustments to the pressure head reduce the return spring 28550 compression. With reduced compression, less pressure is required in the diaphragm chamber to overcome the spring compression.

Optionally, a clockwise rotation of the pressure head results in a compression of the return spring. Compressing the return spring 28550 increases the compression of the return spring. Therefore, more pressure is required in the diaphragm chamber 28800 to overcome the spring compression. Conversely, a counter-clockwise rotation of the pressure head results in an expansion of the return spring 28550. Therefore, less pressure is required in the diaphragm chamber to overcome the spring compression.

The inventive arrangement functions when pressurized source fluid enters the lockstep actuator via a fluid passage into diaphragm chamber 28800. The diaphragm expansion overcomes the return spring 28550 compression and forces linear movement of the rigid pressurized disk 28555. The coupled leaf spring 16100 rotates the cog wheel 25400 into its new position. This position aligns the pilot valve port 27100 in the valve shaft 28350 with its fluid passage (e.g., the lockstep actuator fluid passage 28100, see FIG. 28). This position creates a fluid passageway from a diaphragm valve chamber in a conventional diaphragm valve through: (a) a diaphragm valve bleed fluid valve passage 22500, (b) lockstep actuator inflow passage 28900, (c) diaphragm chamber 28800, (d) actuator internal fluid passageway 28600, (e) pilot valve shaft port 27100, (f) lockstep actuator outflow passage 28100, (g) diaphragm bleed port passage 22600. This fluid passageway enables fluid in the diaphragm chamber of the conventional diaphragm valve to bleed out causing the diaphragm valve to open. Upon termination of the fluid pressure by the control mechanism, the pressure is removed from the diaphragm 28810 allowing pressure from the return spring 28555 to extend the diaphragm while the anti-back rotation leaf spring 16300 prevents the cog wheel 25400 from rotating in the reverse direction by the retraction of the leaf spring 16100. When pressurized source fluid is reapplied, the fluid enters the lockstep actuator via a fluid passage into diaphragm chamber 28800. The diaphragm expansion overcomes the return spring 28550 compression and forces linear movement of the rigid pressurized disk 28555. The coupled leaf spring 16100 rotates the cog wheel 25400 into its new position. This new position, in this example, blocks the pilot valve port 27100 in the valve shaft 28350. This effectively blocks the fluid flow in the bleed port 22500 of the conventional diaphragm valve causing the diaphragm valve (e.g., 7A or 7B) to close.

In an example embodiment, two commercially available output diaphragm valves are connected using standard PVC plumbing fittings. The one or more lockstep actuators mount in the solenoid mounting of each of the output diaphragm valves, see FIG. 24. When fluid pressure is applied (turned on at the central control source) it enters the actuator by way of the bleed port (e.g., 22500) of the diaphragm valve and pressurizes a diaphragm 28810 inside the actuator which in turn controls the output diaphragm valves (e.g., opens 7A) as described above. When fluid pressure is turned off fluid exits the diaphragm 14400 via the diaphragm bleed port (e.g., 22500) and returns to its starting position. When pressure is reapplied the leaf spring 16000 engages a new cog wheel post 19 that rotates the pilot valve shaft 28350 to a new position thereby controlling the output diaphragm valve (e.g., close 7B). This alternates as determined by the fluid source control timer. Time durations are set for each output port per normal timer operation. As previously described above, lockstep actuators 24100 and 24200 are optionally configured out-of-phase. When one valve is open the other is closed. This configuration allows the system to deliver an alternating flow of fluid to output lines with pressure equal to the pressure of the inlet. Other fluid flow options are also configurable. For example, a system of 3 actuators is configured such that all the inlet pressure is applied to line 1 (open) when lines 2 and 3 are closed. In the next cycle, line 1 is closed and lines 2 and 3 are open and half the inlet pressure is applied to line 2 and half to line 3, etc.

Lockstep Actuator II Description

Figure 36:
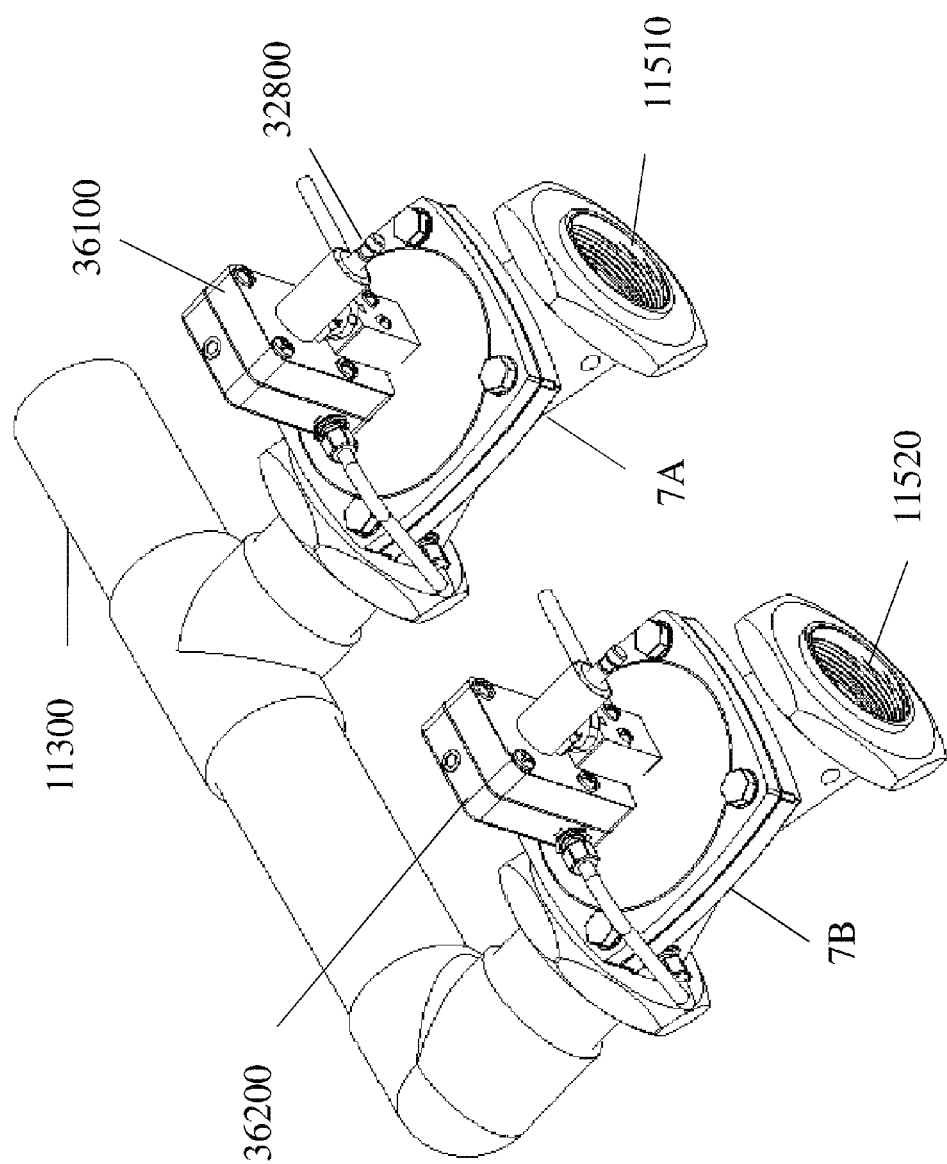
FIG. 36 depicts an example generalized arrangement for fluid activated actuators.

FIG. 36 represents a generalized arrangement for two fluid activated, actuator assemblies 36100 and 36200. This is a second type of lockstep actuator, similar to the lockstep actuator described above. In this arrangement a fluid inlet 11300 receives fluid from a source and the inventive device automatically determines whether one or more distribution valves 7A and 7B are activated or inactivated, thus, directing fluid out one or more of a group of fluid outlet ports 11510 and 11520. Advantageously, the lockstep actuator, as compared to the sequencing actuator for example, does not require a general communication system between the lockstep actuators 36100 and 36200. Advantageously, this modified lockstep actuator, as compared to the lockstep actuator described above uses a modified, notched cog wheel. The independent lockstep actuators when appropriately configured in a system operationally can direct fluid flow into various distribution lines with the same pressure and flow characteristics.

In an example embodiment lockstep actuators 36100 and 36200 receives fluid from a source via an inlet line 11300. Pressure, flow rate, or other parameter of the input fluid drives the lockstep actuators 36100 and 36200 to activate or deactivate one or more output valves 7A and 7B. When more than one output valve 7A and 7B are present, activation of one output valve, for example 7A, occurs simultaneously, or nearly thereto, with deactivation of another output valve, for example 7B. Thus, fluid is directed into a particular distribution line with the same pressure and flow characteristics of the source fluid. In this way multiple distribution lines are optionally served by a single source with the pressure, rate, and other flow characteristics of the original source maintained throughout the entire system. Thus, expansion of an existing irrigation or other fluid delivery system is accomplished without need for an additional fluid source, control device, or timing mechanism.

In an example embodiment two lockstep actuators 36100 and 36200 regulates flow through two output valves as illustrated in FIG. 36. However, it is appreciated that the one or more lockstep actuators are suitable for regulation of one, two, three, four, five, six, or more output valves. This is optionally accomplished by configuring the number of valve shaft ports and cog wheel posts. Increasing the number of cog wheel posts reduces the degree of rotation of the valve shaft ports in response to a fluid pressure change. This coupled with a reduction in the number of valve shaft ports (e.g., to one) enables the regulation of multiple valves. While certain embodiments are described with respect to two output valves, a person having ordinary skill in the art recognizes description and enablement of any number of output valves without limitation.

FIG. 36 depicts a configuration of lockstep actuators 36100 and 36200 replacing the solenoids in a standard prior art solenoid controlled diaphragm valve, see also FIG. 20. Thus, certain embodiments optionally incorporate the low cost and simplicity of widely used diaphragm valves with embodiments of the fluid activated actuator devices disclosed herein.

An exemplary lockstep actuator 36100 is optionally constructed of an actuator housing 32810 to prevent fluid leakage from the actuator. In addition, the housing 32810 provides a protective cover to reduce contamination by soil, water, or other environmental conditions. A protective cover is optionally a separate piece that is removable, or is incorporated into a single injection molded part. The housing 32810 includes a diaphragm 32100 of the actuator assembly coupled to a rigid push plate 32300. A return spring 32400 is further coupled to the push plate 32300 that provides suitable force to compress the push plate 32300 and diaphragm 32100 when pressure is reduced from the fluid source, see FIG. 32. Optionally, a single or dual acting piston drive is operable in place of the diaphragm, push plate, and spring system. Attached to the push plate 32300 is a cog drive bar or leaf spring 32500 that interfaces with a notched cog wheel 32600 via a cog wheel post 19, see FIG. 32. The leaf spring 32500 produce a rotational force in the cog wheel 32600 when the push plate 32300 is raised in response to application of fluid pressure and expansion of the diaphragm 32100. The types of cog wheels and number of cog wheel posts varies as previously described.

The lockstep actuator 36100 optionally includes an anti-back rotation leaf spring stop that prevents the cog wheel 32600 from reversing rotational direction. The anti-back rotation leaf spring optionally is fixed to the lockstep actuator housing 32810 and in contact with the cog wheel 32600. The anti-back rotation leaf spring stop is flexible such that it does not impede the forward rotation of the cog wheel 32600. As the cog wheel 32600 advances in a forward rotation, the anti-back rotation leaf spring stop slides over the notched cog wheel 32600. As the cog wheel 32600 completes a partial rotation cycle (e.g., a cog wheel advancement in response to the raising of the drive bar/leaf spring 32500), the anti-back rotation leaf spring stop clears the cog wheel notch 33220. With the anti-back rotation leaf spring stop positioned against the cog wheel notch 33220, the cog wheel 32600 is prevented from rotating in the reverse direction.

The lockstep actuator 36100 optionally includes a pilot valve shaft 34100. The pilot valve shaft 34100 is rotatable and connects one or more pilot valve ports 34200 and 34600 to fluid passages 34500 and 34400, and 34700 and 34400, respectively. The pilot valve shaft 34100 is secured to the cog wheel 32600 such that rotation of the cog wheel 32600 produces rotation in the pilot valve shaft 34100. The pilot valve shaft 34100 is optionally cylindrical in shape. It is recognized in the art that other shapes for the cog wheel interface end of the pilot valve shaft 34100 are similarly suitable illustratively including square, triangle, oval, rectangle, pentagon, hexagon, and other shapes known in the art. Optionally, the pilot valve shaft 34100 meets the cog wheel 32600 in a pressure fitting such that the association of the two parts provides sufficient frictional force that rotation of the cog wheel translates to rotation of the valve shaft. It is also appreciated in the art that the cog wheel and valve shaft are optionally affixed with an adhesive or by press fit. The cog wheel 32600 and pilot valve shaft 34100 are optionally formed from a single unitary piece eliminating the need for fitting a separate pilot valve shaft 34100 and cog wheel 32600.

Figure 34:
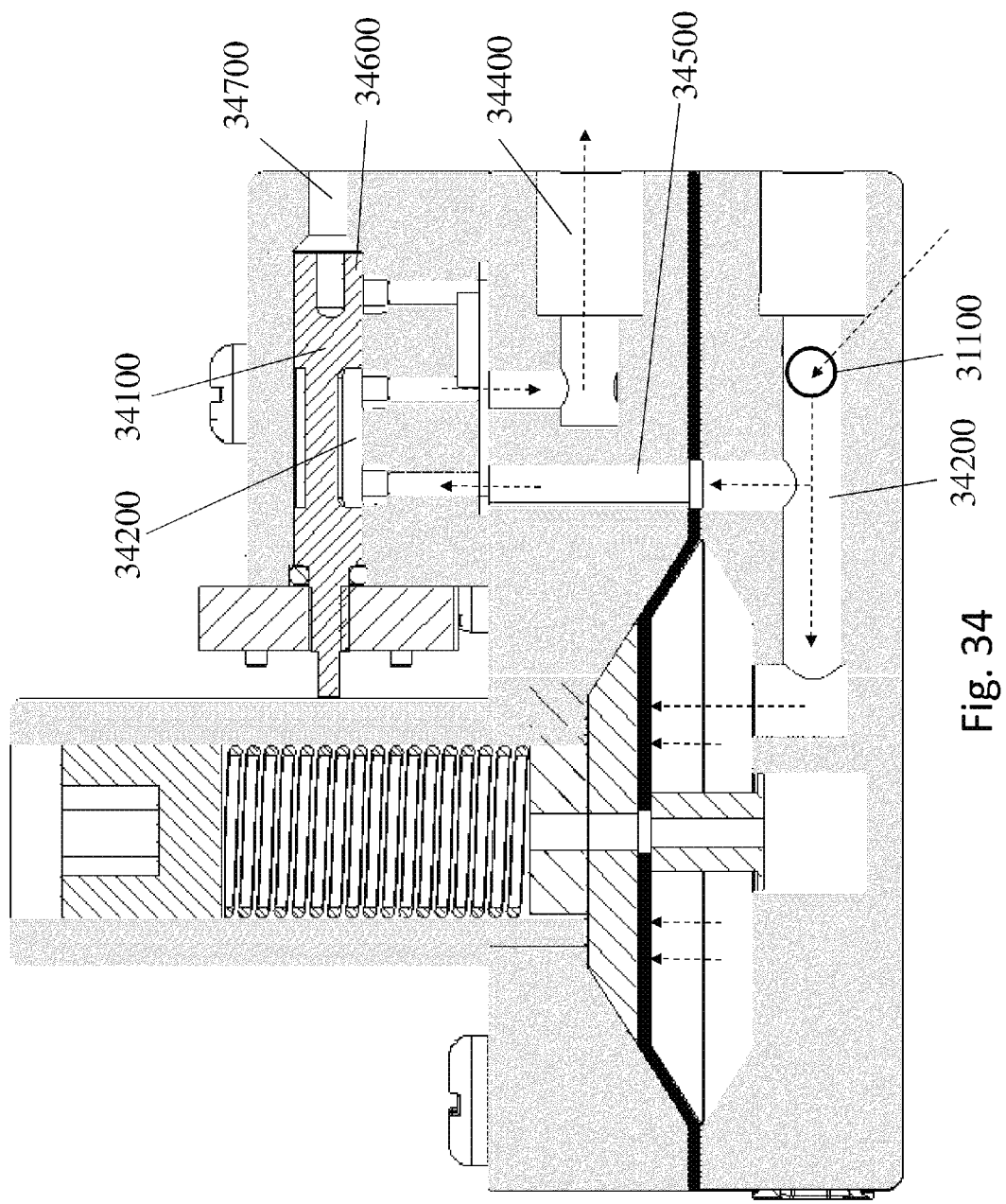
FIG. 34 depicts a cross-sectional view of an example fluid activated actuator.
Figure 37:
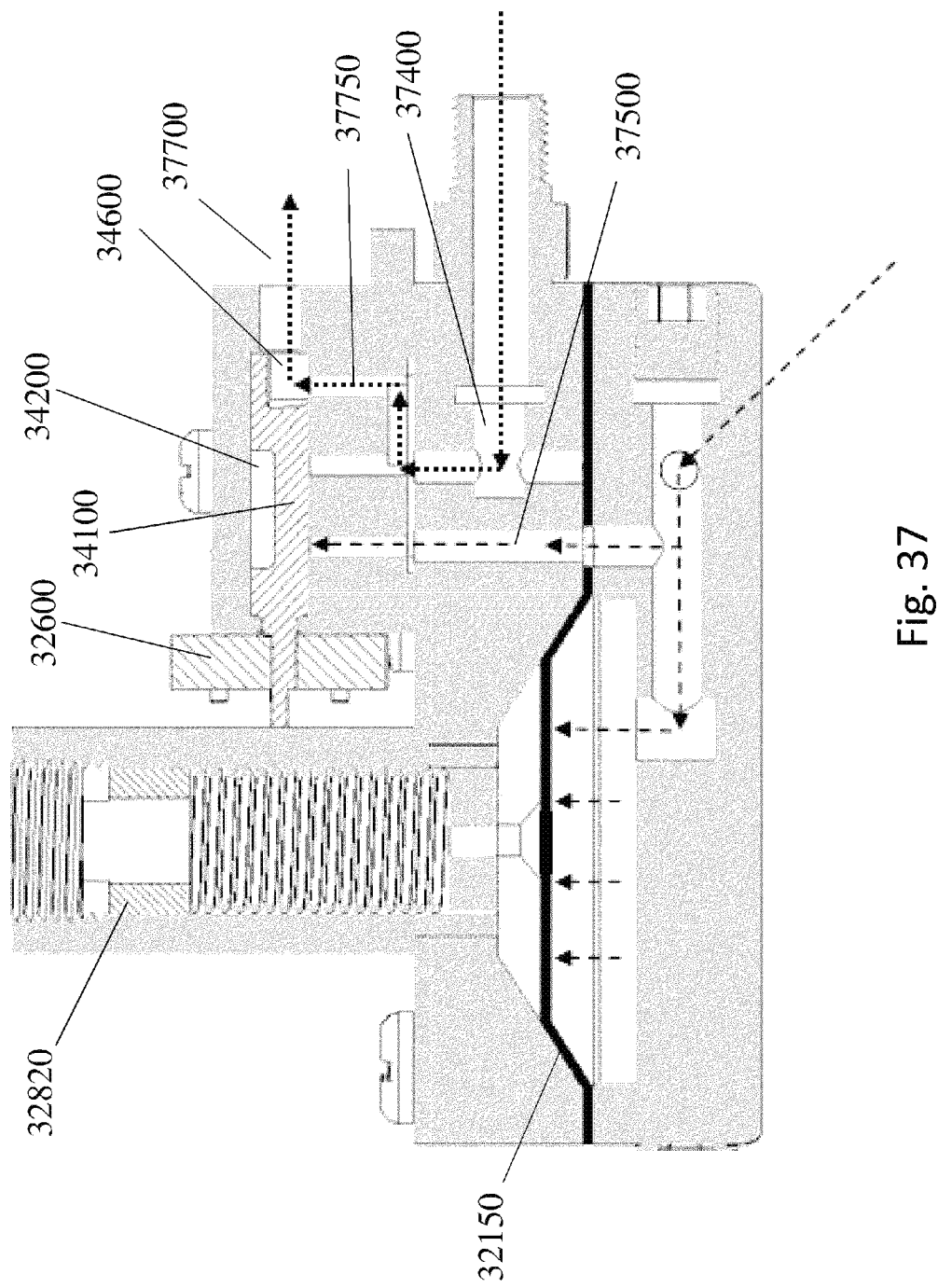
FIG. 37 depicts a cross-sectional view of an example fluid activated actuator.

The lockstep actuator assembly 36100 preferably includes one or more fluid passages (e.g., 34500 and 34400) that can optionally be interconnected by the pilot valve ports 34200 and 34600. When two pilot valve shaft ports 34200 and 34600 as illustrated in FIG. 34 and FIG. 37 are present in a pilot valve shaft 34100, a 90 degree rotation of the cog wheel 32600 aligns one valve port 34200 with a corresponding lockstep actuator passages 34500 and 34400, see FIG. 34, while the pilot valve shaft 34100 blocks the corresponding lockstep actuator fluid passages 34700 and 34400. To continue the example, a further 90 degree rotation of the cog wheel 32600 aligns the second valve shaft port 34600 with corresponding lockstep actuator fluid passages 34700 and 34400 and the pilot valve shaft 34100 blocks fluid passages 34500 and 34400, see FIG. 34 and FIG. 37. The pilot valve shaft ports 34200 and 34600 are preferably capable of delivering flow omni-directionally. Thus, in FIG. 36, if the lockstep actuators 36100 and 36200 in this example are configured to be out-of-phase with each other, the lockstep actuator passage and pilot valve port are aligned in one valve and not aligned in the other. This arrangement provides alternating flow through the lockstep actuators 36100 and 36200 for each 90 degrees of valve shaft 34100 rotation as provided by four cog wheel posts 19 on the cog wheel 32600. It is appreciated that multiple configurations of a pilot valve port are operable herein as previously described.

Optionally, each lockstep actuators 36100 and 36200 include a manual setting knob 32800 which is coupled to the rigid push plate 32300. The manual setting knob 32800 enables a user to manually actuate the lockstep actuators 36100 and 36200. Manually applying, for example, an outward force to the setting knob 32800 causes the coupled rigid push plate 32300 and attached leaf spring 32500 to move in a linear direction to the applied force (e.g., upward in FIG. 16 and FIG. 28). The leaf spring 32500, interfacing with the cog wheel post 19, applies a rotational force to the cog wheel 32600. The rotation of the cog wheel 32600 cause a rotation in the pilot valve shaft 34100. Each full extension of the manual setting knob results in an advancement of the pilot valve shaft 34100. In this manner, the flow to an output valve (e.g., 7A or 7B) is manually configured. Optionally, the position of the pilot valve and/or cam shaft is indicated by one or more markings and/or labels on the visible cog wheel 32600, see also FIG. 44.

Optionally, the lockstep actuators 36100 and 36200 include a pressure head adjustment bushing 32820. Optionally, a clockwise rotation of the pressure head results in a compression of the return spring 32400. Compressing the return spring 32400 increases the compression of the return spring. Therefore, more pressure is required in the diaphragm valve chamber to overcome the spring compression. Conversely, a counter-clockwise rotation of the pressure head results in an expansion of the return spring 32400. Therefore, less pressure is required in the diaphragm valve chamber to overcome the spring compression.

The inventive arrangement functions when pressurized source fluid enters the lockstep actuator via a fluid passage 34200 into diaphragm chamber 32150. The diaphragm expansion overcomes the return spring 32400 compression and forces linear movement of the rigid pressurized disk 32300. The coupled leaf spring 32500 rotates the cog wheel 32600 into its new position. This position aligns the pilot valve port 34200 in the valve shaft 34100 with its fluid passage (e.g., the lockstep actuator fluid passage 34500 and 34400, see FIG. 34). This position enables a fluid passageway from: (a) a conventional diaphragm valve inlet, (b) a diaphragm valve bleed fluid valve passage tubing 31100 (e.g., connecting the inlet fluid source and actuator 36100, see FIG. 31), (c) lockstep actuator inflow passages 34200 and 34500, (d) pilot valve shaft port 34200, (e) lockstep actuator outflow passages 34400, (f) diaphragm bleed port passage 34400. This passageway enables fluid to enter the diaphragm chamber of the conventional diaphragm valve causing the diaphragm valve (e.g., 7A or 7B) to close. Upon termination of the fluid pressure by the control mechanism, the pressure is removed from the diaphragm chamber 32150 (e.g., via actuator passage 32900) allowing pressure from the return spring 32400 to extend the diaphragm while the anti-back rotation leaf spring stop prevents the cog wheel 32600 from rotating in the reverse direction by the retraction of the leaf spring 32500. When pressurized source fluid is reapplied, the fluid enters the lockstep actuator via a fluid passage 34200 into diaphragm chamber 32150. The diaphragm expansion overcomes the return spring 32400 compression and forces linear movement of the rigid pressurized disk 32300. The coupled leaf spring 32500 rotates the cog wheel 32600 into its new position. The pilot valve shaft 34100 rotates into a new position as the cog wheel 32600 rotates. In the new position, the pilot valve shaft blocks the fluid passage 34500 and 34400 in this example, and the pilot valve port 34600 connects the lockstep actuator passages 34700 and 34400 allowing fluid to exhaust from the diaphragm valve chamber 31200 causing the diaphragm valve (e.g., 7A or 7B) to open.

In an example embodiment, two commercially available output diaphragm valves are connected using standard PVC plumbing fittings (although custom output diaphragm valves may be used as well). The one or more lockstep actuators mount in the solenoid mounting of each of the output diaphragm valves, see FIG. 36. When fluid pressure is applied (turned on at the central control source) it enters the actuator by way of the interconnecting tubing (e.g., 31100) of the diaphragm valve and pressurizes a diaphragm chamber 32150 inside the actuator which in turn controls the output diaphragm valves (e.g., opens 7A) as described above. When fluid pressure is turned off fluid exits the diaphragm chamber 32150 via the diaphragm bleed port (e.g., 31100) and returns to its starting position. When pressure is reapplied the leaf spring 32500 engages a new cog wheel post 19 that rotates the pilot valve shaft 34100 to a new position thereby controlling the output diaphragm valve (e.g., close 7B) as described above. The system alternates as determined by the fluid source control timer. Time durations are set for each output port per normal timer operation. As previously described above, lockstep actuators 36100 and 36200 are optionally configured out-of-phase. When one valve is open the other is closed allowing the system to deliver an alternating flow of fluid to output lines with pressure equal to the pressure of the inlet. Other options are also configurable. For example, a system of 3 actuators is configured such that all the inlet pressure is applied to line 1 (open) when lines 2 and 3 are closed. In the next cycle, line 1 is closed and lines 2 and 3 are open and half the inlet pressure is applied to line 2 and half to line 3, etc.

Lockstep Actuator III Description

Figure 45:
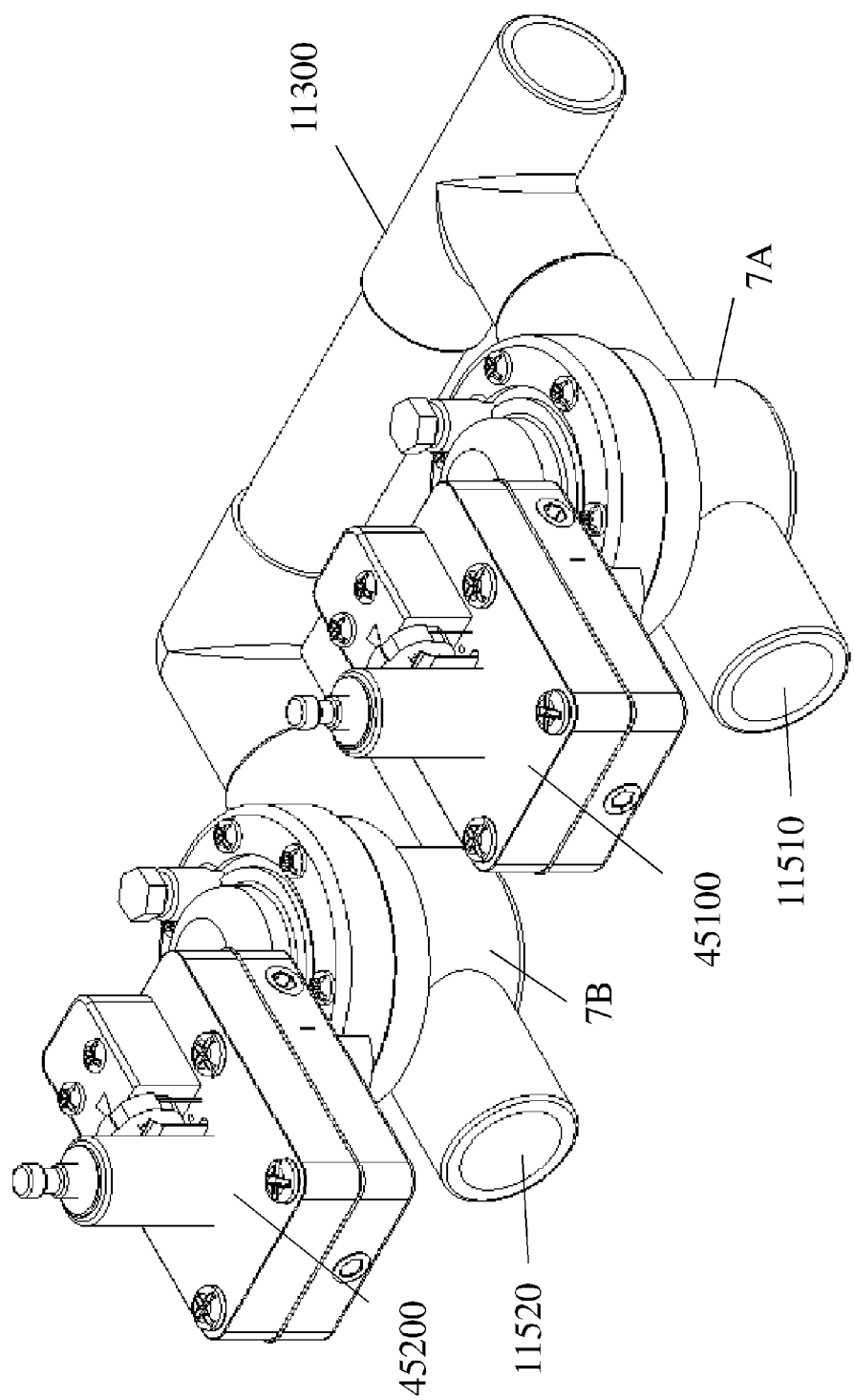
FIG. 45 depicts an example generalized arrangement for fluid activated actuators.

FIG. 45 represents a generalized arrangement for two fluid activated, actuator assemblies 45100 and 45200. This is a third type of lockstep actuator, similar to the lockstep actuators described above. In this arrangement a fluid inlet 11300 receives fluid from a source and the inventive device automatically determines whether one or more distribution valves 7A and 7B are activated or inactivated, thus, directing fluid out one or more of a group of fluid outlet ports 11510 and 11520. Advantageously, the lockstep actuator, as compared to the sequencing actuator for example, does not require a general communication system between the lockstep actuators 45100 and 45200. Advantageously, this modified lockstep actuator, as compared to the previously described lockstep actuators, has no pilot shaft ports and fewer actuator fluid passages. The independent lockstep actuators when appropriately configured in a system operationally can direct fluid flow into various distribution lines with the same pressure and flow characteristics.

In an example embodiment lockstep actuators 45100 and 45200 receives fluid from a source via an inlet line 11300. Pressure, flow rate, or other parameter of the input fluid drives the lockstep actuators 45100 and 45200 to activate or deactivate one or more output valves 7A and 7B. When more than one output valve 7A and 7B are present, activation of one output valve, for example 7A, occurs simultaneously, or nearly thereto, with deactivation of another output valve, for example 7B. Thus, fluid is directed into a particular distribution line with the same pressure and flow characteristics of the source fluid. By control from the lockstep actuators 45100 and 45200, fluid is optionally then directed to a different distribution line by deactivation of the first output valve 7A and activation of another output valve 7B, see FIG. 36. In this way multiple distribution lines are optionally served by a single source with the pressure, rate, and other flow characteristics of the original source maintained throughout the entire system. Thus, expansion of an existing irrigation or other fluid delivery system is accomplished without need for an additional fluid source, control device, or timing mechanism.

In an example embodiment two lockstep actuators 45100 and 45200 regulates flow through two output valves as illustrated in FIG. 45. However, it is appreciated that the one or more lockstep actuators are suitable for regulation of one, two, three, four, five, six, or more output valves. This is optionally accomplished by configuring the number of cam shaft lobes and cog wheel posts. Increasing the number of cog wheel posts reduces the degree of rotation of the cam shaft in response to a fluid pressure change. This coupled with a reduction in the number of valve shaft ports (e.g., to one) enables the regulation of multiple valves. For example, a 4 post cog wheel provides a rotation of 90 degrees with each pressure application. If the cam shaft has a single lobe, this translates into a plunger transition/opening with every fourth application of pressure. Therefore, for example, a system of 4 valves, each with a 4 post cog wheel and single lobe cam shaft each is configured out-of-phase in order to deliver the full inlet pressure to each output valve in a round-robin fashion. In another example, a 6 post cog wheel provides a rotation of 60 degrees with each pressure application. If the cam shaft has a single lobe, this translates into a plunger transition/opening with every sixth application of pressure. Therefore, for example, a system of 6 valves, each with a 6 post cog wheel and single lobe cam shaft is configured out-of-phase in order to deliver the full inlet pressure to each output valve in a round-robin fashion. While certain embodiments are described with respect to two output valves, a person having ordinary skill in the art recognizes description and enablement of any number of output valves without limitation.

Optionally, the cog wheel interfaces with the cam shaft via a set of gears. Optionally, the cog wheel is configured with a fixed number of posts, for example 4 posts. With each cog wheel rotation (e.g., 90 degrees), a set of one or more gears are used to determine the rotation of the cam shaft. One set of gears is used to increase the amount of cam shaft rotation relative to the cog wheel. For example, a 90 degree rotation of the cog wheel can result in a 180 degree rotation of the cam shaft (e.g., using a large gear affixed to the cog wheel and a smaller gear affixed to the cam shaft). Similarly, another set of gears is used to decrease the cam shaft rotation relative to the cog wheel. For example, a 90 degree rotation of the cog wheel can result in a 45 degree rotation of the cam shaft (e.g., using a small gear affixed to the cog wheel and a larger gear affixed to the cam shaft). Optionally, the previously described fluid activated actuator assemblies can similarly use gears in the interface between the cog wheel and pilot valve shaft.

FIG. 45 depicts a configuration of lockstep actuators 45100 and 45200 replacing the solenoids in a standard prior art solenoid controlled diaphragm valve, see also FIG. 20. Thus, certain embodiments optionally incorporate the low cost and simplicity of widely used diaphragm valves with embodiments of the fluid activated actuator devices disclosed herein.

An exemplary lockstep actuator 45100 is optionally constructed of an actuator housing 41500 to prevent fluid leakage from the actuator. In addition, the housing 41500 provides a protective cover to reduce contamination by soil, water, or other environmental conditions. A protective cover is optionally a separate piece that is removable, or is incorporated into a single injection molded part. The housing 41500 includes a diaphragm 32100 of the actuator assembly coupled to a rigid push plate 32300. A return spring 32400 is further coupled to the push plate 32300 that provides suitable force to compress the push plate 32300 and diaphragm 32100 when pressure is reduced from the fluid source, see FIG. 32. Optionally, a single or dual acting piston drive is operable in place of the diaphragm, push plate, and spring system. Attached to the push plate 32300 is a cog drive bar or leaf spring 32500 that interfaces with a cog wheel 32600 via a cog wheel post 19, see FIG. 32. The leaf spring 32500 produce a rotational force in the cog wheel 32600 when the push plate 32300 is raised in response to reapplication of fluid pressure and expansion of the diaphragm 32100. The types of cog wheels and number of cog wheel posts varies as previously described.

The lockstep actuator 45100 optionally includes an anti-back rotation leaf spring stop that prevents the cog wheel 32600 from reversing rotational direction. The anti-back rotation leaf spring optionally is fixed to the lockstep actuator housing 41500 and in contact with the cog wheel 32600. The anti-back rotation leaf spring stop is flexible such that it does not impede the forward rotation of the cog wheel 32600. As the cog wheel 32600 advances in a forward rotation, the anti-back rotation leaf spring stop slides over the notched cog wheel 32600. As the cog wheel 32600 completes a rotation cycle (e.g., a cog wheel advancement in response to the raising of the drive bar/leaf spring 32500), the anti-back rotation leaf spring stop clears the cog wheel notch 33220. With the anti-back rotation leaf spring stop positioned against the cog wheel notch 33220, the cog wheel 32600 is prevented from rotating in the reverse direction.

The lockstep actuator 45100 optionally includes a cam shaft 41300. The cam shaft 41300 is rotatable and interfaces with a plunger 41400. The cam shaft 41300 is secured to the cog wheel 32600 such that rotation of the cog wheel 32600 produces rotation in the cam shaft 41300. The cam shaft 41300 is optionally cylindrical in shape. It is recognized in the art that other shapes for the cog wheel interface end of the cam shaft 41300 are similarly suitable illustratively including square, triangle, oval, rectangle, pentagon, hexagon, and other shapes known in the art. Optionally, the cam shaft 41300 meets the cog wheel 32600 in a pressure fitting such that the association of the two parts provides sufficient frictional force that rotation of the cog wheel translates to rotation of the valve shaft. It is also appreciated in the art that the cog wheel and cam shaft are optionally affixed with an adhesive or by press fit. The cog wheel 32600 and cam shaft 41300 are optionally formed from a single unitary piece eliminating the need for fitting a separate cam shaft 41300 and cog wheel 32600.

The cam shaft 41300 interfaces with a plunger 41400. When the plunger is raised by the cam shaft a fluid passageway is created in the associated diaphragm valve. This fluid passageway causes a pressure drop within the diaphragm valve chamber which causes the valve to open (e.g., in response to inlet fluid pressure within the valve). Similarly, when the plunger is lowered by the compression of the return spring onto the diaphragm bleed port passage, the fluid passage is blocked. Blocking the fluid passage causes a pressure increase within the diaphragm valve chamber which causes the valve to close (e.g., an internal diaphragm expands (e.g., changes the amount of its surface area) by overcoming the inlet pressure and seals the valve), see also FIG. 47.

Optionally, the lockstep actuator 45100 includes one or more fluid passages that enable fluid to enter the area enclosing the plunger. A passage 41220, for example, is created by the shape of plunger which may include a flat edge where fluid flows from the associated diaphragm valve, for example via diaphragm valve port 22500, into the enclosed plunger space. Optionally, the fluid pressure in the enclosure applied to the plunger, together with the return spring 41450 seals the fluid bleed port 22600.

Optionally, the lockstep actuators 45100 and 45200 include a manual setting knob 32800 which is coupled to the rigid push plate 32300. The manual setting knob 32800 enables a user to manually actuate the lockstep actuators 45100 and 45200. Manually applying, for example, an outward force to the setting knob 32800 causes the coupled rigid push plate 32300 and attached leaf spring 32500 to move in a linear direction to the applied force (e.g., upward in FIG. 41). The leaf spring 32500, interfacing with the cog wheel post 19, applies a rotational force to the cog wheel 32600. The rotation of the cog wheel 32600 cause a rotation in the cam shaft 41300. Each full extension of the manual setting knob results in an advancement rotation of the cam shaft 41300. Optionally, the position of the pilot valve and/or cam shaft is indicated by one or more markings and/or labels on the visible cog wheel, see also FIG. 44. In this manner, the flow to an output valve (e.g., 7A or 7B) is manually configured.

Optionally, the lockstep actuators 45100 and 45200 include a pressure head adjustment bushing 32820. Optionally, a clockwise rotation of the pressure head results in a compression of the return spring 32400. Compressing the return spring 32400 increases the compression of the return spring. Therefore, more pressure is required in the diaphragm valve chamber to overcome the spring compression. Conversely, a counter-clockwise rotation of the pressure head bushing results in an expansion of the return spring 32400. Therefore, less pressure is required in the diaphragm valve chamber to overcome the spring compression.

The inventive arrangement functions when pressurized source fluid enters the lockstep actuator (e.g., 45100 or 45200) via a fluid passage 41200 and into diaphragm chamber 32150. The diaphragm expansion overcomes the return spring 32400 compression and forces linear movement of the rigid pressurized disk 32300. The coupled leaf spring 32500 rotates the cog wheel 32600 into its new position. The rotation of the cog wheel results in a rotation of the cam shaft 41300. If the cam shaft is positioned to raise the plunger 41400, fluid can flow from the diaphragm chamber via the diaphragm bleed ports (e.g., 22500 and 22600, see FIG. 47). As described above, the reduction in pressure in the diaphragm chamber causes the diaphragm valve to open. When the plunger 41400 is lowered, the diaphragm bleed ports are blocked. The increase in pressure in the diaphragm chamber causes the diaphragm valve to close. Upon termination of the fluid pressure by the control mechanism, the pressure is removed from the diaphragm chamber 32150 allowing pressure from the return spring 32400 to extend the diaphragm while the anti-back rotation leaf spring stop prevents the cog wheel 32600 from rotating in the reverse direction by the retraction of the leaf spring 32500. When pressurized source fluid is reapplied and enters the lockstep actuator via a fluid passage 41200 and into the diaphragm chamber 41100, the diaphragm expansion overcomes the return spring 32400 compression and forces linear movement of the rigid pressurized disk 32300. The coupled leaf spring 32500 rotates the cog wheel 32600 into its new position. The cam shaft 41300 rotates into a new position as the cog wheel 32600 rotates.

In an example embodiment, two commercially available output diaphragm valves are connected using standard PVC plumbing fittings. The one or more lockstep actuators mount in the solenoid mounting of each of the output diaphragm valves, see FIG. 45. When fluid pressure is applied (turned on at the central control source) it enters the actuator by way of the diaphragm valve passages (e.g., 22300, 22500, and 41220) and pressurizes a diaphragm chamber 41100 inside the actuator which in turn controls the output diaphragm valves (e.g., opens 7A) as described above. When fluid pressure is turned off fluid exits from the diaphragm chamber 41100 via the internal passages and the actuator resets. When pressure is reapplied the leaf spring 32500 engages a new cog wheel post 19 that rotates the cam shaft 41300 to a new position thereby controlling the output diaphragm valve (e.g., close 7B) as described above. The system alternates as determined by the fluid source control timer. Time durations is set for each output port per normal timer operation. As previously described above, lockstep actuators 45100 and 45200 are out-of-phase. When one valve is open the other is closed allowing the system to deliver an alternating flow of fluid to output lines with pressure equal to the pressure of the inlet. Other options are also configurable. For example, a system of 3 actuators is configured such that all the inlet pressure is applied to line 1 (open) when lines 2 and 3 are closed. In the next cycle, line 1 is closed and lines 2 and 3 are open and half the inlet pressure is applied to line 2 and half to line 3, etc.

Lockstep Actuator IV

Figure 48:
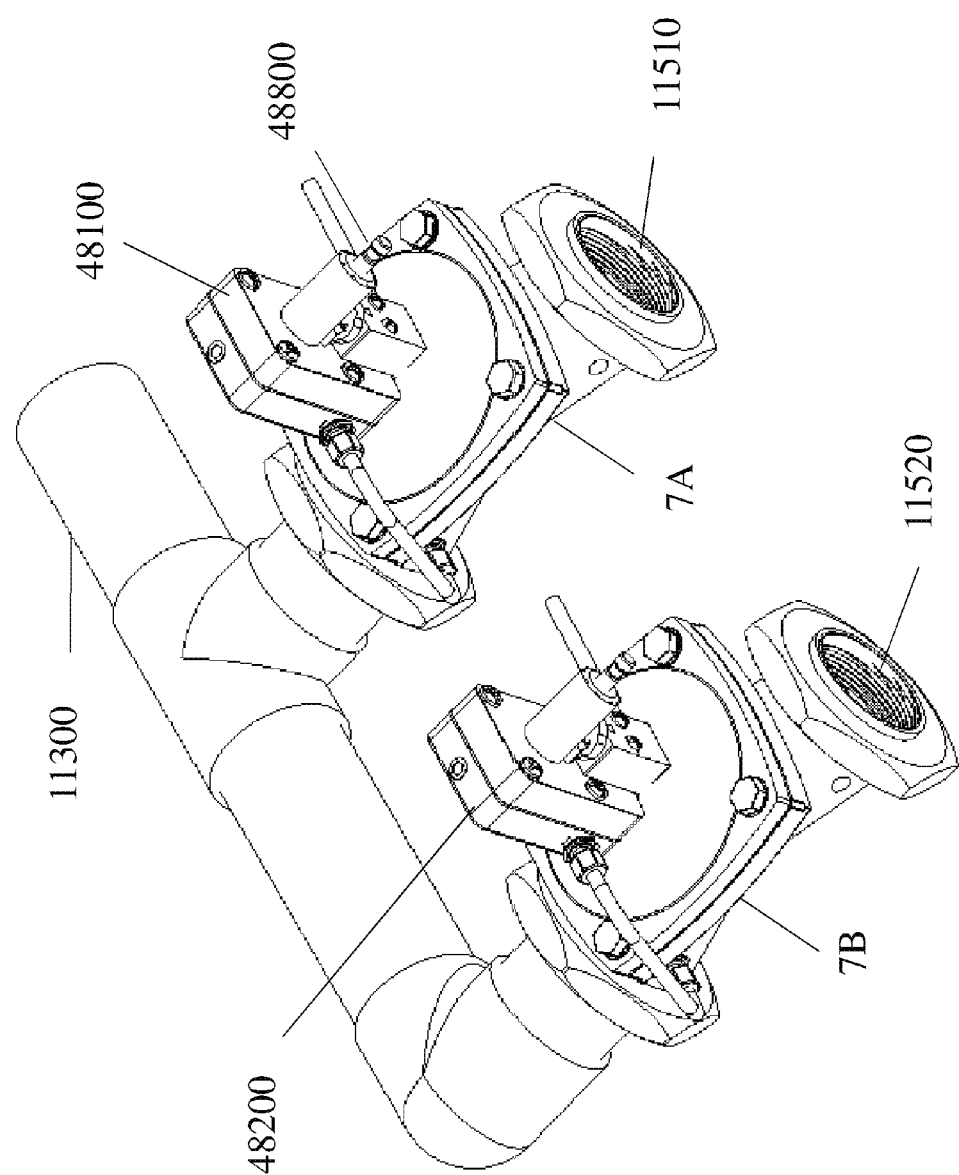
FIG. 48 depicts an example generalized arrangement for fluid activated actuators.
Figure 49:
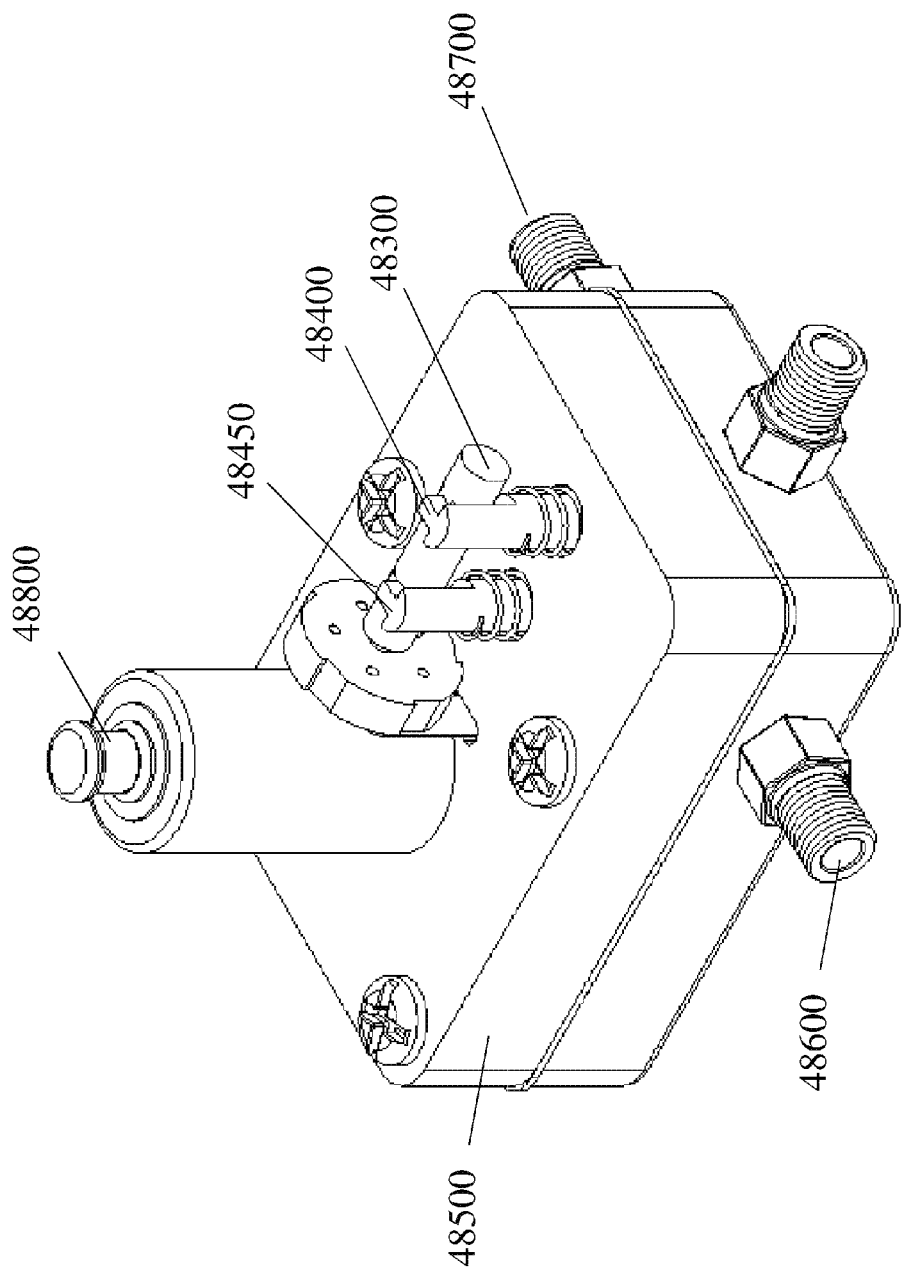
FIG. 49 depicts a view of an example fluid activated actuator assembly with part of the housing removed providing a view of the actuator's external interfaces and internal cam shaft, dual plunger configuration.

FIG. 48 illustrates a fourth type of lockstep actuator, similar to the lockstep actuators III described above. Advantageously, this fourth type of lockstep actuator can be used in conventional single port diaphragm valves 31000, see FIG. 31. Single port diaphragm valves use the same port to close the valve (e.g., using inlet fluid) as used to open the valve (exhaust path for diaphragm chamber fluid). Simply opening and closing the internal bleed ports with a single plunger mechanism as described in the Lockstep actuator case above would not by itself be sufficient to both open and close the associated diaphragm valve. Advantageously, this lockstep actuator utilizes a dual lobe cam mechanism to raise and lower two plungers as further described below.

FIG. 48 represents a generalized arrangement for two fluid activated, actuator assemblies 48100 and 48200. In this arrangement a fluid inlet 11300 receives fluid from a source and the inventive device automatically determines whether one or more distribution valves 7A and 7B are activated or inactivated, thus, directing fluid out one or more of a group of fluid outlet ports 11510 and 11520. Advantageously, the lockstep actuator, as compared to the sequencing actuator for example, does not require a general communication system between the lockstep actuators 45100 and 45200. The independent lockstep actuators when appropriately configured in a system operationally can direct fluid flow into various distribution lines with the same pressure and flow characteristics.

In an example embodiment lockstep actuators 45100 and 45200 receives fluid from a source via an inlet line 11300. Pressure, flow rate, or other parameter of the input fluid drives the lockstep actuators 45100 and 45200 to activate or deactivate one or more output valves 7A and 7B. When more than one output valve 7A and 7B are present, activation of one output valve, for example 7A, occurs simultaneously, or nearly thereto, with deactivation of another output valve, for example 7B. Thus, fluid is directed into a particular distribution line with the same pressure and flow characteristics of the source fluid. By control from the lockstep actuators 48100 and 48200, fluid is optionally then directed to a different distribution line by deactivation of the first output valve 7A and activation of another output valve 7B, see FIG. 48. In this way multiple distribution lines are optionally served by a single source with the pressure, rate, and other flow characteristics of the original source maintained throughout the entire system. Thus, expansion of an existing irrigation or other fluid delivery system is accomplished without need for an additional fluid source, control device, or timing mechanism.

In an example embodiment two lockstep actuators 48100 and 48200 regulate flow through two output valves as illustrated in FIG. 48. However, it is appreciated that the one or more lockstep actuators are suitable for regulation of one, two, three, four, five, six, or more output valves. This is optionally accomplished by configuring the number of cam shaft posts and/or cam shaft lobes, cog wheel posts, and/or gears as described above. Optionally, if a plunger is required to be in a raised position for an extended number of pressure cycles, multiple cam shaft posts and/or an extended cam shaft lobe can be employed and/or the cam can be circular with carve outs in the shaft enabling the interfacing plunger to be lowered at rotational positions of the cam shaft. While certain embodiments are described with respect to two output valves, a person having ordinary skill in the art recognizes description and enablement of any number of output valves without limitation.

FIG. 48 depicts a configuration of lockstep actuators 48100 and 48200 replacing the solenoids in a standard prior art solenoid controlled diaphragm valve, see also FIG. 20. Thus, certain embodiments optionally incorporate the low cost and simplicity of widely used diaphragm valves with embodiments of the fluid activated actuator devices disclosed herein.

An exemplary lockstep actuator 48100 is optionally constructed of an actuator housing 48500 to prevent fluid leakage from the actuator. In addition, the housing 48500 provides a protective cover to reduce contamination by soil, water, or other environmental conditions. A protective cover is optionally a separate piece that is removable, or is incorporated into a single injection molded part. The housing 48500 includes internal fluid passages, a flexible diaphragm within a diaphragm chamber, a push plate, a push plate return spring, a notched cog wheel with interfacing drive and anti-rotation springs. These actuator components operate in a manner similar to that described above with respect to lockstep actuator II.

The lockstep actuator 48100 optionally includes a cam shaft. The cam shaft 48300 is rotatable and interfaces with two plungers 48400 and 48450. The cam shaft 48300 is secured to the cog wheel (e.g., 32600) such that rotation of the cog wheel (e.g., 32600) produces rotation in the cam shaft 48300. The cam shaft 48300 is optionally cylindrical in shape. It is recognized in the art that other shapes for the cog wheel interface end of the cam shaft 48300 are similarly suitable illustratively including square, triangle, oval, rectangle, pentagon, hexagon, and other shapes known in the art. Optionally, the cam shaft 48300 meets the cog wheel (e.g., 32600) in a pressure fitting such that the association of the two parts provides sufficient frictional force that rotation of the cog wheel translates to rotation of the valve shaft. It is also appreciated in the art that the cog wheel and cam shaft are optionally affixed with an adhesive or by press fit. The cog wheel (e.g., 32600) and cam shaft 48300 are optionally formed from a single unitary piece eliminating the need for fitting a separate cam shaft 48300 and cog wheel (e.g., 32600).

The cam shaft 48300 interfaces with the plungers 48400 and 48450 to create a tandem plunger operation. If one plunger is raised, the other plunger is lowered and vice versa. With respect to the inlet plunger 48400, when the inlet plunger 48400 is raised by the inlet cam, a fluid passageway is created from the inlet side of the single port diaphragm valve, through the actuator, and into the associated diaphragm valve port. The fluid pressure through this actuator passageway causes a fluid pressure increase within the diaphragm valve chamber which causes the diaphragm valve to close, see also FIG. 31 for an illustration of a single port diaphragm valve. When the inlet plunger 48400 is in a raised position the exhaust plunger 48500 is in a lowered position (e.g., lowered by the compression of the return spring and the associated exhaust cam is in a position opposite to the inlet cam) blocking an exhaust fluid passage (described next). With respect to the exhaust plunger 48450, when the exhaust plunger 48450 is raised there is an exhaust fluid passage created from the diaphragm valve port, through an internal actuator passageway, to an actuator exhaust port. This exhaust fluid passage creates a pressure drop within the diaphragm valve chamber. The diaphragm valve inlet fluid pressure overcomes the pressure within the diaphragm valve chamber causing a contraction of the diaphragm and opening of the valve, see also FIG. 31 for an illustration of a single port diaphragm valve. When the exhaust plunger 48450 is in a raised position the inlet plunger 48500 is in a lowered position (e.g., lowered by the compression of the return spring and the associated inlet cam is in a position opposite to the exhaust cam) blocking the inlet fluid flow.

Optionally, the lockstep actuators 48100 and 48200 include a manual setting knob (e.g., 48800) which is coupled to the rigid push plate (e.g., 32300). The manual setting knob (e.g., 48800) enables a user to manually actuate the lockstep actuators 45100 and 45200 as previously described, see also manual setting knob for lockstep actuator III for example.

Optionally, the lockstep actuators 48100 and 48200 include a pressure head adjustment bushing (e.g., 32800) which operates in the same manner as the adjustment bushing for lockstep actuator III.

The inventive arrangement functions when pressurized source fluid enters the lockstep actuator via tubing 31100 connecting the inlet side of the diaphragm valve to an actuator fitting 48600 which connects to an internal fluid passage. The internal fluid passage connects to a diaphragm/diaphragm chamber (e.g., 32100). The fluid pressure expands the diaphragm (e.g., 32100) and overcomes the return spring (e.g., 32400) compression and forces linear movement of the rigid pressurized disk (e.g., 32300). The coupled leaf spring (e.g., 32500) rotates the cog wheel (e.g., 32600) into its new position. The rotation of the cog wheel results in a rotation of the dual lobe cam shaft 48300. If the cam shaft is positioned to raise the inlet plunger 41400, fluid flows into the diaphragm valve chamber 31200 via the diaphragm port 34400 causing an increase in pressure in the diaphragm chamber 31200 causing the diaphragm valve (e.g., 7A or 7B) to close. Upon termination of the fluid pressure by a control mechanism, the pressure is removed from the diaphragm (e.g., 32100) allowing pressure from the return spring (e.g., 32400) to extend the diaphragm while the anti-back rotation leaf spring stop prevents the cog wheel (e.g., 32600) from rotating in the reverse direction by the retraction of the leaf spring (e.g., 32500). When pressurized source fluid is reapplied, the fluid enters the lockstep actuator via tubing 31100 connecting the inlet side of the diaphragm valve to the actuator fitting 48200 which connects to an internal fluid passage. The internal fluid passage connects to a diaphragm/diaphragm chamber, (e.g., 32150). The fluid pressure expands the diaphragm (e.g., 32100) and overcomes the return spring (e.g., 32400) compression and forces linear movement of the rigid pressurized disk (e.g., 32300). The coupled leaf spring (e.g., 32500) rotates the cog wheel (e.g., 32600) into its new position. The rotation of the cog wheel results in a rotation of the cam shaft 48300. If the cam shaft is positioned to raise the exhaust plunger 41400, fluid flows from the diaphragm valve chamber 31200 via the diaphragm port 34400, through the actuator, and exits the actuator at the actuator fitting 48700 causing a drop in pressure in the diaphragm chamber further causing the diaphragm valve (e.g., 7A or 7B) to open.

In an example embodiment, two commercially available output diaphragm valves are connected using standard PVC plumbing fittings. The one or more lockstep actuators mount in the solenoid mounting of each of the output diaphragm valves, see FIG. 20. When fluid pressure is applied (turned on at the central control source) it enters the actuator by way of the inlet connected tubing (e.g., 31100) of the diaphragm valve and pressurizes a diaphragm chamber (e.g., 32150) inside the actuator which in turn controls the output diaphragm valves (e.g., closes 7A) as described above. When fluid pressure is turned off, fluid exits the diaphragm chamber 32150 via the diaphragm control tube (e.g., 31100) and returns to its starting position. When pressure is reapplied the leaf spring (e.g., 32500) engages a new cog wheel post 19 that rotates the cam shaft 48300 to a new position thereby controlling the output diaphragm valve (e.g., opens 7B) as described above. The system alternates as determined by the fluid source control timer. Time durations are set for each output port per normal timer operation. As previously described above, lockstep actuators 48100 and 48200 are optionally configured out-of-phase. When one valve is open the other is closed allowing the system to deliver an alternating flow of fluid to output lines with pressure equal to the pressure of the inlet. Other options are also configurable. For example, a system of 3 actuators is configured such that all the inlet pressure is applied to line 1 (open) when lines 2 and 3 are closed. In the next cycle, line 1 is closed and lines 2 and 3 are open and half the inlet pressure is applied to line 2 and half to line 3, etc.

Optional System Sync Feature

Optionally, the fluid activated actuator is equipped with or is fitted with (e.g., after operational installation in a diaphragm valve) optional components including a timing mechanism, a solenoid-based actuator, a sensor, transmitter, receiver, and/or a power source (e.g., battery). One or more of these components is associated and/or configured with the system of actuators in order to determine the state of one or more actuators and/or return a system of fluid activated actuators to a configurable home setting based on a timing event or other condition. For example, to improve the robustness of an irrigation system, a user might choose to configure each night a home setting reset for each fluid activated actuator. Optionally, if the expected configuration is the home setting for the actuator, a resetting is unlikely to occur and battery usage will be minimal. Optionally, these optional components are configured into the actuator to determine and report the operation of the actuator and/or associated valve.

Optionally, there are a variety of timing mechanisms that are used with the fluid activated actuator. Optionally, a simple duration based (e.g., 1 hour, 24 hours, x days, 1 month, etc.) timing mechanism is used. Optionally, a more sophisticated timing mechanism is used in which multiple triggering events are scheduled on a given user specified time (e.g., time of day, day of week, day or month, etc.). Optionally, the timing mechanism is used in association with one or more actuators or a system of actuators. Optionally, when a scheduled timing event occurs, only the state of a sensor is determined. Optionally, when a scheduled timing event occurs, the system resets the actuator(s) to a home or user specified configuration.

Figure 38:
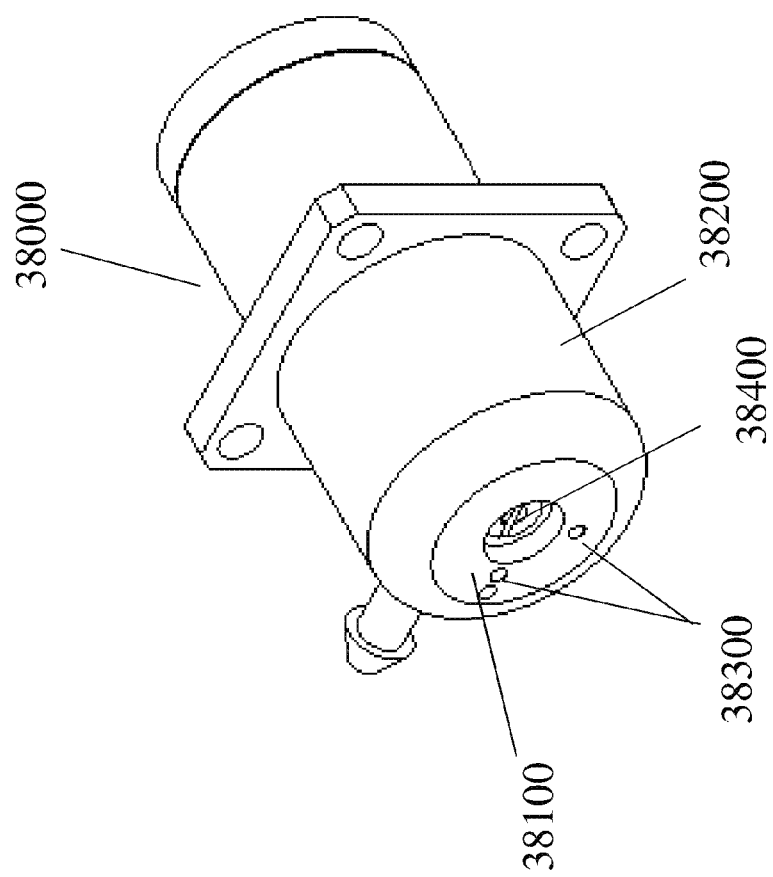
FIG. 38 depicts an example fluid activated actuator indicator.

FIG. 38 illustrates an example fluid activated actuator indicator 38000 user control for configuring a home position. Optionally, a view window is provided which enables the user to determine the position of the pilot valve shaft via a visible indicator 38400. Optionally, the pilot valve shaft is encased in a housing 38200 which is rotated manually by a user into fixed positions which correspond to available positions of the valve shaft. Optionally, the fluid activated actuator is manually activated/cycled by the user pulling (e.g., outward) on the manual activator knob (e.g., 14650). Optionally, there are one or more markings 38300 on the actuator housing 38200 which indicate a user configurable home position. Optionally, the markings 38300 indicate an associated valve on or off position. Optionally, housing 38200 includes a position sensor which is capable of detecting when the actuator is in a configured home position, not in a home position, and/or if not in a home position, the rotation position of the pilot valve shaft.

Optionally, the fluid activated actuator includes a solenoid. Optionally, the solenoid is configured into the actuator unit in a manner which compliments and does not replace the manual setting knob. For example, in the sequencing actuator, the solenoid is configured into the upper housing 14550 and/or the upper housing 14550 is extended to accommodate the solenoid. Optionally, power is applied to the solenoid which causes the actuator to advance to the next position (e.g., advance 90 degrees in a 4 post cog wheel).

Optionally, the fluid activated actuator system includes a radio transmitter. Optionally, the radio transmitter is used to transmit signals related to the operation of the actuator and/or sensor position of the actuator. For example, the radio transmitter is used to transmit a signal if the actuator is not in a configured home setting. In another example, the radio transmitter is used to transmit a signal if the actuator is not in a configured home setting at a timed event.

Optionally, the fluid activated actuator system includes a radio receiver. Optionally, the radio receiver is used to receive signals and/or signal commands related to the operation of the actuator and/or sensor position of the actuator. For example, the radio receiver is used to receive a signal to cycle the actuator or to cycle the actuator to a home setting.

Optionally, the fluid activated actuator system includes one or more electrical power sources. The power source is configured to power one or more solenoids within the system, one or more timing mechanisms, transmitter, receiver, and one or more position sensors per actuator.

Optionally, there are multiple combinations of the optional components described above and all combinations should be considered herein.

Optional Actuator Reset Control Monitor

Optionally, the fluid activated actuator system is equipped with or is fitted with (e.g., after operational installation in a diaphragm valve) optional components including an Actuator Reset Control Monitor (ARCM). In an operating environment, the system may encounter pressure spikes, pulses, dips, etc. These pressure fluctuations can be caused, for example, by a power brown out or a lighting strike affecting the controller/timing mechanism fluid pressure source. Regardless of the cause of fluid pressure fluctuation, the fluid activated actuators are generally robust to these types of fluctuations. However, the ARCM further increases the system reliability as further described below. In addition, as previously described, the fluid activated actuator system relies upon a timing mechanism or controller to manage the fluid pressure changes. The timing mechanism requires the inlet fluid pressure to be sufficiently decreased for a fixed and/or configurable period of time in order for an actuator or the system of actuators to reset. Therefore, with one or more of the actuators described herein, the timing mechanism needs to sufficiently reduce fluid pressure (e.g., by turning off the master valve) wait an interval of time, and then reapply pressure (e.g., by turning on the master valve). This cycle of master valve off, pause, and on, conventionally requires user programming of the controller. Therefore, advantageously, in certain embodiments the ARCM simplifies user programming of the controller by removing the need to program the cycle. As is further described below, with an ARCM, a user merely programs valve on/off timing.

In an example operating environment one or more master control valves are used to regulate pressure changes to the downline fluid controlled actuators and associated diaphragm valves (see example embodiments below). Conventionally, the master valve is controlled by a timer. The timer or controller is electrically connected to a solenoid-based actuator used to control the master diaphragm valve. In response to an activate signal (e.g., voltage) from the controller, the solenoid in the control panel actuates and opens the master diaphragm valve. In response to a deactivate signal (e.g., voltage off) from the control timer, the solenoid deactivates and closes the master diaphragm valve. In an example embodiment, an ARCM is mounted on the master diaphragm valve. Optionally, the ARCM is electrically spliced between the control timer and the master diaphragm valve solenoid. Optionally, the ARCM includes a pressure sensor which is connected to the output end of the master valve (e.g., via a diaphragm port or by boring a hole into the output line). Optionally, the ARCM includes a timing mechanism. Optionally, the ARCM is powered from an external power source including, for example, a battery, and/or the controller.

Optionally, there are one or more configurations and/or features of the ARCM. In an example embodiment of a basic version of the ARCM, which does not include a pressure sensor, the ARCM measures the time period between the receipt of a controller signal to deactivate the solenoid (and consequently turn off the master control valve) and subsequent receipt of the controller reactivation of the solenoid (and consequently turn on the master control valve). This time period is labeled the master valve downtime period or downtime period. Optionally, if the downtime period exceeds a system configurable time period, the ARCM allows the solenoid actuation signal to be applied and fluid is released to the downline fluid activated actuators and associated valves. If the downtime period is less than or equal to the system configurable time period the ARCM delays the solenoid actuation signal application until the system configurable time period has been exceeded. For example, if the downtime period is 45 seconds, and the ARCM detects a signal to reactivate the solenoid after 15 seconds, the ARCM will delay the signal for an additional 30 seconds. This fixed and/or guaranteed minimum delay ensures that each downline fluid activated actuator has a sufficient time period to reset before the reapplication of fluid pressure.

In another example embodiment the ARCM measures both the time and pressure during the downtime period. For example, in response to a close valve signal, the ARCM begins to measure the output pressure on the master control valve. When the pressure drop and/or the measured pressure reaches a threshold level (e.g., 5 psi) the ARCM initiates a timer and the start of the downtime period begins. The downtime period ends with the receipt of the open valve signal from the master controller. Optionally, if the downtime period exceeds a system configurable time period, the ARCM allows the valve activation signal to be applied and fluid is released to the downline fluid activated actuators and associated valves. If the downtime period is less than or equal to the system configurable time period the ARCM delays the valve activation signal until the system configurable time period has been exceeded. For example, if the downtime period is 45 seconds, and the ARCM detects a signal to open the valve after 15 seconds of measured downtime (e.g., from the time the pressure in the output line dropped below the configured threshold) the ARCM will delay the signal for an additional 30 seconds. This fixed and/or guaranteed minimum delay and/or associated pressure drop ensures that each downline fluid activated actuator has a sufficient period of time to reset before the reapplication of fluid pressure.

Local Control Toggle

Optionally, the fluid activated actuator is equipped with a local control mechanism which enables a user to disable the actuator. When the actuator is in a disabled state, the on or off position of the current valve does not change in response to input fluid pressure changes. Optionally, the local control mechanism is managed manually (e.g., by a user toggling a switch) or electronically (e.g., by an electrical switch and/or via remote control using a wireless connection).

A local control mechanism is used, for example, to disable one or more zones in a multiple zone irrigated field. For example, a user may want to stop the irrigation of the third zone in a four zone field. In this example, the user can manually disable the third zone by toggling a disable switch on the zone 3 actuator. When the user wants to resume the irrigation of zone 3, the user simply toggles the switch to the on position and the fluid activated actuator is again enabled. Advantageously, this local control mechanism allows the user, for example, to avoid reprogramming a master controller.

There are a number of different manual or electronic methods for disabling/enabling a fluid activated actuator. For example, an external switch can open or close a fluid passage connected to the diaphragm chamber(s) of the actuator. In the open fluid passage position leading to the diaphragm chamber, the inlet fluid pressure normally fills the diaphragm chamber and expands the diaphragm of the fluid activated actuator is insufficient. In another example embodiment, a mechanical switch can be used to activate a cog wheel braking mechanism. In another example embodiment, a mechanical switch can be used to activate a pilot valve shaft or cam shaft braking mechanism. In another example embodiment, a barrier slides between the cog wheel and the drive spring and/or drive spring interface with push plate, thus preventing engagement of the cog wheel. In another example, a mechanical switch can be used to open or close a fluid passage leading to or from the associated output valve (in this example, the actuator still advances in response to fluid pressure changes but the associated output valve position is not affected). Optionally, the mechanical switch described above can be controlled with an electronic switch. Optionally, the mechanism itself (e.g., the braking mechanism, fluid passage opening or obstruction, etc.) can be electronically powered and controlled.

FIG. 12 illustrates an expanded view of the cog drive spring 10 and the interface between the leaf drive bar mechanism and cog wheel 8. The cog drive spring 10 and anti-back rotation leaf spring 9 include a flange shelf 12000. The cog drive spring 10 is attached to drive post 11. The anti-back rotation leaf spring 9 and cog drive spring 10 interfaces with the cog wheel 8 via cog wheel posts 11.

Figure 13:
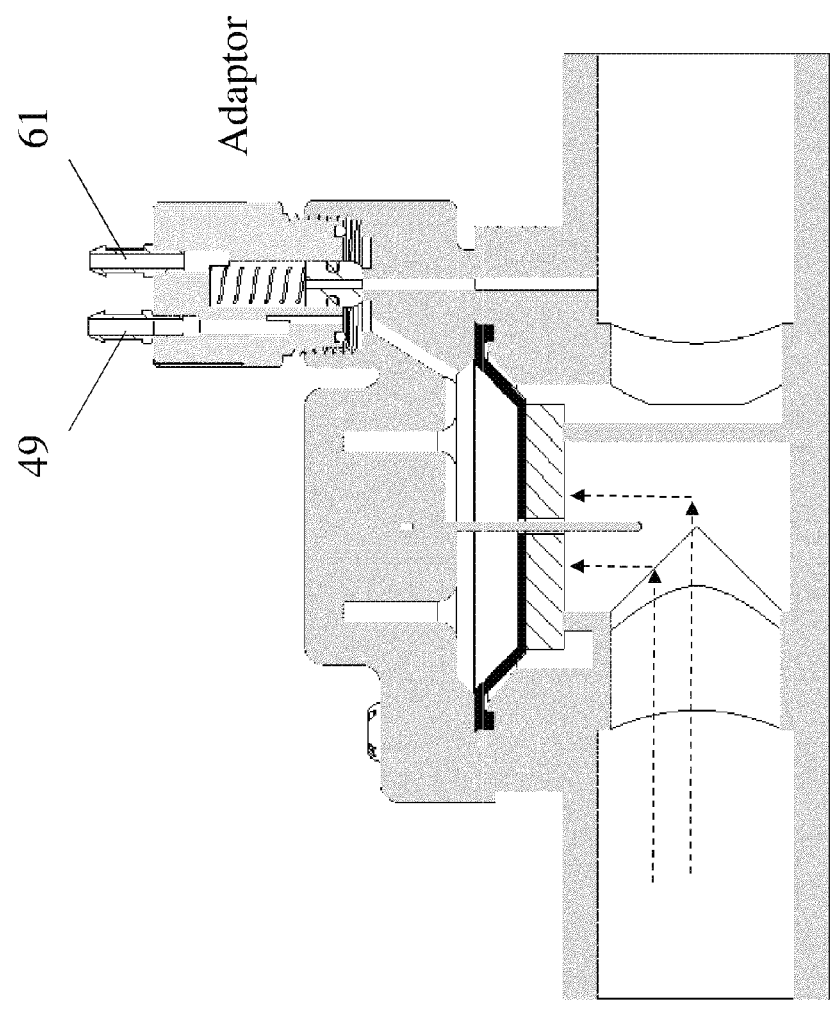
FIG. 13 depicts an example cross-sectional view of an adaptor used in a fluid activated actuator assembly mounted into a closed diaphragm valve.
Figure 15:
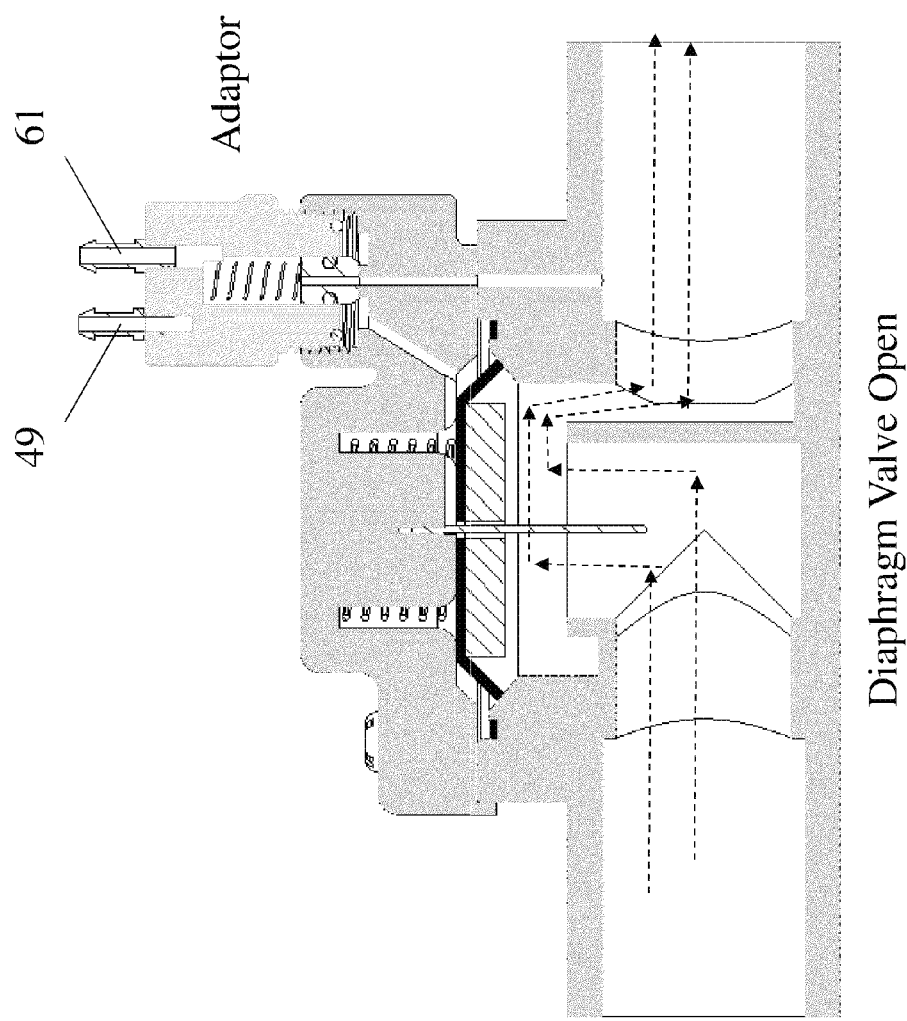
FIG. 15 depicts a cross-sectional view of an example fluid activated actuator mounted into a conventional diaphragm valve with the diaphragm valve in the open position.

FIGS. 13 and 15 illustrates a cross-section view of exemplary adaptors 6A or 6B connected to a conventional diaphragm valve (e.g., 7A or 7B) seated in the solenoid mount position. Adaptors 6A and 6B interwork with fluid activated servo assembly 3. Optionally, the adapters 6A or 6B are mounted into the diaphragm valve in a manner which allows fluid to flow from the diaphragm bleed port passage 22500 into the adapter passage 49, see also FIG. 22. Optionally, the adapter includes a passage 61 in which fluid can flow to the diaphragm bleed port passage 22600, see also FIG. 22. Optionally, the adaptor fittings 49 and 61 are connected to a fluid activated servo assembly 3 via, for example, flexible tubing 5. FIG. 13 illustrates the adaptor mounted on a closed conventional diaphragm valve. FIG. 15 illustrates the adaptor mounted on an open conventional diaphragm valve.

Figure 14:
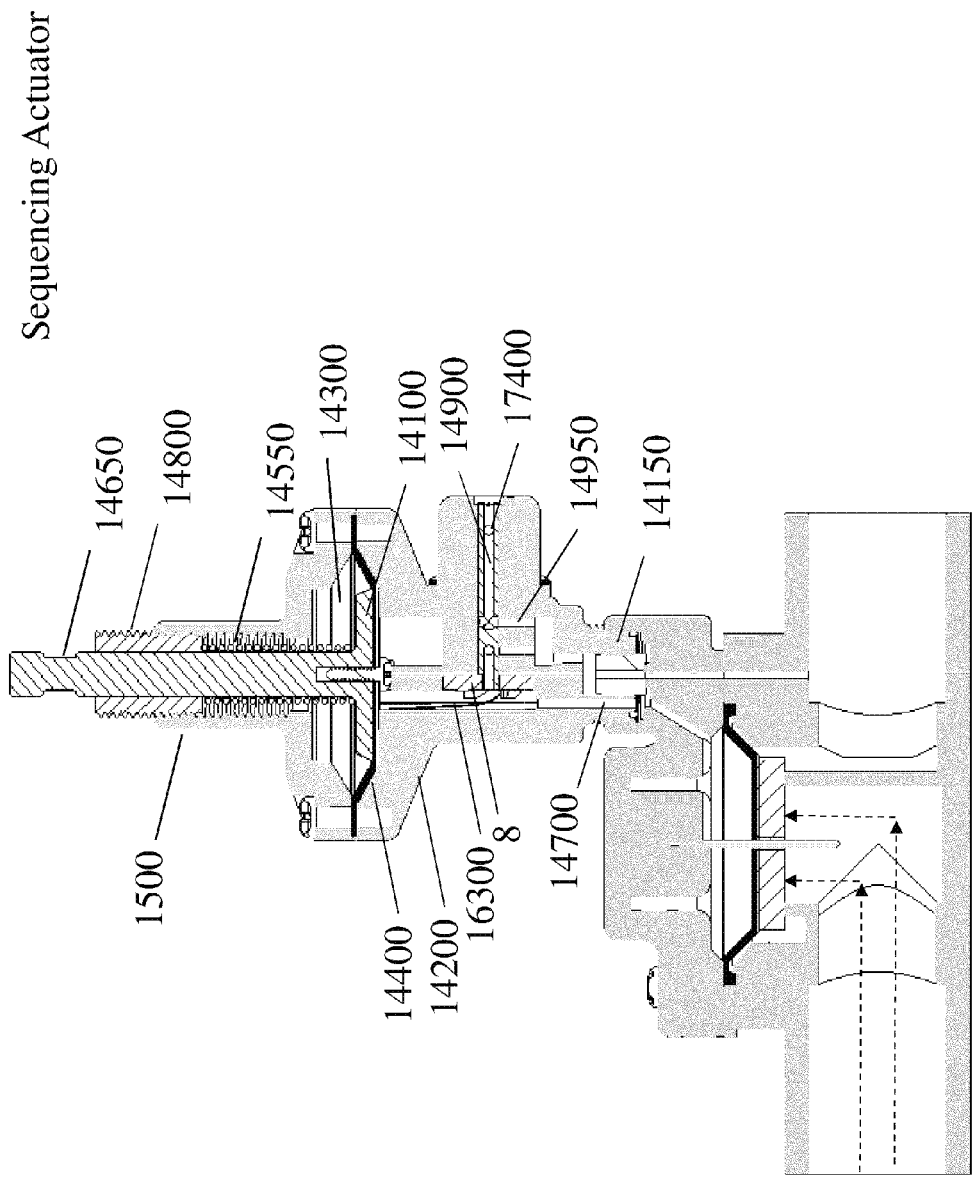
FIG. 14 depicts a cross-sectional view of an example fluid activated actuator mounted into a conventional diaphragm valve with the diaphragm valve in the closed position.

FIG. 14 illustrates a cross-section view of an exemplary fluid activated lockstep actuator assembly mounted into the solenoid position of a conventional diaphragm valve 7A. The lockstep actuator components and operation are described above. The cross-sectional view, in particular, illustrates the interface between the diaphragm valve fluid passage 22500, lockstep sequencing passages 14700 and 14950, and diaphragm valve fluid passage 22600, see also FIG. 22. As illustrated in FIG. 14, with the blockage of fluid through the sequencing actuator at the pilot valve port 17100, the diaphragm valve 7A is closed.

Figure 16:
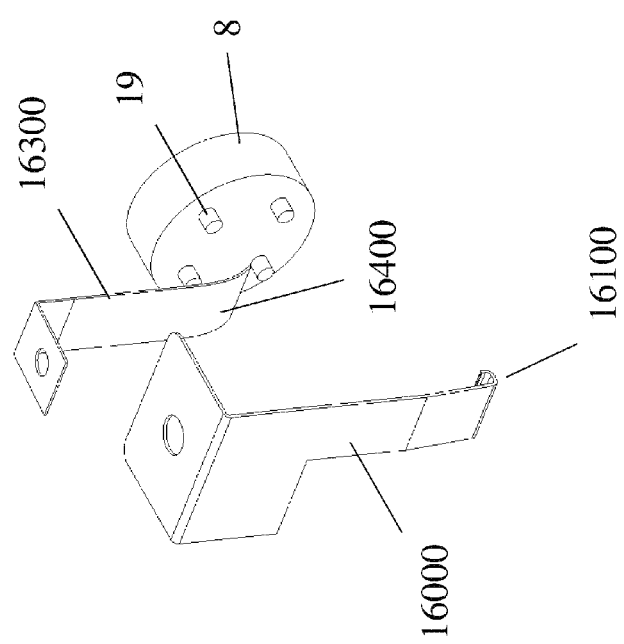
FIG. 16 depicts an example cog wheel and springs interface which is optionally used in a fluid activated actuator assembly.

FIG. 16 illustrates the example drive or leaf spring 16000 used in an example embodiment of a fluid activated sequencing actuator 1500. FIG. 16 provides an enlarged view of the drive spring 16000 and cog wheel 8 of that shown in FIG. 14. The hooked end 16100 of the drive spring engages a cog wheel post 19 to drive the cog wheel 8 in the forward rotational direction (e.g., counter clockwise). The drive spring 16000 is optionally flexible such that when the spring moves downward a lower cog wheel post 19 does not impede the downward movement of the drive post but causes the hooked end of the drive spring 16100 to bend outward until the hooked end has cleared the next cog wheel post 19. A subsequent raising of the drive spring 16100 results in another forward rotational direction of the cog wheel 19.

The system optionally includes an anti-back rotational leaf spring stop 16300 that prevents the cog wheel 8 from reversing the forward or rotational direction of the cog wheel 8. The anti-back rotation leaf spring optionally has a bend 16400 that enables the cog post 19 to slide underneath the anti-back rotational leaf spring stop as the cog wheel rotates. During a rotation, the cog wheel post 19 bends the anti-back rotation leaf spring outward until the cog wheel post clears the end of the leaf spring. When the cog wheel post 19 engages the end of the leaf spring 16300, the cog wheel 8 is prevented from rotating in the reverse direction.

Figure 17:
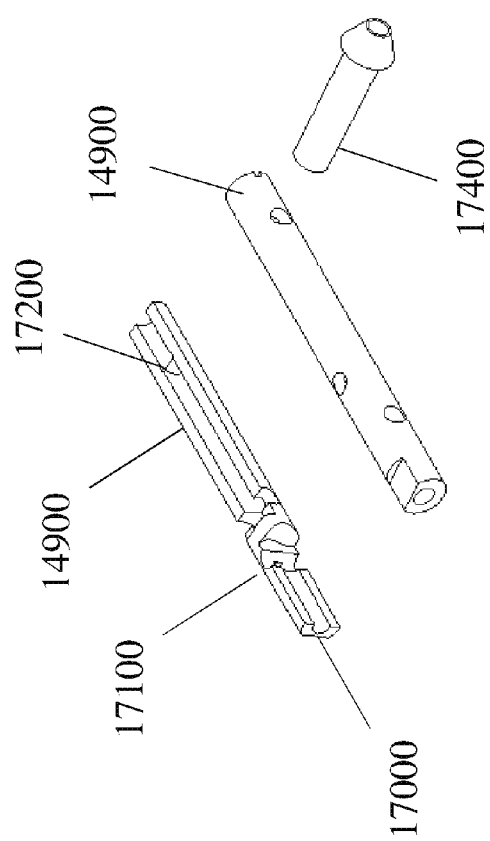
FIG. 17 depicts a cross-sectional view of an example pilot valve which is optionally used in a fluid activated actuator assembly.

FIG. 17 illustrates an exemplary pilot valve shaft 14900 with two pilot valve ports 17100 and 17200. In an example embodiment, the two pilot valve ports 17100 and 17200 are perpendicular to each other. Optionally, a 90 degree rotation of the pilot valve shaft 14900 aligns one of the two pilot valve ports (e.g., 17100 or 17200) to open a bleed port passage for an associated diaphragm valve.

Figure 18:
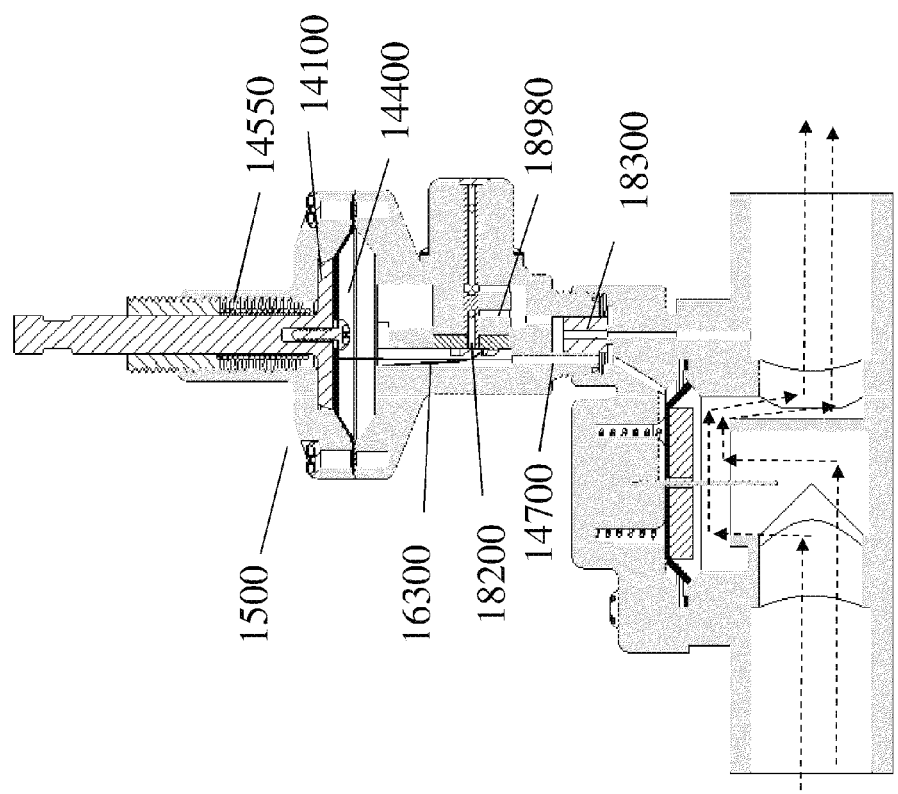
FIG. 18 depicts a cross-sectional view of an example fluid activated actuator mounted into a conventional diaphragm valve with the diaphragm valve in the open position.

FIG. 18 illustrates a cross-section view of an exemplary fluid activated sequencing actuator assembly 1500 mounted into the solenoid position of a conventional diaphragm valve 7A. The sequencing actuator components and operation are described above. The cross-sectional view, in particular, illustrates the fluid connections between the diaphragm valve fluid passage 19500, lockstep actuator passages 14700 and 18300, and diaphragm valve fluid passage 19600, see also FIG. 19. As illustrated in FIG. 18, with the free flow of fluid through the lockstep actuator including the pilot valve port 17100, the diaphragm valve is open.

Figure 19:
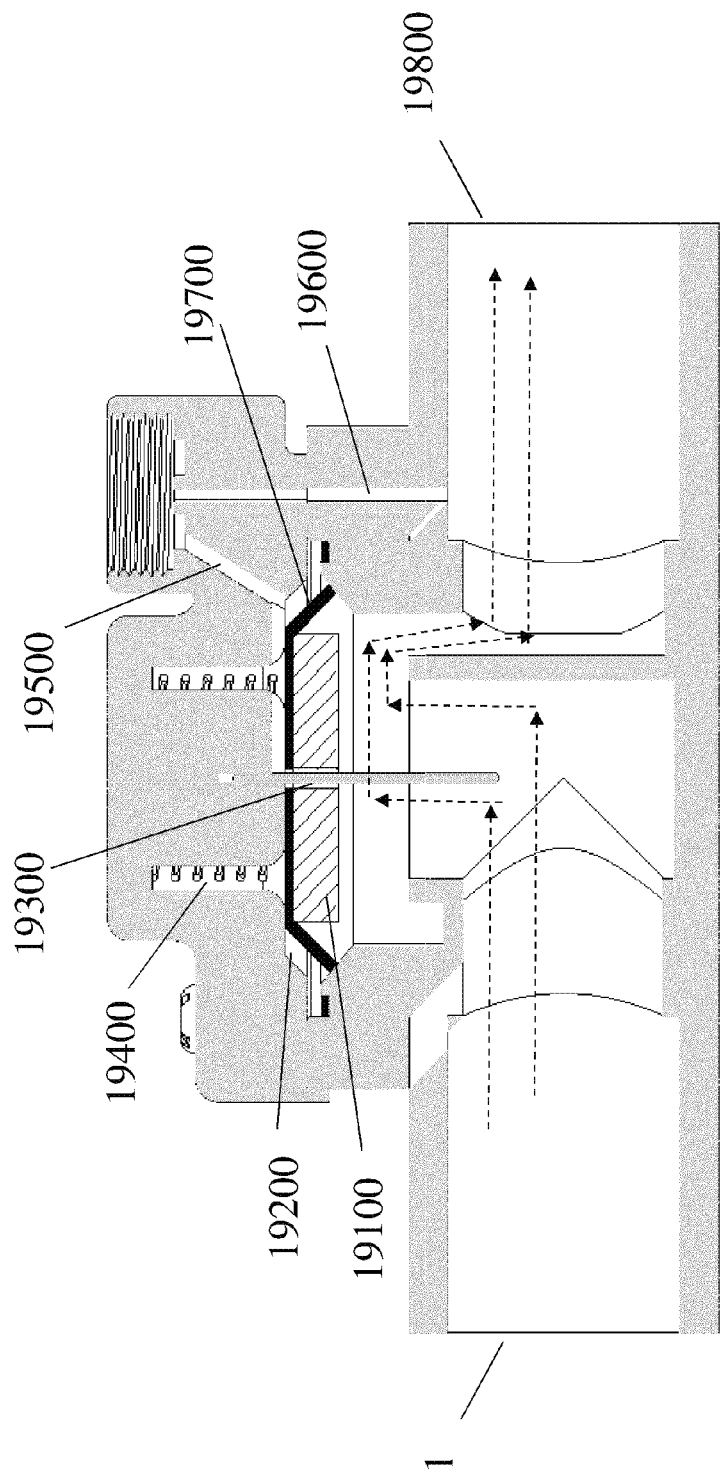
FIG. 19 depicts a cross-sectional view of a conventional diaphragm valve in the open position.

FIG. 19 illustrates a cross-section view of an exemplary diaphragm valve 19000 in the on or open position. Source fluid enters the diaphragm valve on the inlet port 1 of the diaphragm valve (e.g., 7A or 7B) and exits on the outlet 19800. The illustrative diaphragm valve includes a flexible diaphragm 19700 and associated diaphragm fluid chamber 19200. Optionally, conventional diaphragm valves (e.g., 7A or 7B) include a spacer 19100 coupled to the diaphragm 19700 which moves linearly in response to fluid pressure from the inlet port 1, diaphragm 19700 expansions and contractions, and return spring 19400 compressions. Optionally, the diaphragm spacer 19100 includes a center passage 19300 through which source fluid from the inlet port 1 can flow into the diaphragm chamber 19200. Optionally, conventional diaphragm valves include a return spring 19400 which applies a compression force against the diaphragm 19700 and spacer 19100. Optionally, conventional diaphragm valves include a bleed port fluid passage 19500 which connects to a mounted solenoid, adapter (e.g., adapter 6A), or in certain embodiments, a fluid activated actuator assembly. Optionally, a conventional valve 19000 includes a bleed port fluid passage 19600 which is connected to the outlet port 19800. A device (e.g., a solenoid) is used to regulate the fluid flow between the passage 19500 and 19600. If the passage 19500/19600 is open, the fluid in the diaphragm chamber 19200 can exhaust through the passage 19600 and there is a resulting loss of pressure in the diaphragm chamber 19200. Inlet source fluid pressure exerted against the spacer overcomes the return spring 19400 compression and fluid flows unobstructed from the inlet port 1 to the outlet port 19800.

Certain optional embodiments enable an existing fluid control device to be retrofitted using a minimum or relatively small number of steps. FIG. 20 illustrates an example removal of a solenoid 20100 and the replacement with a fluid activated actuator assembly (e.g., 1500) in a conventional diaphragm valve. The solenoid 20100 is unscrewed from the solenoid mounting location 20200. The fluid activated actuator assembly (e.g., 1500) is screwed into the solenoid mounting location 20200. Optionally, one or more gaskets and/or separate adaptors are used to interface the fluid activated actuator assembly into the solenoid mount position. Optionally, an adaptor can be used to change the dimensions of the receiving solenoid mount position (e.g., ¾" thread to ½" thread), to change the thread direction (e.g., counter clockwise or clockwise), etc. It is appreciated that the coupling of the actuator with the receiving solenoid mount position can be accomplished in a number of different embodiments and a person having ordinary skill in the art recognizes that enablement of this coupling is not limited to those examples above. Optionally, no gaskets and/or adaptors are required to interface the fluid activated actuator assembly into the solenoid mount position. Optionally, one or more fluid activated actuator assemblies are each separately designed to interface within the solenoid mount position of different output valves without the use of adaptors. Optionally, no machining of the pre-existing diagraph valve is required for the retrofit and no electrical wiring to the fluid activated actuator assembly is required for the retrofit.

Figure 22:
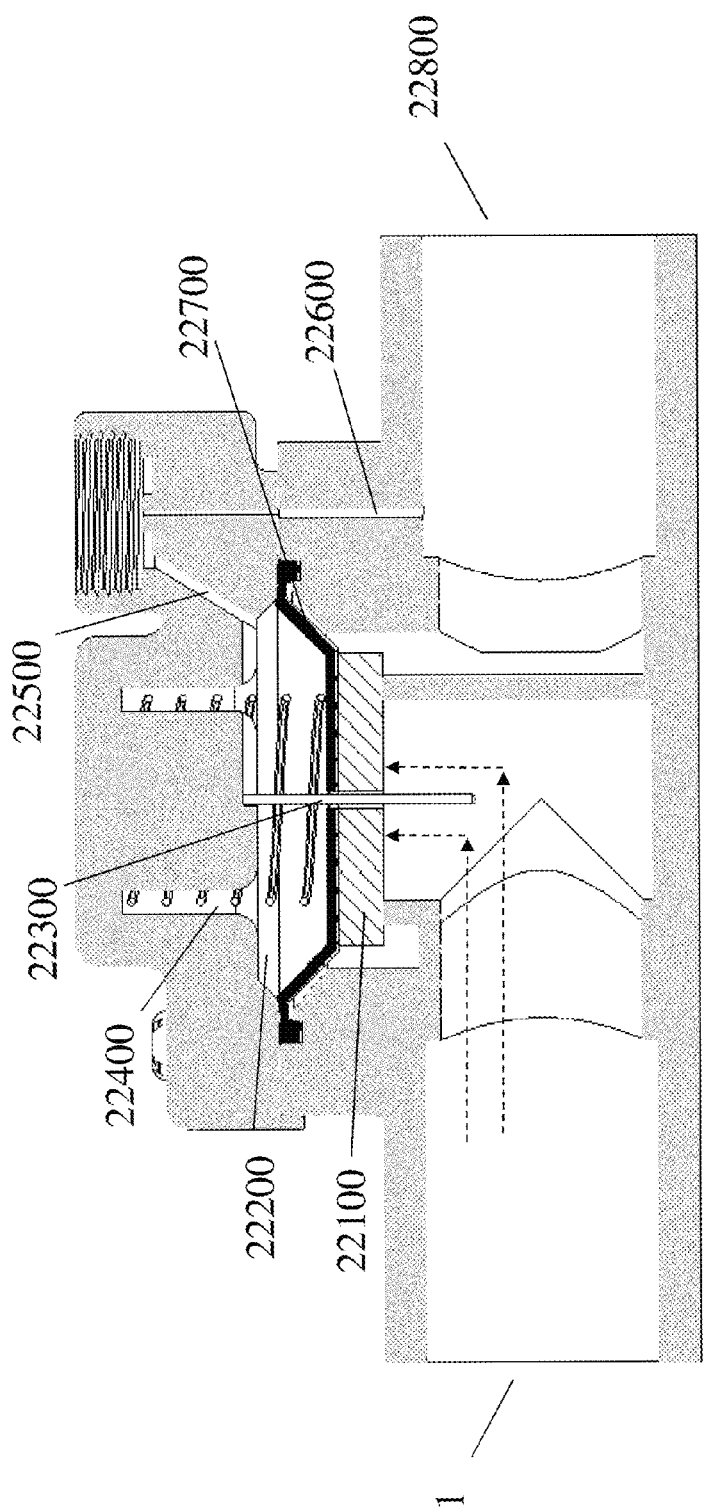
FIG. 22 depicts a cross-sectional view of a conventional diaphragm valve in the closed position.

FIG. 22 illustrates a cross-section view of an exemplary diaphragm valve 22000 in the off or closed position. Source fluid enters the diaphragm valve on the inlet port 1 of the diaphragm valve (e.g., 7A or 7B) and exits on the outlet 22800. The illustrative diaphragm valve includes a flexible diaphragm 22700 and associated diaphragm fluid chamber 22200. Optionally, conventional diaphragm valves (e.g., 7A or 7B) include a spacer 22100 coupled to the diaphragm 22700 which moves linearly in response to fluid pressure from the inlet port 1, diaphragm 22700 expansions and contractions, and return spring 22400 compressions. Optionally, when the diaphragm 22700 is extended, the spacer 22100 contacts the internal structure of the valve and blocks/seals the flow of fluid from the inlet port 1 to the outlet port 22800. Optionally, the diaphragm spacer 22100 includes a center passage 22300 through which source fluid from the inlet port 1 can flow into the diaphragm chamber 22200. Optionally, conventional diaphragm valves include a return spring 22400 which applies a compression force against the diaphragm 22700 and spacer 22100. Optionally, conventional diaphragm valves include a bleed port fluid passage 22500 which connects to a mounted solenoid, adapter (e.g., adapter 6A), or in certain embodiments, a fluid activated actuator assembly. Optionally, a conventional valve 22000 includes a bleed port fluid passage 22600 which is connected to the outlet port 22800. A device (e.g., a solenoid) is used to regulate the fluid flow between the passage 22500 and 22600. In conventional diaphragm valves, if the fluid flow through the bleed port 22500 is blocked, the compression in the return spring 22400 and fluid pressure entering the diaphragm chamber 22200 seats the spacer 22100 over the source fluid inlet and prevents fluid from flowing to the outlet 22800.

Figure 25:
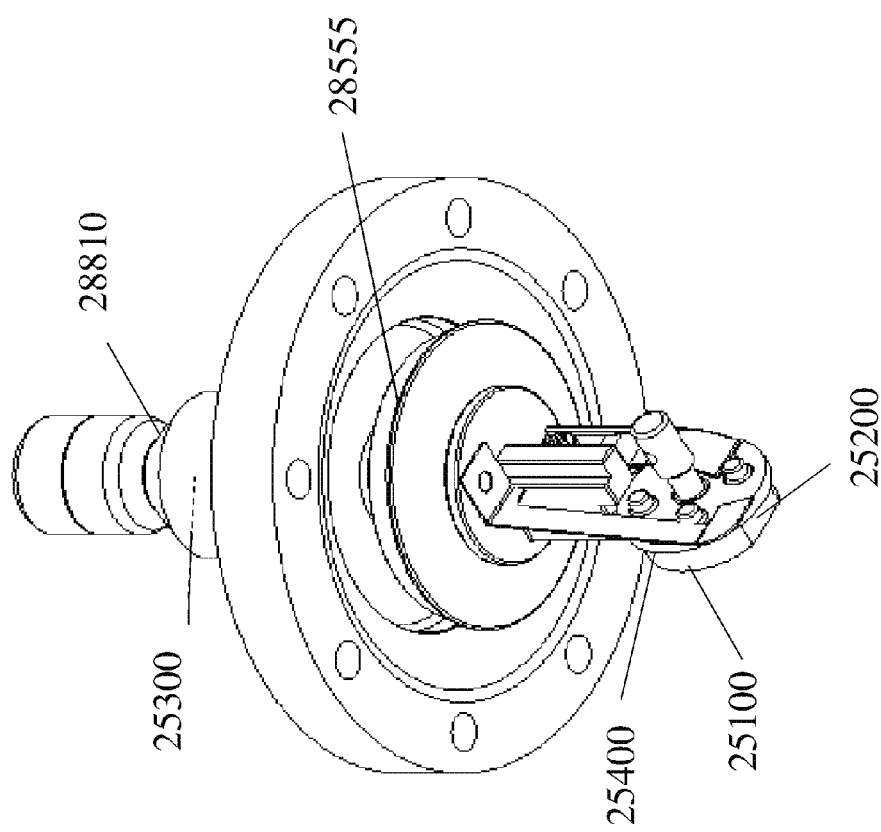
FIG. 25 depicts an internal view of some of the components of an example fluid activated actuator.

FIG. 25 illustrates a cog wheel 25400 variant used in the lockstep actuator 24100 and 24200 which is used to create a cog wheel position indicator feature. The circular cog wheel 25400 is modified to include two opposing flat edges. Two ends of the cog wheel 25400 across the plane are circular 25100 and the two ends of the cog wheel vertical to the plane (or 90 degrees off the plane) have flat edges 25200 (e.g., as in a flat tire). This edge flattening causes the push plate 28555 to descend further when the cog wheel 25400 is in the position illustrated in FIG. 25. Similarly, when the cog wheel 25400 is advanced 90 degrees, the circular edge of the cog wheel 25400 will cause the contacting push plate 28555 to be raised or in a higher position relative to the flat edge position. The elevated position of the push plate and associated manual adjusting knob inform the user of the position of the cog wheel 25400. Optionally, the post 25300 attached to the push plate 28555 is a different color (e.g., red) than the housing 28500 (e.g., black). When the post 25300 is in the raised position (e.g., push plate is in contact with the circular edge 25100), the color of the post 25300 is visible to a user. When the post 25300 is in the lower position (e.g., push plate is in contact with the flat edge 25200), the color of the post 25300 is not visible to a user. Therefore, the user can determine the position of the internal cog wheel by viewing the push plate post. Knowing the position of the cog wheel informs the user of the pilot valve shaft 28350 and thus the user, can determine whether the associated diaphragm valve is in the open or closed position.

Figure 26:
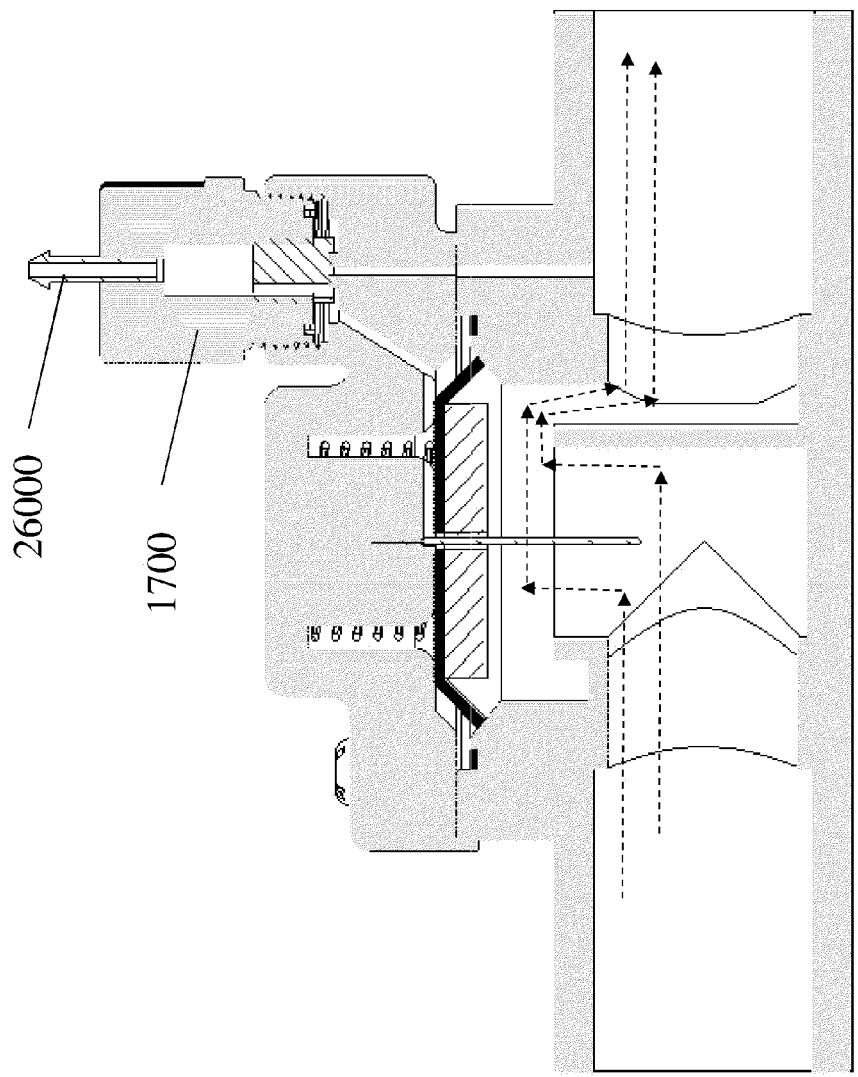
FIG. 26 depicts an example cross-sectional view of a single channel adaptor used in a fluid activated actuator assembly mounted into an open diaphragm valve.

FIG. 26 illustrates a cross-section view of an exemplary adaptor 1700 connected to a conventional diaphragm valve 7B seated in the solenoid mount position. Adaptor 1700 interworks with an example sequencing adaptor 1500. Optionally, the adapter 1700 is mounted into the diaphragm valve in a manner which allows fluid to flow from the diaphragm bleed port passage 19500 into the adapter passage 49, see also FIG. 19. Optionally, when the passage 26000 through the adapter 1700 is blocked, for example, at the fluidly connected (e.g., via 1800) pilot valve port 17200, the associated diaphragm valve 7B is closed. Optionally, when the passage 26000 through the adapter 1700 is open, for example, at the fluidly connected (e.g., via 1800) pilot valve port 17200, the associated diaphragm valve 7B is open.

Figure 28:
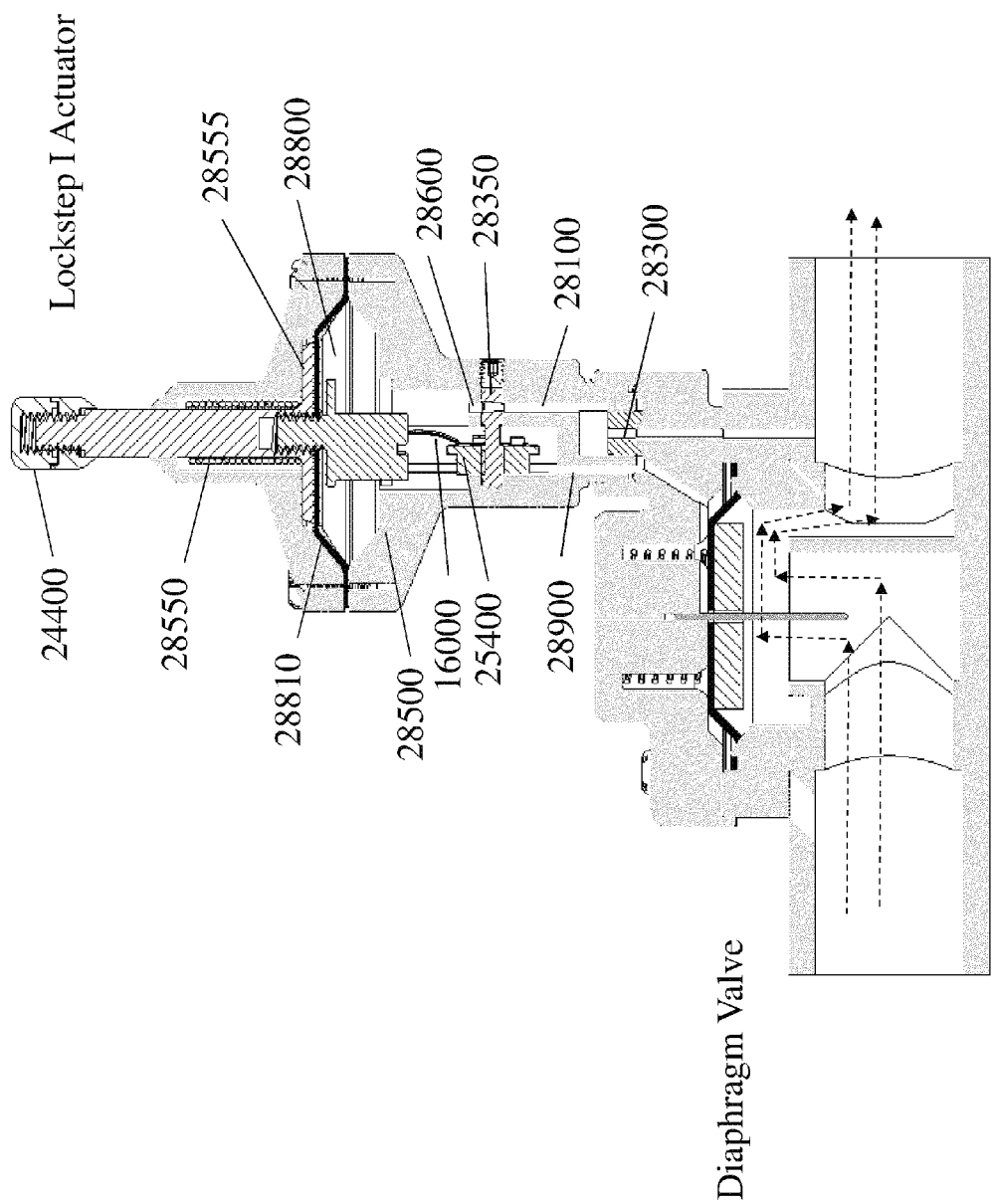
FIG. 28 depicts a cross-sectional view of an example fluid activated actuator mounted into a conventional diaphragm valve with the diaphragm valve in the open position.

FIG. 28 illustrates a cross-section view of an exemplary fluid activated lockstep assembly 24100 or 24200 mounted into the solenoid position of a conventional diaphragm valve 7A or 7B. The lockstep actuator components and operation are described in detail above. The cross-sectional view, in particular, illustrates the fluid connections between the diaphragm valve fluid passage 19500, lockstep actuator passages 28900 and 28300, and diaphragm valve fluid passage 19600, see also FIG. 19. As illustrated in FIG. 28, with the free flow of fluid through the lockstep actuator including the pilot valve port 27100, the diaphragm valve is open.

Figure 29:
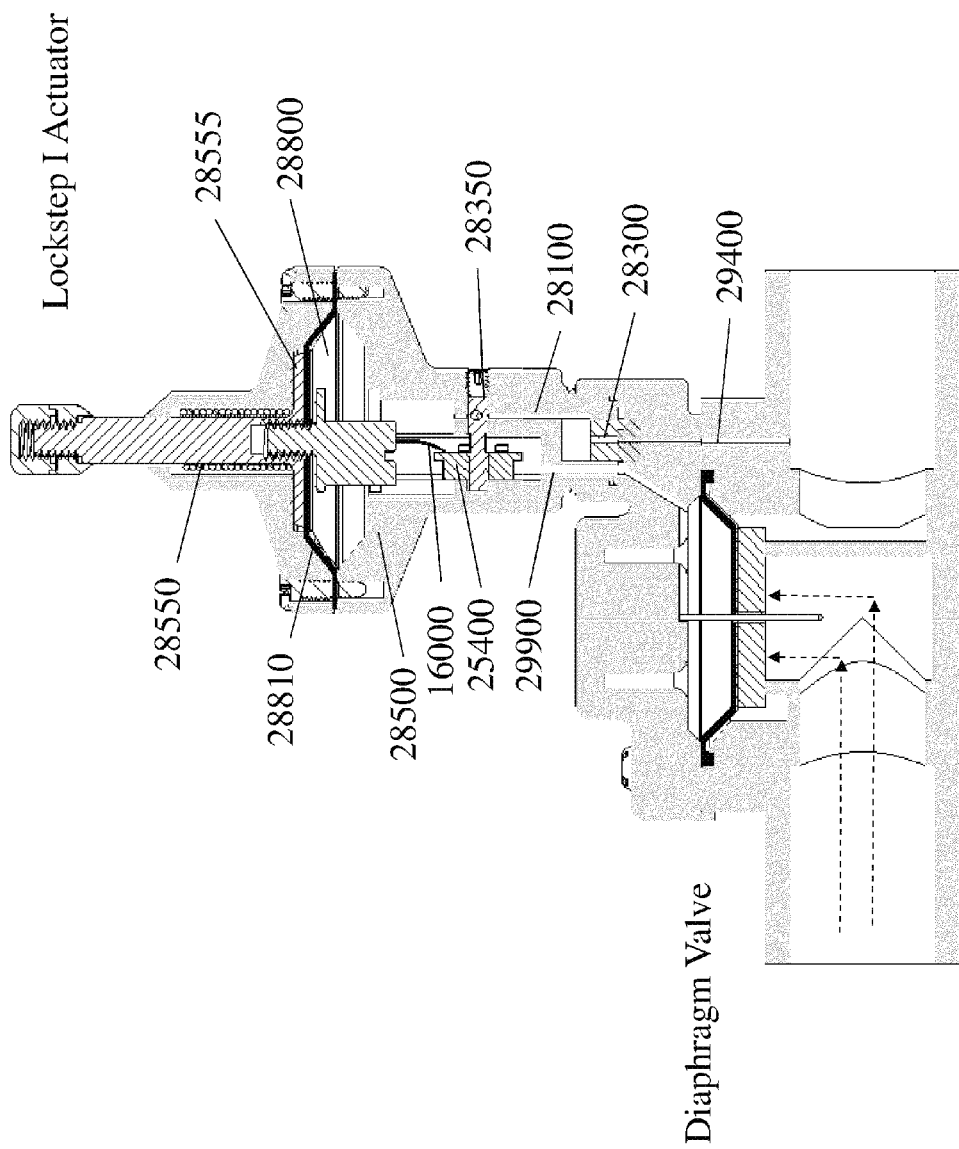
FIG. 29 depicts a cross-sectional view of an example fluid activated actuator mounted into a conventional diaphragm valve with the diaphragm valve in the closed position.

FIG. 29 illustrates a cross-section view of an exemplary fluid activated lockstep assembly 24100 or 24200 mounted into the solenoid position of a conventional diaphragm valve 7A or 7B. The lockstep actuator components and operation are described in detail above. The cross-sectional view, in particular, illustrates the fluid connections between the diaphragm valve fluid passage 22500, lockstep actuator passages 29900 and 28300, and diaphragm valve fluid passage 22600, see also FIG. 22. As illustrated in FIG. 29, with blockage of fluid through the lockstep actuator at the pilot valve port 27100, the diaphragm valve is closed.

Figure 30:
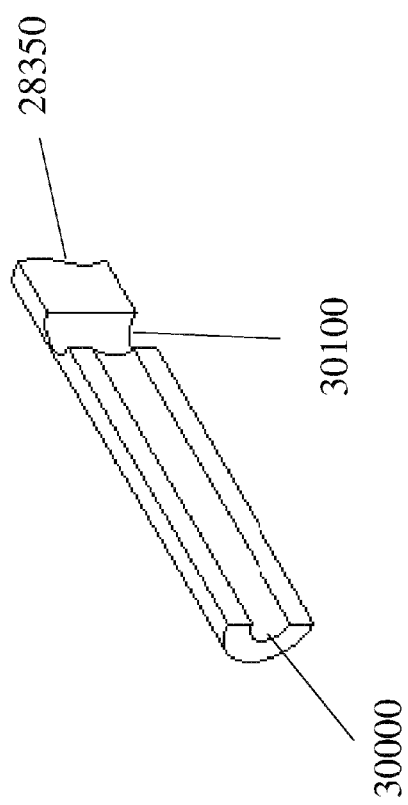
FIG. 30 depicts a cross-sectional view of an example pilot valve which is optionally used in a fluid activated actuator assembly.

FIG. 30 illustrates an exemplary pilot valve shaft 28350 with a single pilot valve port 30100. In an example embodiment, a fluid passage 30000 interfaces with a bore hole in the cog wheel 25400. A 90 degree rotation of the pilot valve shaft 28350 aligns the pilot valve port 30100 with a fluid passageway 28100, see FIG. 28. A further 90 degree rotation of the pilot valve shaft 28350 blocks the pilot valve port 30100 from the lockstep actuator fluid passageway 28300, see FIG. 28.

Figure 31:
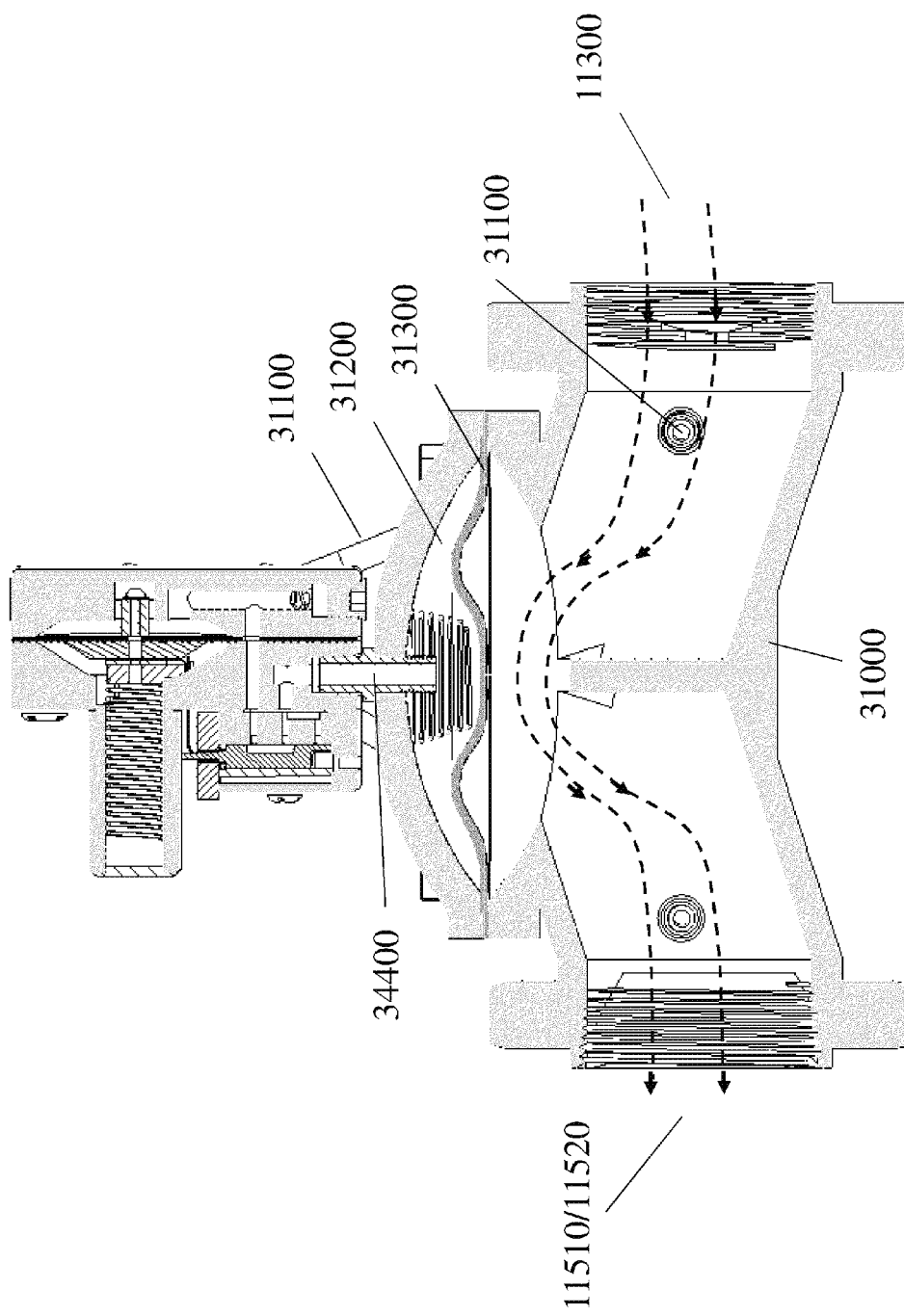
FIG. 31 depicts a cross-sectional view of an example fluid activated actuator mounted into a conventional domed diaphragm valve with the diaphragm valve in the open position.

FIG. 31 illustrates a cross-section view of an exemplary fluid activated lockstep assembly 36100 or 36200 mounted into the solenoid position of a conventional diaphragm valve 7A or 7B. The lockstep actuator components and operation are described in detail above. The cross-sectional view, in particular, illustrates the operation of a second type of conventional diaphragm valve. In the diaphragm valve open position, the fluid pressure from the inlet 11300 applies a force to the diaphragm 31300. If there is an exhaust path for the fluid in the diaphragm chamber 31200, the diaphragm will collapse into the diaphragm chamber and the inlet fluid flows freely past the diaphragm and into the outlet 11510 or 11520. In the closed diaphragm valve position, there is a fluid passageway from inlet fluid source via 31100, into the actuator 36100 or 36200, into the bleed port 34400, and into the diaphragm chamber 31200. The shape of the diaphragm chamber and the force of the fluid pressure from the source 31100 cause the diaphragm to expand into the primary fluid passageway. The diaphragm, when in an expanded state, blocks the fluid flow and the valve closes.

Figure 32:
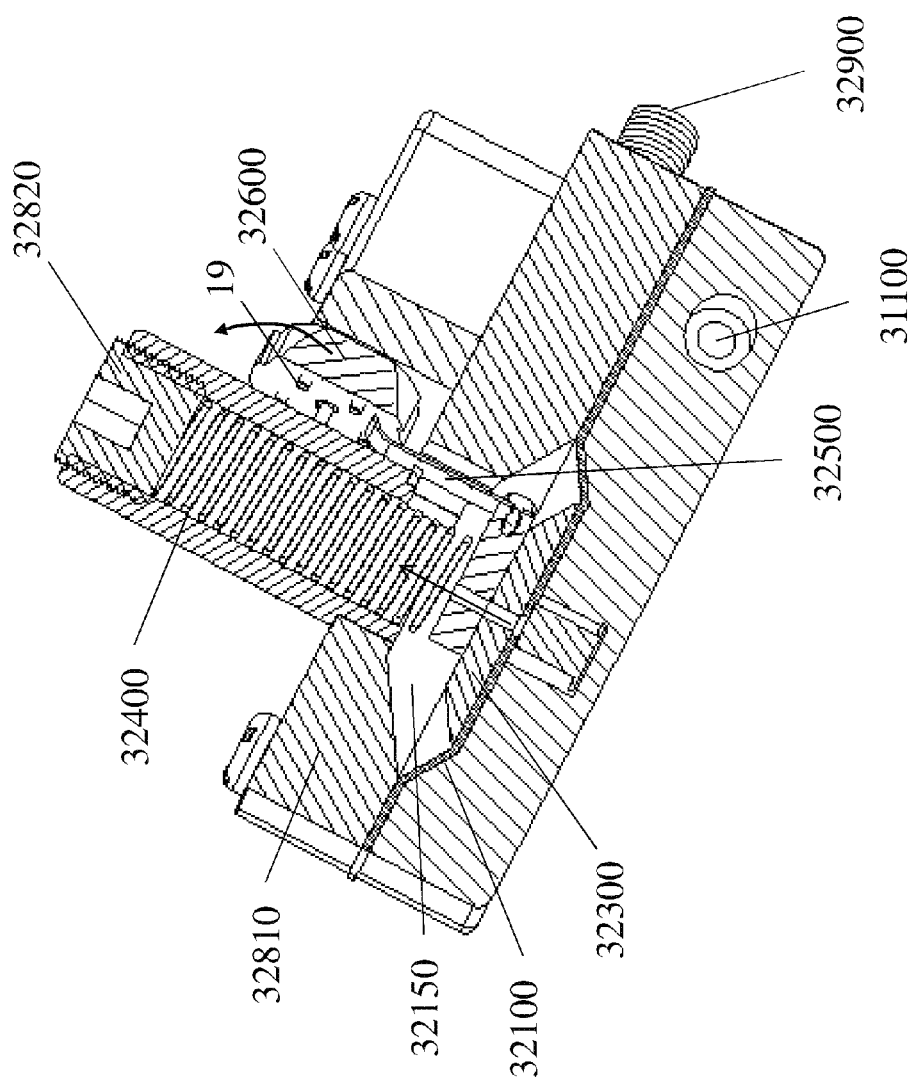
FIG. 32 depicts a cross-sectional view of an example fluid activated actuator.

FIG. 32 illustrates a cross-section view of an exemplary fluid activated lockstep assembly 36100 or 36200 mounted into the solenoid position of a conventional diaphragm valve 7A or 7B. The lockstep actuator components and operation are described in detail above. This cross-sectional view, in particular, illustrates the lockstep actuator in an inactive state. Optionally, fluid is allowed to leak from the actuator diaphragm chamber 32150 during normal operation and during the actuator reset period via fluid passageway 32900.

Figure 33:
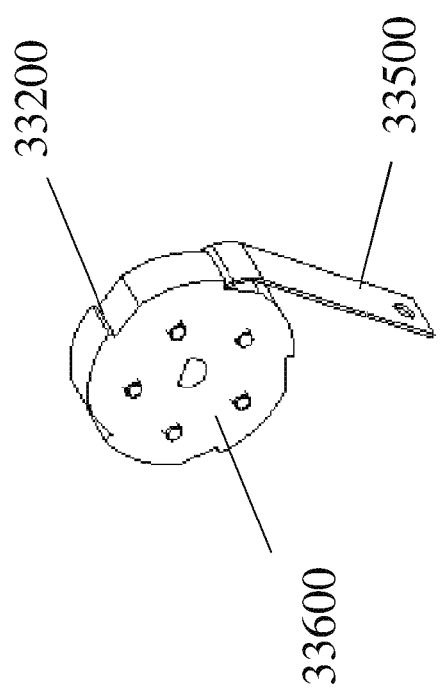
FIG. 33 depicts a notched cog wheel and leaf spring interface.

FIG. 33 illustrates a third example variant of the cog wheel/leaf spring mechanism. In this example embodiment, the cog wheel 32600 is notched to prevent back rotation as described in detail above (see second example lockstep actuator). A leaf spring 32500 engages the cog wheel posts 19 to advance the rotation of the cog wheel 32600. A second anti-back rotation leaf spring engages the one or more notches in the cog wheel to prevent the back rotation of the cog wheel 32600 as the actuator resets and/or the leaf spring 32500 travels down (in FIG. 32) and over the cog wheel post 19.

FIG. 34 illustrates a cross-section view of an exemplary fluid activated lockstep assembly 36100 or 36200 mounted into the solenoid position of a conventional diaphragm valve 7A or 7B. The lockstep actuator components and operation are described in detail above. The cross-sectional view, illustrates the fluid connections between the diaphragm valve inlet fluid passage 31100, lockstep actuator passages 34500, pilot valve port 34200, and lockstep actuator passage 34400. The free flow of fluid through the lockstep actuator into the diaphragm chamber 31200 via passageway 34400 causes the diaphragm valve to close.

FIG. 37 illustrates a cross-section view of an exemplary fluid activated lockstep assembly 36100 or 36200 mounted into the solenoid position of a conventional diaphragm valve 7A or 7B. The lockstep actuator components and operation are described in detail above. The cross-sectional view, illustrates a rotation of the pilot valve shaft 34100 in which the pilot valve shaft port 34200 is blocked and the exhaust pilot valve port 34600 is open. The blocking of the pressurized inlet fluid and the opening of exhaust passageway 34400 via pilot valve shaft port 34600 causes the diaphragm 31300 to collapse and the diaphragm valve (e.g., 7A or 7B) to open.

FIG. 40 illustrates an example sequencing actuator fluidly coupled to the diaphragm valves via tubing. The actuator system of 40100 regulates the output of fluid to three separate output lines. FIG. 40 also illustrates an example sequencing actuator fluidly coupled to four valves via tubing. The actuator system of 40200 regulates the output of fluid to four separate output lines.

Figure 41:
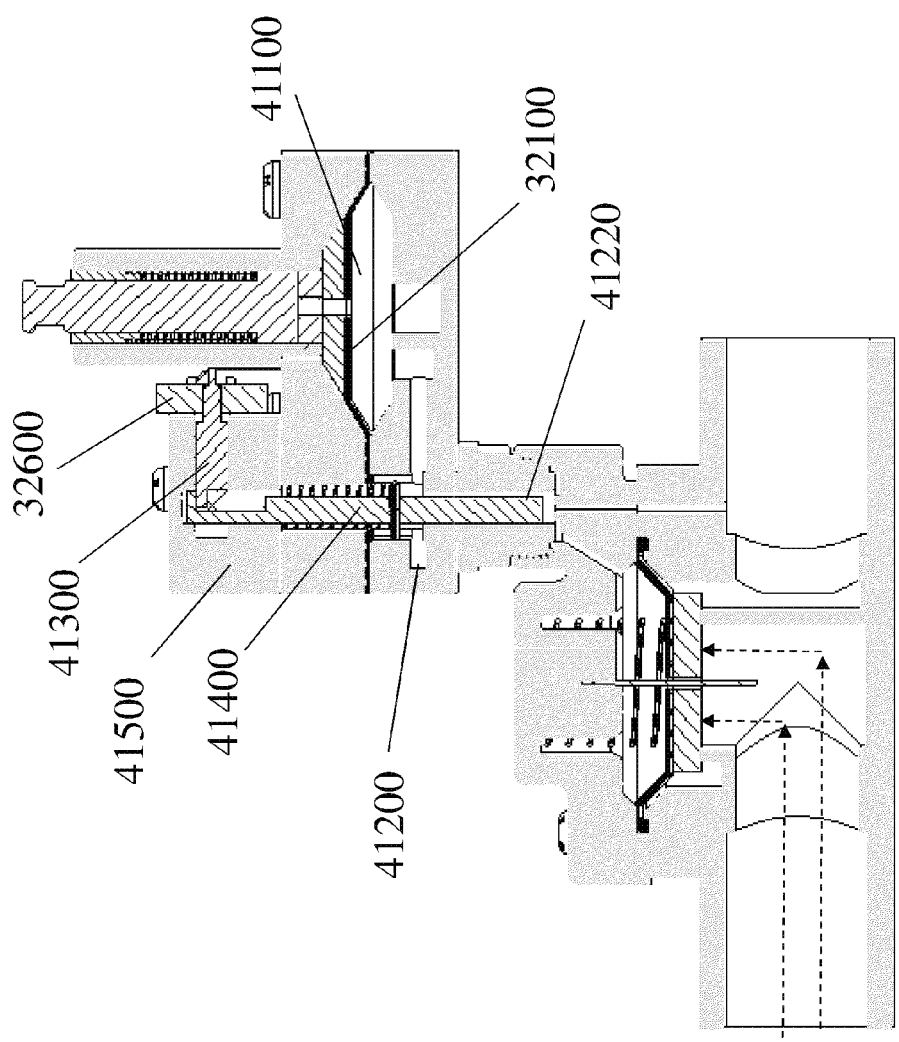
FIG. 41 depicts a cross-sectional view of an example fluid activated actuator mounted into a conventional diaphragm valve with the diaphragm valve in the closed position.

FIG. 41 illustrates a cross-section view of an exemplary fluid activated lockstep assembly 45100 or 45200 mounted into the solenoid position of a conventional diaphragm valve 7A or 7B. The lockstep actuator components and operation are described in detail above. The cross-sectional view illustrates the use of a cam shaft mechanism as an alternative to a pilot valve shaft. The cross-sectional view also illustrates the effect of raising and lowering the plunger 41400 onto the associated diaphragm bleed port passages.

Figure 42:
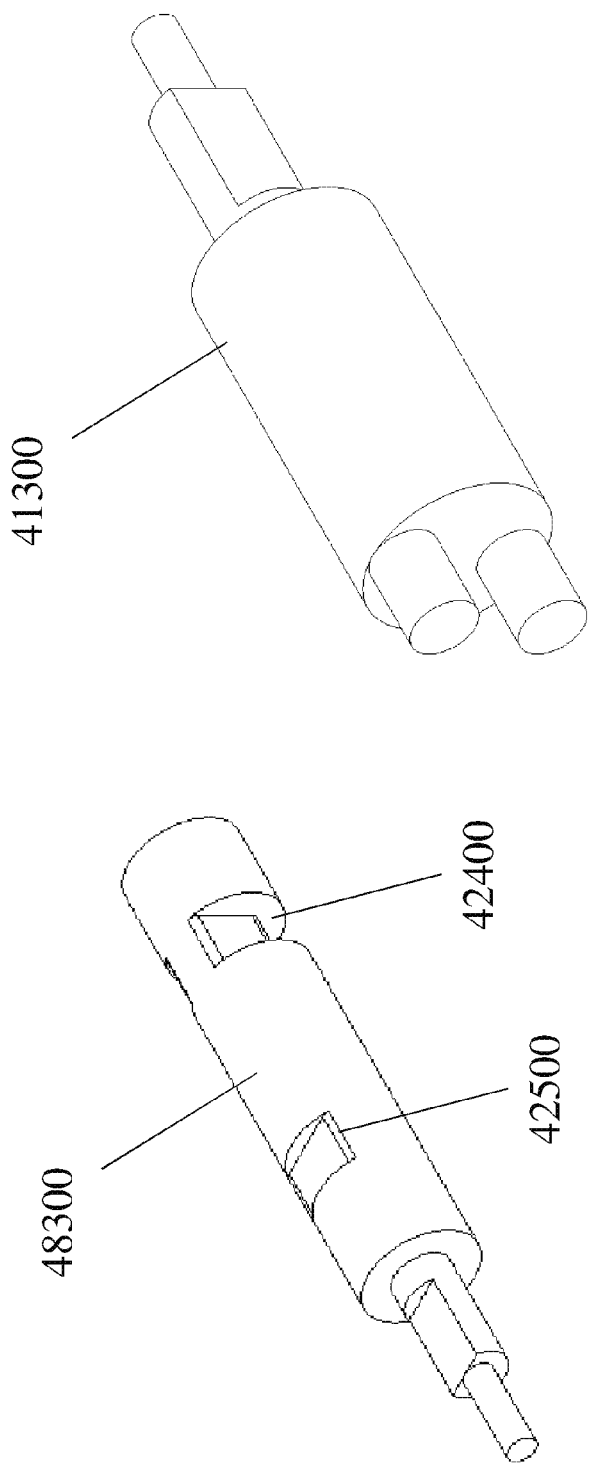
FIG. 42 depicts an example embodiment of a dual post cam shaft and a dual lobe cam shaft.

FIG. 42 illustrates an example two post cam shaft 41300 used in the fifth example embodiment. A 90 degree rotation of an interconnected 4 post cog wheel causes one of the two posts to interface and/or raise the plunger 41400 with every 180 degree rotation. FIG. 42 also illustrates a dual lobe cam shaft 48300 used in the description of the dual lobe cam shaft actuator 48100. A 90 degree rotation of an interconnected 4 post cog wheel causes one of the two plungers, for example 48400, to interface and/or raise the plunger in tandem with the lowering of the companion plunger 48450. In a similar manner, another 90 degree rotation of the interconnected 4 post cog wheel causes the raised plunger, for example 48400, to descend in response to the force of the return compression spring and the groove 42400 in the dual lobe cam shaft 48300, and a raising of the companion plunger 48450.

Figure 43:
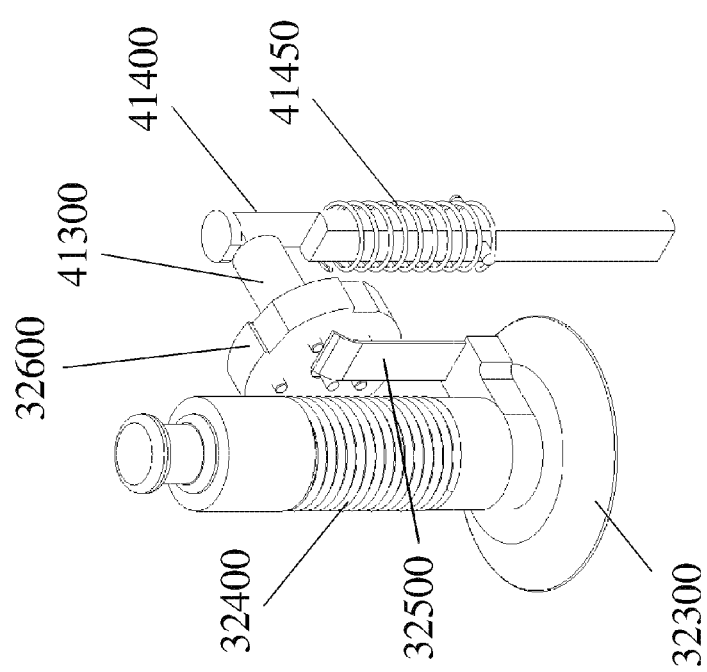
FIG. 43 depicts an internal view of some of the components of an example fluid activated actuator.

FIG. 43 illustrates an expanded view of an exemplary cam shaft 41300 interface with a plunger 41400.

Figure 44:
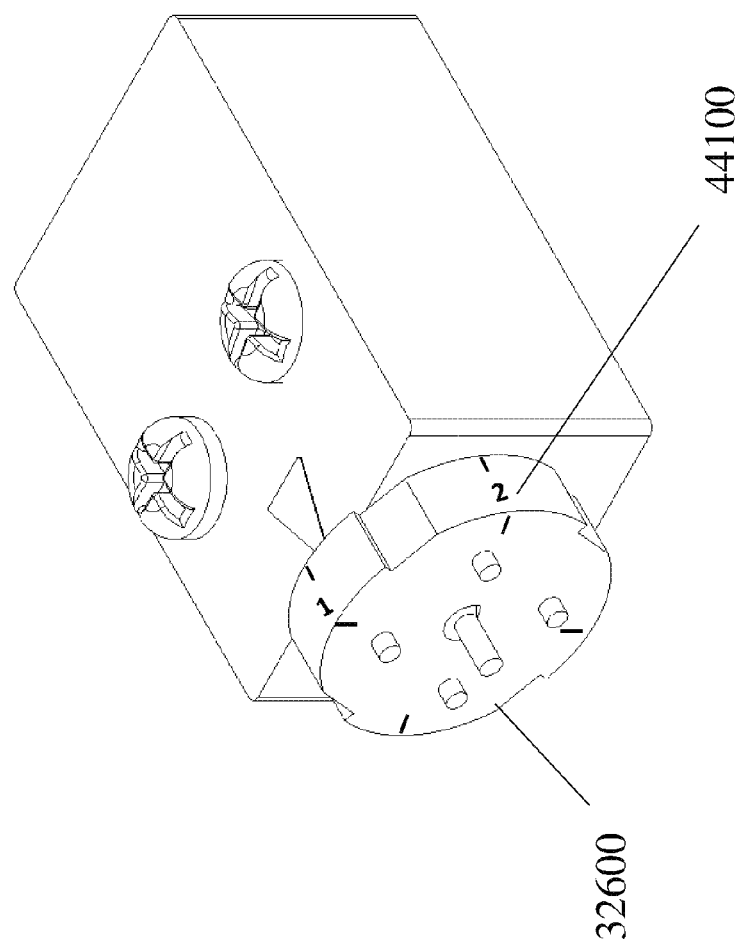
FIG. 44 depicts an example fluid activated actuator indicator.

FIG. 44 illustrates another example fluid activated actuator indicator display. In this example embodiment, the cog wheel (e.g., 32600) includes one or more markings 44100 (e.g., numbers and/or characters). The markings on the cog wheel indicate to the user the position of the pilot valve and/or cam shaft. Advantageously, the user does not have to open the actuator housing to view the pilot valve and/or cam shaft position. Optionally, the user manually advances or cycles the actuator using fluid pressure to a desired position. Optionally, this marked cog wheel indicator is used in those actuator designs in which the cog wheel is viewable by the user.

Figure 47:
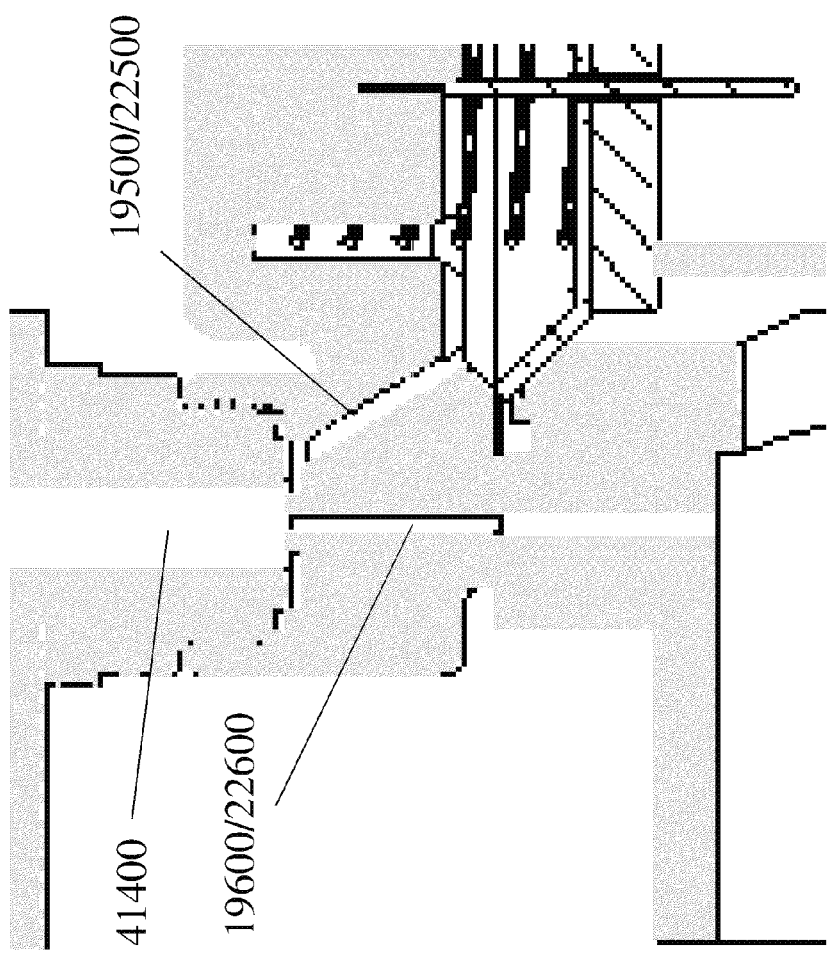
FIG. 47 depicts the plunger interface in a cam shaft-based fluid activated actuator assembly with a conventional diaphragm bleed port passages.

FIG. 47 illustrates a cross-sectional view of the lockstep actuator (cam shaft version) assembly 45100 or 45200 interface with a conventional diaphragm valve (e.g., 7A or 7B). The expanded view illustrates the plunger 41400 interface with the diaphragm bleed port fluid passages and how these passages are opened and blocked with the raising and lowering of the plunger, respectively.

Figure 50:
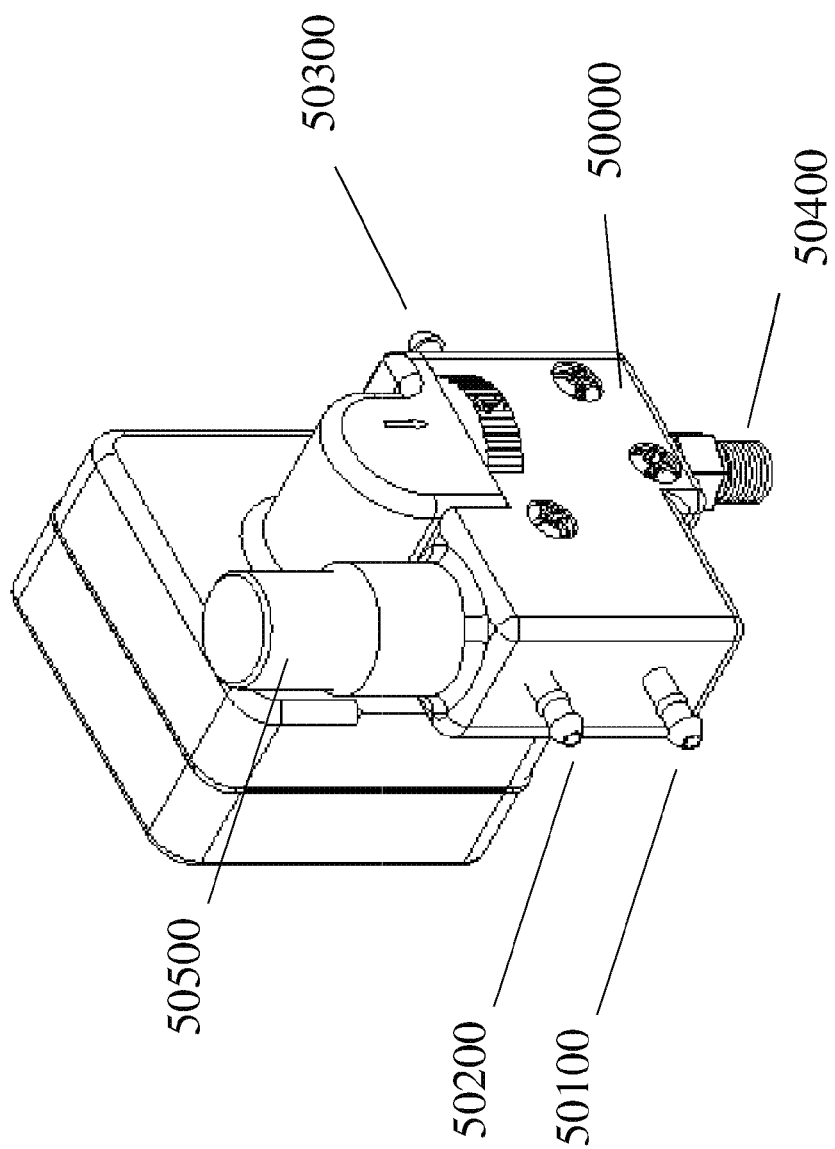
FIG. 50 depicts an external view of an example embodiment of a fluid activated actuator.

In an example embodiment, a fluid control device, such as the example fluid control device 50000 of FIG. 50, controls one or more output valves, such as an example externally ported diaphragm valve 31000 illustrated in FIG. 31. Optionally, the fluid control device 50000 operates in a manner similar to the fluid control devices described with respect to FIG. 34. Optionally, the input control fluid passages 34200 is modified to house one or more components including for example, springs, gaskets, diaphragms, and pistons to improve the performance of the fluid control device under dynamic fluid pressure environments in which the inlet control fluid pressure is not shut off to affect a state transition. For example, during normal operation and, in particular, during a valve state transition, the input fluid pressure applied to the device is not reduced to near zero or shut off before pressure is reapplied. Thus for example, to affect a state change (e.g., turning an associated valve off), a lowering of input fluid pressure followed by an increase in fluid pressure is sufficient to cause a diaphragm valve state change. Optionally, this enables the total system of valves to continue operating, albeit at a reduced pressure, even during valve state transitions.

Optionally, the fluid control device 50000 has one or more external ports. In this example embodiment the control device 50000 includes a control water inlet 50100, an actuator diaphragm exhaust vent to ambient outlet 50200 (which vents external to the device 50000), a bleed port 50300, and an optionally threaded diaphragm valve interface port 50400. The external ports on the fluid control device 50000 generally correspond to the corresponding external ports of the lockstep actuator 36100 illustrated in FIG. 36, as described above. For example, the control water inlet 50100 generally corresponds to the control water inlet 31100; the diaphragm exhaust vent to ambient 50200 generally corresponds to 31100 (the diaphragm bleed port in FIG. 34 is also the inlet port 31100—the water exits back into the input line when the pressure is turned off); the bleed port 50300 generally corresponds to 34700; and the threaded interface port 50400 generally corresponds to 34400. Optionally, one or more O-rings or gaskets or other sealing mechanisms may be used to improve the seal between the solenoid mount position of the diaphragm valve and the interface port 50400 of the fluid control device. Optionally, other adaptors are provided to physically mate any brand of commercial valve with the fluid control device. For example, flanges and/or compression fittings can be used to mate the two devices.

Figure 51:
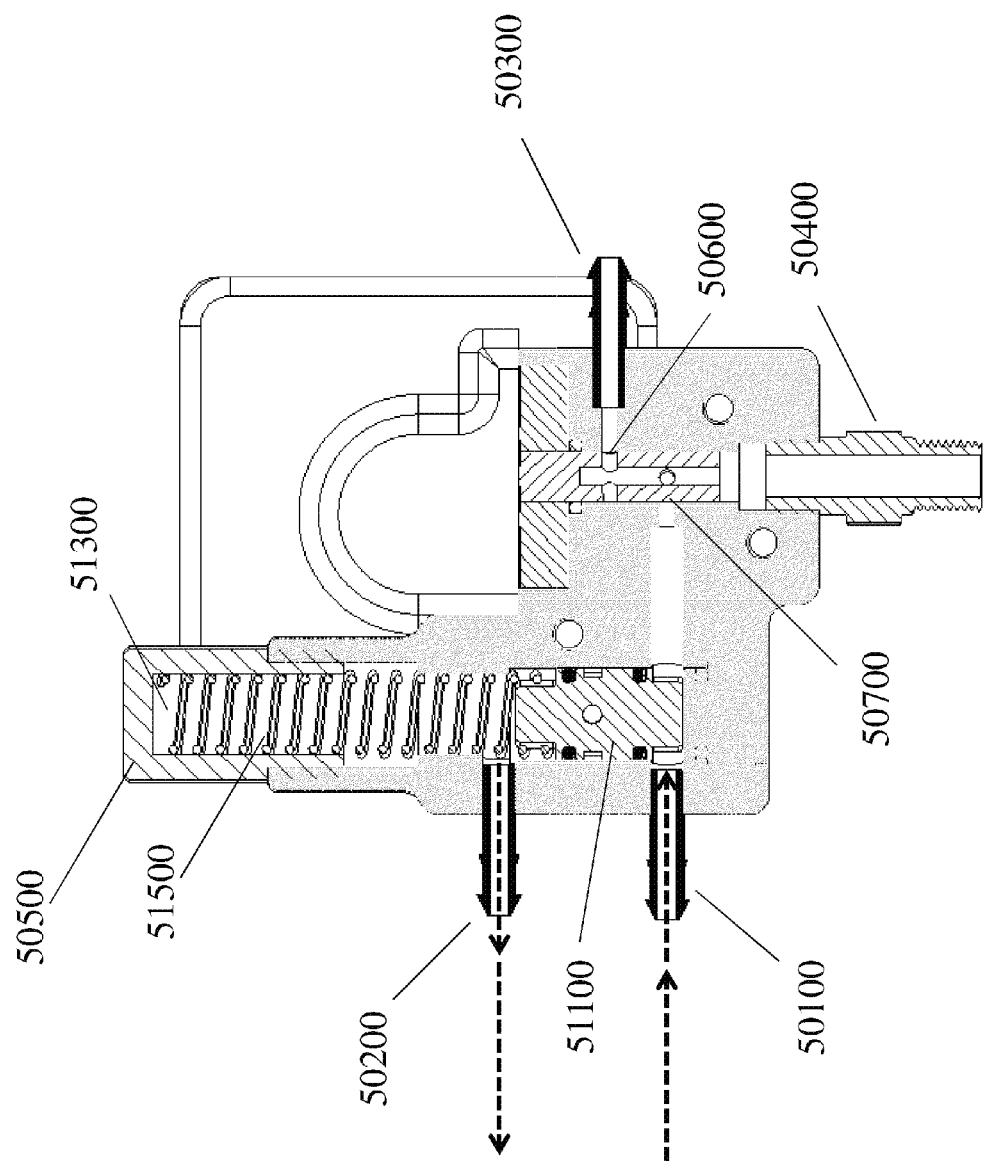
FIG. 51 depicts an internal view of certain components of an example fluid activated actuator.

FIG. 51 illustrates a cut-away, cross-sectional view of certain example components in the modified lockstep actuator 50000. In FIG. 51, the spool valve/piston is in the extended position, for example, in response to a reduction in pressure. The modified lockstep actuator 50000 components include a spool valve/piston 51100 which is configured to travel within a spool valve chamber 51300, one or more fluid channels, a spring 51500 which exerts a downward tension force against the spool valve/piston, and, an adjustment knob 50500. Optionally, a clockwise rotation of the adjustment knob 50500 causes a compression of the spring 51500. Compressing the spring 51500 increases the force of the spring 51500. Therefore, more pressure is needed in the control flow water inlet 50100 to overcome the increased spring compression. Conversely, a counter-clockwise rotation of the pressure head adjustment knob 50500 causes an expansion of the spring 51500. Therefore, less pressure is needed in the in the control flow water inlet 50100 to overcome the reduced spring compression. In another example embodiment, one or more springs and/or diaphragms can be used in place of, or in addition to the example spool valve and springs illustrated in FIG. 51.

Figure 52:
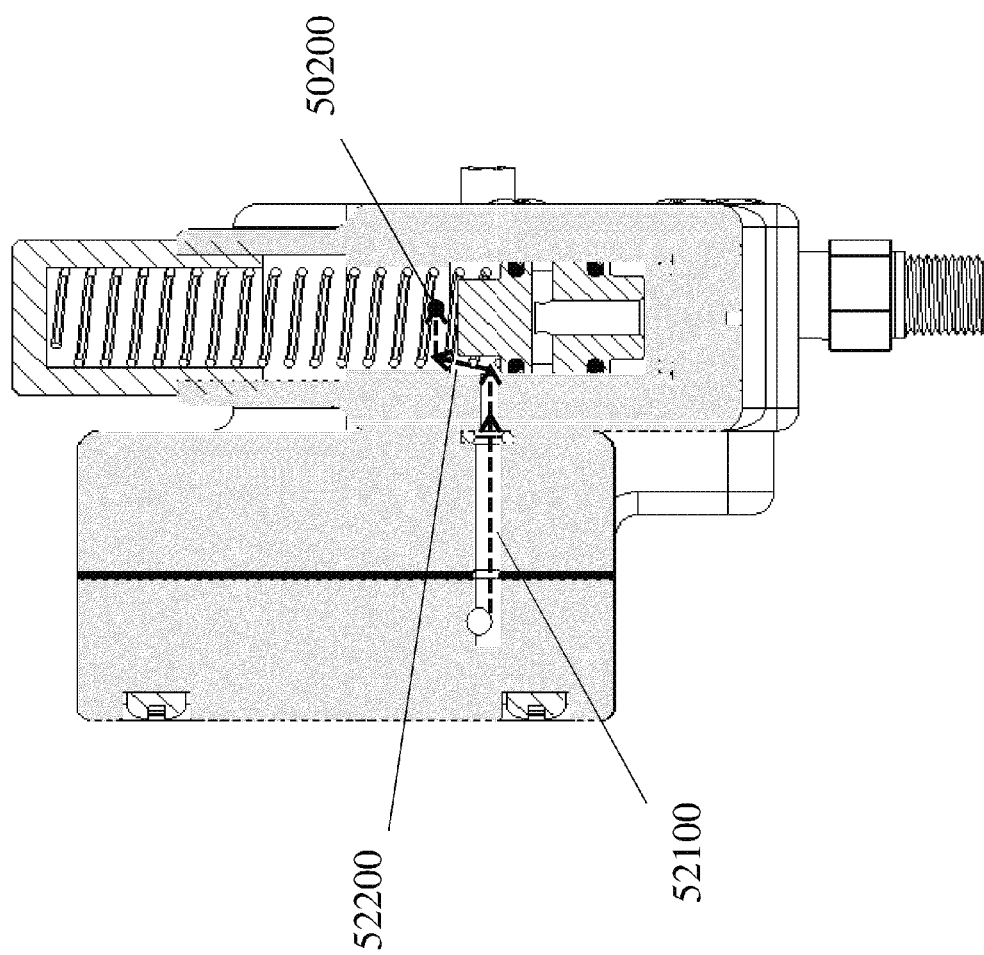
FIG. 52 depicts an internal view of certain components of an example fluid activated actuator.

FIG. 52 illustrates another cut-away, cross-sectional view of certain example components in the modified lockstep actuator 50000, where the actuator is rotated counter clockwise 90 degrees relative to its position as illustrated in FIG. 51. FIG. 52 further illustrates an example fluid channel 52100 leading from the actuator diaphragm chamber to the spool valve chamber 51300 and then to ambient outlet 50200 via the spool valve chamber 51300.

Figure 53:
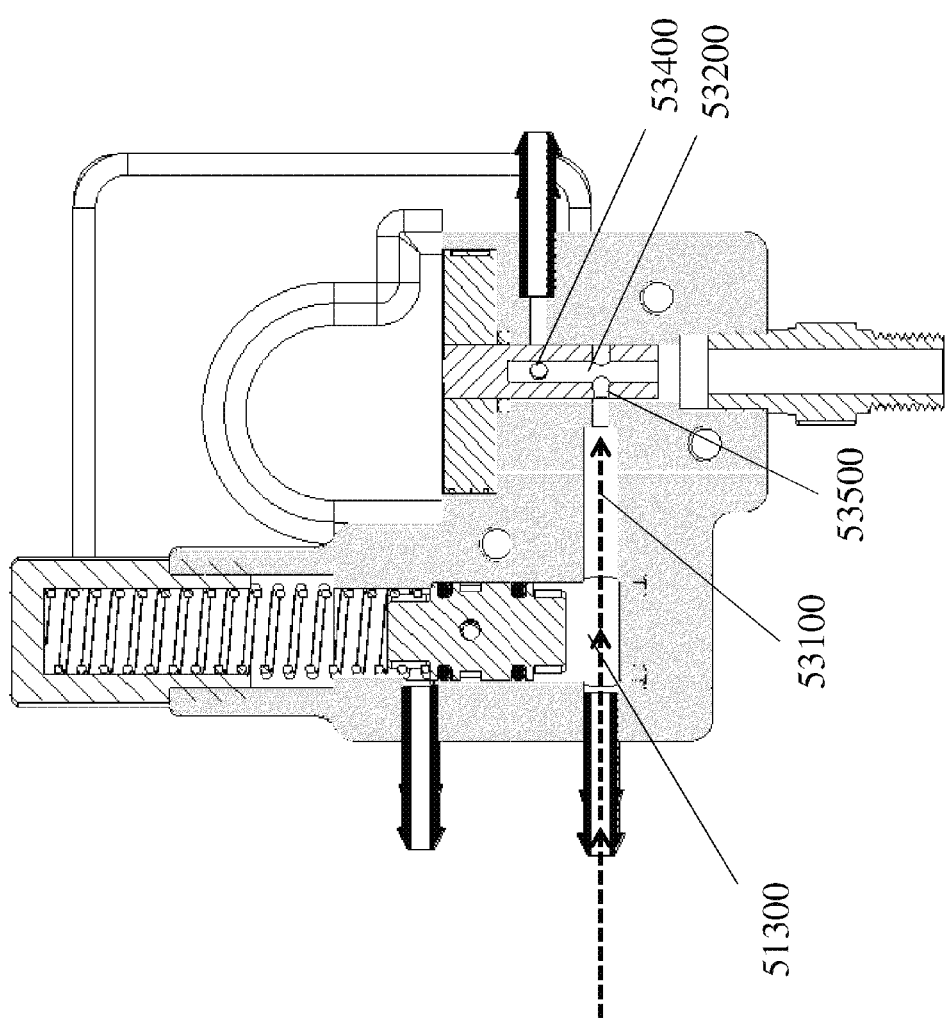
FIG. 53 depicts an internal view of certain components of an example fluid activated actuator.

FIG. 53 illustrates a cut-away, cross-sectional view of certain example components in the modified lockstep actuator 50000. In FIG. 53, the example spool valve/piston is in the retracted position, for example, in response to an increase in pressure. FIG. 53 further illustrates a fluid channel leading from the control fluid inlet 50100, through the spool valve chamber 51300, through a fluid channel 53100, through the port 53500, and to the pilot valve 53200.

Figure 54:
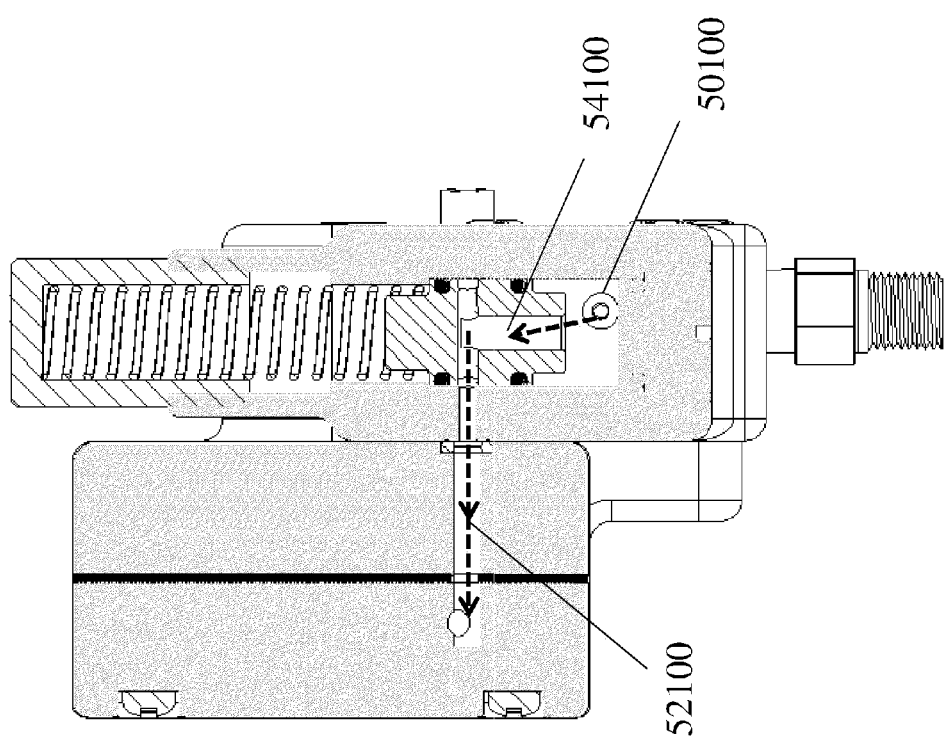
FIG. 54 depicts an internal view of certain components of an example fluid activated actuator.

FIG. 54 illustrates another cut-away, cross-sectional view of certain example components in the modified lockstep actuator 50000 where the actuator is rotated counter clockwise 90 degrees relative to its position as illustrated in FIG. 51 or FIG. 53. FIG. 54 further illustrates an example fluid channel leading from the control fluid inlet 50100, through the spool valve chamber 51300, through a fluid channel 54100 inside the spool valve/piston 51100, and to an interfacing fluid channel 52100, which leads to the actuator diaphragm chamber.

In an example embodiment, a pressure delta lockstep actuator 55100 receives fluid from a source via an inlet line 55200. Pressure, pressure changes, flow rate, and/or other parameters of the input fluid cause the lockstep actuator 55100 to activate or deactivate one or more output valves 31000. In an example embodiment, a change in pressure exceeding a threshold amount in the source line is sufficient to cause the actuator 55100 to transition the state of the output valve 31000, as described below. Thus, expansion or retrofit of an existing irrigation or other fluid delivery system is accomplished without the need for an additional fluid source, timing mechanism, and/or electrical power (e.g., voltage) at the valve 31000.

Figure 55:
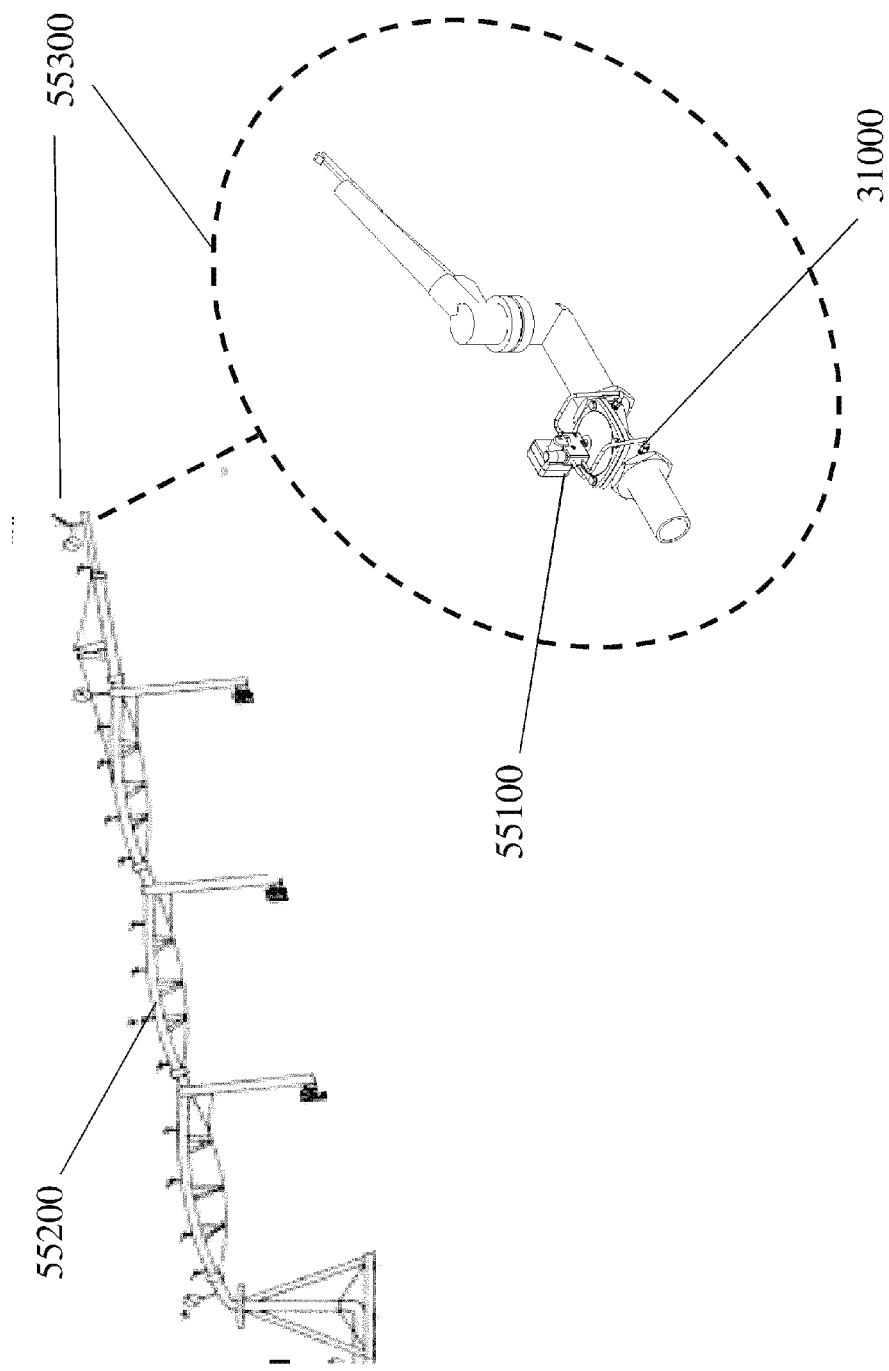
FIG. 55 depicts an example generalized arrangement for a fluid activated actuator.

In an example embodiment, a single pressure delta lockstep actuator 55100 regulates flow through a single output valve as illustrated in FIG. 55. However, it is appreciated that one or more lockstep actuators may be utilized to regulate one, two, three, four, five, six, or more output valves. In this example embodiment, the output valve drives an "end gun" sprinkler 55300 in a rotating center pivot system of sprinklers and valves. In the example operation below, the diaphragm valve 31000 is initially in the open state with the end gun on. Optionally, the pressure delta lockstep actuator replaces electrical solenoids in a conventional or unconventional solenoid controlled diaphragm valve, see also FIG. 20. Thus, certain embodiments optionally incorporate the low cost and simplicity of widely used diaphragm valves with embodiments of the fluid activated actuator devices disclosed herein.

In this example embodiment, the arrangement responds to a reduction in pressurized control fluid. Inlet control fluid is directed from the working fluid of the associated diaphragm valve 31000 via external port 31100 (see also FIG. 31) and enters the lockstep actuator via the inlet fluid passage 50100. In response to a reduction in fluid pressure at the control water inlet 50100, the tension spring force overcomes the reduced fluid pressure and the spool valve/piston travels in the direction of the spring force (e.g., downward with respect to the example embodiment illustrated in FIG. 51). Optionally, once the reduction in pressure exceeds a user configurable threshold, the spool valve/piston 51100 seats against the base of the spool valve chamber 51300, as illustrated in FIG. 51. With the spool valve/piston 51100 in the seated position and the spring 51500 in an extended position, a fluid passage is provided comprising: a fluid passage leading from the actuator diaphragm chamber 52100, a fluid passage between the spool valve/piston and chamber wall 52200, the spool valve chamber 51300, and the vent port 50200, see also FIGS. 50, 51, and 52. Fluid in the actuator diaphragm chamber exhausts to ambient through this fluid passage. Optionally, the venting of the diaphragm chamber resets or repositions the cog wheel as previously described above. When the fluid pressure is subsequently increased, the control fluid pressure applies a force to the spool valve/piston which exceeds the spring force, causing the spool valve/piston to travel in the direction opposed to the spring force (e.g., in the upward direction with respect to the embodiment illustrated in FIG. 53). As illustrated in FIG. 53, the spool valve/piston moves vertically until the center fluid channel 54100 of the spool valve/piston interfaces with the fluid passage leading to the actuator diaphragm chamber 52100. The vertical state change (upward in this example) in the spool valve/piston creates a first fluid passage comprising: the control fluid inlet 50100, the spool valve chamber 51300; the spool valve/piston center fluid channel 53200; and the fluid passage to the actuator diaphragm chamber 52100, see also FIG. 54. Control fluid enters the diaphragm chamber via the first fluid passage causing the actuator diaphragm to expand, the cog wheel to rotate (e.g., 90 degrees), and the interfacing pilot valve 53200 to rotate (e.g. 90 degrees). In this example, the pilot valve rotation aligns a first pilot valve fluid port 53500 with a fluid passage 53100 connected to the spool valve chamber 53300 and closes a second pilot valve fluid port 53400. Therefore, the vertical state change in the spool valve/piston coupled with the pilot valve rotation creates a second fluid passage defined by: the control fluid inlet 50100, the spool valve chamber 53300; the internal fluid passage 53100; the pilot valve port 53500, the pilot valve fluid passage 53200; the diaphragm valve interfacing port 50400, and the diaphragm valve port 34400. The control fluid flows through the second fluid passage (51000, 51300, 53100, 53500, 53200, 50400, and 34400) into the diaphragm valve causing the diaphragm valve to change state to a closed position. With the diaphragm valve in a closed position, the "end gun" sprinkler 55300 turns off.

Continuing the example above, the device responds again when there is a second reduction in pressurized control fluid. In response to the reduction in fluid pressure at the control water inlet 50100, the tension spring force overcomes the fluid pressure and the spool valve/piston travels in the direction of the spring force (e.g., downward in FIG. 51). Optionally, once the reduction in pressure exceeds the user configurable threshold the spool valve/piston 51100 seats against the base of the spool valve chamber 51300 as illustrated in FIG. 51. With the spool valve/piston 51100 in the seated position and the spring 50500 in the extended position, fluid in the actuator diaphragm chamber exhausts to ambient through the fluid passage comprising: a fluid passage leading from the actuator diaphragm chamber 52100, a fluid passage between the spool valve/piston and chamber wall 52200, the spool valve chamber 51300, and the vent port 50200, see also FIGS. 50, 51, and 52. Optionally, the venting of the diaphragm chamber resets the cog wheel as described above. When the inlet fluid pressure is increased, the control fluid pressure applies a force to the spool valve/piston which exceeds the spring force causing the spool valve/piston to travel in the direction opposed to the spring force (e.g., upward with respect to the embodiment illustrated in FIG. 53). As illustrated in FIG. 53, the spool valve/piston moves vertically until the center fluid channel of the spool valve/piston substantially interfaces with the fluid passage leading to the actuator diaphragm chamber 52100. The vertical state change (upward in this example) in the spool valve/piston creates a first fluid passage comprising: the control fluid inlet 50100, the spool valve chamber 51300, the spool valve/piston center fluid channel 54100, and the passage connecting to the actuator diaphragm chamber 52100. Control fluid enters the diaphragm chamber via the first fluid passage causing the actuator diaphragm to expand, the cog wheel to rotate (e.g., 90 degrees), and the pilot valve 53200 to rotate (e.g. 90 degrees). In this example, the pilot valve rotation closes the pilot valve fluid port 53500 with the interfacing fluid passage 53100 and opens through a second pilot valve port 53400 a third fluid passage. The third fluid passage is defined by: the associated diaphragm valve port 34400, the diaphragm valve interfacing port 50400, the pilot valve 53200, the pilot valve port 50400, and bleed port 50300. The fluid in the diaphragm valve chamber exhausts through the third fluid passage causing the diaphragm valve to change state to an open position. With the diaphragm valve in an open position, the "end gun" sprinkler 55300 turns on Optionally, the spring valve/piston is configured to enable associated valve state transitions in response to an increase in fluid pressure from a baseline. For example, an increase in pressure from a baseline (e.g., 0 PSI or 30 PSI) causes the spool valve/piston to advance, opening a fluid passage to expand the actuator diaphragm as described above. In an example embodiment, the diaphragm expansion causes the pilot valve to rotate resulting in an associated valve state transition as described above. A reduction in pressure back to the baseline resets the cog wheel.

Advantageously, the diaphragm valve control device described above operates in both a fluid pressure on/off environment and a fluid pressure delta (e.g., up/down or down/up) environment.

Mechanical Timing Device

There are operating environments in which a number of valves and associated sprinklers and/or sprinkler systems connect to a very high pressure and flow rate master fluid line {do you have example pressures and flow rate ranges?}. In addition, these valves may be distributed over a broad geographic area. In these high fluid pressure environments, rapid valve state changes, off or on, can result in water hammer, significantly reducing the life of the pipes and associated components (e.g., valves). Although not as common, water hammer can also occur in low pressure environments in response to sudden valve state changes, for example, when you have a large mass of water. Certain embodiments address such issues by providing an operating environment with tunable, orderly, and predictable gradual diaphragm valve state transitions.

With respect to the foregoing issues, in an example embodiment a fluid control device can be configured or integrated with a timing device (which is optionally purely mechanical) which delays the onset of a state change from a first position (e.g., open) to a second position (e.g., closed) while the same device only negligibly delays the state change in the opposite direction.

Figure 56:
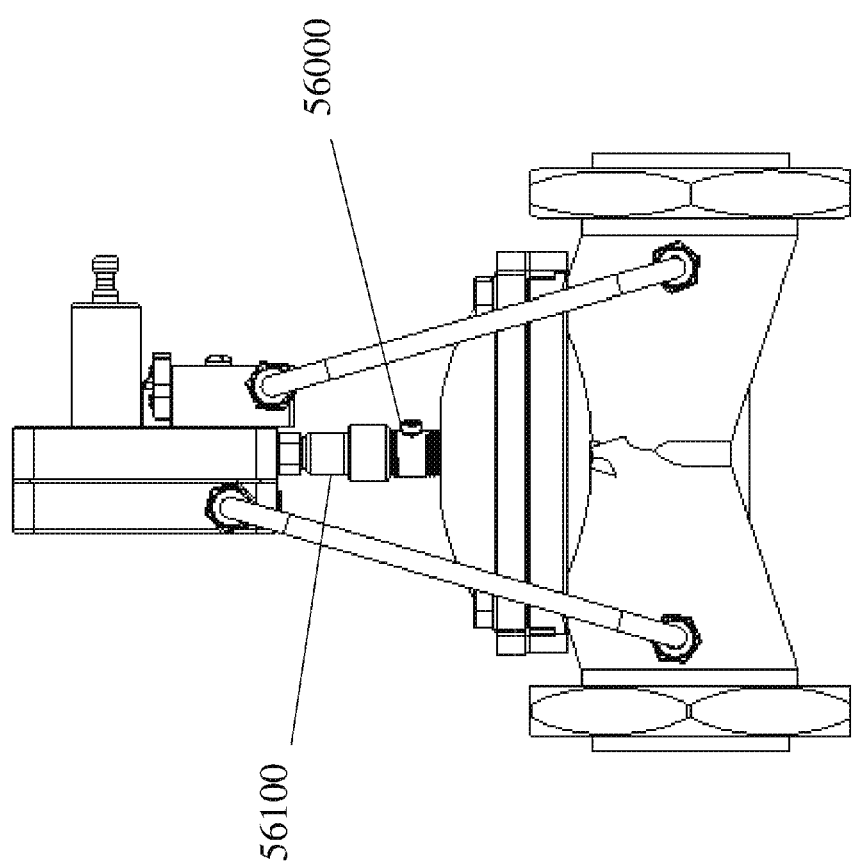
FIG. 56 depicts an example embodiment of a fluid activated actuator interfacing to an example embodiment timing device and a conventional diaphragm valve.

In an example embodiment, a timing device (e.g., mechanical timing device) is optionally configured with male threads at both ends enabling the timing device to be threadedly inserted into a solenoid mount position of a diaphragm valve (e.g., a conventional diaphragm valve) on one end and threadedly inserted into a receiving area of an actuator on the other end. Optionally, the mechanical timing device is configured with a male threaded end to be threadedly inserted into a solenoid position and the other end is capable of receiving a threaded male actuator. Optionally, coupling mechanisms can be used to connect mail ends to female ends and vice versa. Optionally, when the mechanical timing device is threaded into the solenoid mount position of a diaphragm valve (e.g., a conventional diaphragm valve), one or more fluid channels are formed in which fluid can pass bi-directionally between the timing device and diaphragm valve. Similarly, when the mechanical timing device is threaded into the actuator mount position, one or more fluid channels are formed in which fluid can pass bi-directionally between the timing device and actuator. FIG. 56 illustrates an example installation of the mechanical timing device in a diaphragm valve (e.g., a conventional diaphragm valve). The installed mechanical timing device 56000 provides a union between the actuator device and the associated conventional diaphragm valve. Optionally an interface coupler 56100 is used to enable a connection from a male threaded timing device and male threaded actuator. Optionally, the mechanical timing device is physically integrated into the housing of the actuator device or the diaphragm valve itself. Optionally, one or more gaskets and/or separate adaptors are used to interface the mechanical timing device into the actuator/solenoid mount position. Optionally, an adaptor can be used to change the dimensions of the receiving actuator/solenoid mount position (e.g., ¾" thread to ½" thread), to change the thread direction (e.g., counter clockwise or clockwise), etc. It is appreciated that the coupling of the mechanical timing device with the receiving actuator/solenoid mount position can be accomplished in a number of different embodiments and a person having ordinary skill in the art recognizes that enablement of this coupling is not limited to those examples above. Optionally, no gaskets and/or adaptors are required to interface the mechanical timing device assembly into the actuator/solenoid mount position. Optionally, one or more mechanical timing device assemblies are each separately designed to interface within the actuator/solenoid mount position of different output valves without the use of adaptors. Optionally, no machining of the pre-existing diagraph valve is required for the retrofit.

Figure 57:
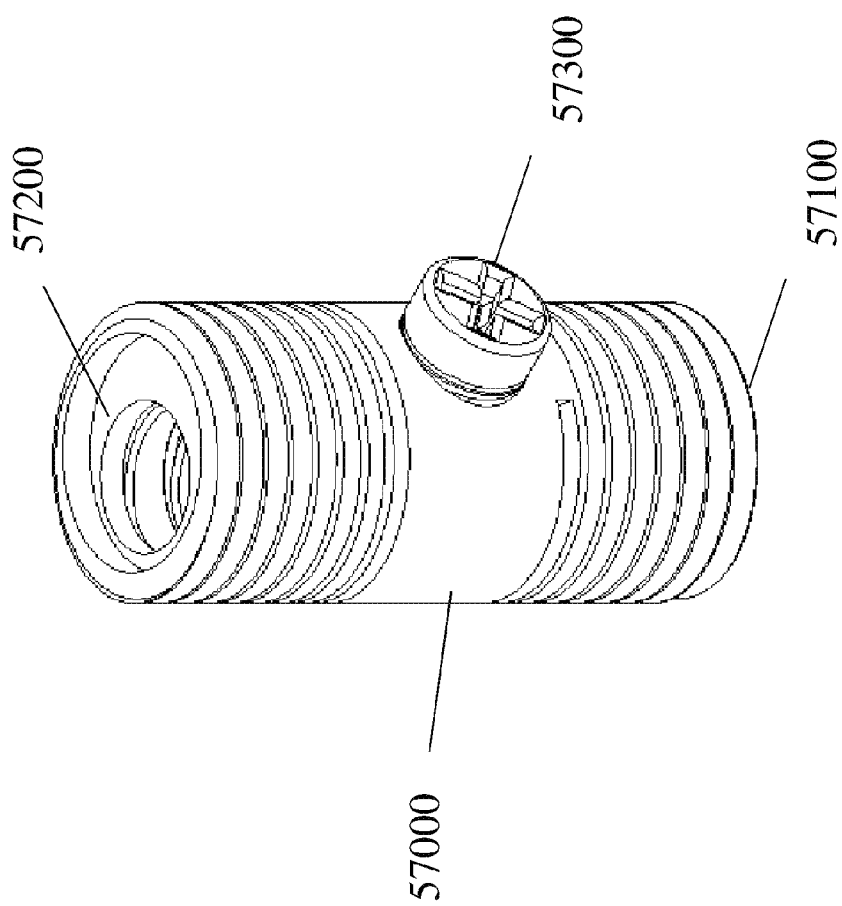
FIG. 57 depicts an external view of an example embodiment of a fluid timing device.

Optionally, the mechanical timing device includes two ports 57100 and 57200 (or additional ports) and a flow rate control mechanism (e.g., control screw 57300) to set the desired flow rate and related valve actuation timing, as illustrated in FIG. 57.

Figure 58:
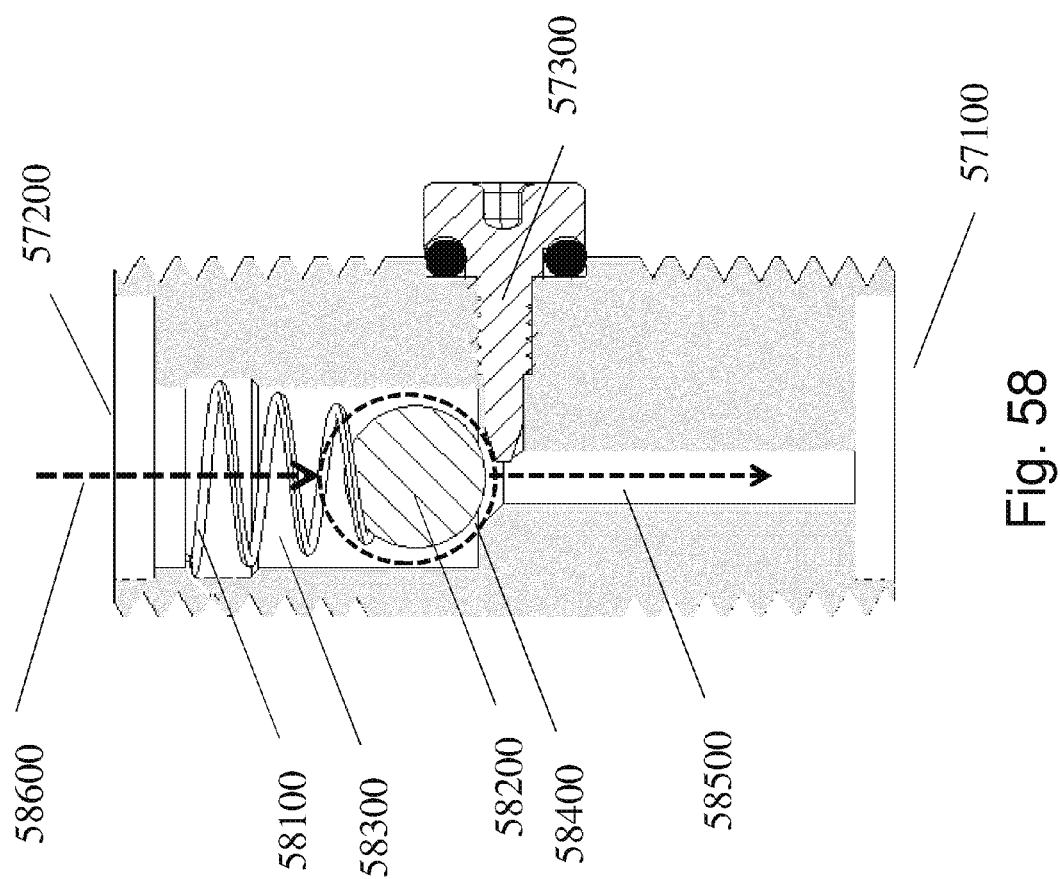
FIG. 58 depicts an internal view of certain the components of an example embodiment of a fluid timing device.

FIG. 58 illustrates a cut-away, cross-sectional view of an example mechanical timing device. The mechanical timing device includes a motivation element (e.g., spring 58100) and a sealing mechanism (e.g., ball 58200) within a chamber 58300. The chamber optionally includes a first port 57200 and second port 57100. Optionally, the first port 57200 is open to an associated actuator. Optionally, the second port 57100 is open to an associated conventional diaphragm valve. The example mechanical timing device includes a control screw 57300 which optionally interfaces with the chamber 58300 and, depending upon the direction of fluid flow, also with the ball 58200. Optionally, the control screw 57300 can be screwed inward with a clockwise rotation and screwed outwardly with a counter-clockwise rotation. Optionally, as the control screw 57300 is screwed inward, the tip of the screw lifts the ball away from a fluid passage 58500 enabling an increase in fluid flow from the chamber 58300 into the fluid passage 58500. Conversely, as the control screw 57300 is screwed outward, the ball (in conjunction with the spring force) restricts the fluid flow from the chamber 58300 into the fluid passage 58500. Optionally, the chamber 58300 includes one or more additional ports (not illustrated in the figure) connecting the chamber 58300 with the fluid passage 58500. Optionally, these additional ports are not restricted by the ball 58200.

In an example embodiment of a mechanical timing device, the mechanical timing device is incorporated into an actuator and diaphragm valve system in order to slow the valve's state change from open to close, thus, mitigating the potential for water hammer. In the example embodiment described below, the timing device 56000 is installed as illustrated in FIG. 56.

The device responds when pressurized control fluid is directed into the port 57200 from the associated actuator. Fluid traveling from the actuator to the associated diaphragm valve travels in the direction of the arrow 58600 or, in this example, in a southerly direction. When the fluid flows in the direction of the diaphragm valve, the fluid pressure applied to the ball 58200 coupled with the spring force causes the ball 58100 to partially restrict the fluid passage 58400 between the chamber wall 58300 and the ball 58200. Adjustments to the interfacing screw enable the user to change the size of the fluid passage 58400. As previously described above, a pressurized fluid flow into the associated diaphragm valve chamber will cause a closure of the valve. Thus, the restricted flow enabled by the timing device slows the closure of the diaphragm valve and mitigates the potential for water hammer. When an open fluid passage is enabled through the actuator, the fluid direction reverses and fluid travels in the direction opposite of 58600 or, in this example, in an upward direction 59200. When the fluid flows in the direction of the actuator, the fluid pressure applied to the ball causes the ball 58200 to move away from the chamber wall 58300 and consequently, increases the size of the fluid passage 59100. Fluid exiting the associated diaphragm chamber causes, at least in part, the diaphragm valve to open as discussed above. Therefore, in this example embodiment, the inclusion of the mechanical timing device causes the diaphragm valve to transition to a closed position at a rate slower than the transition to an open state.

In another example embodiment, the mechanical timing device can be installed in an inverted position (that is, inverted relative to the position described above). The operation is similar to that described above except in an inverted position the timing device causes the associated diaphragm valve to actuate to a closed position at a normal rate and an open position at a slower than normal rate (e.g., restricted fluid flow exiting the diaphragm chamber). Advantageously, the timing device may be configured in the inverted position in low pressure environments in which it is desirable to quickly shutoff a valve set and use the additional pressure to open a second set of valves.

Figure 62:
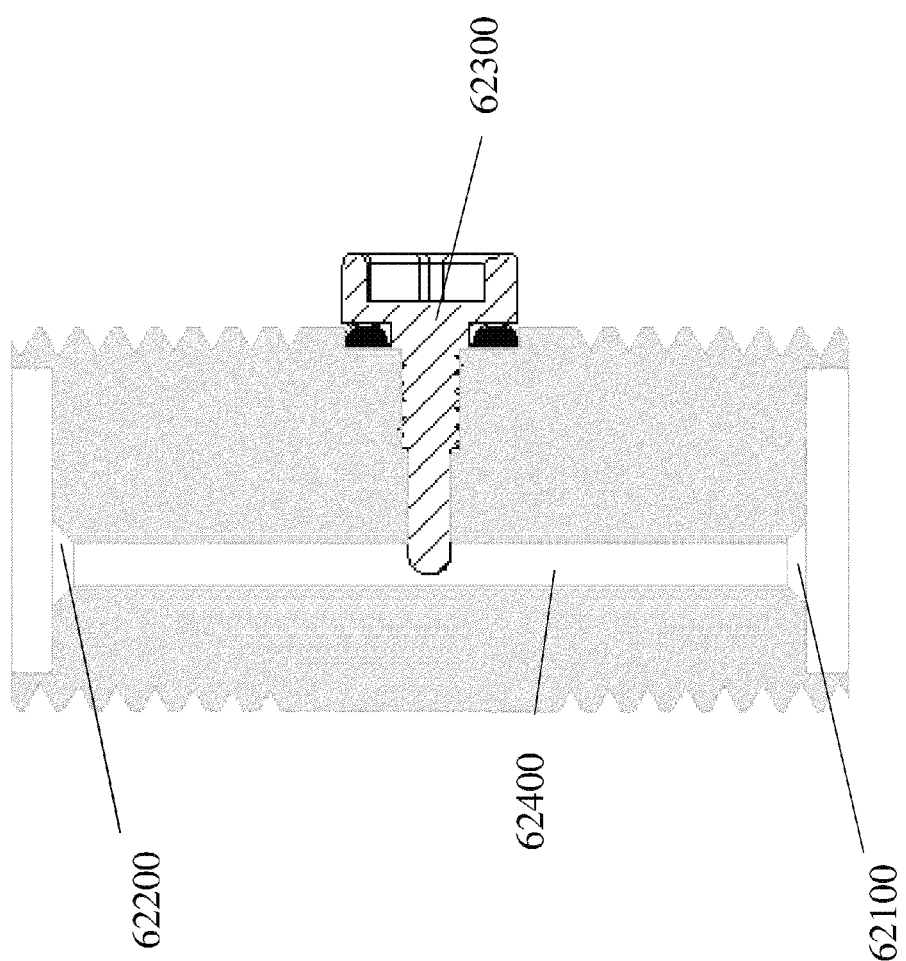
FIG. 62 depicts an internal view of certain components of an example embodiment of a fluid timing device.

FIG. 62 illustrates a cut-away, cross-sectional view of another example mechanical timing device. The mechanical timing device of FIG. 62 restricts flow bi-directionally. The mechanical timing device includes two ports 62100 and 62200 and a flow control mechanism (e.g., screw 62300) to set the desired flow rate and related valve actuation timing.

Optionally, a first port 62200 is open to an associated actuator. Optionally, a second port 62100 is open to an associated diaphragm valve (e.g., a conventional diaphragm valve). The mechanical timing device includes a control screw 62300 which optionally interfaces with a fluid passage 62400. Optionally, the control screw 62400 can be screwed inward with a clockwise rotation and screwed outwardly with a counter-clockwise rotation. Optionally, as the control screw 62400 is screwed inward the fluid passage is restricted and the flow rate is reduced. Conversely, as the control screw 57300 is screwed outward, the fluid passage is increased and the fluid flow rate is increased. As previously described above, a restricted flow slows the associated diaphragm valve state transition which can, for example, mitigate water hammer.

Precision Dome

Figure 60:
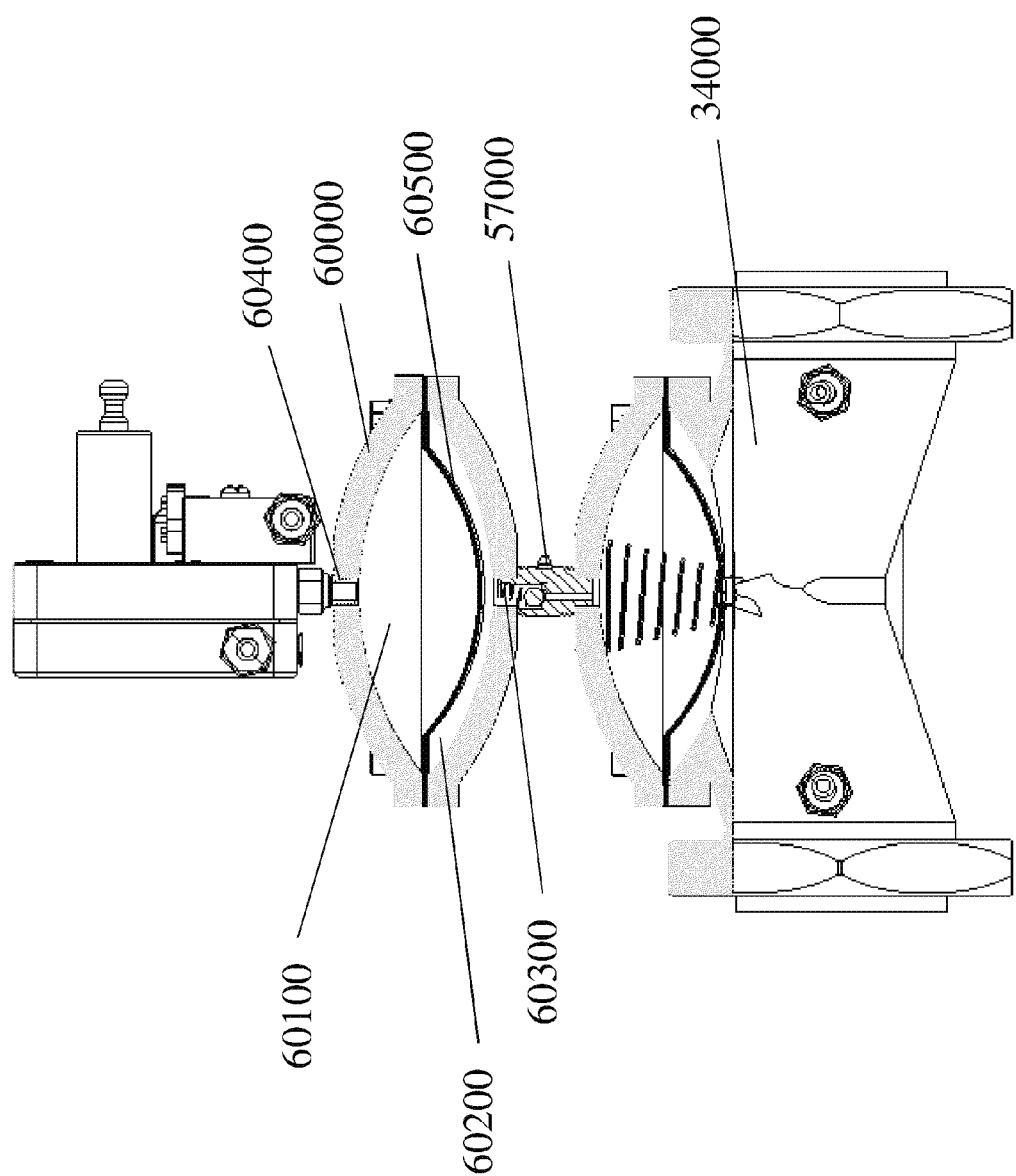
FIG. 60 depicts an internal view of certain components of an example embodiment of a precision dome device interfacing with an example embodiment of a fluid timing device and a conventional diaphragm valve.
Figure 61:
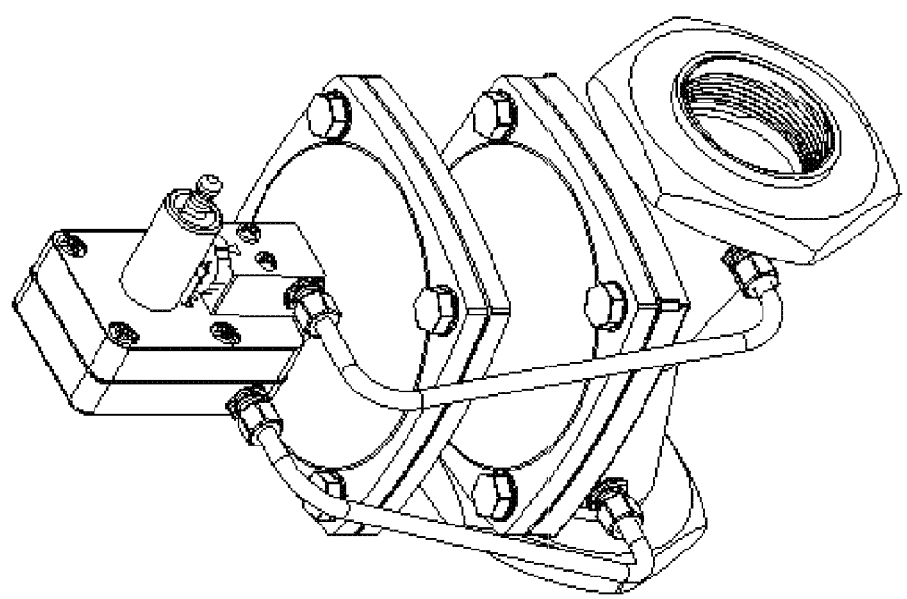
FIG. 61 depicts an example generalized arrangement for an example embodiment of a precision dome device.

In another example embodiment, the mechanical timing device operation described above can be further improved by the inclusion of a precision dome, an example embodiment of which is illustrated in FIG. 60. The mechanical timing device described above, because of the restricted passage, is subject to clogging in dirty or contaminated working fluid environments. Thus, there is a need to improve the robustness of actuator control mechanisms (including for example, solenoid-based actuators) and mechanical timing devices if the control fluid includes particulates which may clog one or more fluid passages and/or ports.

With respect to these needs, in an example embodiment a fluid control device can be configured or integrated with a precision dome which isolates control fluid from contaminated fluids. In addition, the precision dome enables the actuator and associated diaphragm system to reliably perform slower state changes than those described above.

In an example embodiment as illustrated in FIG. 60, a precision dome includes separate fluid chambers 60100 and 60200, a flexible diaphragm 60500, a threaded timing device port 60300, a threaded actuator port 60400, and an optional fluid input port (not shown in FIG. 60). FIG. 60 also illustrates an example installation of the mechanical timing device 57000 in association with a conventional diaphragm valve. A mechanical timing device 57000 is threadedly inserted into a solenoid mount position of a conventional diaphragm valve on one end and threadedly inserted into the precision dome on the other end (the upper end of the embodiment illustrated in FIG. 60). The mechanical timing device 57000, as previously described, provides a fluid channel between the precision dome 60000 and associated diaphragm valve 34000. Optionally a fluid pressure controlled actuator or solenoid-based actuator is threadedly inserted into a mount position 60400 of the precision dome. Optionally, the precision dome is user or professionally assembled from off-the-shelf diaphragm valve parts. Optionally, the chamber 60200 interfacing with the diaphragm valve includes a sealable input port (not illustrated in the figure). Optionally, a user or professional can fill or inject a clean fluid into the sealed chamber. Optionally, the fluid injected into the sealed chamber is a pure, low viscosity fluid such as low viscosity synthetic motor oil. Optionally other fluids can be used including, for example, distilled water, purified water, alcohol, etc. Optionally and advantageously, the precision dome structure is dome shaped in the embodiment described in order to assemble the device using off-the-shelf diaphragm valve parts. However, any suitable type/shape chamber can be used including for example a square chamber, circular chamber, rectangular chamber, irregularly shaped chamber, etc.

In an example embodiment of a precision dome, the precision dome is included in an actuator and diaphragm valve system in order to slow the valve's state change from open to close, thus, mitigating the potential for water hammer. In the example embodiment described below, the precision dome is installed as illustrated in FIG. 60.

The device functions when pressurized control fluid is directed into the actuator facing chamber 60100. The pressurized control fluid depresses the diaphragm downward forcing the clean fluid in the lower chamber 60200 through the timing device into the diaphragm valve chamber causing the valve to transition to a closed state. Advantageously, the fluid flowing between the precision dome and diaphragm valve is a clean fluid isolated from the control fluid and main line fluid and therefore the flow rate can be controlled with a higher degree of precision and without clogging, see also timing description above.

Continuing with the example embodiment, if the actuator port 60400 is opened, the fluid in the upper chamber 60100 exhausts from the chamber through the actuator and the fluid in the diaphragm valve exhausts into the lower chamber 60200 enabling the diaphragm valve 34000 to open. Advantageously, the working fluid entering the diaphragm valve and actuator can be dirty fluid because the fluid passages and ports can be configured large enough to tolerate the dirty fluid. Thus, the actuator diaphragm configuration illustrated above can be installed in various environments including those environments in which the working fluid is dirty and/or contaminated and water hammer can still be mitigated.

Viscous Dampening

Figure 65:
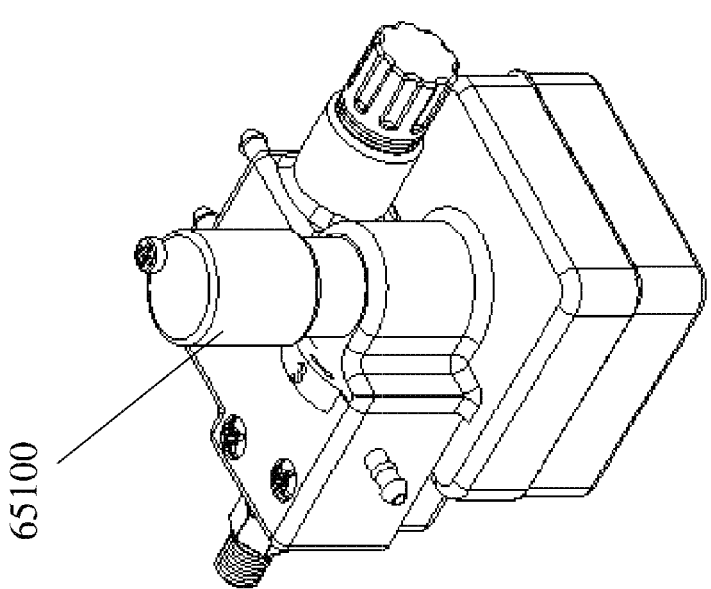
FIG. 65 depicts an example embodiment of a fluid activated actuator with an installed dampening unit.

In another example embodiment, the fluid regulating devices described above can optionally include a viscous dampening unit 65100, an example embodiment of which is illustrated in FIG. 65. The pressure controlled regulators illustrated above optionally are utilized in fluid environments that may be subject to random and periodic pressure spikes. These inadvertent or unintended rapid changes in pressure, generally a change in pressure of short duration (e.g., less than about a second), create a noisy environment and in some cases it is difficult to separate the fluid communicated signal (e.g., an intentional pressure change) from the fluid communicated noise (e.g., an unintended pressure change). Thus, there is a need to provide a pressure controlled actuator mechanism that is resistant to or impervious to unintended pressure changes.

To address the noise issue presented by changes in pressure that are not intended to communicate signal information to the fluid control device, in an example embodiment the fluid control device can optionally include a viscous dampening unit which retards the expansion of the actuator's diaphragm and associated push plate. In this example embodiment, retarding or slowing the expansion of the actuator eliminates and/or reduces unintended pressure changes (e.g., a pressure spike) from causing a state change (e.g., open to close) in the associated diaphragm output valve. Optionally, the dampening unit is designed to retard the expansion of the diaphragm of the actuator but to have minimal to no dampening effect on the retraction of the diaphragm, thus for example, not delaying the reset of the cog wheel spring mechanism discussed herein or its equivalent.

Figure 63:
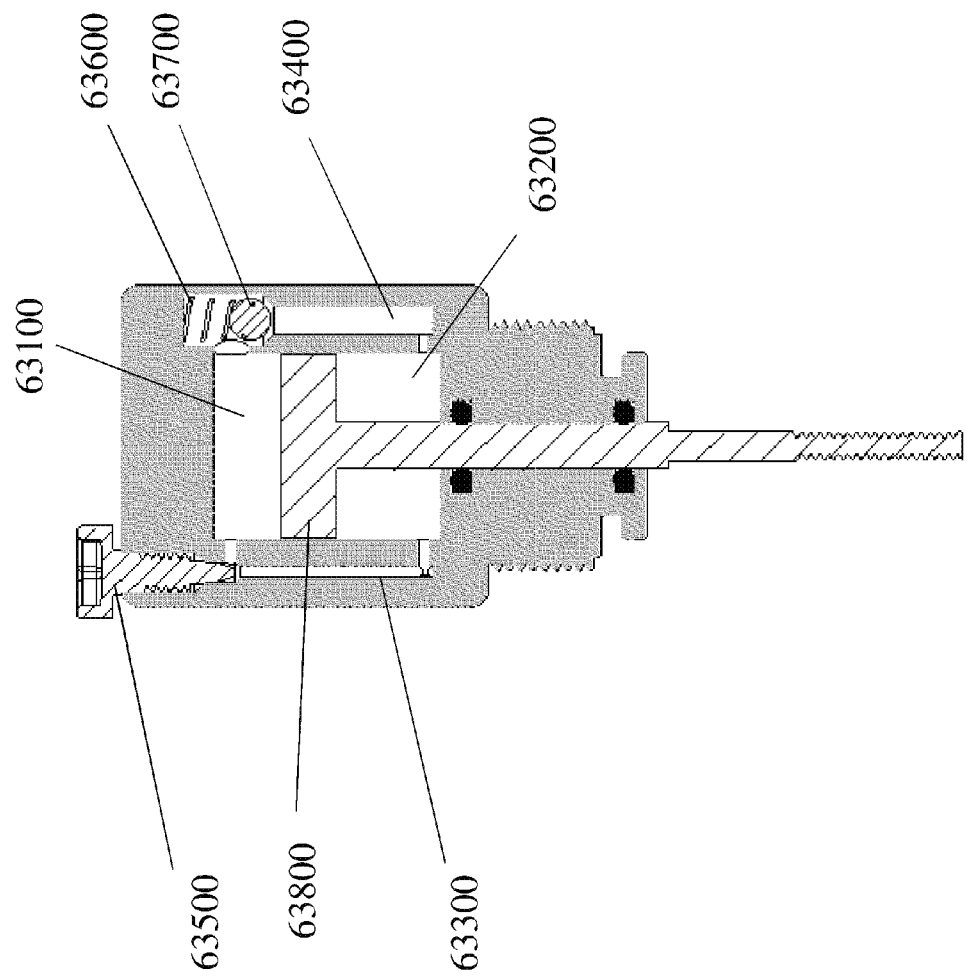
FIG. 63 depicts an internal view of certain components of an example embodiment of a viscous dampening device.
Figure 64:
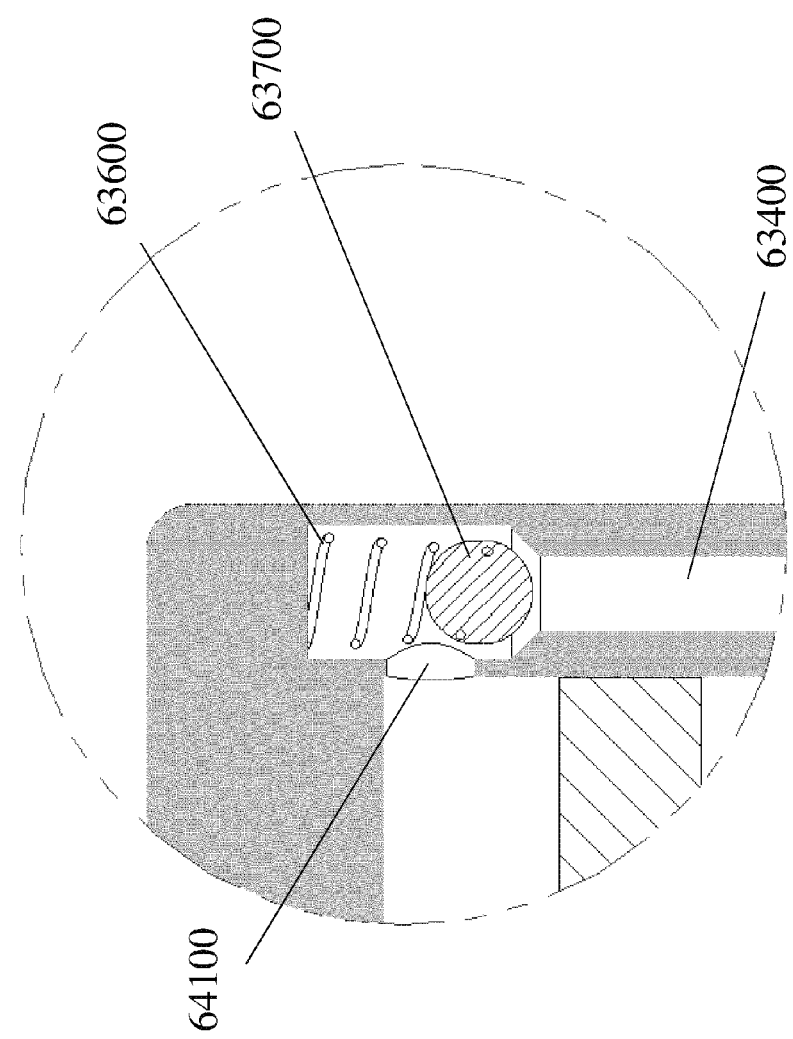
FIG. 64 depicts an exploded view of a mechanism within a fluid passage of an example embodiment of a viscous dampening device.
Figure 66:
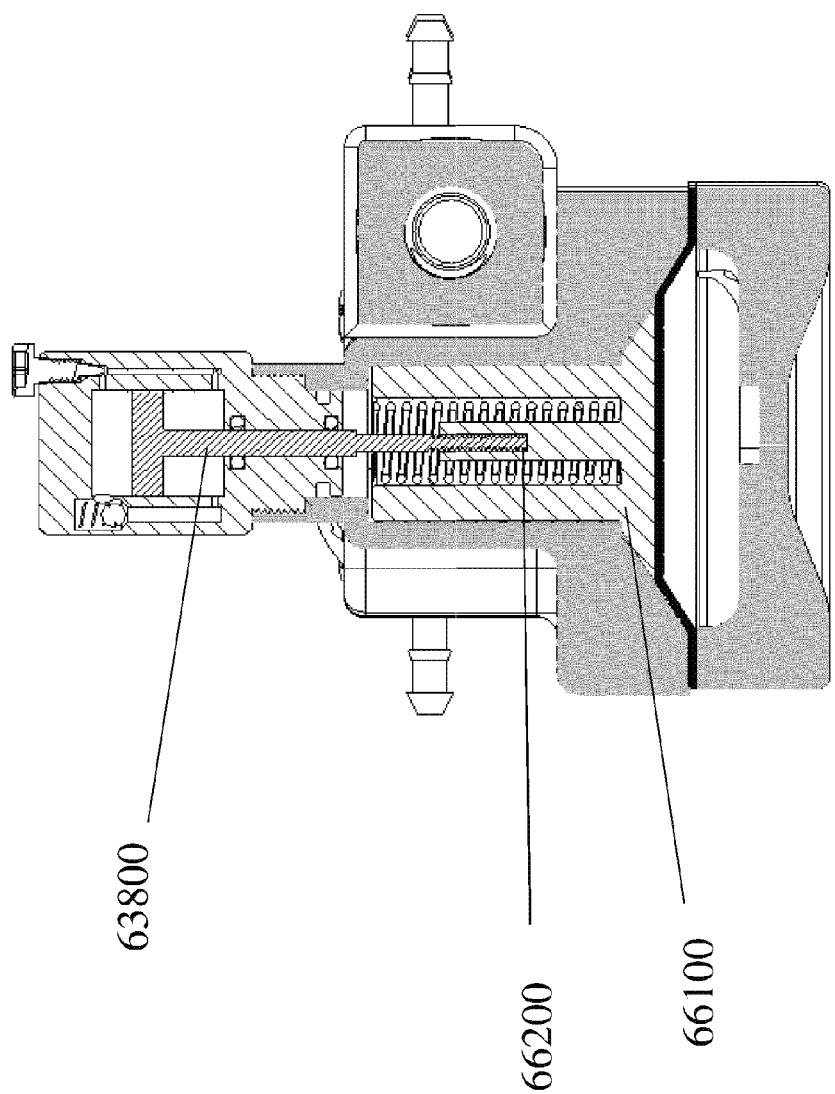
FIG. 66 depicts an internal view of certain components of an example embodiment of a viscous dampening device and fluid activated actuator.
Figure 67:
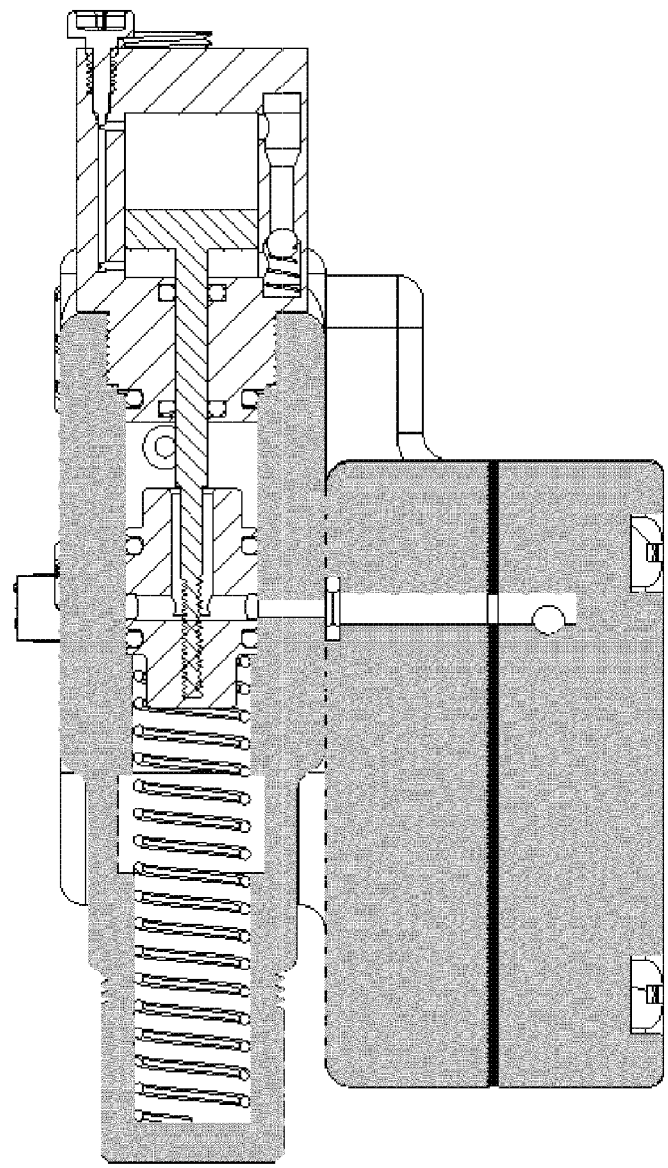
FIG. 67 depicts an internal view of certain components of an example embodiment of a viscous dampening device and fluid activated actuator.

A cutaway view of an example embodiment is illustrated in FIG. 63, a viscous dampening unit includes separate fluid chambers 63100 and 63200 that are connected via a relatively narrow internal fluid passage 63300 and an internal fluid passage 63400. Optionally, the fluid chambers and passages form a closed system. Optionally, the fluid chambers are filled with a viscous fluid including for example, distilled water, purified water, alcohol, etc. Optionally, a needle valve 63500 interfaces with the narrow internal fluid passage 63300. Optionally, if the needle valve 63500 is turned (e.g., clockwise, for example) by a user, the interfacing edge of the needle valve further narrows the internal passage. Optionally, narrowing the passage increases the dampening action of the unit as will be further described below. Optionally, other mechanisms can be used to restrict the flow of fluid through the narrow internal fluid passage 63300 including, for example, a fluid passage including a plurality of ports that can be manually configured to close thereby restricting the flow rate. Optionally, the internal fluid passage 63200 includes a motivation element (e.g., spring 63600) and a sealing element (e.g., ball 63700). Optionally, the sealing element moves against the spring in response to fluid pressure (e.g., upward in FIG. 64) to increase the fluid flow through the passage and into the chamber via port 64100. Optionally, a plunger 63800 separates the first fluid chamber 63100 from the second fluid chamber 63200. Optionally, the plunger 63800 can travel within the chamber, for example in an upward stroke, in response to a force (e.g., push force) applied to the plunger in an upward direction. Optionally, the plunger 63800 can travel within the chamber, for example in a downward stroke, in response to a force (e.g., pull) applied to the plunger in a downward direction. Optionally, the end of the plunger 63800 is attached to the push plate associated with the actuator's flexible diaphragm as illustrated in FIG. 66. For example, the plunger may be adhesively or otherwise joined to the push plate at a point 66200 where the plunger contacts the push plate. Optionally, in an example embodiment, the viscous dampener unit replaces the manual control knob 24400 in the lockstep actuator described above. Optionally, in an example embodiment, the viscous dampener unit replaces the manual pressure head adjustment bushing 32820 in the lockstep actuator described above. Optionally, in an example embodiment, the viscous dampener unit replaces the manual setting knob (e.g., 48800) in the lockstep actuator described above. Optionally, in an example embodiment, the viscous dampener unit replaces an adjustment knob (e.g., 50500) in the actuator described above. Optionally, in an example embodiment, the viscous dampener unit is integral with the pressure delta feature of the lockstep actuators described above as illustrated in FIG. 67. In this example embodiment, the viscous dampener unit retards or delays the spool valve/piston (e.g., spool valve/piston 51100) movement in response to inlet control fluid.

In an example embodiment of a dampening unit, the dampening unit is attached to or is integral to an actuator and diaphragm valve system in order to mitigate inadvertent pressure changes (e.g., pressure drop and/or pressure increase spikes). In the example embodiment described below, the dampening unit is installed as illustrated in FIG. 66. In this example embodiment, the plunger 63800 is attached to the diaphragm push plate 66100. To simplify the description below, the operation of the dampening unit is described with respect to the FIG. 63 in which the unit is mounted in an upright position. However, the dampening unit can be mounted and/or operate in any position including for example, relative to FIG. 63 upside down, horizontal, angled, etc.

The device functions when the diaphragm push plate moves upward in response to an expansion of the actuator's diaphragm. The pressure On stroke or upward stroke exerts a force on the viscous fluid in the chamber 63100. In this example embodiment, the fluid exits the chamber through the narrow internal passage 63300. The fluid pressure created from the plunger action together with the tension spring

63600 seals the internal fluid passage 63400, preventing fluid from exiting the chamber 63100 via this passage. Therefore, in this example embodiment, fluid exits the chamber 63100 via the narrow internal passage 63300. Optionally, the dimension of the passage 63300 is user configured by the needle valve 63500. Optionally, the passage 63300 is narrowed by a rotation (e.g., a clockwise rotation) of the needle valve 63500. Optionally, the passage 63300 is widened by a counter rotation of the needle valve 63500. The narrower the passage 63300, the more fluid resistance that results when fluid exits the chamber 63100. Conversely, widening the passage 63300 creates less fluid resistance in the chamber 63100. Thus, the effect of the viscous dampening unit is to slow or delay the actuator's diaphragm expansion, preventing short duration pressure variations, which may occur in the inlet fluid pressure system, from causing a state change (e.g., open to closed) in the actuator/associated output valve. The clean isolated fluid within the dampening unit and the high thread count of the needle valve enables precise user control of the diaphragm expansion and associated push plate movement.

Continuing with the example embodiment, while it is advantageous to slow or delay the push plate action in response to a pressure On stroke, it optionally is advantageous to not or minimally slow or delay the pressure Off stroke or downward movement of the plunger. The device functions when the diaphragm push plate moves downward in response to a retraction of the actuator's diaphragm. The pressure Off stroke or downward stroke exerts a force on the viscous fluid in the chamber 63200. In this example embodiment, the fluid exits the chamber through both internal passages 63300 and 63400. The fluid pressure created from the plunger action overcomes the spring 64200 tension unseating the obstructing element 63700 enabling the fluid to flow around the element 63700 and into the chamber 63100. The open passage 63400 reduces the resistance of the fluid in the chamber 63200 and enabling a quick return stroke.

Optionally, the viscous dampening unit can be designed to dampen the Off stroke with minimal change to the On stroke. In an example embodiment, by positioning the placement of the obstructing element 63700 at the lower end of the passage 63400, the force of the fluid exiting the chamber 63200 in response to a down stroke (or pressure Off) and/or a spring 63600 tension force causing the obstructing element 63700 to obstruct the passage 63400. Optionally, the force of the fluid exiting the chamber 63100 in response to an up stroke (or pressure On) overcomes the spring 63600 tension unseating the obstructing element 63700, enabling the fluid to flow around the obstructing element 63700 and into the chamber 63200. Therefore, the open passage 63400 reduces the resistance of the fluid in the chamber 63100, enabling a quick pressure On stroke.

Optionally, the precision dome assembly described above can alternatively or in addition be used to manage noisy/fluid pressure fluctuating environments. A precision dome assembly, for example a precision dome assembly such as that illustrated in FIG. 60, and a timing device, for example a timing device 57000 such as that illustrated in FIG. 57 can be fluidly installed between the upstream actuator supply tube and the actuator diaphragm fluid chamber. This will delay the actuator's diaphragm motion and associated cog wheel rotation sufficiently to prevent short duration pressure variations from causing an output valve state change.

Over Pressure Cutoff Device

Figure 68:
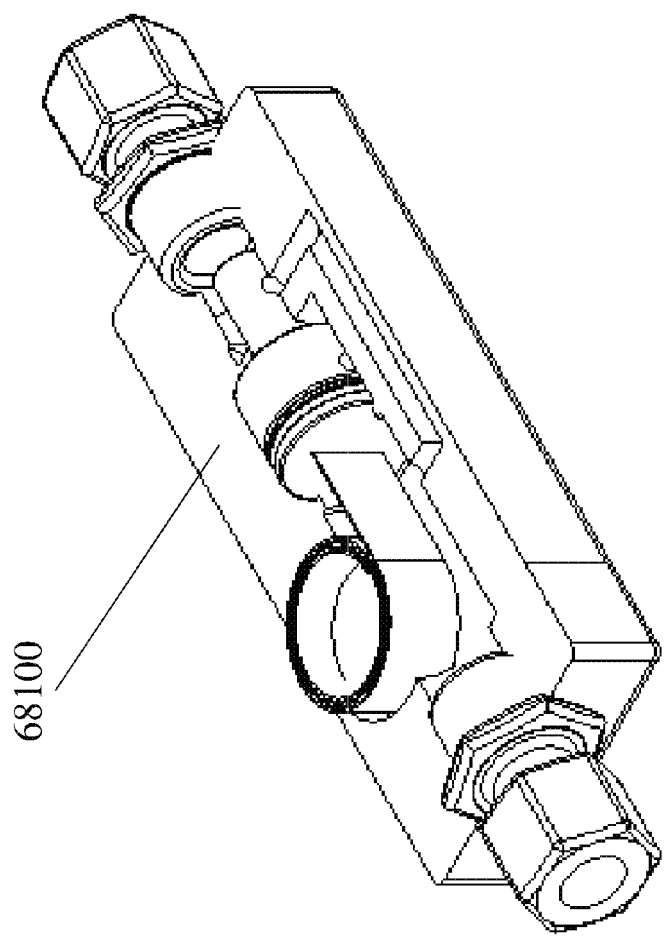
FIG. 68 depicts an internal view of an example embodiment of an over pressure cutoff device.

In another example embodiment, the pressure controlled regulators described above include an over pressure cutoff device 68100, an example embodiment of which is illustrated in FIG. 68. The pressure controlled regulators illustrated above optionally are utilized in fluid environments subject to random and periodic pressure spikes and/or input pressure which may exceed the operating parameters of the regulators. Thus, there is a need to provide a pressure controlled actuator mechanism that is robust to unexpected high pressure surges, or pressure surges that exceed the operation parameters of the regulators.

Figure 70:
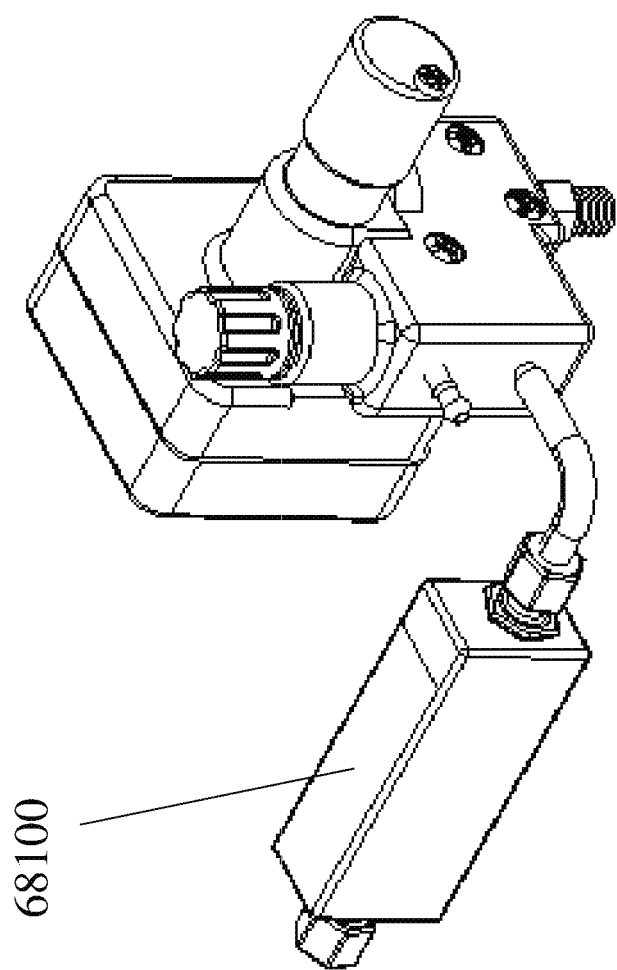
FIG. 70 depicts an example embodiment of an installation of an over pressure cutoff device.

In an example embodiment a fluid control device can optionally include an over pressure cutoff device 68100 which is spliced or otherwise inserted into the fluid control device's control inlet flow as illustrated in FIG. 70. Optionally, for example, the over pressure cutoff device is spliced into the fluid control line 31100 (see FIG. 31). In this example embodiment, the over pressure cutoff device blocks the fluid inlet flow into the fluid control device if the inlet pressure exceeds a specified and/or configurable threshold.

Figure 69:
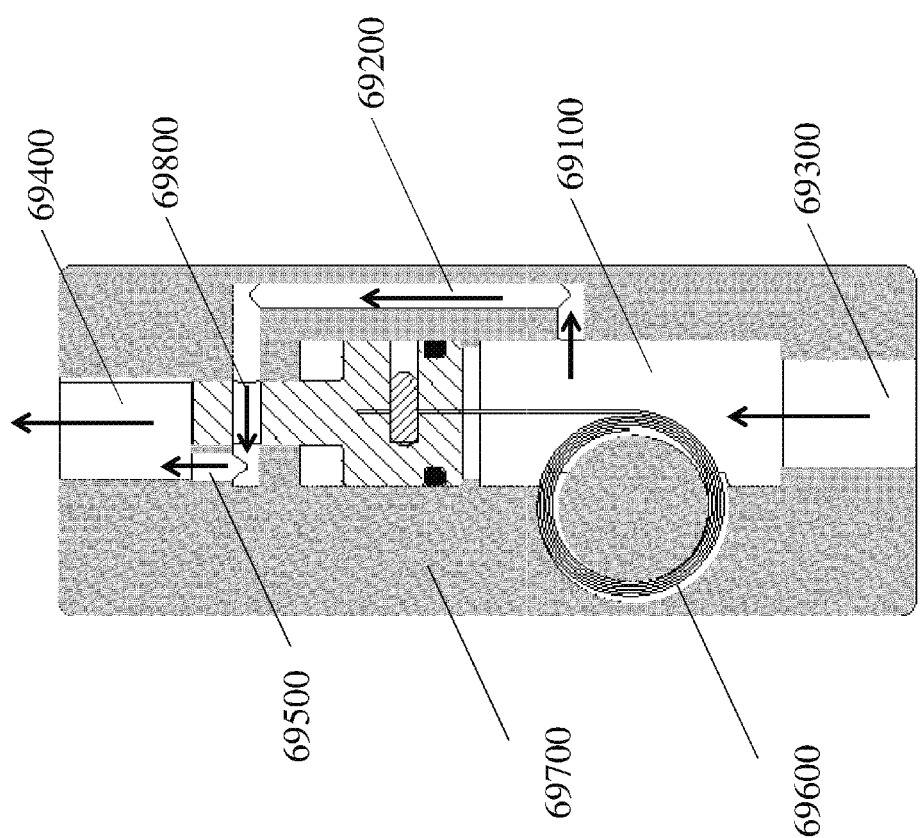
FIG. 69 depicts an internal view of an example embodiment of an over pressure cutoff device.

In an example embodiment as illustrated in FIG. 69, an over pressure cutoff device includes a housing 69700, a piston valve 69100, a substantially constant force spring 69600 (e.g., a spring which provides a substantially unvarying force anywhere along the length of travel), a first fluid passage 69200, a second fluid passage 69500, a fluid inlet 69300, and a fluid outlet 69400. Optionally, the spring 69600, fixed to the housing 69700 restrains the movement of the piston valve 69100. Optionally, the piston valve 69100 travels within the housing 69700 (e.g., vertically in FIG. 69) in response to fluid pressure in which the fluid pressure exceeds the resistance of the spring 69600.

Figure 71:
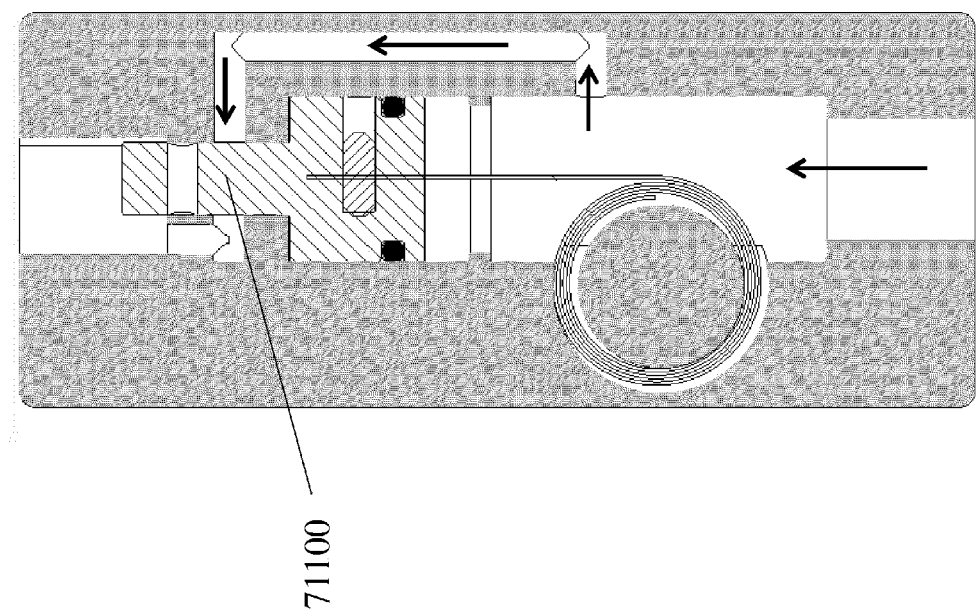
FIG. 71 depicts an internal view of an example embodiment of an over pressure cutoff device.

In a typical normal operating environment, inlet fluid enters the device at the fluid inlet 69300 and exits the device at the fluid outlet 69400. The fluid flows through the over pressure cutoff device via: the piston valve chamber 69100, the inlet 69300, the first fluid passage 69200, the piston valve 69500, and the second fluid passage 69500. The fluid exits the over pressure cutoff device at the fluid outlet 69400. Optionally, provided the fluid pressure within the piston valve does not exceed the resistance force of the spring 69600, fluid traverses the device as described above and as illustrated by the arrows in FIG. 69. Optionally, if the inlet fluid pressure exceeds the resistance force of the spring 69600, the valve piston 69100 travels in the direction of the fluid pressure as illustrated in FIG. 71 (e.g., vertically in FIG. 71). Optionally, the valve port 69800 connected to the piston also travels in the direction of the fluid pressure. The vertical movement of the piston body 71100 obstructs the fluid flow from the first fluid passage 69200 into the second fluid passage 69500, thereby, blocking the flow of fluid to the fluid outlet 69400. Optionally, in response to a subsequent reduction in fluid pressure in which the pressure is reduced below a configured threshold and/or the resistance force of the spring, the valve port 69800 connected to the piston valve travels (e.g., vertically downward in FIG. 71) enabling a fluid path between the first fluid passage 69200 and the second fluid passage 69500, for example, as illustrated in FIG. 69. In the open position, fluid entering the inlet traverses the device as described above and as illustrated by the arrows in FIG. 69.

In an example embodiment, the spring restraint 69600 is configurable to a plurality of fluid pressure points including for example 30 PSI, 40 PSI, 50 PSI, etc. Optionally, other spring mechanisms including, for example, a coil spring can be used in place of a constant spring mechanism.

Certain embodiments are further illustrated with respect to the following non-limiting examples. In these example embodiments, water is used as the fluid. Other example embodiments could use other forms of liquid or a gas. It is appreciated that the flow control system is independent of the fluid that is delivered, and a person having ordinary skill in the art recognizes that enablement for one liquid enables one to make and use certain embodiments with any fluid.

The process flows depict alternative example embodiments where a user is using a pressure activated, fluid flow, regulating device to irrigate a field. The example operating environment include a central pump, a master valve, one or more tributary valves, one or more distribution (tributary) valve actuators, one or more main fluid delivery lines, one or more distribution delivery lines, and, one or more fluid delivery terminals.

The first example operating environment illustrates the irrigation of a farm field using an example embodiment of a fluid flow regulating device; the device labeled a fluid activated servo assembly. The device enables the land owner to irrigate a field without manual labor beyond initial setup. Further, the device enables the land owner to irrigate without electrical power beyond the master valve which is located a considerable distance from the field to be irrigated.

The second example operating environment illustrates the irrigation of a farm field using an example embodiment of a fluid flow regulating device; the device labeled a sequencing actuator. The sequencing actuator enables the land owner to irrigate a field without manual labor beyond initial setup. Further, the sequencing actuator enables the land owner to irrigate without electrical power beyond the master valve which is located a considerable distance from the field to be irrigated.

The third example operating environment illustrates the irrigation of a farm field using an example embodiment of a fluid flow regulating device; the device also labeled a lockstep actuator. The lockstep actuator enables the land owner to irrigate a field without manual labor beyond initial setup. Further, the lockstep actuator enables the land owner to irrigate without electrical power beyond the master valve which is located a considerable distance from the field to be irrigated.

The fourth example operating environment illustrates the irrigation of a farm field using an example embodiment of a fluid flow regulating device; the device also labeled a lockstep actuator. The second variant lockstep actuator enables the land owner to irrigate a field without manual labor beyond initial setup. Further, the lockstep actuator enables the land owner to irrigate without electrical power beyond the master valve which is located a considerable distance from the field to be irrigated.

The fifth example operating environment illustrates the irrigation of a farm field using an example embodiment of a fluid flow regulating device; the device also labeled a lockstep actuator. The third variant lockstep actuator enables the land owner to irrigate a field without manual labor beyond initial setup. Further, the lockstep actuator enables the land owner to irrigate without electrical power beyond the master valve which is located a considerable distance from the field to be irrigated.

First Example Embodiment

Figure 11:
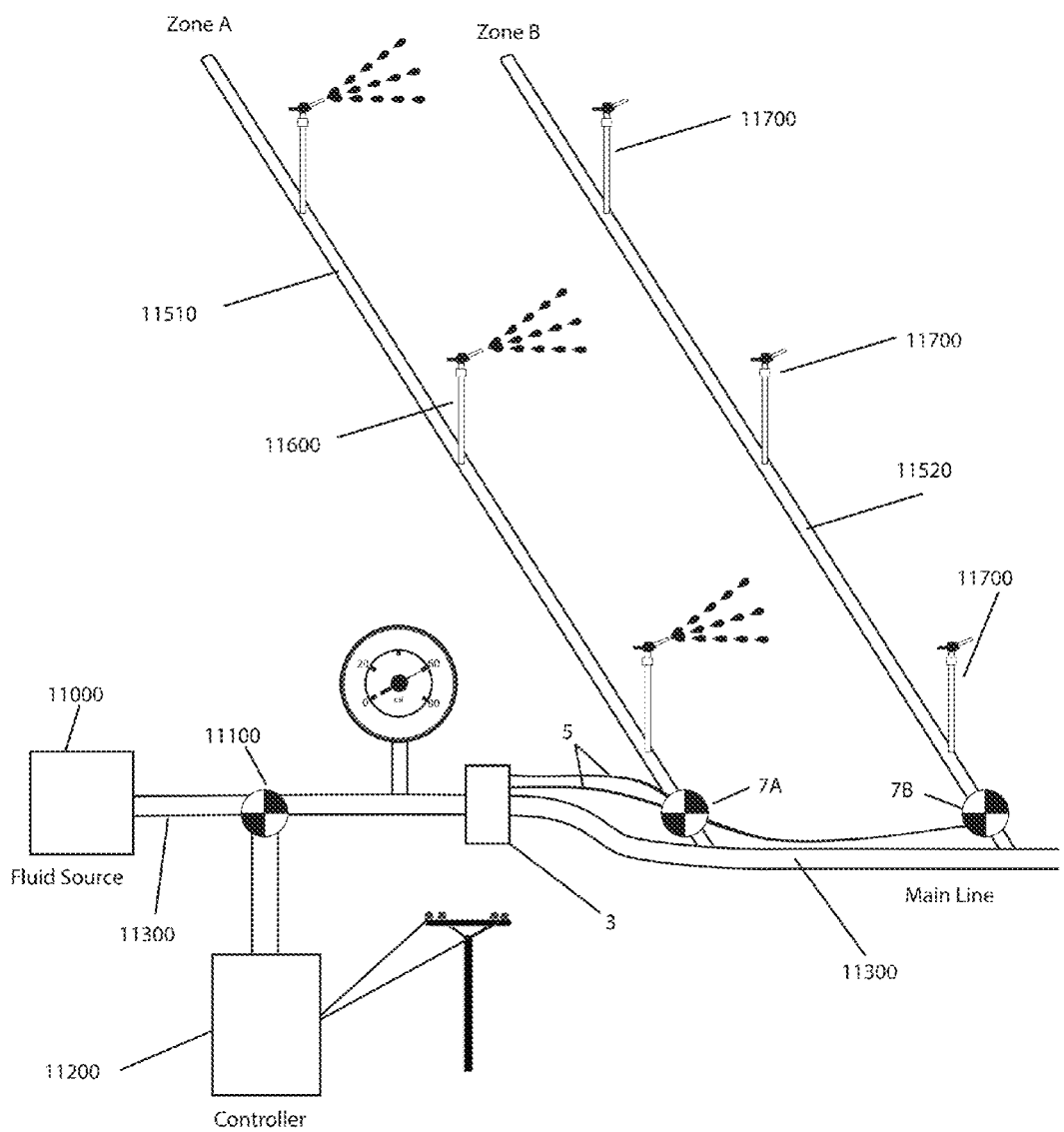
FIG. 11 depicts a first example operating environment for a fluid activated actuator assembly.

The first example operating environment illustrates the irrigation of a field using a single actuator without manual labor or electrical power beyond the central pump and master valve, see FIG. 11.

FIG. 11 illustrates the operating environment of a first example fluid activated actuator system. The operating environment consists of a pressurized water source (e.g., a water pump) 11000. The pressurized water is delivered using conventional water transport methods including, for example PVC pipes, to a master valve 11100. The master valve 11100, for example, is a conventional diaphragm valve. Attached to the master valve 11100 is a conventional valve controller 11200. The valve controller actuates the master valve 11100 into a closed or open position based upon a user configurable timing schedule. When the master valve 11100 is actuated into the on/open position by the controller 11200, pressurized fluid is released from the water source 11000 into the main line 11300. In this example operating environment, the main water line 11300 is fluidly connected to 2 diaphragm valves 7A and 7B in a parallel circuit fashion. In this example, the diaphragm valves 7A and 7B are controlled via a fluid activated servo assembly 3. The fluid activated servo assembly 3 is fluidly connected to adapters 6A and 6B via tubing 5. When the diaphragm valve 7A is in the on position, source water in the main line is delivered to a lateral water line 11510. When the diaphragm valve is in the off position, source water in the main line is prevented from flowing down the lateral water line 11510. Similarly, with respect to diaphragm valve 7B, when the diaphragm valve is in the on position, source water in the main line is delivered to the lateral water line 11520. When the diaphragm valve is in the off position, source water in the main line is prevented from flowing down the lateral water line 11520. Each lateral water line 11510 and 11520 is configured with a series of sprinklers 11600 and 11700, respectively. Water flowing through the lateral line exits the sprinklers and the field is thereby irrigated. Lastly, in this example, the fluid activated servo assembly 3 is a considerable distance from the master valve 11100 (e.g., 250 yards or more) and at a considerable distance from each other.

In this first example, the valve actuator assembly 3 is installed on the main water line 11300 over a small bore hole. Optionally, in this example, the valve actuator assembly includes an inlet port and an outlet port which is spliced into the main water line 11300. In addition, an adapter device 6A and 6B replace a solenoid-based actuator in conventional diaphragm valves 7A and 7B (in this example, no modification of the existing diaphragm valve itself is required).

In this sprinkler irrigation example, water is applied to a farm field using a timed schedule. Irrigation begins every day at 6 AM in the morning and cycles/alternates between Zone A and Zone B for periods of 1 hour. Irrigation of the field ends at 10 AM each day resulting in an irrigation total of 2 hours for each Zone. Zone A is covered by sprinklers 11600 and Zone B is covered by sprinklers 11700. The water source 11000 applies water fluid pressure to the main line, see FIG. 11. Lastly, in this example, the water cycle ended the previous day with valve 7A open and valve 7B closed.

State 1. In this example, at 6 AM the controller 11200, which includes a timing mechanism, opens the master control valve 11100.

State 2. With the opening of the control valve 11100, pressurized water begins to flow down the main line 11300. The pressurized water makes contact with the diaphragm 12 of the fluid actuated servo assembly 3, see FIG. 2.

State 3. The pressure from the fluid exerts a force against the diaphragm 12 causing the diaphragm 12 to move in a linear motion (e.g., in FIG. 2 upwards). In this example, a drive post 11 is coupled to the diaphragm 12. The linear motion of the diaphragm 12 causes the coupled drive post 11 to move (e.g., in FIG. 2 upwards). In this example, the drive post 11 is incased within a channel within the protective housing of the assembly 3 to direct the motion of the drive post. Further, a leaf spring 10 is fixed to the drive post 11. In this example, the leaf spring 10 moves linearly in the direction of the drive post 11, see FIG. 2.

State 4. The leaf spring 10 has a flange at the end which creates a shelf 12000, see FIG. 12. The shelf 12000 is in contact with a cog wheel post 19 of cog wheel 8, see FIG. 3. The linear motion of the leaf spring 10 applies a force to the cog wheel post 19 which causes the cog wheel to advance 90 degrees (as the fluid pressure compresses the diaphragm 12).

State 5. An anti-back rotational leaf spring 9 includes a flange at the end which creates a shelf 12000, see FIG. 12. In this example, the anti-back rotational leaf spring is inverted to the leaf spring 10 and is in contact with cog wheel post 19 directly opposite the cog wheel post in contact with the leaf spring 10. The anti-back rotational leaf spring 9 is also fixed to the housing of the servo assembly 3. As the cog wheel 8 advances in State 4, the cog wheel post 19 in contact with the anti-back rotational leaf spring 9 bends the leaf spring but does not impede the progress of the cog wheel 8. In this example, as the cog wheel 8 nears a 90 degree rotation, the anti-back rotational leaf spring 9 clears the flanged end and engages the cog wheel post 19 to prevent back rotation when the leaf spring 10 is reset (e.g., in a response a drop in fluid pressure).

State 6. Cog wheel 8 is fixed to a servo valve shaft 20 which rotates as the cog wheel 8 rotates. In this example, 90 degrees rotation of the servo valve shaft aligns the servo valve shaft port 21A with interconnect fittings 18A to allow fluid to pass between adjoining fittings. Similarly, a second servo valve shaft port 21B, perpendicular to servo valve shaft port 21A rotates 90 degrees blocking the fluid flow between adjoining interconnect fittings 18B, see FIG. 3.

State 7. The servo valve 4 is fluidly connected via tubing 5 to Adaptor 6A, see FIG. 1. In this example, prior to the rotation of the cog wheel 8 in State 4 there is a fluid passageway from the inlet line of valve 7A, through: (a) diaphragm valve spacer passage 19300, (b) diaphragm valve bleed passage 19500, (c) the adapter 6A channel 49, (d) the interconnect tubing 5, (e) the servo valve interconnect fitting 18B, (f) the servo valve port 21B (g) the companion servo valve interconnect fittings 18B, (h) the interconnect tubing 5 to the adapter 6A, (i) the adapter's 6A companion adapter passage 61, (j) diaphragm valve bleed water flow passage 19600, and into the outlet line of 7A, see FIG. 15 and FIG. 19. With the rotation of the servo valve shaft 20 in State 6, the water flow through the servo valve port 21B is blocked. Because the servo valve port 21B and the diaphragm bleed port 19500 of diaphragm valve 7A are fluidly connected as described above, the bleed port 19500 is effectively closed when the servo valve port 21B is blocked.

State 8. The closing of the bleed port 19500 causes the water pressure to increase in the diaphragm chamber 22200 and coupled with the force of the spring 22400 causes the diaphragm valve 7A to close. The closure of the diaphragm valve prevents the water flow from the inlet line 11300 to the outlet line 11520.

State 9. In this example, the rotation of the servo valve 20 in State 6 creates a water channel through the servo valve port 21A, see FIG. 3. As similarly discussed above, servo valve 4 is fluidly connected via tubing 5 to Adaptor 6B. When the servo valve port 21A is in the open position there is a fluid passage from the inlet of valve 7B, through: (a) diaphragm valve spacer passage 22300, (b) diaphragm valve bleed passage 22500, (c) the adapter channel 49 of adapter 6B, (d) the interconnect tubing 5, (e) the interconnect fittings 18A, (f) the servo valve port 21A, (g) companion interconnect fittings 18A on the servo valve assembly 4, (h) the interconnect tubing 5 to the adapter 6B, (i) the adapter's 6B companion adapter passage 61, (j) diaphragm valve bleed water flow passage 22600, and into the output line of 7B. Because the servo valve port 21A and the bleed port 22500 of diaphragm valve 7B are fluidly connected as described above, the bleed port 22500 is effectively open when the servo valve 21A is opened. The fluid behind the diaphragm 22700 escapes via the bleed port through the passage 49 and exits the valve following the water passage described above, see FIG. 13.

State 10. With the loss of pressure in the diaphragm chamber 22200, the force of the water pressure in the inlet 11300 overcomes the spring compression 19400 and the diaphragm valve 7B opens. Water flows unobstructed from the inlet 11300 through the diaphragm valve 7B to the outlet 2B. The irrigation of Zone B begins.

State 11. At the 1 hour mark, the controller 11200 briefly shuts off water pressure in the inlet line 11300 (e.g., by closing a valve).

State 12. With respect to closed valve 7A, a decrease in water pressure causes fluid to leak from the diaphragm passage 22300. However, the diaphragm valve 7A remains closed due to the force exerted by the compression spring 22400, see FIG. 22.

State 13. With respect to open valve 7B, a decrease in water pressure causes the diaphragm compression spring 22400 to overcome the decreasing fluid pressure. The diaphragm valve transitions to a closed state.

State 14. With respect to fluid actuated servo assembly 3, the loss of water pressure enables the return spring 16 compression to overcome the water pressure exerted against the diaphragm 12 causing the diaphragm 12 to move in a linear motion (e.g., in FIG. 2 downwards). In this example, the linear motion of the diaphragm 12 causes the coupled drive post 11 and coupled leaf spring to also move (e.g., in FIG. 2 downwards).

State 15. As the leaf spring 10 retracts the beginning of the flanged end of the leaf spring 12000 makes contact with the cog wheel post 19. As the leaf spring 10 continues to retract the cog wheel post 19 causes the leaf spring 10 to bend slightly outward but does not impede the progress of the spring. Near the end of the retraction of the leaf spring 10, the flanged end 12000 clears the cog wheel post 19 and the shelf of the leaf spring 10 engages the cog wheel post 19.

State 16. As the leaf spring 10 retracts, the anti-back rotation leaf spring 9 inverted to the leaf spring 10 is in contact with cog wheel post 19 directly opposite the cog wheel post in contact with the leaf spring 10. The anti-back rotation leaf spring 9 prevents the cog wheel 8 from rotating during the leaf spring 10 retraction. The actuator is now reset.

State 18. The controller 11200 reasserts water pressure in the inlet line 11300 (e.g., by opening a valve).

States 19-22. The States 2-5 are repeated. In this example, the diaphragm 12 moves linearly (e.g. upward) in response to the water pressure causing the drive post 11 and leaf spring 10 to move which in turn causes the cog wheel 8 to rotate.

State 23. Cog wheel 8 is fixed to a servo valve 20 which rotates as the cog wheel 8 rotates. In this example, 90 degrees rotation of the servo valve aligns the servo valve shaft port 21B with interconnect fittings 18B to allow fluid to pass between adjoining fittings. Similarly, a second servo valve shaft port 21A, perpendicular to servo valve shaft port 21B rotates 90 degrees blocking the fluid flow between adjoining interconnect fittings 18*b*, see FIG. 3.

State 24. The opening of servo valve shaft port 21B causes the fluidly connected diaphragm valve 7A to open as similarly described in State 9 and State 10. The opening of the diaphragm valve enables the water flow from the inlet line 11300 to the outlet line 11520. The irrigation of Zone A begins.

State 25. The closing of servo valve shaft port 21A (see State 23) causes the fluidly connected diaphragm valve 7B to close as similarly described in State 7 and State 8. The closure of the diaphragm valve stops the water flow from the inlet line 11300 to the outlet line 11520. The irrigation of Zone B ends.

State 26. At the 2 hour mark, the controller 11200 briefly shuts off water pressure in the inlet line 1 (e.g., by closing a valve).

States 27-35. The States 2 through 10 are repeated. The water shutoff resets the actuator. The application of water pressure causes the valve shaft port 21B to close and associated diaphragm valve 7A to close. The irrigation of Zone A ends. The corresponding opening of the valve shaft port 21A causes the associated diaphragm valve 7B to open. The irrigation of Zone B begins.

State 36. At the 3 hour mark, the controller 11200 briefly shuts off water pressure in the inlet line 11300 (e.g., by closing a valve).

States 37-50. The States 12 through 25 are repeated. The water shutoff resets the actuator. The application of water pressure causes the valve shaft port 21B to open and associated diaphragm valve 7A to open. The irrigation of Zone A begins. The corresponding closing of the valve shaft port 21A causes the associated diaphragm valve 7B to close. The irrigation of Zone B ends.

State 51. At the 4 hour mark, the controller shuts off water pressure in the inlet line 11300 (e.g., by closing a valve) terminating the field irrigation for the day. The cycle repeats beginning the next morning at 6 AM.

Second Example Embodiment

The second example operating environment, similar to the first example, illustrates the irrigation of a field using a single actuator without manual labor or electrical power beyond the central pump and master valve. In this example, as compared to the first example, the sequencing valve actuator is mounted in the solenoid position in one of the diaphragm valves in the operating system. This fluid activated actuator configuration reduces the number of parts in the system, is simpler to install, and requires no bore hole in the main line.

Figure 39:
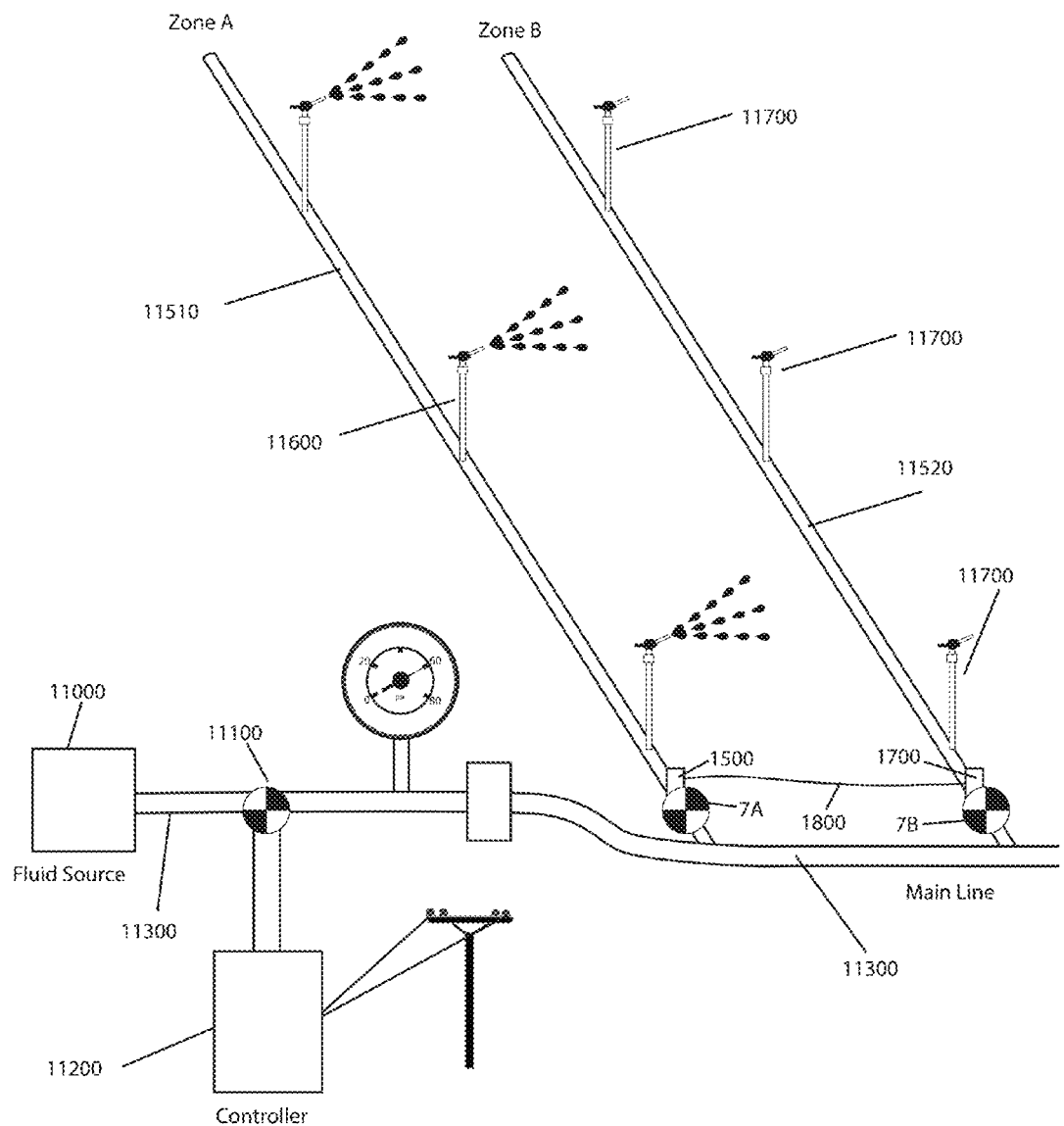
FIG. 39 depicts a second example operating environment for a fluid activated actuator assembly.

FIG. 39 illustrates the operating environment of a second example fluid activated actuator system. The operating environment consists of a pressurized water source (e.g., a water pump) 11000. The pressurized water is delivered using conventional water transport methods including, for example PVC pipes, to a master valve 11100. The master valve 11100, for example, is a conventional diaphragm valve. Attached to the master valve 11100 is a conventional valve controller 11200. The valve controller actuates the master valve 11100 into a closed or open position based upon a user configurable timing schedule. When the master valve 11100 is actuated into the on/open position by the controller 11200, pressurized fluid is released from the water source 11000 into the main line 11300. In this second example operating environment, the main water line 11300 is fluidly connected to 2 diaphragm valves 7A and 7B in a parallel circuit fashion. In this example, the diaphragm valves 7A and 7B are controlled via a fluid activated sequencing actuator 1500. The sequencing actuator 1500 is mounted in the solenoid position of the diaphragm valve 7A. The sequencing actuator 1500 is also fluidly connected to adapter 1700 via tubing 1800. When the diaphragm valve 7A is in the on position, source water in the main line is delivered to a lateral water line 11510. When the diaphragm valve is in the off position, source water in the main line is prevented from flowing down the lateral water line 11510. Similarly, with respect to diaphragm valve 7B, when the diaphragm valve is in the on position, source water in the main line is delivered to the lateral water line 11520. When the diaphragm valve is in the off position, source water in the main line is prevented from flowing down the lateral water line 11520. Each lateral water line 11510 and 11520 is configured with a series of sprinklers 11600 and 11700, respectively. Water flowing through the lateral line exits the sprinklers and the field is thereby irrigated. Lastly, in this example, the diaphragm valves 7A and 7B are a considerable distance from the master valve 11100 (e.g., 250 yards or more) and at a considerable distance from each other.

In this second example, the sequencing actuator assembly 1500 replaces two conventional solenoid-based actuators as illustrated in FIG. 20 and FIG. 21. In this example, the solenoid 20100 in the diaphragm valve 7A is replaced with the sequencing actuator 1500. Further, the solenoid in the second diaphragm valves 7B, which is slaved to the actuator 1500, is replaced with an adapter 1700 and fluidly connected to the sequencing actuator assembly 1500 via tubing 1800, see FIG. 21. In this example, no modification to the existing diaphragm valve is required. Optionally, the diaphragm valves are purchased by the user without solenoids and the sequencing actuator assembly 1500 and adapter 1700 are installed without a solenoid removal step. Optionally, the diaphragm valves are purchased with the sequencing actuator preinstalled.

In this sprinkler irrigation example, water is applied to a farm field using a timed schedule. Irrigation begins every day at 6 AM in the morning and cycles/alternates between Zone A and Zone B for periods of 1 hour. Irrigation of the field ends at 10 AM each day resulting in an irrigation total of 2 hours for each Zone. Zone A is covered by sprinklers 11600 and Zone B is covered by sprinklers 11700. The water source 11000 applies water fluid pressure to the main line, see FIG. 39. Lastly, in this example, the water cycle ended the previous day with valve 7A closed and valve 7B open.

State 1. The user actuates the valve manually by pulling the manual setting knob 14650, see FIG. 14, until the actuator indicator 38000 indicates that the first valve 7A is closed and that the second valve 7B is open. (In this example, manually actuating to a closed first valve 7A and an open second valve 7B will result in an initial open first valve 7A when water pressure is applied. Conversely, in this example, manually actuating to an open first valve 7A and a closed second valve 7B will result in an initial closed first valve 7A when water pressure is applied.)

State 2. In this example, at 6 AM the controller 11200, which includes a timing mechanism, opens the master control valve 11100.

State 3. Fluid begins to flow down the main line 11300 with the opening of the control valve 11100 and makes contact with the diaphragm valve 7A, see FIG. 39. The water flows through the spacer passage 22300 building up water pressure behind the diaphragm seating the diaphragm if it was previously not seated in the closed position, see FIG. 22.

State 4. Fluid flows through the diaphragm valve passageway 22500 into the sequencing actuator 1500.

State 5. Fluid enters the actuator diaphragm chamber 14300 via the sequencing actuator passage 14700. As the chamber 14300 fills, the pressure from the fluid exerts a force against the diaphragm 14400 overcoming the return spring 14550 compression causing the diaphragm 14400 to move in a linear motion (e.g., upwards in FIG. 14).

State 6. In this example, a rigid pressure disk 14100 is coupled to diaphragm 14400, see FIG. 14. The linear motion of the diaphragm 14400 causes the coupled rigid pressure disk to move in a linear motion (e.g., upwards in FIG. 2). In this example, the rigid pressure disk 14100 is incased within a channel within the protective housing to ensure the linear direction of motion of the pressure disk.

State 7. A leaf/drive spring 16000 is fixed to the rigid pressure disk 14100. In this example, the drive spring 16000 moves linearly in the direction of the rigid pressure disk 14100.

State 8. The drive spring 16000 has a hook at the end 16100, see FIG. 16. The end of the hook 16100 is in contact with a cog wheel 8 and cog wheel post 19. The linear motion of the drive spring 16000 applies a force to the cog wheel post 19 which causes the cog wheel to advance 90 degrees.

State 9. In this example, an anti-back rotational leaf spring 16300 is positioned parallel to the leaf spring 16000 but inverted and located on the adjacent but opposite side of the cog wheel 8, see FIG. 16. The anti-back rotational leaf spring 16300 includes a bend at the end 16400 which enables the cog wheel post 19, on rotation of the cog wheel, to enter underneath the leaf spring 16300. The anti-back rotational leaf spring 16300 is also fixed to the housing 14200 of the sequencing actuator 1500. As the cog wheel 8 advances in State 8, the anti-back rotational leaf spring 16300 makes contact with the leaf spring but does not impede the progress of the cog wheel 8. In this example, as the cog wheel 8 nears a 90 degree rotation, the anti-back rotational leaf spring 16300 clears the end of the anti-back rotational leaf spring and engages the cog wheel post 19 to prevent back rotation when the pressure disk 14100 and coupled diaphragm 14400 retracts (e.g., in response to the spring 14550 overcoming a drop in fluid pressure in the chamber 14300).

State 10. Cog wheel 8 is fixed to a pilot valve shaft 14900 which rotates as the cog wheel 8 rotates, see FIG. 17. In this example, a 90 degrees rotation of the pilot valve aligns the pilot valve shaft port 17100 with passageway 18980 to allow fluid to pass through the cog wheel 8 via the pilot valve shaft port 17100 into the sequencing passageway 18300. Similarly, a second pilot valve shaft port 17200, perpendicular to pilot valve shaft port 17100 rotates 90 degrees blocking the fluid flow to the interconnect fitting 17400, see FIG. 17.

State 11. With the opening of the valve shaft port 17100, a diaphragm bleed port fluid passage is created through which water can flow. Water flows through: (a) the diaphragm valve bleed path 22500, (b) the sequencing actuator bleed path 14700, (c) the pilot valve 17000, (d) the valve shaft port 17100, (e) the sequencing actuator bleed path 18980 and 18300, (f) the diaphragm bleed path 22600, and into the outlet 11510, see FIGS. 18 and 22. Therefore, water from the diaphragm valve chamber 22200 exhausts through this passage into outlet 11510.

State 12. With the loss of pressure in the diaphragm valve chamber 22200 caused by the water flow passage of State 11, the force of the water pressure in the inlet 11300 overcomes the spring compression 19400 and the diaphragm valve opens, see FIG. 19. Water flows unobstructed from the inlet 11300 through the diaphragm valve 7A to the outlet 11510. The irrigation of Zone A begins.

State 13. As illustrated in FIG. 21, the sequencing actuator fitting 17400 is fluidly connected to fluid adaptor 1700 via interconnect tubing 1800. With the rotation of the pilot valve as described in State 10, the fluid flow past the fitting is blocked. Consequently, the following fluidly connected passage is blocked: (a) sequencing actuator fitting 17400, (b) interconnect tubing 1800, (c) fluid adaptor 1700 fluid passage 26000, and, (d) diaphragm bleed passage 19500.

State 14. The blockage of the bleed passage 19500 as described in State 13 causes the water pressure flowing in from spacer passage 19300 to build up in the diaphragm chamber 22200, see FIG. 19 and FIG. 22. The shape of the diaphragm 22700 and compression spring 22400 overcome the pressure exerted by the source water cause an expansion of the diaphragm linearly (e.g., downward in FIG. 22) closing the diaphragm valve 7B.

State 15. At the 1 hour mark, the controller 11200 briefly shuts off water pressure in the inlet line 1 (e.g., by closing a valve).

State 16. With respect to closed valve 7B, a decrease in water pressure causes fluid to leak from the diaphragm passage 22300. However, the diaphragm valve 7B remains closed due to the force exerted by the compression spring 22400, see FIG. 22.

State 17. With respect to open valve 7A, a decrease in water pressure causes the diaphragm compression spring 19400 to overcome the decreasing fluid pressure. The diaphragm valve transitions to a closed state.

State 18. With the pressure drop, the water in the sequencing actuator diaphragm chamber 14300 exits through the sequencing actuator passageway 14700 and diaphragm bleed port 19500, see FIG. 18. With loss of pressure in the sequencing actuator diaphragm chamber 14300, the return spring 14550 exerts a force on the pressure disk 14100 causing linear motion (e.g., downward motion in FIG. 18).

State 19. The linear motion of the pressure disk 14100 causes a linear motion of the coupled drive spring 16300. As the coupled drive spring in contact with the cog wheel 8 moves downward, the drive spring edge 16100 makes contact with the cog wheel post 19. As the coupled drive spring moves downward, the cog wheel 8 is held in a fixed position by the leaf spring 16300 in contact with the cog wheel post 19. The coupled drive spring continues its downward motion as the curved edge of the drive spring 16100 moves over the surface of the cog wheel post 19, bending outward, until the drive spring clears the post and engages the cog wheel post 19. The actuator is reset.

State 20. The controller 11200 then reasserts water pressure in the inlet line 11300 (e.g., by opening a master valve 11100).

State 21. The pressurized water flow moves down the main line 11300 and makes contact with the diaphragm valve 7A. The water flows through the spacer passage 22300 through the diaphragm valve passageway 22500 into the sequencing actuator 1500. Fluid enters the actuator diaphragm chamber 14300 via the sequencing actuator passage 14700.

State 22. As the chamber fills, the pressure from the fluid exerts a force against the diaphragm 14400 overcoming the return spring 14550 compression causing the diaphragm 14400 to move in a linear motion (e.g., in FIG. 14 upwards).

State 23. In this example, a rigid pressure disk 14100 is coupled to diaphragm 14400, see FIG. 14. The linear motion of the diaphragm 14400 causes the coupled rigid pressure disk to move in a linear motion (e.g., in FIG. 2 upwards). In this example, the rigid pressure disk 14100 is incased within a channel within the protective housing to ensure the linear direction of motion of the pressure disk.

State 24. A leaf/drive spring 16000 is fixed to the rigid pressure disk 14100. In this example, the drive spring 16000 moves linearly in the direction of the rigid pressure disk 14100.

State 25. The drive spring 16000 has a hook at the end 16100, see FIG. 16. The end of the hook 16100 is in contact with a cog wheel 8 and cog wheel post 19. The linear motion of the drive spring 16000 applies a force to the cog wheel post 19 which causes the cog wheel to advance 90 degrees.

State 26. In this example, an anti-back rotational leaf spring 16300 is positioned parallel to the leaf spring 16000 but inverted and positioned on the adjacent but opposite side of the cog wheel 8, see FIG. 16. The anti-back rotational leaf spring 16300 includes a bend at the end which enables the cog wheel post 19, on rotation of the cog wheel, to enter underneath the leaf spring 16300. The anti-back rotational leaf spring 16300 is also fixed to the housing 14200 of the sequencing actuator 1500. As the cog wheel 8 advances in State 25, the anti-back rotational leaf spring 16300 makes contact with the leaf spring but does not impede the progress of the cog wheel 8. In this example, as the cog wheel 8 nears a 90 degree rotation, the anti-back rotational leaf spring 16300 clears the end of the anti-back rotational leaf spring and engages the cog wheel post 19 to prevent back rotation when the pressure disk 14100 and coupled diaphragm 14400 retracts (e.g., in response to the spring 14550 overcoming a drop in fluid pressure in the chamber 14300).

State 27. Cog wheel 8 is fixed to a pilot valve shaft 14900 which rotates as the cog wheel 8 rotates, see FIG. 17. In this example, a 90 degrees rotation of the pilot valve aligns the pilot valve shaft port 17200 with passageway 14950 to allow fluid to pass from the fitting 17400 into the sequencing actuator passageway. Similarly, a second pilot valve shaft port 17100, perpendicular to pilot valve shaft port 17200 rotates 90 degrees blocking the fluid flow through the cog wheel 8, see FIG. 14 and FIG. 17.

State 28. With the opening of the valve shaft port 17200, a diaphragm bleed port fluid passage is created through which water can flow from valve 7B, see FIG. 26. Water flows through: (a) the diaphragm bleed path 22500, the sequencing adapter 26000, interconnect tubing 1800, the sequencing actuator fitting 17400, the pilot valve 17200, the sequencing actuator bleed path 14950, the diaphragm bleed port path 19600, and into the outlet 11510.

State 29. With the loss of pressure in the diaphragm chamber 22200, the force of the water pressure in the inlet 11300 overcomes the spring compression 19400 and the diaphragm valve 7B opens. Water flows unobstructed from the inlet 11300 through the diaphragm valve 7B to the outlet 11520. The irrigation of Zone B begins.

State 30. With the rotation of the pilot valve as described in State 27, the fluid flow through the cog wheel 8 is blocked. Consequently, the following fluidly connected passages are blocked: sequencing actuator passage 14700 and diaphragm bleed passage 19500.

State 31. The blockage of the diaphragm bleed passage 19500 causes the water pressure flowing in from diaphragm passage 19300 to build up in the diaphragm chamber 22200. The shape of the diaphragm 22200 and compression spring 22400 overcome the pressure exerted by the source water causing an expansion of the diaphragm linearly (e.g., downward in FIG. 14) closing the diaphragm valve 7A. The irrigation of Zone A ends.

State 32. At the 2 hour mark, the controller 11200 briefly shuts off water pressure in the inlet line 11300 (e.g., by closing the master valve 11100).

States 33-42. The States 3 through 12 are repeated. The water shutoff resets the actuator. The application of water pressure causes the pilot valve shaft port 17100 to open and associated diaphragm valve 7A to open. The irrigation of Zone A begins. The corresponding closing of the valve shaft port 17200 causes the associated diaphragm valve 7B to close. The irrigation of Zone B ends.

State 43. At the 3 hour mark, the controller 11200 briefly shuts off water pressure in the inlet line 11300 (e.g., by closing the master valve 11100).

States 44-59. The States 16 through 31 are repeated. The water shutoff resets the actuator. The application of water pressure causes the valve shaft port 17200 to open and associated diaphragm valve 7B to open. The irrigation of Zone B begins. The corresponding closing of the valve shaft port 17100 causes the associated diaphragm valve 7A to close. The irrigation of Zone A ends.

State 60. At the 4 hour mark, the controller shuts off water pressure in the inlet line 1 (e.g., by closing the master valve 11100) terminating the field irrigation for the day. The cycle repeats beginning the next morning at 6 AM.

Third Example Embodiment

The third example operating environment, similar to the first and second example, illustrates the irrigation of a field using multiple fluid activated actuators without manual labor or electrical power beyond the central pump and master valve. In this example, as compared to the first and second example, the fluid activated valve actuator (labeled a lockstep actuator) is mounted in the solenoid position in each of the diaphragm valves in the operating system see FIG. 20 and FIG. 24. The lockstep actuator further simplifies the operating environment for a user but is designed using the same general concepts and principles as the actuators of examples 1 and 2. In particular, the lockstep actuators do not require connective tubing between the actuator and associated or slaved diaphragm valves.

Figure 23:
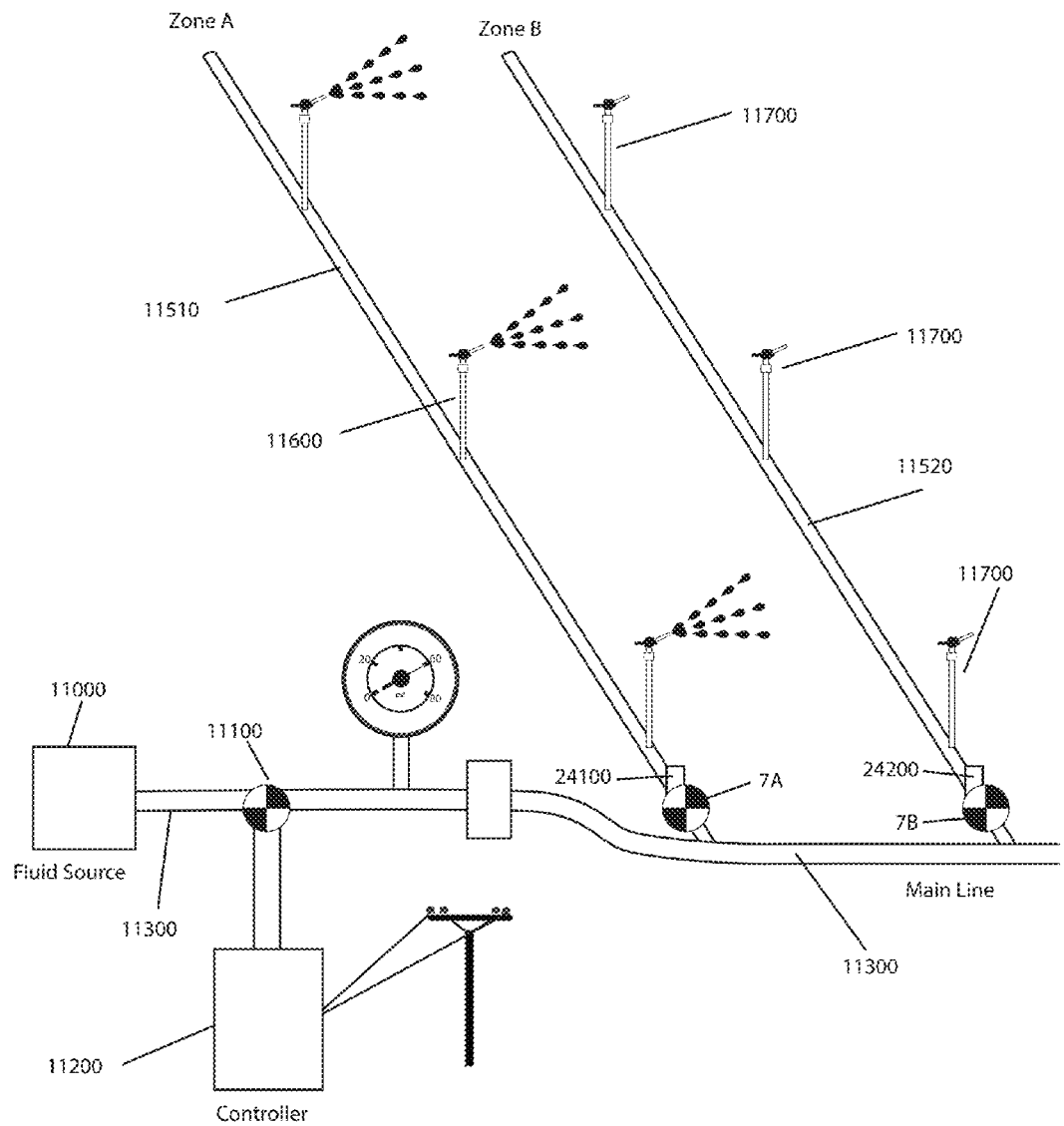
FIG. 23 depicts a third example operating environment for a fluid activated actuator assembly.

FIG. 23 illustrates the operating environment of a third example fluid activated actuator system. The operating environment consists of a pressurized water source (e.g., a water pump) 11000. The pressurized water is delivered using conventional water transport methods including, for example PVC pipes, to a master valve 11100. The master valve 11100, for example, is a conventional diaphragm valve. Attached to the master valve 11100 is a conventional valve controller 11200. The valve controller actuates the master valve 11100 into a closed or open position based upon a user configurable timing schedule. When the master valve 11100 is actuated into the on/open position by the controller 11200, pressurized fluid is released from the water source 11000 into the main line 11300. In this third example operating environment, the main water line 11300 is fluidly connected to 2 diaphragm valves 7A and 7B in a parallel circuit fashion. In this example, the diaphragm valves 7A and 7B are controlled via 2 fluid activated lockstep actuators 24100 and 24200, respectively. When the diaphragm valve is in the on position, source water in the main line is delivered to a lateral water line 11510. When the diaphragm valve is in the off position, source water in the main line is prevented from flowing down the lateral water line 11510. Similarly, with respect to diaphragm valve 7B, when the diaphragm valve is in the on position, source water in the main line is delivered to the lateral water line 11520. When the diaphragm valve is in the off position, source water in the main line is prevented from flowing down the lateral water line 11520. Each lateral water line 11510 and 11520 is configured with a series of sprinklers 11600 and 11700, respectively. Water flowing through the lateral line exits the sprinklers and the field is thereby irrigated. Lastly, in this example, the diaphragm valves 7A and 7B are a considerable distance from the master valve 11100 (e.g., 250 yards or more) and at a considerable distance from each other.

In this third example, the lockstep actuators 24100 and 24200 replace two conventional solenoid-based actuators as illustrated in FIG. 24. In this example, the solenoids in the diaphragm valves 7A and 7B are replaced with lockstep actuators 24100 and 24200, see FIG. 24. In this example, no modification to the existing diaphragm valve is required. Optionally, the diaphragm valves are purchased by the user without solenoids and the lockstep actuators 24100 and 24200 are installed without a solenoid removal step. Optionally, the diaphragm valves are purchased with the lockstep actuators preinstalled.

In this sprinkler irrigation example, water is applied to a farm field using a timed schedule. Irrigation begins every day at 6 AM in the morning and cycles/alternates between Zone A and Zone B for periods of 1 hour. Irrigation of the field ends at 10 AM each day resulting in an irrigation total of 2 hours for each Zone. Zone A is covered by sprinklers 11600 and Zone B is covered by sprinklers 11700. The water source 11000 applies water fluid pressure to the main line, see FIG. 23.

State 1. The user manually actuates the lockstep actuator by pulling the manual setting knob 24400 until the actuator indicator 24300 indicates that the first actuator 7A is in a closed diaphragm valve position. The user manually actuates the lockstep actuator by pulling the manual setting knob 24400 until the actuator indicator 24300 indicates that the second actuator 7B is in an open diaphragm valve position. [In this example, manually actuating to a closed first valve and an open second valve will result in an initial open first valve when water pressure is applied. Conversely, in this example, manually actuating to an open first valve and a closed second valve will result in an initial closed first valve when water pressure is applied.]

State 2. In this example, at 6 AM the controller, which includes a timing mechanism 11200, opens the master control valve 11100.

State 3. Fluid begins to flow down the main line 11300 with the opening of the control valve 11100. The pressurized water flow moves down the main line 11300 and makes contact with the diaphragm valve 7A, see FIG. 23. The water flows through the spacer passage 22300 building up water pressure behind the diaphragm seating the diaphragm if it was previously not seated in the closed position, see FIG. 29.

State 4. Fluid flows through the diaphragm valve passageway 22500 into the lockstep actuator 24100.

State 5. Fluid enters the actuator diaphragm chamber 28800 via the lockstep actuator passage 29900, see FIG. 29. As the chamber fills, the pressure from the fluid exerts a force against the diaphragm 28810 overcoming the return spring 28550 compression causing the diaphragm 28810 to move in a linear motion (e.g., in FIG. 29 upwards).

State 6. In this example, a rigid pressure disk 28555 is coupled to diaphragm 28810, see FIG. 29. The linear motion of the diaphragm 28810 causes the coupled rigid pressure disk to move in a linear motion (e.g., in FIG. 29 upwards). In this example, the rigid pressure disk 28555 is incased within a channel within the protective housing to ensure the linear direction of motion of the pressure disk.

State 7. A leaf/drive spring 16000 is fixed to the rigid pressure disk 28555. In this example, the drive spring 16000 moves linearly in the direction of the rigid pressure disk 28555.

State 8. The drive spring 16000 has a hook at the end 16100, see FIG. 16. The end of the hook 16100 is in contact with a cog wheel 25400 and cog wheel post 19. The linear motion of the drive spring 16000 applies a force to the cog wheel post 19 which causes the cog wheel to advance 90 degrees.

State 9. In this example, an anti-back rotational leaf spring 16300 is positioned parallel to the leaf spring 16000 but inverted to the leaf spring and positioned on the adjacent but opposite side of the cog wheel 25400, see FIG. 16. The anti-back rotational leaf spring 16300 includes a bend at the end which enables the cog wheel post 19, on rotation of the cog wheel, to enter underneath the leaf spring 16300. The anti-back rotational leaf spring 16300 is also fixed to the housing 28500 of the lockstep actuator 24100. As the cog wheel 25400 advances in State 8, the anti-back rotational leaf spring 16300 makes contact with the cog wheel post 19 and the spring bends outward but does not impede the progress of the cog wheel 25400. In this example, as the cog wheel 25400 nears a 90 degree rotation, the anti-back rotational leaf spring 16300 clears the end of the anti-back rotational leaf spring and engages the cog wheel post 19 to prevent back rotation when the pressure disk 28555 and coupled diaphragm 28810 retracts (e.g., in response to the return spring 28550 overcoming a drop in fluid pressure).

State 10. Cog wheel 25400 is fixed to a pilot valve shaft 28350 which rotates as the cog wheel 25400 rotates, see FIG. 28. In this example, a 90 degrees rotation of the pilot valve shaft aligns the pilot valve shaft port 27100 with passageway 28100, see FIG. 28 and FIG. 27, to allow fluid to flow through the actuator housing via the diaphragm chamber 28800 and internal fluid passageway 28600, through the pilot valve shaft port 27100, and into the valve bleed water passageway 28300.

State 11. With the opening of the pilot valve port 27100, a bleed water passage is created through which fluid can flow. Water flows through: (a) the diaphragm valve bleed path 22500, (b) the lockstep actuator bleed path 28900, (c) the diaphragm chamber 28800 (*d*) the pilot valve port 27100, (e) the lockstep actuator bleed path 28100, through the diaphragm valve bleed path 22600, and into the outlet 11510. Water from the diaphragm valve chamber 22200 exhausts through this passage into outlet 11510.

State 12. With the loss of pressure in the diaphragm chamber 22200, the force of the water pressure in the inlet 11300 overcomes the spring compression 19400 and the diaphragm valve 7A opens, see FIG. 19. Water flows unobstructed from the inlet 11300 through the diaphragm valve 7A to the outlet 11510. The irrigation of Zone A begins.

State 13. Returning to State 3. Fluid begins to flow down the main line 11300 with the opening of the control valve 11100. The pressurized water flow moves down the main line 11300 and makes contact with the diaphragm valve 7B, see FIG. 23 (which is an open position). The water flows through the spacer passage 19300, through the bleed port passage 19500, and through the lockstep actuator passage 28900, see FIG. 28.

State 14. Fluid enters the actuator diaphragm chamber 28800 via the lockstep actuator passage 28900. As the chamber fills, the pressure from the fluid exerts a force against the actuator diaphragm 28810 overcoming the return spring 28550 compression causing the diaphragm 28810 to move in a linear motion (e.g., in FIG. 28 upwards).

State 15. In this example, a rigid pressure disk 28555 is coupled to diaphragm 28810, see FIG. 28. The linear motion of the diaphragm 28810 causes the coupled rigid pressure disk to move in a linear motion (e.g., in FIG. 28 upwards). In this example, the rigid pressure disk 28555 is incased within a channel within the protective housing to ensure the linear direction of motion of the pressure disk.

State 16. A leaf/drive spring 16000 is fixed to the rigid pressure disk 28555. In this example, the drive spring 16000 moves linearly in the direction of the rigid pressure disk 28555.

State 17. The drive spring 16000 has a hook at the end 16100, see FIG. 16. The end of the hook 16100 is in contact with a cog wheel 25400 and cog wheel post 19. The linear motion of the drive spring 16000 applies a force to the cog wheel post 19 which causes the cog wheel to advance 90 degrees.

State 18. In this example, an anti-back rotational leaf spring 16300 is positioned parallel to the leaf spring 16000 but inverted to the leaf spring and positioned on the adjacent but opposite side of the cog wheel 25400, see FIG. 16. The anti-back rotational leaf spring 16300 includes a bend at the end which enables the cog wheel post 19, on rotation of the cog wheel, to enter underneath the leaf spring 16300. The anti-back rotational leaf spring 16300 is also fixed to the housing 28500 of the lockstep actuator 24200. As the cog wheel 25400 advances in State 17, the anti-back rotational leaf spring 16300 makes contact with the cog wheel post 19 and the spring bends outward but does not impede the progress of the cog wheel 25400. In this example, as the cog wheel 25400 nears a 90 degree rotation, the anti-back rotational leaf spring 16300 clears the end of the anti-back rotational leaf spring and engages the cog wheel post 19 to prevent back rotation when the pressure disk 28555 and coupled diaphragm 28810 retracts (e.g., in response to the spring 28550 overcoming a drop in fluid pressure).

State 19. Cog wheel 25400 is fixed to a pilot valve shaft 28350 which rotates as the cog wheel 25400 rotates. In this example, a 90 degrees rotation of the pilot valve shaft blocks the water flow to pilot valve shaft outlet port 27100, see FIG. 29.

State 20. With the closing of the pilot valve port 27100, the diaphragm bleed port passage 19500 is effectively closed. Water pressure in the valve diaphragm chamber 22200 begins to build. The shape of the diaphragm 22700 and return spring 22400 compression overcome the pressure exerted by the inlet water pressure 11300 causes an expansion of the diaphragm linearly (e.g., downward in FIG. 22) causing the spacer 22100 to seal the diaphragm valve 7B closed. In this example, Zone B is not irrigated during the first hour.

State 21. At the 1 hour mark, the controller 11200 briefly shuts off water pressure in the inlet line 11300 (e.g., by closing the master valve 11100).

State 22. With respect to open valve 7A, a decrease in water pressure causes the diaphragm compression spring 19400 to overcome the decreasing fluid pressure. The diaphragm valve transitions to a closed state.

State 23. With the pressure drop, the water in the lockstep actuator 24100 diaphragm chamber 28800 exits through the lockstep actuator passages 28900 and 28100 and diaphragm bleed port 19500 and 19600, respectively, see FIGS. 19 and 28. With loss of pressure in the lockstep actuator diaphragm chamber 28800, the return spring 28550 exerts a force on the pressure disk 28555 causing linear motion (e.g., downward motion in FIG. 28).

State 24. The linear motion of the pressure disk 28555 causes a linear motion of the coupled drive spring 16000. As the coupled drive spring in contact with the cog wheel 25400 moves downward, the drive spring edge 16100 makes contact with the cog wheel post 19. As the coupled drive spring moves downward, the cog wheel 8 is held in a fixed position by the leaf spring 16300 in contact with the cog wheel post 19. The coupled drive spring continues its downward motion as the curved edge of the drive spring 16100 moves over the surface of the cog wheel post 19, bending outward, until the drive spring clears the post and engages the cog wheel post 19. The lockstep actuator 24100 is reset.

State 25. With respect to closed valve 7B, the diaphragm compression spring 22400 maintains the valve closed in light of the decreased water pressure.

State 26. With the pressure drop, the water in the lockstep actuator 24200 diaphragm chamber 28800 exits through the lockstep actuator passage 29900 and diaphragm bleed port 22500, see FIG. 22 and FIG. 28. With loss of pressure in the lockstep actuator diaphragm chamber 28800, the return spring 28550 exerts a force on the pressure disk 28555 causing linear motion (e.g., downward motion in FIG. 29).

State 27. The linear motion of the pressure disk 28555 causes a linear motion of the coupled drive spring 16000. As the coupled drive spring in contact with the cog wheel 25400 moves downward, the drive spring edge 16100 makes contact with the cog wheel post 19. As the coupled drive spring moves downward, the cog wheel 25400 is held in a fixed position by the leaf spring 16300 in contact with the cog wheel post 19. The coupled drive spring continues its downward motion as the curved edge of the drive spring 16100 moves over the surface of the cog wheel post 19, bending outward, until the drive spring clears the post and engages the cog wheel post 19. The lockstep actuator 24200 is reset.

State 28. The controller 11200 then reasserts water pressure in the inlet line 11300 (e.g., by opening a master valve 11100).

State 29. The pressurized water flow moves down the main line 11300 and makes contact with the diaphragm valve 7A, see FIG. 24 (which is an open position). The water flows through the spacer passage 19300, through the bleed port passage 19500, and through the lockstep actuator passage 28900, see FIG. 28.

State 30-36. Repeating States 14-20, with the closing of the pilot valve port 27100, the diaphragm bleed port passage 19500 is effectively closed. Water pressure in the valve diaphragm chamber 22200 begins to build. The shape of the diaphragm 22700 and return spring 22400 compression overcome the pressure exerted by the inlet water pressure 11300 causes an expansion of the diaphragm linearly (e.g., downward in FIG. 22) causing the spacer 22100 to seal the diaphragm valve 7A closed. The irrigation of Zone A ends.

State 37. Returning to State 28. Fluid begins to flow down the main line 11300 with the opening of the control valve 11100. The pressurized water flow moves down the main line 11300 and makes contact with the diaphragm valve 7B, see FIG. 24. The water flows through the spacer passage 22300 building up water pressure behind the diaphragm seating the diaphragm if it was previously not seated in the closed position.

State 38-46. Repeating States 4-12, with the loss of pressure in the diaphragm chamber 22200, the force of the water pressure in the inlet 11300 overcomes the spring compression 19400 and the diaphragm valve 7A opens, see FIG. 19. Water flows unobstructed from the inlet 11300 through the diaphragm valve 7B to the outlet 11510. The irrigation of Zone B begins.

State 47. At the two hour mark, the controller 11200 briefly shuts off water pressure in the inlet line 11300 (e.g., by closing the master valve 11100).

States 48-50. Repeating States 25-27, with the pressure drop, the water in the lockstep actuator diaphragm chamber 28800 exits through the lockstep actuator passage 29900 and diaphragm bleed port 22500, see FIG. 22 and FIG. 29. The lockstep actuator 24100 resets.

States 51-53. Repeating States 22-24, with the pressure drop, the water in the lockstep actuator diaphragm chamber 28800 exits through the lockstep actuator passages 28900 and 28100 and diaphragm bleed ports 19500 and 19600, respectively, see FIGS. 19 and 28. The lockstep actuator 24200 resets.

State 54. The controller 11200 reasserts water pressure in the inlet line 11300 (e.g., by opening a master valve 11100).

States 55-63. Repeating States 4-12, with the loss of pressure in the diaphragm chamber 22200, the force of the water pressure in the inlet 11300 overcomes the spring compression 19400 and the diaphragm valve 7A opens, see FIG. 19. Water flows unobstructed from the inlet 11300 through the diaphragm valve 7A to the outlet 11510. The irrigation of Zone A begins.

States 64-71. States 13-20 are repeated. With the closing of the pilot valve port 27100, the diaphragm bleed port passage 19500 is effectively closed. Water pressure in the valve diaphragm chamber 22200 begins to build. The shape of the diaphragm 22700 and return spring 22400 compression overcome the pressure exerted by the inlet water pressure 11300 causes an expansion of the diaphragm linearly (e.g., downward in FIG. 22) causing the spacer 22100 to seal the diaphragm valve 7B closed. The irrigation of Zone B ends.

State 72. At the three hour mark, the controller 11200 briefly shuts off water pressure in the inlet line 11300 (e.g., by closing the master valve 11100).

States 73-75. Repeating States 22-24, with the pressure drop, the water in the lockstep actuator diaphragm chamber 28800 exits through the lockstep actuator passages 28900 and 28100 and diaphragm bleed ports 19500 and 19600, respectively, see FIGS. 19 and 28. The lockstep actuator 24100 resets.

States 76-78. Repeating States 25-27, with the pressure drop, the water in the lockstep actuator diaphragm 28800 exits through the lockstep actuator passage 29900 and diaphragm bleed ports 22500, see FIG. 22 and FIG. 28. The lockstep actuator 24200 resets.

State 79. The controller 11200 reasserts water pressure in the inlet line 11300 (e.g., by opening a master valve 11100).

States 80-87. Repeating States 13-20, with the closing of the pilot valve port 27100, the diaphragm bleed port passage 19500 is effectively closed. Water pressure in the valve diaphragm chamber 22200 begins to build. The shape of the diaphragm 22700 and return spring 22400 compression overcome the pressure exerted by the inlet water pressure 11300 causes an expansion of the diaphragm linearly (e.g., downward in FIG. 22) causing the spacer 22100 to seal the diaphragm valve 7A closed. The irrigation of Zone A ends.

States 88-96. Repeating States 4-12, with the loss of pressure in the diaphragm chamber 22200, the force of the water pressure in the inlet 11300 overcomes the spring compression 19400 and the diaphragm valve 7A opens, see FIG. 19. Water flows unobstructed from the inlet 11300 through the diaphragm valve 7B to the outlet 11510. The irrigation of Zone B begins.

State 97. At the 4 hour mark, the controller shuts off water pressure in the inlet line 1 (e.g., by closing a valve) terminating the field irrigation for the day. The cycle repeats beginning the next morning at 6 AM.

Fourth Example Embodiment

The forth example operating environment illustrates the irrigation of a field using a different example embodiment of a lockstep actuator to that illustrated in Example 3. As in the other examples, the field is irrigated using a lockstep actuator per valve without manual labor or electrical power beyond the central pump and master valve, see FIG. 35. In this fourth example, a second type of diaphragm valve is used to further illustrate the flexibility of the actuator to interoperate with different diaphragm valve types. In this example, as in the third example, the fluid activated valve actuator (labeled a lockstep actuator) is mounted in the solenoid position in each of the diaphragm valves in the operating system, see FIG. 20 and FIG. 36.

Figure 35:
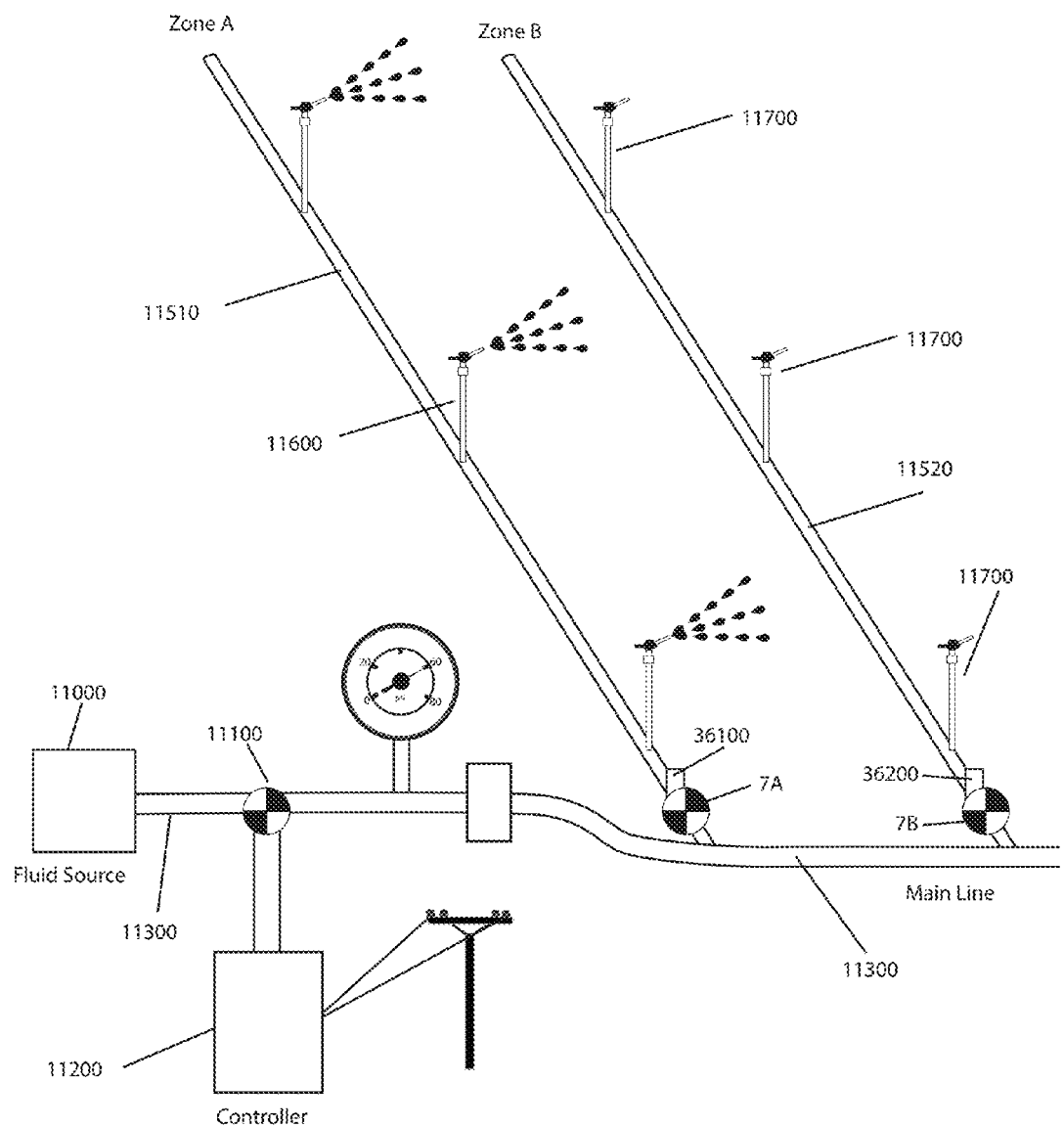
FIG. 35 depicts a fourth example operating environment for a fluid activated actuator assembly.

FIG. 35 illustrates the operating environment of a fourth example fluid activated actuator system. The operating environment consists of a pressurized water source (e.g., a water pump) 11000. The pressurized water is delivered using conventional water transport methods including, for example PVC pipes, to a master valve 11100. The master valve 11100, for example, is a conventional diaphragm valve. Attached to the master valve 11100 is a conventional valve controller 11200. The valve controller actuates the master valve 11100 into a closed or open position based upon a user configurable timing schedule. When the master valve 11100 is actuated into the on/open position by the controller 11200, pressurized fluid is released from the water source 11000 into the main line 11300. In this fourth example operating environment, the main water line 11300 is fluidly connected to 2 diaphragm valves 7A and 7B in a parallel circuit fashion. In this example, the diaphragm valves 7A and 7B are controlled via fluid activated lockstep actuators 36100 and 36200. The lockstep actuators 36100 and 36200 are mounted in the solenoid position of the diaphragm valve 7A and 7B, respectively. When the diaphragm valve 7A is in the on position, source water in the main line is delivered to a lateral water line 11510. When the diaphragm valve is in the off position, source water in the main line is prevented from flowing down the lateral water line 11510. Similarly, with respect to diaphragm valve 7B, when the diaphragm valve is in the on position, source water in the main line is delivered to the lateral water line 11520. When the diaphragm valve is in the off position, source water in the main line is prevented from flowing down the lateral water line 11520. Each lateral water line 11510 and 11520 is configured with a series of sprinklers 11600 and 11700, respectively. Water flowing through the lateral line exits the sprinklers and the field is thereby irrigated. Lastly, in this example, the diaphragm valves 7A and 7B are a considerable distance from the master valve (e.g., 250 yards or more) and at a considerable distance from each other.

In this fourth example, the lockstep actuators 36100 and 36200 replace two conventional solenoid-based actuators as illustrated in FIG. 36. In this example, the solenoids in the diaphragm valves 7A and 7B are replaced with lockstep actuators 36100 and 36200, see FIG. 36. In this example, no modification to the existing diaphragm valve is required. Optionally, the diaphragm valves are purchased by the user without solenoids and the lockstep actuators 36100 and 36200 are installed without a solenoid removal step. Optionally, the diaphragm valves are purchased with the lockstep actuators preinstalled.

In this sprinkler irrigation example, water is applied to a farm field using a timed schedule. Irrigation begins every day at 6 AM in the morning and cycles/alternates between Zone A and Zone B for periods of 1 hour. Irrigation of the field ends at 10 AM each day resulting in an irrigation total of 2 hours for each Zone. Zone A is covered by sprinklers 11600 and Zone B is covered by sprinklers 11700. The water source 11000 applies water fluid pressure to the main line, see FIG. 35.

State 1. The user manually actuates the lockstep actuator by pulling the manual setting knob 32800 until the actuator indicator 44100 indicates that the first actuator 7A is in a closed diaphragm valve position. The user manually actuates the lockstep actuator by pulling the manual setting knob 32800 until the actuator indicator 44100 indicates that the second actuator 7B is in an open diaphragm valve position. [In this example, manually actuating to a closed first valve and an open second valve will result in an initial open first valve when water pressure is applied. Conversely, in this example, manually actuating to an open first valve and a closed second valve will result in an initial closed first valve when water pressure is applied.]

State 2. In this example, at 6 AM the 11200 controller, which includes a timing mechanism 11200, opens the master control valve 11100.

State 3. Fluid begins to flow down the main line 11300 with the opening of the control valve 11100. The pressurized water flow moves down the main line 11300 and makes contact with the diaphragm valve 7A, see FIG. 35.

State 4. Fluid flows through the diaphragm valve passageway 31100 into the lockstep actuator 36100.

State 5. Fluid enters the actuator diaphragm chamber 32150 via the lockstep actuator passage 34200. As the actuator diaphragm chamber 32150 fills, the pressure from the fluid exerts a force against the push plate 32300 overcoming the return spring 32400 compression causing the push plate 32300 to move in a linear motion (e.g., in FIG. 32 upwards). In this example, the push plate 32300 is incased within a channel within the protective housing to ensure the linear direction of motion of the pressure disk.

State 6. A drive bar/leaf spring 32500 is fixed to the push plate 32300. In this example, the drive bar 32500 moves linearly in the direction of the rigid pressure disk 32300.

State 7. The drive bar 32500 is bent outward at the end. The end of the drive bar 32500 is in contact with a cog wheel 32600 and cog wheel post 19. The linear motion of the drive spring 32500 applies a force to the cog wheel post 19 which causes the cog wheel to advance 90 degrees.

State 8. In this example, the cog wheel 32600 is notched 33200, see FIG. 33. The actuator includes an anti-back rotational leaf spring which is fixed to the actuator housing. As the cog wheel advances in State 7, the anti-back rotational leaf spring makes contact with the cog wheel 32600 but does not impede the progress of the cog wheel 32600. In this example, as the cog wheel 32600 nears a 90 degree rotation, the anti-back rotational leaf spring clears the end of the notch 33200 in the cog wheel 32600 and is positioned to prevent back rotation when the push plate 32300 and coupled actuator diaphragm 32100 retracts (e.g., in response to the spring 32400 overcoming a drop in fluid pressure).

State 9. Cog wheel 32600 is fixed to a pilot valve shaft 34100 which rotates as the cog wheel 32600 rotates, see FIG. 32. In this example, a 90 degrees rotation of the pilot valve shaft port 34100 blocks the actuator fluid passage between passage 34500 and passage 34400. In addition, the pilot valve shaft port 34600 opens creating a passageway between actuator passage 34400 and actuator passage 34700 (e.g. to an open area outside of the diaphragm valve and associated lockstep actuator).

State 10. With the opening of the valve shaft port 34600, a passage is created through which water can exhaust from the valve diaphragm chamber 31200. The water exhausting from the diaphragm valve chamber 31200 causes the diaphragm 31300 to contract/compress in a linear motion (e.g., upward in FIG. 31 in reaction to water pressure from inlet 11300) causing the diaphragm valve 7A to open. Water flows unobstructed from the inlet 11300 through the diaphragm valve 7A to the outlet 11510. The irrigation of Zone A begins.

State 11. Returning to State 2. Fluid begins to flow down the main line 11300 with the opening of the control valve 11100. The pressurized water flow moves down the main line 11300 and makes contact with the diaphragm valve 7B, see FIG. 35.

State 12. Fluid flows through the diaphragm valve passageway 31100 into the lockstep actuator 36200.

State 13. Fluid enters the actuator diaphragm chamber 32150 via the lockstep actuator passage 34200. As the actuator diaphragm chamber 32150 fills, the pressure from the fluid exerts a force against the push plate 32300 overcoming the return spring 32400 compression causing the push plate 32300 to move in a linear motion (e.g., in FIG. 32 upwards). In this example, the push plate 32300 is incased within a channel within the protective housing to ensure the linear direction of motion of the pressure disk.

State 14. A drive bar/leaf spring 32500 is fixed to the push plate 32300. In this example, the drive bar 32500 moves linearly in the direction of the rigid pressure disk 32300.

State 15. The drive bar 32500 is bent outward at the end. The end of the drive bar 32500 is in contact with a cog wheel 32600 and cog wheel post 19. The linear motion of the drive spring 32500 applies a force to the cog wheel post 19 which causes the cog wheel to advance 90 degrees.

State 16. In this example, the cog wheel 32600 is notched 33200, see FIG. 33. The actuator includes an anti-back rotational leaf spring which is fixed to the actuator housing. As the cog wheel advances in State 15, the anti-back rotational leaf spring makes contact with the cog wheel 32600 but does not impede the progress of the cog wheel 32600. In this example, as the cog wheel 32600 nears a 90 degree rotation, the anti-back rotational leaf spring clears the end of the notch 33200 in the cog wheel 32600 and is positioned to prevent back rotation when the push plate 32300 and coupled actuator diaphragm 32100 retracts (e.g., in response to the spring 32400 overcoming a drop in fluid pressure).

State 17. Cog wheel 32600 is fixed to a pilot valve shaft 34100 which rotates as the cog wheel 32600 rotates, see FIG. 32. In this example, a 90 degrees rotation of the pilot valve aligns the pilot valve shaft port 34200 with passage 34500 and passage 34400 to allow fluid to flow through the actuator housing via the pilot valve shaft port 34200, and into the attached valve diaphragm chamber 31200, see FIG. 31 and FIG. 34. In addition, the pilot valve rotation changes the alignment of the pilot valve port 34600 so as to block the passageway between actuator passage 34700 and actuator passage 34400.

State 18. With the opening of the valve shaft port 34200, a fluid passage is created through which water can flow from the water inlet passage 11300, through: (a) the tubing 31100 connecting the inlet water flow with the actuator assembly, (b) the actuator inlet assembly passage 34500, (c) the pilot valve port 34200, (d) the outlet actuator passage 34400. The water flow entering the diaphragm valve causes the diaphragm 31300 to expand in a linear motion (e.g., downward in FIG. 31) causing the diaphragm valve 7B to close.

State 19. At the 1 hour mark, the controller 11200 briefly shuts off water pressure in the inlet line 11300 (e.g., by closing the master valve 11100).

State 20. With respect to both lockstep actuator 36100 and lockstep actuator 36200, the pressure drop causes the fluid in the lockstep actuator diaphragm chamber 32150 to exit through the lockstep actuator passages including 32900. With loss of pressure in the lockstep actuator diaphragm chamber 32150, the return spring 32400 exerts a force on the push plate 32300 causing linear motion (e.g., downward motion in FIG. 32).

State 21. A drive bar/leaf spring 32500 is fixed to the push plate 32300. In this example, the drive bar 32500 moves linearly in the direction of the rigid pressure disk 32300.

State 22. The drive bar 32500 is bent outward at the end. As the drive bar/leaf spring is driven along the cog wheel 32600 (e.g., downward in FIG. 32), the drive bar makes contact with the cog wheel post 19. The cog wheel post 19 bends the drive bar back until the drive bar 32500 clears the cog wheel post 19. As the drive bar is driven along the cog wheel 32600, the cog wheel 32600 is held in position by the anti-back rotational leaf spring which is in contact with a notch 33200 on the cog wheel 19. The lockstep actuator 36100 and lockstep actuator 36200 are now reset.

State 23. The controller 11200 reasserts water pressure in the inlet line 11300 (e.g., by opening a master valve 11100).

State 24. Fluid begins to flow down the main line 11300 with the opening of the control valve 11100. The pressurized water flow moves down the main line 11300 and makes contact with the diaphragm valve 7A, see FIG. 35.

State 25-31. Repeating States 12-18, with the opening of the pilot valve port 34200 and closing of the pilot valve 34600, the diaphragm bleed port passage 34400 is effectively closed. Water pressure in the valve diaphragm chamber 31200 begins to build. The diaphragm 31300 overcomes the pressure exerted by the inlet water pressure 11300 causes an expansion of the diaphragm linearly (e.g., downward in FIG. 31) causing diaphragm valve 7A to seal closed. The irrigation of Zone A ends.

State 32. Returning to State 23. Fluid begins to flow down the main line 11300 with the opening of the control valve 11100. The pressurized water flow moves down the main line 11300 and makes contact with the diaphragm valve 7B, see FIG. 35.

State 33-39. Repeating States 4-10, with the opening of the pilot valve 34600, a bleed water passage is created through which water can flow out of the diaphragm valve chamber 31200. With the loss of pressure in the diaphragm chamber 31200, the force of the water pressure in the inlet 11300 opens the diaphragm valve 7A, see FIG. 36. Water flows unobstructed from the inlet 11300 through the diaphragm valve 7B to the outlet 11520. The irrigation of Zone B begins.

State 40. At the 2 hour mark, the controller 11200 briefly shuts off water pressure in the inlet line 11300 (e.g., by closing the master valve 11100).

State 41-43. Repeating States 20-22, with respect to both lockstep actuator 36100 and lockstep actuator 36200, the pressure drop causes the fluid in the lockstep actuator diaphragm chamber 32150 to drain from the internal actuator passages including 32900 causing a reset of the lockstep actuator 36100 and lockstep actuator 36200.

State 44. The controller 11200 reasserts water pressure in the inlet line 113000 (e.g., by opening a master valve 11100).

State 45. Fluid begins to flow down the main line 11300 with the opening of the control valve 11100. The pressurized water flow moves down the main line 11300 and makes contact with the diaphragm valve 7A, see FIG. 35.

States 46-52. Repeating States 4-10, with the opening of the pilot valve 34600, a bleed water passage is created through which water can flow out of the diaphragm valve chamber 31200. With the loss of pressure in the diaphragm chamber 31200, the force of the water pressure in the inlet 11300 opens the diaphragm valve 7A, see FIG. 36. Water flows unobstructed from the inlet 11300 through the diaphragm valve 7A to the outlet 11520. The irrigation of Zone A begins.

State 53. Returning to State 45. Fluid begins to flow down the main line 11300 with the opening of the control valve 11100. The pressurized water flow moves down the main line 11300 and makes contact with the diaphragm valve 7B, see FIG. 35.

States 54-60. Repeating States 12-18, with the opening of the pilot valve port 34200 and closing of the pilot valve 34600, the diaphragm bleed port passage 34400 is effectively closed. Water pressure in the valve diaphragm chamber 31200 begins to build. The diaphragm 31300 overcomes the pressure exerted by the inlet water pressure 11300 causes an expansion of the diaphragm linearly (e.g., downward in FIG. 31) causing diaphragm valve 7B to seal closed. The irrigation of Zone B ends.

State 61. At the three hour mark, the controller 11200 briefly shuts off water pressure in the inlet line 11300 (e.g., by closing the master valve 11100).

State 62-64. Repeating States 20-22, with respect to both lockstep actuator 36100 and lockstep actuator 36200, the pressure drop causes the fluid in the lockstep actuator diaphragm chamber 32150 to drain from the internal actuator passages including 32900 causing a reset of the lockstep actuator 36100 and lockstep actuator 36200.

State 65. The controller 11200 reasserts water pressure in the inlet line 11300 (e.g., by opening a master valve 11100).

State 66. Fluid begins to flow down the main line 11300 with the opening of the control valve 11100. The pressurized water flow moves down the main line 11300 and makes contact with the diaphragm valve 7A, see FIG. 35.

States 67-73. Repeating States 12-18, with the opening of the pilot valve port 34200 and closing of the pilot valve 34600, the diaphragm bleed port passage 34400 is effectively closed. Water pressure in the valve diaphragm chamber 31200 begins to build. The diaphragm 31300 overcomes the pressure exerted by the inlet water pressure 11300 causes an expansion of the diaphragm linearly (e.g., downward in FIG. 31) causing diaphragm valve 7A to seal closed. The irrigation of Zone A ends.

State 74. Returning to State 67. Fluid begins to flow down the main line 11300 with the opening of the control valve 11100. The pressurized water flow moves down the main line 11300 and makes contact with the diaphragm valve 7B, see FIG. 35.

States 75-81. Repeating States 4-10, with the opening of the pilot valve 34600, a bleed water passage is created through which water can flow out of the diaphragm valve chamber 31200. With the loss of pressure in the diaphragm chamber 31200, the force of the water pressure in the inlet 11300 opens the diaphragm valve 7A, see FIG. 36. Water flows unobstructed from the inlet 11300 through the diaphragm valve 7B to the outlet 11520. The irrigation of Zone B begins.

State 82. At the 4 hour mark, the controller shuts off water pressure in the inlet line 1 (e.g., by closing a valve) terminating the field irrigation for the day. The cycle repeats beginning the next morning at 6 AM.

Fifth Example Embodiment

The fifth example operating environment, similar to the fourth example, illustrates the irrigation of a field using multiple fluid activated actuators without manual labor or electrical power beyond the central pump and master valve. In this example, the fluid activated valve actuator (labeled a lockstep actuator) is mounted in the solenoid position in each of the diaphragm valves in the operating system, see FIG. 20 and FIG. 45. The lockstep actuator, while designed using the same general concepts and principles as the actuators of the previous examples, employs slight variations in its design.

Figure 46:
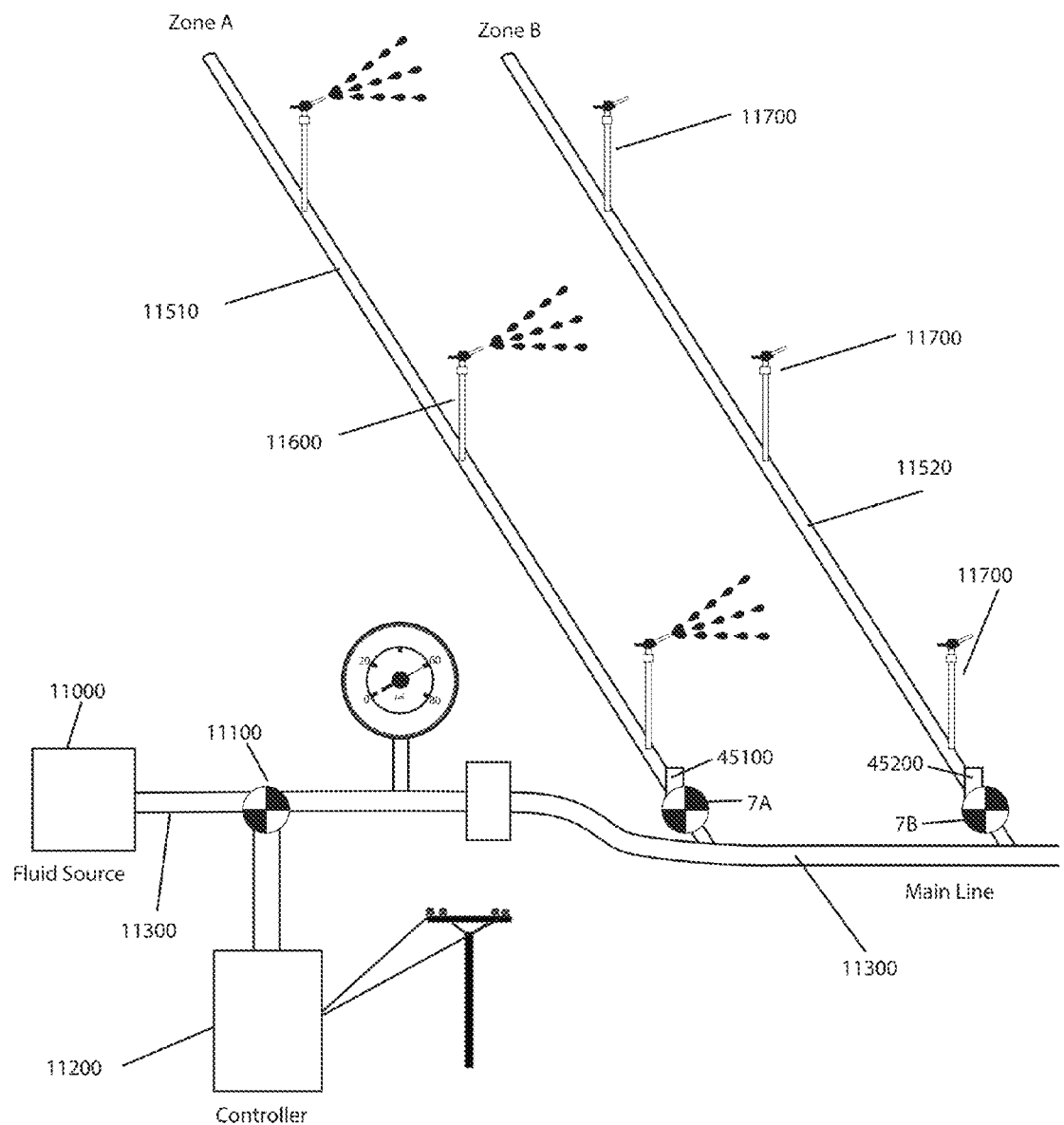
FIG. 46 depicts a fifth example operating environment for a fluid activated actuator assembly.

FIG. 46 illustrates the operating environment of this fifth example fluid activated actuator system which resembles that of the previous example fluid activated actuator system. The operating environment consists of a pressurized water source (e.g., a water pump) 11000. The pressurized water is delivered using conventional water transport methods including, for example PVC pipes, to a master valve 11100. The master valve 11100, for example, is a conventional diaphragm valve. Attached to the master valve 11100 is a conventional valve controller 11200. The valve controller actuates the master valve 11100 into a closed or open position based upon a user configurable timing schedule. When the master valve 11100 is actuated into the on/open position by the controller 11200, pressurized fluid is released from the water source 11000 into the main line 11300. In this example fifth operating environment, the main water line 11300 is fluidly connected to 2 diaphragm valves 7A and 7B in a parallel circuit fashion. In this example, the diaphragm valves 7A and 7B are controlled via fluid activated lockstep actuators 45100 and 45200. The lockstep actuators 45100 and 45200 are mounted in the solenoid position of the diaphragm valve 7A and 7B, respectively. When the diaphragm valve 7A is in the on position, source water in the main line is delivered to a lateral water line 11510. When the diaphragm valve is in the off position, source water in the main line is prevented from flowing down the lateral water line 11510. Similarly, with respect to diaphragm valve 7B, when the diaphragm valve is in the on position, source water in the main line is delivered to the lateral water line 11520. When the diaphragm valve is in the off position, source water in the main line is prevented from flowing down the lateral water line 11520. Each lateral water line 11510 and 11520 is configured with a series of sprinklers 11600 and 11700, respectively. Water flowing through the lateral line exits the sprinklers and the field is thereby irrigated. Lastly, in this example, the diaphragm valves 7A and 7B are a considerable distance from the master valve (e.g., 250 yards or more) and at a considerable distance from each other.

In this fifth example, the lockstep actuators 45100 and 45200 replace two conventional solenoid-based actuators as illustrated in FIG. 45. In this example, the solenoids in the diaphragm valves 7A and 7B are replaced with lockstep actuators 45100 and 45200, see FIG. 45. In this example, no modification to the existing diaphragm valve is required. Optionally, the diaphragm valves are purchased by the user without solenoids and the lockstep actuators 45100 and 45200 are installed without a solenoid removal step. Optionally, the diaphragm valves are purchased with the lockstep actuators preinstalled.

In this sprinkler irrigation example, water is applied to a farm field using a timed schedule. Irrigation begins every day at 6 AM in the morning and cycles/alternates between Zone A and Zone B for periods of 1 hour. Irrigation of the field ends at 10 AM each day resulting in an irrigation total of 2 hours for each Zone. Zone A is covered by sprinklers 11600 and Zone B is covered by sprinklers 11700. The water source 11000 applies water fluid pressure to the main line, see FIG. 46.

State 1. The user manually actuates the lockstep actuator by pulling the manual setting knob 48300 until the actuator indicator 44100 indicates that the first actuator 7A is in a closed diaphragm valve position. The user manually actuates the lockstep actuator by pulling the manual setting knob 36300 until the actuator indicator 44100 indicates that the second actuator 7B is in an open diaphragm valve position. [In this example, manually actuating to a closed first valve and an open second valve will result in an initial open first valve when water pressure is applied. Conversely, in this example, manually actuating to an open first valve and a closed second valve will result in an initial closed first valve when water pressure is applied.]

State 2. In this example, at 6 AM the 11200 controller, which includes a timing mechanism 11200, opens the master control valve 11100.

State 3. Fluid begins to flow down the main line 11300 with the opening of the control valve 11100. The pressurized water flow moves down the main line 11300 and makes contact with the diaphragm valve 7A, see FIG. 46.

State 4. Fluid flows through passages 22300 and 22500 into the lockstep actuator passage 41200 and 41220, see FIG. 22 and FIG. 42.

State 5. Fluid enters the actuator diaphragm chamber 41100 via the lockstep actuator passage 41200. As the actuator diaphragm chamber 41100 fills, the pressure from the fluid exerts a force against the push plate 32300 overcoming the return spring 32400 compression causing the push plate 32300 to move in a linear motion (e.g., in FIG. 41 upwards). In this example, the push plate 32300 is incased within a channel within the protective housing to ensure the linear direction of motion of the pressure disk.

State 6. A drive bar/leaf spring 32500 is fixed to the push plate 32300. In this example, the drive bar 32500 moves linearly in the direction of the push plate 32300.

State 7. The drive bar 32500 is bent outward at the end. The end of the drive bar 32500 is in contact with a cog wheel 32600 and cog wheel post 19. The linear motion of the drive spring 32500 applies a force to the cog wheel post 19 which causes the cog wheel to advance 90 degrees.

State 8. In this example, the cog wheel 32600 is notched 33200, see FIG. 33. The actuator includes an anti-back rotational leaf spring which is fixed to the actuator housing. As the cog wheel advances in State 7, the anti-back rotational leaf spring makes contact with the cog wheel 32600 but does not impede the progress of the cog wheel 32600. In this example, as the cog wheel 32600 nears a 90 degree rotation, the anti-back rotational leaf spring clears the end of the notch 33200 in the cog wheel 32600 and is positioned to prevent back rotation when the push plate 32300 and coupled actuator diaphragm 32150 retracts (e.g., in response to the spring 32400 overcoming a drop in fluid pressure).

State 9. Cog wheel 32600 is fixed to a cam shaft 41300 which rotates as the cog wheel 32600 rotates, see FIG. 43. In this example, a 90 degrees rotation of the cam shaft 41300 causes the post on the end of the cam shaft to apply a force to the plunger 41400. The force of the rotating cam shaft 41300 overcomes the plunger return spring 41450 compression and raises the plunger 41400. The unseating of the plunger creates a water passage from the bleed port inlet 22500 to the bleed port outlet 22600.

State 10. With the unseating of the plunger, a fluid passage is created through which water can exhaust from the valve diaphragm chamber 22200. The water exhausting from the diaphragm valve chamber 22200 causes the diaphragm 19700 to contract/compress in a linear motion (e.g., upward in FIG. 22 in reaction to the lack of internal diaphragm water pressure and the force of the inlet water pressure) causing the diaphragm valve 7A to open, see FIG. 19. Water flows unobstructed from the inlet 11300 through the diaphragm valve 7A to the outlet 11510. The irrigation of Zone A begins.

State 11. Returning to State 2. Fluid begins to flow down the main line 11300 with the opening of the control valve 11100. The pressurized water flow moves down the main line 11300 and makes contact with the diaphragm valve 7B, see FIG. 46.

State 12. Fluid flows through passages 19300 and 19500 into the lockstep actuator passage 41200 and 41220, see FIG. 19 and FIG. 42.

State 13. Fluid enters the actuator diaphragm chamber 41100 via the lockstep actuator passage 41200. As the actuator diaphragm chamber 41100 fills, the pressure from the fluid exerts a force against the push plate 32300 overcoming the return spring 32400 compression causing the push plate 32300 to move in a linear motion (e.g., in FIG. 32 upwards). Note, in this example, the pressure builds because there is sufficient pressure from the inlet 11300 via 31100 together with the shape of the diaphragm to overcome the spring compression. In this example, the push plate 32300 is incased within a channel within the protective housing to ensure the linear direction of motion of the pressure disk.

State 14. A drive bar/leaf spring 32500 is fixed to the push plate 32300. In this example, the drive bar 32500 moves linearly in the direction of the rigid pressure disk 32300.

State 15. The drive bar 32500 is bent outward at the end. The end of the drive bar 32500 is in contact with a cog wheel 32600 and cog wheel post 19. The linear motion of the drive spring 32500 applies a force to the cog wheel post 19 which causes the cog wheel to advance 90 degrees.

State 16. In this example, the cog wheel 32600 is notched 33200, see FIG. 33. The actuator includes an anti-back rotational leaf spring which is fixed to the actuator housing. As the cog wheel advances in State 15, the anti-back rotational leaf spring makes contact with the cog wheel 32600 but does not impede the progress of the cog wheel 32600. In this example, as the cog wheel 32600 nears a 90 degree rotation, the anti-back rotational leaf spring clears the end of the notch 33200 in the cog wheel 32600 and is positioned to prevent back rotation when the push plate 32300 and coupled actuator diaphragm 32100 retracts (e.g., in response to the spring 32400 overcoming a drop in fluid pressure).

State 17. Cog wheel 32600 is fixed to a cam shaft 41300 which rotates as the cog wheel 32600 rotates, see FIG. 32. In this example, a 90 degrees rotation of the cam shaft 41300 causes the post on the end of the cam shaft to move in a downward direction. The return spring 41450 compression causes the plunger 41400 to move downward until the plunger seats against diaphragm bleed water passage 19600, see FIG. 47.

State 18. With the closing of the diaphragm bleed water passage 19500, water pressure in the valve diaphragm chamber 19200 begins to build. The shape of the diaphragm 22700 and return spring 22400 compression overcome the pressure exerted by the inlet water pressure 11300 causes an expansion of the diaphragm linearly (e.g., downward in FIG. 22) causing the spacer 22100 to seal the diaphragm valve 7B closed. In this example, Zone B is not irrigated during the first hour.

State 19. At the 1 hour mark, the controller 11200 briefly shuts off water pressure in the inlet line 11300 (e.g., by closing the master valve 11100).

State 20. With respect to both lockstep actuator 45100 and lockstep actuator 45200, the pressure drop causes the fluid in the lockstep actuator diaphragm chamber 41100 to exit through the lockstep actuator internal passages. With loss of pressure in the lockstep actuator diaphragm chamber 41100, the return spring 32400 exerts a force on the push plate 32300 causing linear motion (e.g., downward motion in FIG. 41).

State 21. A drive bar/leaf spring 32500 is fixed to the push plate 32300. In this example, the drive bar 32500 moves linearly in the direction of the rigid pressure disk 32300.

State 22. The drive bar 32500 is bent outward at the end. As the drive bar/leaf spring is driven along the cog wheel 32600 (e.g., downward in FIG. 32), the drive bar makes contact with the cog wheel post 19. The cog wheel post 19 bends the drive bar back until the drive bar 32500 clears the cog wheel post 19. As the drive bar is driven along the cog wheel 32600, the cog wheel 32600 is held in position by the anti-back rotational leaf spring which is in contact with a notch 33200 on the cog wheel 19. The lockstep actuator 45100 and lockstep actuator 45200 are now reset.

State 23. The controller 11200 reasserts water pressure in the inlet line 113000 (e.g., by opening a master valve 11100).

State 24. Fluid begins to flow down the main line 11300 with the opening of the control valve 11100. The pressurized water flow moves down the main line 11300 and makes contact with the diaphragm valve 7A, see FIG. 46.

State 25-31. Repeating States 12-18, with the rotation of the cam shaft 41300 and the associated lowering of the plunger 41400 the diaphragm bleed port passage 19600 is blocked. Water pressure in the valve diaphragm chamber 19700 begins to build. The shape of the diaphragm 22700 and return spring 22400 compression overcome the pressure exerted by the inlet water pressure 11300 causes an expansion of the diaphragm linearly (e.g., downward in FIG. 22) causing the spacer 22100 to seal the diaphragm valve 7A closed. The irrigation of Zone A ends.

State 32. Returning to State 23. Fluid begins to flow down the main line 11300 with the opening of the control valve 11100. The pressurized water flow moves down the main line 11300 and makes contact with the diaphragm valve 7B, see FIG. 46.

State 33-39. Repeating States 4-10, with the rotation of the cam shaft 41300 and the associated raising of the plunger 41400 the diaphragm bleed port passage 19600 is opened. With the opening of the bleed water passage 22500, a passage is created through which water can flow out of the diaphragm valve chamber 31200 into bleed water passage 22500 and exhaust through bleed water passage 22600. With the loss of pressure in the diaphragm chamber 19200, the force of the water pressure in the inlet 11300 opens the diaphragm valve 7B, see FIG. 19. Water flows unobstructed from the inlet 11300 through the diaphragm valve 7B to the outlet 11520. The irrigation of Zone B begins.

State 40. At the 2 hour mark, the controller 11200 briefly shuts off water pressure in the inlet line 11300 (e.g., by closing the master valve 11100).

State 41-43. Repeating States 20-22, with respect to both lockstep actuator 45100 and lockstep actuator 45200, the pressure drop causes the fluid in the lockstep actuator diaphragm chamber 41100 to drain from internal passages causing a reset of the lockstep actuator 45100 and lockstep actuator 45200.

State 44. The controller 11200 reasserts water pressure in the inlet line 113000 (e.g., by opening a master valve 11100).

State 45. Fluid begins to flow down the main line 11300 with the opening of the control valve 11100. The pressurized water flow moves down the main line 11300 and makes contact with the diaphragm valve 7A, see FIG. 46.

States 46-52. Repeating States 4-10, with the rotation of the cam shaft 41300 and the associated raising of the plunger 41400 the diaphragm bleed port passage 19600 is opened. With the opening of the bleed water passage 22500, a passage is created through which water can flow out of the diaphragm valve chamber 31200 into bleed water passage 22500 and exhaust through bleed water passage 22600. With the loss of pressure in the diaphragm chamber 19200, the force of the water pressure in the inlet 11300 opens the diaphragm valve 7A, see FIG. 19. Water flows unobstructed from the inlet 11300 through the diaphragm valve 7A to the outlet 11520. The irrigation of Zone A begins.

State 53. Returning to State 45. Fluid begins to flow down the main line 11300 with the opening of the control valve 11100. The pressurized water flow moves down the main line 11300 and makes contact with the diaphragm valve 7B, see FIG. 46.

States 54-60. Repeating States 12-18, with the opening of the pilot valve port 34200 and closing of the pilot valve 34600, the diaphragm bleed port passage 34400 is effectively closed. Water pressure in the valve diaphragm chamber 31200 begins to build. The diaphragm 31300 overcomes the pressure exerted by the inlet water pressure 11300 causes an expansion of the diaphragm linearly (e.g., downward in FIG. 31) causing diaphragm valve 7B to seal closed. The irrigation of Zone B ends. Repeating States 11-18, with the rotation of the cam shaft 41300 and the associated lowering of the plunger 41400 the diaphragm bleed port passage 19600 is blocked. Water pressure in the valve diaphragm chamber 19700 begins to build. The shape of the diaphragm 22700 and return spring 22400 compression overcome the pressure exerted by the inlet water pressure 11300 causes an expansion of the diaphragm linearly (e.g., downward in FIG. 22) causing the spacer 22100 to seal the diaphragm valve 7B closed. The irrigation of Zone B ends.

State 61. At the three hour mark, the controller 11200 briefly shuts off water pressure in the inlet line 11300 (e.g., by closing the master valve 11100).

State 62-64. Repeating States 20-22, with respect to both lockstep actuator 45100 and lockstep actuator 45200, the pressure drop causes the fluid in the lockstep actuator diaphragm chamber 41100 to drain from internal passages causing a reset of the lockstep actuator 45100 and lockstep actuator 45200.

State 65. The controller 11200 reasserts water pressure in the inlet line 11300 (e.g., by opening a master valve 11100).

State 66. Fluid begins to flow down the main line 11300 with the opening of the control valve 11100. The pressurized water flow moves down the main line 11300 and makes contact with the diaphragm valve 7A, see FIG. 35.

States 67-73. Repeating States 12-18, with the rotation of the cam shaft 41300 and the associated lowering of the plunger 41400 the diaphragm bleed port passage 19600 is blocked. Water pressure in the valve diaphragm chamber 19700 begins to build. The shape of the diaphragm 22700 and return spring 22400 compression overcome the pressure exerted by the inlet water pressure 11300 causes an expansion of the diaphragm linearly (e.g., downward in FIG. 22) causing the spacer 22100 to seal the diaphragm valve 7A closed. The irrigation of Zone A ends.

State 74. Returning to State 67. Fluid begins to flow down the main line 11300 with the opening of the control valve 11100. The pressurized water flow moves down the main line 11300 and makes contact with the diaphragm valve 7B, see FIG. 35.

States 75-81. Repeating States 4-10, with the rotation of the cam shaft 41300 and the associated raising of the plunger 41400 the diaphragm bleed port passage 19600 is opened. With the opening of the bleed water passage 22500, a passage is created through which water can flow out of the diaphragm valve chamber 31200 into bleed water passage 22500 and exhaust through bleed water passage 22600. With the loss of pressure in the diaphragm chamber 19200, the force of the water pressure in the inlet 11300 opens the diaphragm valve 7B, see FIG. 19. Water flows unobstructed from the inlet 11300 through the diaphragm valve 7B to the outlet 11520. The irrigation of Zone B begins.

State 82. At the 4 hour mark, the controller shuts off water pressure in the inlet line 1 (e.g., by closing a valve) terminating the field irrigation for the day. The cycle repeats beginning the next morning at 6 AM.

What is claimed is:

1. A fluid regulator, comprising:
   a fluid inlet;
   a fluid outlet;
   a first piston;
   a plurality of fluid passages including a first fluid passage and a second fluid passage;
   a first housing having a fluid connector configured to engage an output valve having a second housing;
   an actuator configured to, without utilizing an electrically powered component:
   open the output valve to provide a fluid flow path between the fluid inlet and the fluid outlet at least partly in response to:
   a first flow of fluid received via the fluid inlet that causes a first movement of the first piston that opens the first fluid passage, and
   a fluid flow through the fluid connector from the output valve second housing;
   the actuator further configured to, without utilizing an electrically powered component:
   close the output valve to obstruct the fluid flow path between the fluid inlet and fluid outlet at least partly in response to:
   an interruption of the first flow of fluid received via the fluid inlet,
   a subsequent, relative to the interruption of the first flow, second flow of fluid received via the fluid inlet, that causes a second movement of the first piston, and
   an interruption of the fluid flow through the fluid connector from the output valve second housing caused at least in part by a closure of the first fluid passage which is caused by the second movement of the first piston.

2. The fluid regulator as defined in claim 1, the fluid regulator further configured to:
   at least partly in response to the second movement of the first piston, transition the second fluid passage from a closed state to an open state.

3. The fluid regulator as defined in claim 1, wherein the fluid inlet comprises a plurality of fluid inlets, and the fluid outlet comprise a plurality of fluid outlets.

4. The fluid regulator as defined in claim 1, wherein the fluid connector of the first housing comprises a male threaded connector.

5. The fluid regulator as defined in claim 1, wherein the output valve having the second housing comprises a female threaded connector configured to threadedly engage the fluid connector of the first housing.

6. The fluid regulator as defined in claim 1, wherein the first fluid passage and the second fluid passage are fluidly connected via the fluid connector to a diaphragm port of the output valve.

7. The fluid regulator as defined in claim 1, the fluid regulator further configured to:
   maintain the first fluid passage in an open state during the interruption of the first flow of fluid.

8. The fluid regulator as defined in claim 1, wherein the fluid flow through the fluid connector from the output valve second housing comprises a gas or a liquid.

9. A fluid regulator, comprising:
   a fluid inlet;
   a fluid outlet;
   one or more pistons including a first piston;
   a plurality of fluid passages including a first fluid passage and a second fluid passage;
   a first housing having a fluid connector configured to engage an output valve having a second housing;
   an actuator configured to, without utilizing an electrically powered component:
   open the output valve to provide a fluid flow path between the fluid inlet and the fluid outlet at least partly in response to:
      a first pressure increase of a fluid flow received via the fluid inlet that equals or exceeds a first threshold, which causes a first movement of the first piston, which causes the first fluid passage to transition from a closed state to an opened state, and
      a fluid flow through the fluid connector from the output valve second housing;
   the actuator further configured to, without utilizing an electrically powered component:
   close the output valve to obstruct the fluid flow path at least partly in response to:
      a first pressure reduction of the fluid flow, received via the fluid inlet, that falls to or below a second threshold,
      a subsequent, relative to the first pressure reduction, second pressure increase of the fluid flow, received via the fluid inlet, that equals or exceeds the first threshold, that causes a second movement of the first piston, and
      an interruption of the fluid flow through the fluid connector from the output valve second housing caused at least in part by the closure of the first fluid passage, which is caused at least in part by the second movement of the first piston.

10. The fluid regulator as defined in claim 9, the fluid regulator further configured to open the second fluid passage at least partly in response to the second movement of the first piston.

11. The fluid regulator as defined in claim 9, wherein the first threshold and/or the second threshold are user configurable via a mechanical control of the fluid regulator.

12. The fluid regulator as defined in claim 9, wherein the fluid inlet comprises a plurality of fluid inlets, and the fluid outlet comprise a plurality of fluid outlets.

13. The fluid regulator as defined in claim 9, wherein fluid connector of the first housing comprises a male threaded connector.

14. The fluid regulator as defined in claim 9, wherein the output valve having the second housing comprises a female threaded connector configured to threadedly engage the fluid connector of the first housing.

15. The fluid regulator as defined in claim 9, wherein the first fluid passage and the second fluid passage are fluidly connected via the fluid connector to a diaphragm port of the output valve.

16. The fluid regulator as defined in claim 9, the fluid regulator further configured to:
   maintain the first fluid passage in an open state during the first reduction in pressure of the first input flow of fluid.

17. The fluid regulator as defined in claim 9, wherein the fluid flow through the output valve comprises a gas or a liquid.

18. A fluid regulator, comprising:
   a fluid inlet;
   a fluid outlet;
   a first piston;
   a first fluid passage and a second fluid passage;
   a first housing having a fluid connector configured to engage a plurality of output valves having a second housing;
   an actuator configured to, without utilizing an electrically powered component:
   open the plurality of output valves to provide a fluid flow path between the fluid inlet and the fluid outlet at least partly in response to:
      a first pressure increase of a fluid flow received via the fluid inlet that equals or exceeds a first threshold, which causes
      a first movement of the first piston, which causes the first fluid passage to transition from a closed state to an opened state, and
      a fluid flow through the fluid connector from the plurality of output valves second housing;
   the actuator further configured to, without utilizing an electrically powered component:
   close the plurality of output valves to obstruct the fluid flow path at least partly in response to:
      a first pressure reduction of the fluid flow received via the fluid inlet that falls to or below a second threshold,
      a subsequent, relative to the first pressure reduction, second pressure increase of the fluid flow via the fluid inlet that is equal to or exceeds the first threshold, that causes
      a second movement of the first piston, and
      an interruption of the fluid flow through the fluid connector from the plurality of output valves second housing caused at least in part by the closure of the first fluid passage, which is caused at least in part by the second movement of the first piston.

19. The fluid regulator as defined in claim 18, the fluid regulator further configured to:
   maintain the first fluid passage in an open state during the first reduction in pressure of the first input flow of fluid.

20. The fluid regulator as defined in claim 18, the fluid regulator further configured to:
   open the second fluid passage at least partly in response to the second movement of the first piston.

21. The fluid regulator as defined in claim 18, wherein the first threshold and/or the second threshold are user configurable via a mechanical control of the fluid regulator.

\* \* \* \* \*